US011013250B2

(12) United States Patent
Vrljic et al.

(10) Patent No.: US 11,013,250 B2
(45) Date of Patent: *May 25, 2021

(54) METHODS AND COMPOSITIONS FOR CONSUMABLES

(71) Applicant: Impossible Foods Inc., Redwood City, CA (US)

(72) Inventors: Marija Vrljic, San Mateo, CA (US); Sergey Solomatin, Mountain View, CA (US); Rachel Fraser, San Francisco, CA (US); Patrick O'Reilly Brown, Stanford, CA (US); Jessica Karr, San Francisco, CA (US); Celeste Holz-Schietinger, East Palo Alto, CA (US); Michael Eisen, Berkeley, CA (US); Ranjani Varadan, Fremont, CA (US)

(73) Assignee: Impossible Foods Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/238,802

(22) Filed: Jan. 3, 2019

(65) Prior Publication Data

US 2019/0200658 A1 Jul. 4, 2019

Related U.S. Application Data

(63) Continuation of application No. 15/786,776, filed on Oct. 18, 2017, now Pat. No. 10,172,381, which is a
(Continued)

(51) Int. Cl.
*A23L 13/00* (2016.01)
*A23L 13/40* (2016.01)
(Continued)

(52) U.S. Cl.
CPC .......... *A23L 13/426* (2016.08); *A23D 7/0053* (2013.01); *A23D 7/0056* (2013.01);
(Continued)

(58) Field of Classification Search
CPC ...................................................... A23J 3/227
See application file for complete search history.

(56) References Cited

U.S. PATENT DOCUMENTS

| 2,934,435 | A | 4/1960 | May |
| 2,934,436 | A | 4/1960 | May |

(Continued)

FOREIGN PATENT DOCUMENTS

| CN | 1252231 A | 5/2000 |
| CN | 1301811 A | 7/2001 |

(Continued)

OTHER PUBLICATIONS

"Heterologous," Merriam-Webster Dictionary, retrieved on Sep. 10, 2015, http://www.merriam-webster.com/dictionary/heterologous, 1 page.

(Continued)

*Primary Examiner* — Elizabeth Gwartney
(74) *Attorney, Agent, or Firm* — Fish & Richardson P.C.

(57) ABSTRACT

Methods and compositions for the production of non-meat consumable products are described herein. A meat substitute is described which is constructed from a muscle analog, a fat analog, and a connective tissue analog.

23 Claims, 9 Drawing Sheets

Specification includes a Sequence Listing.

Related U.S. Application Data continuation of application No. 14/796,970, filed on Jul. 10, 2015, now Pat. No. 10,039,306, which is a continuation of application No. PCT/US2014/011361, filed on Jan. 13, 2014, which is a continuation of application No. 13/941,211, filed on Jul. 12, 2013, now abandoned.

(60) Provisional application No. 61/908,634, filed on Nov. 25, 2013, provisional application No. 61/751,816, filed on Jan. 11, 2013.

(51) Int. Cl.
| | |
|---|---|
| A23D 7/005 | (2006.01) |
| A23L 2/66 | (2006.01) |
| A23J 3/22 | (2006.01) |
| A23L 29/238 | (2016.01) |
| A23L 7/109 | (2016.01) |
| A23L 27/10 | (2016.01) |
| A23L 5/41 | (2016.01) |
| A23L 33/185 | (2016.01) |
| A23J 3/14 | (2006.01) |
| A23L 27/26 | (2016.01) |
| A23L 27/00 | (2016.01) |
| A23L 27/20 | (2016.01) |

(52) U.S. Cl.
CPC .......... *A23J 3/14* (2013.01); *A23J 3/227* (2013.01); *A23L 2/66* (2013.01); *A23L 5/41* (2016.08); *A23L 7/109* (2016.08); *A23L 13/42* (2016.08); *A23L 13/424* (2016.08); *A23L 27/00* (2016.08); *A23L 27/10* (2016.08); *A23L 27/20* (2016.08); *A23L 27/26* (2016.08); *A23L 29/238* (2016.08); *A23L 33/185* (2016.08)

(56) References Cited

U.S. PATENT DOCUMENTS

| | | |
|---|---|---|
| 2,934,437 A | 4/1960 | Morton et al. |
| 2,955,041 A | 10/1960 | Broderick |
| 3,157,516 A | 11/1964 | Huber |
| 3,271,167 A | 9/1966 | Perret |
| 3,316,099 A | 4/1967 | Hoersch |
| 3,365,306 A | 1/1968 | Perret |
| 3,394,015 A | 7/1968 | Giacino et al. |
| 3,394,016 A | 7/1968 | Bidmead |
| 3,394,017 A | 7/1968 | Giacino et al. |
| 3,480,447 A | 11/1969 | Hack |
| 3,493,395 A | 2/1970 | Soeters |
| 3,519,437 A | 7/1970 | Giacino et al. |
| 3,524,747 A | 8/1970 | O'Hara |
| 3,532,514 A | 10/1970 | May |
| 3,532,515 A | 10/1970 | Broderick |
| 3,578,465 A | 5/1971 | van der Zijden |
| 3,615,600 A | 10/1971 | Zevenaar |
| 3,620,772 A | 11/1971 | Nagayoshi |
| 3,642,497 A | 2/1972 | Gunther |
| 3,645,753 A | 2/1972 | Gasser |
| 3,645,754 A | 2/1972 | Wiener |
| 3,658,550 A | 4/1972 | Hawley |
| 3,660,114 A | 5/1972 | Thomas |
| 3,689,289 A | 9/1972 | Perret |
| 3,693,533 A | 9/1972 | Liepa |
| 3,697,295 A | 10/1972 | van der Ouweland |
| 3,716,379 A | 2/1973 | de la Potterie |
| 3,716,380 A | 2/1973 | de la Potterie |
| 3,719,499 A | 3/1973 | Hai et al. |
| 3,741,775 A | 6/1973 | Lee |
| 3,761,287 A | 9/1973 | Jaeggi et al. |
| 3,804,953 A | 4/1974 | Bentz et al. |
| 3,829,582 A | 8/1974 | Guadagni et al. |
| 3,840,674 A | 10/1974 | Joseph et al. |
| 3,857,970 A | 12/1974 | Tsumura |
| 3,870,801 A | 3/1975 | Tombs |
| 3,879,561 A | 4/1975 | Smith et al. |
| 3,881,022 A | 4/1975 | Gasser |
| 3,928,643 A | 12/1975 | Ishiguro et al. |
| 3,930,046 A | 12/1975 | Baugher |
| 3,966,985 A | 6/1976 | Jonas |
| 3,973,043 A | 8/1976 | Lynn |
| 4,045,587 A | 8/1977 | Katz et al. |
| 4,066,793 A | 1/1978 | Eguchi |
| 4,076,852 A | 2/1978 | Van Delft et al. |
| 4,094,997 A | 6/1978 | Aishima et al. |
| 4,098,913 A | 7/1978 | Baugher |
| 4,132,809 A | 1/1979 | Desrosier |
| 4,161,550 A | 7/1979 | Bernhardt et al. |
| 4,165,391 A | 8/1979 | Corbett |
| 4,197,324 A | 4/1980 | Ziminski et al. |
| 4,218,487 A | 8/1980 | Jaeggi |
| 4,324,807 A | 4/1982 | Kim et al. |
| 4,411,915 A | 10/1983 | Eriksson |
| 4,435,438 A | 3/1984 | Lehnhardt et al. |
| 4,604,290 A | 8/1986 | Lee et al. |
| 4,678,676 A | 7/1987 | Ishizuka et al. |
| 4,994,285 A | 2/1991 | Hisano et al. |
| 5,039,543 A | 8/1991 | Lee et al. |
| 5,055,310 A | 10/1991 | Nonaka et al. |
| 5,264,239 A | 11/1993 | Cornet et al. |
| 5,443,852 A | 8/1995 | Shahidi et al. |
| 5,597,594 A | 1/1997 | Matsuura et al. |
| 5,650,554 A | 7/1997 | Moloney et al. |
| 5,753,295 A | 5/1998 | Goldman |
| 5,807,601 A | 9/1998 | Carpenter et al. |
| 5,856,452 A | 1/1999 | Moloney et al. |
| 5,922,392 A | 7/1999 | Kelly et al. |
| 6,093,424 A | 7/2000 | Han et al. |
| 6,146,645 A | 11/2000 | Deckers et al. |
| 6,183,762 B1 | 2/2001 | Deckers et al. |
| 6,210,742 B1 | 4/2001 | Deckers et al. |
| 6,228,418 B1 | 5/2001 | Gluck |
| 6,242,036 B1 | 6/2001 | Han et al. |
| 6,287,620 B1 | 9/2001 | Van Den Ouweland et al. |
| 6,372,234 B1 | 4/2002 | Deckers et al. |
| 6,372,961 B1 | 4/2002 | Tarczynski |
| 6,379,738 B1 | 4/2002 | Dingman et al. |
| 6,383,531 B1 | 5/2002 | Gottemoller |
| 6,399,135 B2 | 6/2002 | Gottemoller |
| 6,413,569 B1 | 7/2002 | Borders et al. |
| 6,416,797 B1 | 7/2002 | Han et al. |
| 6,420,148 B2 | 7/2002 | Yamaguchi |
| 6,495,184 B1 | 12/2002 | Zheng et al. |
| 6,495,187 B1 | 12/2002 | Borders et al. |
| 6,509,453 B1 | 1/2003 | Moloney |
| 6,582,710 B2 | 6/2003 | Deckers et al. |
| 6,596,287 B2 | 7/2003 | Deckers et al. |
| 6,599,513 B2 | 7/2003 | Deckers et al. |
| 6,692,788 B1 | 2/2004 | Mottram et al. |
| 6,761,914 B2 | 7/2004 | Deckers et al. |
| 6,908,634 B2 | 6/2005 | Hwang |
| 6,936,749 B1 | 8/2005 | Guy et al. |
| 7,052,879 B2 | 5/2006 | Shaw et al. |
| 7,332,587 B2 | 2/2008 | Moloney |
| 7,407,786 B2 | 8/2008 | Giver et al. |
| 7,479,472 B1 | 1/2009 | Harbury et al. |
| 7,585,645 B2 | 9/2009 | Deckers et al. |
| 7,622,290 B2 | 11/2009 | Brunstedt et al. |
| 7,666,618 B2 | 2/2010 | Miasnikov et al. |
| 7,666,628 B2 | 2/2010 | Moloney |
| 7,674,953 B2 | 3/2010 | Mulet Salort et al. |
| 7,709,044 B2 | 5/2010 | Ishimoto |
| 7,807,870 B2 | 10/2010 | Geigenberger et al. |
| 7,931,925 B2 | 4/2011 | Nielsen |
| 8,012,732 B2 | 9/2011 | Brunstedt et al. |
| 8,021,695 B2 | 9/2011 | Gruber et al. |
| 8,188,415 B2 | 5/2012 | Kats et al. |
| 8,304,522 B2 | 11/2012 | Kungitani |
| 8,597,694 B2 | 12/2013 | Guth et al. |
| 9,011,949 B2 | 4/2015 | Brown et al. |
| 9,700,067 B2 | 7/2017 | Fraser |
| 9,808,029 B2 | 11/2017 | Fraser et al. |

(56) References Cited

U.S. PATENT DOCUMENTS

| | | |
|---|---|---|
| 9,826,772 B2 | 11/2017 | Fraser et al. |
| 9,943,096 B2 | 4/2018 | Fraser et al. |
| 10,039,306 B2 | 8/2018 | Vrljic et al. |
| 10,172,380 B2 | 1/2019 | Varadan et al. |
| 10,172,381 B2 | 1/2019 | Vrljic et al. |
| 10,798,958 B2 | 10/2020 | Varadan et al. |
| 2001/0024677 A1 | 9/2001 | Bringe |
| 2001/0049132 A1 | 12/2001 | Kringelum et al. |
| 2002/0034570 A1 | 3/2002 | Krammer et al. |
| 2003/0198700 A1 | 10/2003 | Gruber |
| 2003/0212281 A1 | 11/2003 | Sinha et al. |
| 2003/0224476 A1 | 12/2003 | Chou |
| 2004/0151778 A1 | 8/2004 | Richard et al. |
| 2004/0161513 A1 | 8/2004 | Akashe et al. |
| 2005/0037111 A1 | 2/2005 | Berry et al. |
| 2005/0112271 A1 | 5/2005 | Pickarski |
| 2006/0035003 A1 | 2/2006 | McMindes et al. |
| 2006/0035006 A1 | 2/2006 | McMindes et al. |
| 2006/0204644 A1 | 9/2006 | Cavallini et al. |
| 2006/0233721 A1 | 10/2006 | Tamarkin et al. |
| 2007/0269567 A1 | 11/2007 | McMindes et al. |
| 2007/0269571 A1 | 11/2007 | Akita et al. |
| 2007/0269583 A1 | 11/2007 | McMindes et al. |
| 2008/0026128 A1 | 1/2008 | Yamaguchi |
| 2008/0226810 A1 | 9/2008 | Passe et al. |
| 2008/0254168 A1 | 10/2008 | Mueller et al. |
| 2008/0254199 A1 | 10/2008 | Orcutt et al. |
| 2008/0268112 A1 | 10/2008 | Rolan et al. |
| 2008/0292749 A1 | 11/2008 | Goodwins et al. |
| 2008/0299254 A1 | 12/2008 | Kim et al. |
| 2009/0148558 A1 | 6/2009 | Kim et al. |
| 2009/0264520 A1 | 10/2009 | Bhagat et al. |
| 2009/0274817 A1 | 11/2009 | Yamaguchi et al. |
| 2010/0074998 A1 | 3/2010 | Espeleta Vega et al. |
| 2010/0136201 A1 | 6/2010 | Bigeard et al. |
| 2010/0196575 A1 | 8/2010 | Sanchez |
| 2010/0233347 A1 | 9/2010 | Uhrhan |
| 2010/0249560 A1 | 9/2010 | Levinson et al. |
| 2010/0281765 A1 | 11/2010 | Schwartz |
| 2010/0310738 A1 | 12/2010 | Ludwig |
| 2010/0311950 A1 | 12/2010 | Kugitani |
| 2011/0008502 A1 | 1/2011 | Hosomi et al. |
| 2011/0064847 A1 | 3/2011 | Miwa et al. |
| 2011/0064862 A1 | 3/2011 | McCready et al. |
| 2011/0081386 A1 | 4/2011 | Guth et al. |
| 2011/0081435 A1 | 4/2011 | Guth et al. |
| 2011/0117180 A1 | 5/2011 | Yan et al. |
| 2011/0286992 A1 | 11/2011 | Gruber et al. |
| 2011/0287467 A1 | 11/2011 | Crane et al. |
| 2011/0288389 A9 | 11/2011 | Levinson et al. |
| 2012/0059150 A1 | 3/2012 | Moloney et al. |
| 2012/0093994 A1 | 4/2012 | Hsieh et al. |
| 2013/0004617 A1 | 1/2013 | Zhang et al. |
| 2014/0011347 A1 | 1/2014 | Yerushalmi et al. |
| 2014/0220217 A1 | 8/2014 | Brown et al. |
| 2015/0289541 A1 | 10/2015 | Brown et al. |
| 2015/0296834 A1 | 10/2015 | Geistlinger et al. |
| 2015/0296835 A1 | 10/2015 | Anderson et al. |
| 2015/0366233 A1 | 12/2015 | Brown et al. |
| 2016/0305361 A1 | 10/2016 | Akita |
| 2017/0105438 A1 | 4/2017 | Ajami et al. |
| 2017/0172169 A1 | 6/2017 | Grzanich et al. |
| 2017/0188612 A1 | 7/2017 | Varadan et al. |
| 2017/0321204 A1 | 11/2017 | Kale et al. |
| 2018/0027851 A1 | 2/2018 | Vrljic et al. |
| 2018/0168209 A1 | 6/2018 | Fraser et al. |
| 2018/0192680 A1 | 7/2018 | Fraser et al. |
| 2018/0199605 A1 | 7/2018 | Fraser et al. |
| 2018/0199606 A1 | 7/2018 | Fraser et al. |
| 2018/0368453 A1 | 12/2018 | Brown et al. |
| 2019/0008192 A1 | 1/2019 | Brown et al. |
| 2019/0116855 A1 | 4/2019 | Vrljic et al. |
| 2019/0133162 A1 | 5/2019 | Varadan et al. |
| 2019/0133163 A1 | 5/2019 | Varadan et al. |

FOREIGN PATENT DOCUMENTS

| | | |
|---|---|---|
| CN | 1407108 A | 4/2003 |
| CN | 1466903 | 1/2004 |
| CN | 1557188 | 12/2004 |
| CN | 1593223 A | 3/2005 |
| CN | 1634524 A | 7/2005 |
| CN | 101138405 | 3/2008 |
| CN | 101156632 | 4/2008 |
| CN | 101489422 | 7/2009 |
| CN | 101541187 A | 9/2009 |
| CN | 101606574 A | 12/2009 |
| CN | 101861895 | 10/2010 |
| CN | 101897418 | 12/2010 |
| CN | 102440302 | 5/2012 |
| CN | 102578544 | 7/2012 |
| CN | 102835460 | 12/2012 |
| DE | 102007061256 | 6/2009 |
| DE | 202011002097 | 3/2011 |
| EP | 0136428 | 4/1985 |
| EP | 0500132 | 8/1992 |
| EP | 0815736 | 1/1998 |
| EP | 1166653 | 1/2002 |
| EP | 1254601 | 11/2002 |
| EP | 0680751 | 11/2004 |
| EP | 1529444 | 5/2005 |
| EP | 1759593 | 3/2007 |
| EP | 1361264 | 4/2007 |
| EP | 1952695 | 8/2008 |
| EP | 2138052 | 12/2009 |
| EP | 2943072 | 11/2015 |
| GB | 836694 | 6/1960 |
| GB | 858333 | 1/1961 |
| GB | 858660 | 1/1961 |
| GB | 1032334 | 6/1966 |
| GB | 1069104 | 5/1967 |
| GB | 1076948 | 7/1967 |
| GB | 1082504 | 9/1967 |
| GB | 1084619 | 9/1967 |
| GB | 1099711 | 1/1968 |
| GB | 1115610 | 5/1968 |
| GB | 1126889 | 9/1968 |
| GB | 1130631 | 10/1968 |
| GB | 1135123 | 11/1968 |
| GB | 1146337 | 3/1969 |
| GB | 1148449 | 4/1969 |
| GB | 1182976 | 3/1970 |
| GB | 1198398 | 7/1970 |
| GB | 1205882 | 9/1970 |
| GB | 1206265 | 9/1970 |
| GB | 1221482 | 2/1971 |
| GB | 1224989 | 3/1971 |
| GB | 1232719 | 5/1971 |
| GB | 1234927 | 6/1971 |
| GB | 1256462 | 12/1971 |
| GB | 1283913 | 8/1972 |
| GB | 1284357 | 8/1972 |
| GB | 1302525 | 1/1973 |
| GB | 1311638 | 3/1973 |
| GB | 1313830 | 4/1973 |
| GB | 1318460 | 5/1973 |
| GB | 1325335 | 8/1973 |
| GB | 1357091 | 6/1974 |
| GB | 1364747 | 8/1974 |
| GB | 1382335 | 1/1975 |
| GB | 1384332 | 2/1975 |
| GB | 1447730 | 8/1976 |
| GB | 1471907 | 4/1977 |
| GB | 1515961 | 6/1978 |
| GB | 1515962 | 6/1978 |
| GB | 1525541 | 9/1978 |
| GB | 2016255 | 9/1979 |
| JP | S42-22194 | 10/1942 |
| JP | S49-39824 | 10/1974 |
| JP | S51-63971 | 10/1975 |
| JP | 52156962 | 12/1977 |
| JP | S53115846 | 10/1978 |
| JP | S54122766 | 9/1979 |
| JP | S5959151 | 4/1984 |

(56) References Cited

FOREIGN PATENT DOCUMENTS

| | | |
|---|---|---|
| JP | S6283842 | 4/1987 |
| JP | H08140627 | 6/1996 |
| JP | H08173024 | 7/1996 |
| JP | H08-289761 | 11/1996 |
| JP | H0970272 | 3/1997 |
| JP | H11-508448 | 7/1999 |
| JP | 2001/037434 | 2/2001 |
| JP | 2001/061415 | 3/2001 |
| JP | 2001/346533 | 12/2001 |
| JP | 2002/101835 | 4/2002 |
| JP | 2005/021163 | 1/2005 |
| JP | 2005/530483 | 10/2005 |
| JP | 2009-516522 | 4/2009 |
| JP | 2009/171877 | 8/2009 |
| JP | 2009/284893 | 12/2009 |
| JP | 2010/512788 | 4/2010 |
| JP | 2010-523125 | 7/2010 |
| JP | 2011/000073 | 1/2011 |
| JP | 2012/016336 | 1/2012 |
| JP | 2013-192528 | 9/2013 |
| JP | 2014/113112 | 6/2014 |
| KR | 10-2009-0009990 | 1/2009 |
| RU | 2144293 | 1/2000 |
| RU | 2010137628 | 3/2012 |
| SU | 291395 | 6/1971 |
| SU | 301014 | 1/1974 |
| WO | WO 1993/025697 | 12/1993 |
| WO | WO 1994/017673 | 8/1994 |
| WO | WO 1996/017981 | 6/1996 |
| WO | WO 1997/01961 | 1/1997 |
| WO | WO 1998/012913 | 4/1998 |
| WO | WO 1998/053698 | 12/1998 |
| WO | WO 2001/022829 | 4/2001 |
| WO | WO 2001/022830 | 4/2001 |
| WO | WO 2003/070172 | 8/2003 |
| WO | WO 2004/113543 | 12/2004 |
| WO | WO 2005/013713 | 2/2005 |
| WO | WO 2005/046354 | 5/2005 |
| WO | WO 2005/097059 | 10/2005 |
| WO | WO 2006/042608 | 4/2006 |
| WO | WO 2007/060288 | 5/2007 |
| WO | WO 2007/115899 | 10/2007 |
| WO | WO 2007/137125 | 11/2007 |
| WO | WO 2007/137128 | 11/2007 |
| WO | WO 2007/118751 | 12/2007 |
| WO | WO 2008/017499 | 2/2008 |
| WO | WO 2008/030089 | 3/2008 |
| WO | WO 2008/083117 | 7/2008 |
| WO | WO 2009/060678 | 5/2009 |
| WO | WO 2010/101625 | 9/2010 |
| WO | WO 2012/106751 | 8/2012 |
| WO | WO 2012/110797 | 8/2012 |
| WO | WO 2012/116703 | 9/2012 |
| WO | WO 2010/110493 | 10/2012 |
| WO | WO 2012/157544 | 11/2012 |
| WO | WO 2013/010037 | 1/2013 |
| WO | WO 2013/010042 | 1/2013 |
| WO | WO 2013/013292 | 1/2013 |
| WO | WO 2013/138793 | 9/2013 |
| WO | WO 2014/110532 | 7/2014 |
| WO | WO 2014/110540 | 7/2014 |
| WO | WO 2015/127388 | 8/2015 |

OTHER PUBLICATIONS

"Rethink Meat," Presented at the 6th Annual Sustainable Innovation Forum, Paris, France, Dec. 7-8, 2015, retrieved on Feb. 1, 2016, https://amp.twimg.com/v/7c7f7084-b173-42cb-bc12-723f35994dff, 1 page (Video Submission).
"Silicon Valley gets a taste for food," The Economist Technology Quarterly, Mar. 7, 2015, http://cdn.static-economist.com/sites/default/files/sponsorships/accenture_tq_march2015/20150307_tq_mailout.pdf, pp. 11-13.
"Veggie burgers that look, taste, and bleed like real meat," CBS News, Aug. 9, 2016, retrieved Aug. 25, 2016 <http://www.cbsnews.com/news/food-trend-veggie-burgers-that-look-bleed-taste-like-real-meat/>, 4 pages.
"Watch Momofuku Cook Impossible Foods' Plant-Based Burger that 'Bleeds'," Vice, Jul. 27, 2016, retrieved Aug. 25, 2016, <https://munchies.vice.com/en/videos/watch-momofuku-cook-impossible-foods-plant-based-burger-that-bleeds>, 3 pages.
[No Author Listed] Impossible Foods Inc. "GRAS Notification for Soybean Leghemoglobin Protein Derived from Pichia Pastoris." GRAS notice 000737, Retrieved from internet <<URL:https://www.fda.gov/downloads/Food/IngredientsPackagingLabeling/GRAS/NoticeInventory/default.htmf>, 1063 pages (Oct. 2, 2017).
"Acidified Milk Products and Protein Stabilisation," Herbstreith & Fox, retrieved on Mar. 3, 2014, http://www.herbstreith-fox.de/en/informative-literature/informative-literature-from-rd-and-tech-application.html, 15 pages.
"Ice Cream and Ice Cream Desserts," Herbstreith & Fox, retrieved on Mar. 3, 2014, http://www.herbstreith-fox.de/en/informative-literature/informative-literature-from-rd-and-tech-application.html, 5 pages.
"Innovation at Its Best: 5 Years of Food Valley Awards," Food Valley, retrieved on Mar. 7, 2014, http://www.foodvalley.nl/English/Afbeeldingen/FVAjubileumuitgave/Innovation%20at%20Its%20Best%20-%205%20Years%20of%20Food%20Valley%20Awards.pdf, 51 pages.
"Low Methylester Amidated Pectins," Herbstreith & Fox, retrieved on Mar. 3, 2014, http://www.herbstreith-fox.de/en/informative-literature/informative-literature-from-rd-and-tech-application.html, 13 pages.
"Stabilisation of Whey and Whey Mix Products with Pectin," Herbstreith & Fox, retrieved on Mar. 3, 2014, http://www.herbstreith-fox.de/en/informative-literature/informative-literature-from-rd-and-tech-application.html, 6 Pages.
"Texturising of Fermented Milk Products," Herbstreith & Fox, retrieved on Mar. 3, 2014, http://www.herbstreith-fox.de/en/informative-literature/informative-literature-from-rd-and-tech-application.html, 6 pages.
Alemán et al., "Oxidative stability of a heme iron-fortified bakery product: Effectiveness of ascorbyl palmitate and co-spray-drying of heme iron with calcium caseinate," Food Chemistry, 2016, 196:567-576.
Asgar et al., "Nonmeat Protein Alternatives as Meat Extenders and Meat Analogs," Comprehensive Reviews in Food Science and Food Safety, 2010, 9:513-529.
Aubrey, "Food for Thought: Saving the Planet, One Burger at a Time: This Juicy Patty Is Meat-Free," The Salt, Feb. 11, 2017, retrieved on Feb. 14, 2017, retrieved from <http://www.npr.org/sections/the salt/2017/02/11/514544431/saving-the-planet-one-burger-at-a-time-this-juicy-patty-is-meat-free>, 14 pages.
Australian Patent Examination Report No. 1 in Australian Application No. 2012281064, dated Jan. 25, 2016, 5 pages.
Australian Patent Examination Report No. 1 in Australian Application No. 2012281069, dated Sep. 25, 2015, 5 pages.
Baek, "Process Flavors," Handbook of Meat, Poultry and Seafood Quality, Second Edition, 2012, Chapter 7, 91-104.
Baohua, "Animal products processing,", China agricultural science and technology press, 2008, pp. 224-222, English Translation.
Bastide et al., "Heme iron from meat and risk of colorectal cancer: a meta-analysis and a review of the mechanisms involved.", Cancer Prev Res; 4(2); 177-84, 2011.
Bastide et al., "Herne Iron from Meat and Risk of Colorectal Cancer: A Meta-analysis and a Review of the Mechanisms Involved," Cancer Prevention Research, 2011, vol. 4, pp. 177-184.
Battaglia et al., "The Enigmatic LEA Proteins and Other HydroPhilins1[W]," Plant Physiology, Sep. 2008, 148:6-24
Belitz et al., "Aroma Compounds," Food Chemistry, Springer 2009, pp. 340-402.
Belitz et al., Food Chemistry, 3rd revised edition. Springer-Verlag, Berlin (2006), p. 368.
Beuchat et al., "Fermentation of Peanut Milk with Lactobacillus bulgaricus and L. acidophilus," J. Food Sci, 1978, 43:1109-1112.

(56) References Cited

OTHER PUBLICATIONS

Beyond Better Order page and Nutritional Facts, retrieved on Feb. 6, 2014, http://www.beyond-better.com/order.html, 8 pages.
Beyond Meat, posted on or before Feb. 24, 2001, accessed Jan. 7, 2014, http://beyondmeat.com/, 2 pages.
Boca Bruschetta Tomato Basil Parmesan Veggie Patties Package Ingredients, posted on or before Jul. 22, 2008, accessed on Jan. 7, 2014, http://www.bocaburger.com/products/nutrition-info.aspx?product=5928360103, 1 page.
Boca Flame Grilled Meatless Burgers Package Ingredients, posted on or before Jul. 14, 2008, accessed on Jan. 7, 2014, http://www.bocaburger.com/products/nutrition-info.aspx?product=5928367321, 1 page.
Boca Original Meatless Chik'n Nuggets Package Ingredients, posted on or beforeJul. 22, 2008, accessed Jan. 7, 2014, http://www.bocaburger.com/products/nutrition-info.aspx?product=5928360012, 1 page.
Boca Original Vegan Meatless Burgers Package Ingredients, posted on or before Jul. 14, 2008, accessed Jan. 7, 2014, http://www.bocaburger.com/products/nutrition-info.aspx?product=5928333445, 1 page.
Boral and Bohidar , "Effect of Ionic Strength on Surface-Selective Patch Binding-Induced Phase Separation and Coacervation in Similarly Charged Gelatin-Agar Molecular Systems," Journal of Physical Chemistry B, 2010, 114(37): 12027-35.
Bradshaw, "Food 2.0: the future of what we eat," FT Magazine, Oct. 31, 2014, retrieved on Nov. 11, 2014, http://www.ft.com/cms/s/2/bfa6fca0-5fbb-11e4-8c27-00144feabdc0.html#axzz3InGaCIdL, 6 pages.
Brewer, "The Chemistry of Beef Flavor," Dec. 2006, retrieved on Aug. 30, 2016, <http://beefresearch.org/CMDocs/BeefResearch/The%20Chemistry%20of%20Beef%20Flavor.pdf>, 16 pages.
Brooks et al., "Prediction of beef flavor by precursor and volatile compounds Principal Investigators: Funded by The Beef Checkoff," Texas Tech University, May 31, 2012, retrieved Aug. 30, 2016, <http://www.beefresearch.org/CMDocs/BeefResearch/PE_Project_Summaries_FY11Prediction_of_beef_flavor.pdf>.
Brown et al., "The structure and function of mammalian and plant globins," International Review of Scientific Synthesis, Sep. 2013, 2014, 21 pages.
Bunge et al., "Quest Heats up for Alternatives to Beef," The Wall Street Journal, Business News, Nov. 4, 2016, p. B5.
Burdock, "Fenaroli's handbook of flavor ingredients," CRC press, 17 pages (2016).
Bute Island Foods, "Cheese," posted on or before Dec. 5, 2006, retrieved on Feb. 6, 2014, http://www.buteisland.com/a_sheese_home.htm, 2 pages.
Cadwallader and Macleod, "16 Instrumental methods for analyzing the flavor of muscle foods," Flavor of Meat, Meat Products and Seafoods, 18 pages (1998).
Calkins et al., "A fresh look at meat flavor," Meat Science, 77(1):63-80 (2007).
Carlsen et al., "Heme-iron in lipid oxidation," Coordination Chemistry Review, 2005, 249:485-498.
Cerny et al., "Formation of Aroma Compounds from Ribose and Cysteine during the Maillard Reaction," J. Agric. Food Chem., 2003, 51, pp. 2714-2721.
Chamlee, "Why Do People Want Veggie Burgers That Bleed?," Eater, Jul. 25, 2016, retrieved Aug. 25, 2016, <http://www.eater.com/2016/7/25/12270698/lab-grown-meat-beyond-burger-impossible-foods>, 11 pages.
Chau, "Uncanny Patty," The Ringer, Feb. 27, 2017, retrieved on Feb. 28, 2017, retrieved from <https://theringer.com/impossible-burger-last-meal-on-earth-week-food-f9f14acdb99d#.vocb2hi6e>, 19 pages.
Chaudhari et al., "The cell biology of taste," 190(3):285-296 (Aug. 2010).
Chen et al., "Effect of Urea on Volatile Generation from Maillard Reaction of Cysteine and Ribose," J. Agric. Food Chem., 48:3512-3516 (2000).
Chen et al., "Influence of DNA on Volatile Generation from Maillard Reaction of Cysteine and Ribose," Nutraceutical Beverages, American Chemical Society, pp. 427-442 (Dec. 2003).
Chicago Vegan Foods, accessed on Jan. 7, 2014, http://chicagoveganfoods.com/products/teese-vegan-cheese/, 8 pages.
Christlbauer et al., "Characterization of the Key Aroma Compounds in Beef and Pork Vegetable Gravies á la Chef by Application of the Aroma Extract Dilution Analysis," J. Agric. Food Chem., 2009, 57:9114-9122.
Clare et al., "Effects of Transglutaminase Catalysis on the Functional and Immunoglobulin Binding Properties of Peanut Flour Dispersions Containing Casein," J. Agric. Food Chem., 2008, 56(22):10913-10921.
Connelly and Piper, "Person of the Year: Tal Ronnen," VegNews, Nov./Dec. 2013, 29-32.
Cott et al., "The 'Impossible' Veggie Burger: A Tech Industry Answer to the Big Mac," Business Day, Jan. 13, 2017, retrieved on Jan. 17, 2017, <https://mobile.nytimes.com/2017/01/13/business/veggie-burger-impossible-burger.html?referer=http://www.drudgereport.com/>, 7 pages.
Cross et al., "Developing a heme iron database for meats according to meat type, cooking method and doneness level", Food Nutr Sci., 3(7): 905-913, 2012.
Dai, "David Chang Adds Plant Based 'Impossible Burger' to Nishi Menu," Jul. 26, 2016, retrieved Jul. 27, 2016 <http://ny.eater.com/2016/7/26/12277310/david-chang-impossible-burger-nishi>, 6 pages.
Daiya, Deliciously Dairy Free, "Say Cheese, Dairy-Free cheesy deliciousness," posted on or before Jan. 26, 2010, accessed Jan. 7, 2014, http://www.daiyafoods.com, 6 pages.
Datar, I. et al., "Possibilities for an in vitro meat production system" Innovative Food Science and Emerging Technologies, vol. 11, 13-22, 2010.
Davis et al., "Some Rheological Properties of Aqueous Peanut Flour Dispersions," J. Texture Studies, 2007, 38:253-272.
Deliciously Healthy Nacheez, Products and Nutrition Facts, posted on or before Jan. 23, 2011, retrieved on Feb. 7, 2014, http://nacheez.com/, 9 pages.
Dixie Diner's Club, Cheese (Not!) Sauce Nutrition Facts, posted on or before Sep. 3, 2009, retrieved on Feb. 7, 2014, http://www.dixiediner.com/cheese-notA™-sauce-regular-cheese-p-69.html, 2 pages.
D'Onfro, "I tried the plant-based meat that Google wanted to buy and I never want to eat a 'real' hamburger again" Business Insider, Jun. 12, 2016, retrieved Jun. 14, 2016, <http://www.businessinsider.com/impossible-burgers-taste-test-2016-6>, 14 pages.
Donnelly, "Meet the Impossible Burger: It Looks and Tastes Like the Real Thing But Is Totally Meat-Free," Vogue, Aug. 1, 2016, retrieved Aug. 25, 2016 <http://www.vogue.com/13462891/impossible-burger-meat-free-vegan-david-chang/>, 6 pages.
Door 86 Vegan Cheese, Discover a New World of Vegan Cheese and Menu, posted on or before Dec. 5, 2013, retrieved Feb. 7, 2014, http://door86vegancheese.wix.com/door-86-vegan-cheese#, 14 pages.
Dr. Cow, Natural Living & Organic Foods, "Aged Cashew & Brazil Nut Cheese," posted on or before Sep. 22, 2008, accessed Feb. 7, 2014, http://www.dr-cow.com/products/aged-cashew-brazil.html, 1 page.
Dr. Cow, Natural Living & Organic Foods, "Aged Cashew & Crystal Algae Cheese," posted on or before Sep. 22, 2008, accessed Feb. 7, 2014, http://www.dr-cow.com/products/aged-cashew-crystal.html, 1 page.
Dr. Cow, Natural Living & Organic Foods, "Aged Cashew & Dulse Cheese," posted on or before Sep. 22, 2008, accessed Feb. 7, 2014, http://www.dr-cow.com/products/aged-cashew-dulse.html, 1 page.
Dr. Cow, Natural Living & Organic Foods, "Aged Cashew & Hemp Seeds Cheese," posted on or before Sep. 22, 2008, accessed Feb. 7, 2014, http://www.dr-cow.com/products/aged-cashew-hemp.html, 1 page.
Dr. Cow, Natural Living & Organic Foods, "Aged Cashew Nut Cheese," posted on or before Sep. 22, 2008, accessed Feb. 7, 2014, http://www.dr-cow.com/products/aged-cashew-nut-cheese.html, 1 page.
Dr. Cow, Natural Living & Organic Foods, "Aged Macadamia & Hemp Seeds Cheese," posted on or before Sep. 22, 2008, accessed Feb. 7, 2014, http://www.dr-cow.com/products/aged-macadam-hemp.html, 1 page.

(56) References Cited

OTHER PUBLICATIONS

Dr. Cow, Natural Living & Organic Foods, "Aged Macadamia Nut Cheese," posted on or before Sep. 22, 2008, accessed Feb. 7, 2014, http://www.dr-cow.com/products/aged-macadam-nut-cheese.html, 1 page.
Dr. Cow, Natural Living & Organic Foods, "Cashew Nut Cream Cheese," posted on or before Sep. 22, 2008, accessed Jan. 7, 2014, http://www.dr-cow.com/products/cashew-nut-cream-cheese.html, 1 page.
Duane, "Engineering the Future of Artisanal Vegan Cheese," Food & Wine, Nov. 2013, http://www.foodandwine.com/articles/engineering-the-future-of-artisanal-vegan-cheese, 5 pages.
DuFosse et al., "Importance of lactones in food flavours," Sciences Des Aliments, 14:17-25 (1994).
Dwivedi, Basant K. et al., "Meat flavor" Critical Reviews in Food Science & Nutrition, vol. 5, 487-535, 1975.
Edris et al., "Application of headspace-solid-phase micro-extraction and HPLC for the analysis of the aroma volatile components of treacle and determination of its content of 5-hydroxymethylfurfural (HMF)", Food Chemistry vol. 104, Issue 3, pp. 1310-1314, 2007.
Elise, "Classic Meatloaf Recipe," Simply Recipes, 2009, https://www.simplyrecipes.com/recipes/classic_meatloaf/, downloaded Nov. 22, 2017, 11 pages.
Ellfolk, Nils, "Crystalline Leghemoglobin" ACTA Chemica Scandinavica, vol. 15, 545-554, 1961.
Ellis et al., "Structure of ferric soybean leghemoglobin a nicotinate at 2.3 A resolution," Acta Crystallographica, May 1997, Section D, 53(3):302-310.
Elmore et al., "Effect of the Polyunsaturated Fatty Acid Composition of Beef Muscle on the Profile of Aroma Volatiles," J. Agric. Food Chem. 47:1619-1625 (1999).
Elzerman et al., Exploring meat substitutes: consumer 2013 experiences and contextual factors: British Food Journal, vol. 115 Issue: 5, pp. 700-710, 705, 2013.
EPO Opposition, "Proprietor's observations and amendments under Rule 79(1) EPC," Feb. 27, 2019, 50 pages.
Etienne, "Eating the plant-derived Impossible Burget cooked by Momofuku's David Chang," Tech Crunch, Jul. 26, 2016, retrieved Aug. 25, 2016, <https://techcrunch.com/2016/07/26/eating-the-plant-derived-impossible-burger-cooked-by-momofukus-david-chang/>, 9 pages.
European Search Report (Supplementary) in European Application No. 12810661.4, dated Mar. 12, 2015, 14 pages.
European Search Report (Supplementary) in European Application No. 12811683.7, dated Mar. 12, 2015, 9 pages.
European Search Report for International Application No. EP 14737766, dated Jul. 15, 2016, 11 pages.
European Search Report for International Application No. EP 17210528, dated May 14, 2018, 10 pages.
Fang et al., "Food Nutrition health theory and technology," China light industry press, p. 448, Jan. 31, 1997 (English Translation).
Fantastic World Foods, "Fantastic Foods Nature's Burger (Meatless Burger Mix)," posted on or before Jan. 6, 2009, accessed on Jan. 7, 2014, http://fantasticfoods.elsstore.com/view/product/?id=8715&cid=1967, 2 pages.
Felt, "Raw Vegan Almond Ricotta Cheese," FeedYourSkull, Mar. 12, 2012, https://feedyourskull.com/2012/03/12/raw-vegan-almond-ricotta-cheese/, 15 pages.
Fengyi et al., "Soybean protein production and application,", China light industry press, 2004, pp. 275-277, English Translation.
Field et al., "Heme Pigment Content of Bovine Hemopoietic Marrow and Muscle," J. Food Sci., 45:1109-1112, 1980.
Follow Your Heart Homepage, posted on or before Nov. 28, 1999, accessed Jan. 7, 2014, http://www.followyourheart.com, 3 pages.
Follow Your Heart, Products and Nutrition Facts, posted on or before Nov. 28, 1999, accessed Feb. 7, 2014, http://www.followyourheart.com/products/, 26 pages.
Foo, "Beef and Scallop Stir-Fry," Food & Wine, Jul. 2001, retrieved on Sep. 10, 2015, http://www.foodandwine.com/recipes/beef-and-scallop-stir-fry/print, 3 pages.

Food for Lovers, Vegan Queso Original & Vegan Queso Mild, posted on or before Oct. 27, 2011, retrieved Feb. 7, 2014, http://www.foodforlovers.com/products, 3 pages.
Fountoulakis and Lahm, "Hydrolysis and amino acid composition analysis of proteins", J. Chromatogr A, 826: 109-134, 1998.
Fourth Chinese Office Action in Chinese Application No. 201280041713.1, dated Nov. 11, 2016, 18 pages (with translation).
Free & Easy Dairy Free Cheese Flavour Sauce Mix, Holland & Barrett, posted on or before Jun. 22, 2013, retrieved Feb. 7, 2014, http://www.hollandandbarrett.com/pp./product_detail.asp?pid=2686, 2 pages.
Fromson, "The Race to Build a Fake-Meat Burger That Just Might Save the World, Free the cows!" New York Magazine, Jun. 1-7, 2015, 46-48.
Galaxy Foods Vegan Soy Grated Parmesan, ShopRite, retrieved Feb. 7, 2014, http://www.shoprite.com/pd/Galaxy-Nutritional-Foods/Vegan-Grated-Soy-Topping-Parmesan-Flavor/4-oz/077172640006/, 6 pages.
Gardein The Ultimate Beefless Burger Package Ingredients, posted on or before 2013, accessed Jan. 7, 2014, http://gardein.com/products/beefless-burger/, 12 pages.
Gardenburger The Original Veggie Burger Package Ingredients, posted on or before Oct. 5, 2008, accessed Jan. 7, 2014, http://www.gardenburger.com/product.aspx?id=11630, 1 page.
GenBank Accession No. AAA02168.1, May 21, 1993, 1 page.
GenBank Accession No. AFK42304.1, unknown [Medicago truncatula], May 25, 2012, 1 page.
Gharst, "Biochemical and Rheological Characteristics of Peanut Proteins Crosslinked with Microbial Transglutaminase," A dissertation submitted to the Graduate Faculty of North Carolina State University, Raleigh NC, 2007, 149 pages.
Gharst, "Effects of Transglutaminase Catalysis on the Functional and Immunoglobulin Binding Properties of Peanut Flour Dispersions Containing Casein," J. Agric. Food Chem., 2008, 56:10913-10921.
Gharst, "The Effect of Transglutaminase Crosslinking on the Rheological Characteristics of Heated Peanut Flour Dispersions," J. Food Sci., 2007, 72(7):C369-C375.
Gilbert et al., "The revolutionary meatless burger from Impossible Foods is perfect for vegetarians and carnivores alike," Tech Insider, Aug. 4, 2016, retrieved on Aug. 25, 2016, <http://www.techinsider.io/the-impossible-foods-burger-review-vegetarian-2016-8>, 9 pages.
Go Veggie!, "O% Dairy. 100% Yum.," posted on or before 2013, accessed Jan. 7, 2014, http://goveggiefoods.com/our-products/dairy-free-cheese-alternative-products/, 1 page.
Go Veggie!, Dairy Free Products and Nutrition Facts, posted on or before 2013, accessed Feb. 7, 2014, http://goveggiefoods.com/our-products/dairy-free-cheese-alternative-products/, 13 pages.
Gordinier, "Masters of Disguise Among Meatless Burgers," The New York Times, Mar. 22, 2011, accessed Jan. 7, 2014, http://www.nytimes.com/2011/03/23/dining/23meatless.html?pagewanted=all&_r=0, 5 pages.
Griffths, "XCIII. The Action of Gastric Juice on Beef Muscle-Globulin, With References to Anaemia," Biochemistry Journal, 28:671-675 (1934).
Grigorakis et al., "Organoleptic and volatile aroma compounds comparison of wild and cultured gilthead sea bream (*Sparus aurata*): sensory differences and possible chemical basis," Aquaculture 225:109-119 (2003).
Grobart, "Making a Steak Without a Cow," Bloomberg Technology, Jun. 21, 2016, retrieved Jun. 23, 2016 <http://www.bloomberg.com/news/articles/2016-06-21/making-a-steak-without-the-cow>, 2 pages.
Grosch, "Evaluation of the Key Odorants of Food by Dilution Experiments, Aroma Models and Omission," Chem. Senses 26:533-545 (Jun. 2001).
Grounds for Opposition Against European Patent No. EP 2 943 072, dated Sep. 27, 2018, 44 pages.
Grunwald et al., "Mechanisms of Heme Protein-Mediated Lipid Oxidation Using Hemoglobin and Myoglobin Variants in Raw and Heated Washed Muscle," J. Agric. Food Chem., 2006, 4:8271-8280.

(56) References Cited

OTHER PUBLICATIONS

Hanlon, "Fake Meat: is science fiction on the verge of becoming fact?," The Guardian, Jun. 22, 2012, http://www.theguardian.com/science/2012/jun/22/fake-meat-scientific-breakthroughs- research, 7 pages.

Hannah, "A fermented feast," Bittersweet, retrieved on Nov. 3, 2016, retrieved from <https://bittersweetblog.com/2010/06/09/a-fermented-feast/>, 2 pages.

Heller, "Barbecued Soybeans," Vegetarian Soybean Recipes, Mother Earth News, Jan./Feb. 1985, http://motherearthnews.com/real-food/vegetarian-soybean-recipes-zmaz85asie.aspx.

Heme Protein Database, "Welcome to the Heme Protein Database," posted on or before Apr. 14, 2013, accessed Dec. 18, 2013, http://hemeprotein.info/heme.php, 1 page.

Heritage Health Food Creamy Veeta Cheeze Sauce Mix, Vegan Essentials, posted on or before Aug. 13, 2013, retrieved Feb. 7, 2014, http://store.veganessentials com/creamy-veeta-cheeze-sauce-mix-by- heritage-health-food-p3945.aspx, 1 page.

Herper, "Mission Impossible Burger: Tasting the Fake Meat That Wants to Save the World," Forbes, Jul. 28, 2016, retrieved on Aug. 25, 2016, <http://www.forbes.com/sites/matthewherper/2016/07/28/mission-impossible-burger-tasting-the-fake-meat-that-wants-to-save-the-world/#57781d823c43>, 6 pages.

Herper, "Drop that Burger," Forbes Online, Nov. 12, 2009, http://www.forbes.com/forbes/2009/1130/thought-leaders-mcdonalds-global-warming-drop-that-burger.html, 4 pages.

Homma et al. "Cheese-like food production from various nuts," Food Preservation Science, Japan 2009, Abstract.

Hoshaw, "Silicon Valley's Bloody Plant Burger Smells, Tastes and Sizzles Like Meat" the salt, Jun. 21, 2016, retrieved Jun. 21, 2016 <http://www.npr.org/sections/thesalt/2016/06/21/482322571/silicon-valley-s-bloody-plant-burger-smells-tastes-and-sizzles-like-meat>, 8 pages.

Hui et al., "Handbook of meat and meat processing," CRC Press, 2012, retrieved on Dec. 5, 2016, retrieved from <https://www.crcpress.com/Handbook-of-Meat-and-Meat-Processing-Second-Edition/Hui/p/book/9781439836835>, 3 pages.

International Preliminary Report on Patentability in International Application No. PCT/US2014/011361, dated Jul. 14, 2015, 13 pages.

International Preliminary Report on Patentability in International Application No. PCT/US 2012/046560, dated Jan. 23, 2014, 12 pages.

International Preliminary Report on Patentability in International Application No. PCT/US 2012/46552, dated Jan. 23, 2014, 9 pages.

International Preliminary Report on Patentability in International Application No. PCT/US14/11347, dated Jul. 14, 2015, 10 pages.

International Preliminary Report on Patentability in International Application No. PCT/US14/11362, dated Jul. 23, 2015, 10 pages.

International Search Report and Written Opinion in International Application No. PCT/US 2012/046560, dated Dec. 14, 2012, 11 pages.

International Search Report and Written Opinion in International Application No. PCT/US 2012/46552, dated Nov. 19, 2012, 12 pages.

International Search Report and Written Opinion in International Application No. PCT/US14/11347, dated Jul. 3, 2014, 20 pages.

International Search Report and Written Opinion in International Application No. PCT/US14/11361, dated Jun. 16, 2014, 26 pages.

International Search Report and Written Opinion in International Application No. PCT/US14/11362, dated Jun. 13, 2014, 19 pages.

International Search Report and Written Opinion in International Application No. PCT/US2015/017147, dated May 1, 2015, 15 pages.

International Search Report and Written Opinion in International Application No. PCT/US2015/023679, dated Aug. 28, 2015, 26 pages.

Invitation to Pay Fees in International Application No. PCT/US14/11361, dated Apr. 10, 2014, 4 pages.

Jamieson, "Iroquois Stew with Beef, Chicken and Pork," Epicurious, Nov. 1995, retrieved on Sep. 10, 2015, http://www.epicurious.com/recipes/food/printerfriendly/iroquois-stew-with-beef-chicken-and-pork-865, 2 pages.

Jensen, "Comparative Analysis of Autoxidation of Haemoglobin," J. Experimental Biology, 2001, 204:2029-2033.

Ju and Kilara, "Textural Properties of Cold-set Gels Induced from Heat-denatured Whey Protein Isolates," J. Food Science, 1998, 63(2): 288-292.

Jublot et al., "Quantitation of sulphur aroma compounds in maillard model reaction systems of different composition," Expression of Multidisciplinary Flavour Science, 4 pages (2010).

Kanani, "The Future of Meat is Meatless, Just as Tasty, and About to Change the World," Forbes, Mar. 6, 2014, retrieved on Sep. 11, 2015, http://www.forbes.com/sites/rahimkanani/2014/03/06/the-future-of-meat-is-meatless-just-as-tasty-and-about-to-change-the-world/, 8 pages.

Karahadian et al., "Action of Tocopherol-Type Compounds in Directing Reactions Forming Flavor Compounds in Autoxidizing Fish Oils," J. Amer. Oil Chem. Soc., 66:1302-8 (1989).

Kerscher et al., "Quantification of 2-Methyl-3-furnathiol, 2-Furfurylthiol, 3-Mercapto-2-pentanone in Heated Meat," J. Agric. Food Chem. 46:1954-1958 (1996).

Kerth and Miller, "Beef flavor: a review from chemistry to consumer," White Paper: Product Quality, Texas A&M University Dept of Animal Sciences, 25 pages (2013).

Khan et al., "Meat flavor precursors and factors influencing flavor precursors—A systematic review," Meat Science, 110:278-284 (Dec. 2010).

Konermann et al., "Acid-induced denaturation of myoglobin studied by time-resolved electrospray ionization mass spectrometry", Biochemistry, 1997, vol. 36, pp. 6448-6454.

Koutsidis et al., "Water-soluble precursors of beef flavor: I. Effect of diet and breed," Meat Science, 79:124-130, 2008.

Kraft American Singles Package Ingredients, posted on or before Jun. 27, 2012, accessed on Jan. 7, 2014, http://www.kraftrecipes.com/Products/ProductInfoDisplay.aspx?SiteId=1&Product=2100060473, 1 page.

Kummer, "The Problem with Fake Meat," MIT Technology Review, Mar. 31, 2015, retrieved Apr. 20, 2016, <https://www.technologyreview.com/s/536296/the-problem-with-fake-meat/>, 11 pages.

Kung et al., "Tobacco as a Potential Food Source and Smoke Material: Nutritional Evaluation of Tobacco Leaf Protein," J. Food Sci., 1980, 45(2):320-322, 327.

Lane et al., "The Variety of Odors Produced in Maillard Model Systems and How They are Influenced by Reaction Conditions," The Maillard Reaction in Foods and Nutrition, American Chemical Society, pp. 141-158 (Apr. 1983).

Leahy Gardens Vegan & Delicious, Macaroni & Cheese and Cheese Flavored Sauce Mix Product and Nutrition Facts, posted on or before Feb. 8, 2010, retrieved Feb. 7, 2014, http://www.leaheyfoods.com/products/MacCheese.aspx, 3 pages.

Leduc et al., "Differentiation of fresh and frozen/thawed fish, European sea bass (Dicentrarchus labrax), gilthead seabream (Sparus aurata), cod (Gadus morhua) and salmon (Salmo salar), using volatile compounds by SPME/GC/MS," J. Sci. Food Agric., 92:2560-80 (2012).

Leghemoglobin, NCBI's database accession 004939, Mar. 1, 2002.

Lisanatti Foods, Vegan Cheeze Products and Nutrition Facts, posted on or before Mar. 26, 2013, retrieved Feb. 7, 2014, http://www.lisanatti.com/index.php?option=com_zoo&view=category&layout=category&Itemid=22 , 5 pages.

Liu et al., "Intermolecular Interactions During Complex Coacervation of Pea Protein Isolate and Gum Arabic," Journal of Agricultural and Food Chemistry, 2010, 58:552-556.

Lombardi et al., "Total Heme and Non-heme Iron in Raw and Cooked Meats," Journal of Food Science, 67(5):1738-1741 (2002).

Lopez, "We just tried the 'Impossible Burger'—the meatless burger NYC has been waiting for," Business Insider, Jul. 27, 2016, retrieved on Aug. 25, 2016, <http://www.businessinsider.com/what-the-impossible-burger-tastes-like-2016-7>, 5 pages.

Lugay and Kim, "Freeze alignment: A novel method for protein texturization," Utilization of Protein Resources, 1981, p. 177-187.

(56) References Cited

OTHER PUBLICATIONS

Luteness, "The Richest Source of Protein," Mosaic, May/Jun. 1979, 39-45.
Macleod, Glesni et al., "Natural and simulated meat flavors (with particular reference to beef)" Critical Reviews in Food Science & Nutrition, vol. 14, 309-437, 1981.
MacMunn, "An address on some of the applications of the spectroscope to medicine", The British Medical Journal, Jan. 3, 1891, pp. 3-9.
Maltais et al., "Formation of Soy Protein Isolate Cold-Set Gels: Proteins and Salt Effects," J. Food Science, 2005, 70 (1): C67-C73.
Maqsood et al., "Haemoglobin-mediated lipid oxidation in the fish muscle: A review," Trends in Food Science & Technology, 2012, 28:33-43.
Marshall et al., "We Tried the "Bleeding" Vegetarian Burger and It Was Actually Good," Jul. 27, 2016, retrieved Jul. 28, 2016 <https://www.buzzfeed.com/chelseamarshall/bleeding-vegetable-burger?utm_term=.jaa03Kyo7#.ogV0m7MAW>, 10 pages.
McGorrin, "Advances in Dairy Flavor Chemistry," Food Flavors and Chemistry: Advances of the New Millennium, Spanier, A. M.; Shahidi,F.; Parliment, T. H.; Mussinan, C. J.; Ho, C.-T.; Contis, E. T., Eds., RoyalSociety of Chemistry, Cambridge, pp. 67-84 (2001).
McGorrin, "Character-impact flavor and off-flavor compounds in foods," Flavor, Fragrance, and Odor Analysis, 2nd, 207-262 (2012).
McGorrin, "The significance of volatile sulfur compounds in food flavors," Volatile sulfur compounds in food 1068, 29 pages (2011).
Mercola, "Controversy over fake meat burger," 2011, https://articles.mercola.com/sites/articles/archive/2017/08/21/impossible-burger-meat-substitute.aspx (Year: 2011), 9 pages.
Moon et al., "Odour-active components of simulated beef flavour analyzed by solid phase micro-extraction and gas chromatography-mass spectrometry and -olfactometry," Food Research International, 39:294-308 (Apr. 2006).
Morita, "Comparison of aroma characteristics of 16 fish species by sensory evaluation and gas chromatographic analysis," J. Sci. Food Agric., 83:289-297 (2003).
Morningstar Farms Garden Veggie Patties Package Ingredients, posted on or before Jun. 26, 2013, accessed Jan. 7, 2014, https://www.morningstarfarms.com/products/burgers/garden-veggie-patties, 6 pages.
Mottram et al., "Formation of Sulfur Aroma Compounds in Reaction Mixtures Containing Cysteine and Three Different Forms of Ribose," J. Agric. Food Chem., 50:4080-4086 (2002).
Mottram, "Flavour formation in meat and meat products: a review," Food Chemistry, 62(4):415-24 (Aug. 1998).
Mottram,"An Overview of the Contribution of Sulfur-Containing Compounds to the Aroma in Heated Foods," Heteroatomic Aroma Compounds, American Chemical Society, pp. 73-92 (Aug. 2002).
Nacho Mom's Vegan Queso, Products and Nutrition Facts, posted on or before Sep. 20, 2010, retrieved on Feb. 7, 2014, http://fatgoblin.com/Home.html, 6 pages.
Naike, "Food Flavor Chemistry," 1st Edition China Light Industry Press, pp. 236-243 (1996) (English Translation).
Nielsen et al., "Improved Method for Determining Food Protein Degree of Hydrolysis", Journal of Food Science: Food Chemistry and Toxicology, vol. 66, 2001.
Nielson, Introduction to the Chemical Analysis of Foods, Jones & Bartlett Publishers, 1994.
Nutty Cow Nut Cheeses, Products and Nutrition Facts, posted on or before Jul. 23, 2012, retrieved Feb. 7, 2014, http://www.nuttycow.com/, 6 pages.
Oelligrath, "Heat Degradation of Heme in Met-hemoglobin and Met-myoglobin Model Systems Measured by Reversed-Phase Ion-Pair High Performance Liquid Chromatography," J Food Science, 1998, 53(1): 40-42.
Office Action in Russian Patent Application No. 2014104812, dated May 23, 2017, 8 pages (English Translation).
Ofori and Hsieh, "The Use of Blood and Derived Products as Food Additives", Chapter 13 of book Food Additive Edited by Yehia El-Samragy Published: Feb. 22, 2012.
Oshodi et al., "In vitro protein digestibility, amino acid profile and available iron of infant-weaning food prepared from maize flour and bovine blood", Food Research International, vol. 30, No. 3-4, pp. 193-197, 1997.
PancakeNinja, "Beef and chicken cheese burgers"—Pancake Ninja, 2011, http://pancake-ninja.blogspot.com/2011/06/beef-and-chicken-cheese-burgers.html, downloaded Nov. 22, 2017, 8 pages.
Parmela Parmesan Style Aged Nut Cheese, Product and Nutrition Facts, 2012, retrieved Feb. 7, 2014, http://www.parmelafoods.com/your-health.html, 4 pages.
Pazos et al., "Effect of pH on Hemoglobin-Catalyzed Lipid Oxidation in Cod Muscle Membranes in Vitro and in Situ," J. Agric. Food Chem., 2005, 53:3605-3612.
Peace Cheese 100% Plant-based Cheese Alternative, Product and Nutrition Facts, posted on or before Jun. 6, 2012, retrieved Feb. 7, 2014, http://www.ilovepeacecheese.com/#/products/4571642621, 3 pages.
Peterson, "The Impact of the Enzymatic Hydrolysis Process on Recovery and Use of Proteins", In: Birch G.G., Blakebrough N., Parker K.J. (eds) Enzymes and Food Processing. Springer, Dordrecht (1981).
Proulx et al., "Iron Bioavailability of Hemoglobin from Soy Root Nodules Using a Caco-2 Cell Culture Model," J. Agricultural and Food Chemistry, Feb. 2006, 54(4):1518-1522.
Proulx, "Diversified strategies for improving iron bioavailability of maize," Iowa State University—Retrospective Theses and Dissertations, 2007 retrieved on Sep. 19, 2016, retrieved from <http://lib.dr.iastate.edu/rtd/15852/>, 144 pages.
Punk Rawk Labs: an ongoing experiment in optimal health, Nut Milk Cheese Products, posted on or before Jun. 8, 2011, retrieved Feb. 7, 2014, http://www.punkrawklabs.net/cheeses.html, 4 pages.
Ramos et al., "What is Masa?—Ingredient Intelligence," The Kitchen, retrieved on Dec. 1, 2016, http://www.thekitchn.com/whats-the-difference-between-masa-and-masa-harina-226434, 5 pages.
Rebellato et al., "Iron in fortified biscuits: A simple method for its quantification, bioaccessibility study and physicochemical quality," Food Research International, 2015, 77:385-391.
Reedy et al., "Development of a heme protein structure-electrochemical function database," Nucleic Acids Research, 2008, 36:307-313.
Richards et al., "Effects of Fish Heme Protein Structure and Lipid Substrate Composition on Hemoglobin-Mediated Lipid Oxidation," J. Agric. Food Chem., 2007, 55:3643-3654.
Richards et al., "Pro-oxidative Characteristics of Trout Hemoglobin and Myoglobin: A Role for Released Heme in Oxidation of Lipids," J. Agric. Food Chem., 2005, 53:10231-10238.
Richins et al., "Effect of Iron Source on Color and Appearance of Micronutrient-Fortified Corn Flour Tortillas," Cereal Chem., 85:561-5 (2008).
Road's End Organics, Cheese Sauce Mix Products and Nutrition Facts, posted on or before Oct. 28, 2009, retrieved Feb. 7, 2014, http://www.edwardandsons.com/reo_shop_chreese.itml, 6 pages.
Road's End Organics, Mac & Cheese Products and Nutrition Facts, posted on or before Oct. 28, 2009, retrieved Feb. 7, 2014, http://www.edwardandsons.com/reo_shop_pastas.itml, 7 pages.
Rochet and Chaintreau, "Carbonyl Odorants Contributing to the In-Oven Roast Beef Top Note," J. Agric. Food Chem., 53:9578-9585 (Nov. 2005).
Rowe, "Chemistry and technology of flavors and fragrances," Oxford:: Blackwell; 2005, 351 pages.
Rusli, "The Secret of These New Veggie Burgers: Plant Blood," The Wall Street Journal, Oct. 7, 2014, retrieved on Oct. 9, 2014, http://online.wsj.com/articles/the-secret-of-these-new-veggie-burgers-plant-blood-1412725267, 5 pages.
Schieberle et al., "Characterization of Key Odorants in Dry-Heated Cysteine-Carbohydrate Mixtures: Comparison with Aqueous Reaction Systems," Flavor Analysis, American Chemical Society, pp. 320-330 (Sep. 1998).
Schwartz, "Meet the Silicon Valley-Backed Vegan Cheese That You Might Actually Eat," Fast Company, Feb. 26, 2014, retrieved Sep. 11, 2015, http://www.fastcoexist.com/3025648/meet-the-silicon-valley-backed-vegan-cheese-that-you-might-actually-eat, 6 pages.

(56) References Cited

OTHER PUBLICATIONS

Segner, "Meatless burger made possible with local effort," Jul. 29, 2016, retrieved Aug. 1, 2016 <http://www.southernminn.com/owatonna_peoples_press/news/article_3d414149-1040-534d-b1af-bf4f8c486788.html>, 5 pages.

Selli et al., "Odour-active and off-odour components in rainbow trout (*Oncorhynchus mykiss*) extracts obtained by microwave assisted distillation-solvent extraction," Food Chemistry, 114:317-322 (2009).

Shahidi et al., "Meat flavor volatiles: A review of the composition, techniques of analysis, and sensory evaluation," CRC Critical Reviews in Food Science and Nutrition, 24(2):141-243 (Jan. 1986).

Shi et al., "Identification of characteristic flavour precursors from enzymatic hydrolysis-mild thermal oxidation tallow by descriptive sensory analysis and gas chromatography-olfactometry and partial least squares regression," Journal of Chromatography B, 913-914:96-76 (Jan. 2013).

Shimbayashi et al., "Free Amino Acids and Phosphorylethanolamine in Milk Whey of Cow" Agr. Biol. Chem, 29(1):13-19, 1965.

Shu et al., "Parameter Effects on the Thermal Reaction of Cysteine and 2,5-Dimethyl-4-hydroxy-3(2H)-furanone," Thermal Generation of Aromas, American Chemical Society, pp. 229-241 (Oct. 1989).

Sister River Foods Parma!, Products and Nutrition Facts, Posted on or before Jun. 2, 2012, retrieved Feb. 11, 2014, http://www.veganstore.com/product/parma-vegan-parmesan/vegan-cheese-and-dairy-alternatives, 6 pages.

Soller, "The Impossible Burger is Ready for Its (Meatless) Close-Up," The Wall Street Journal, Jun. 14, 2016, retrieved Jun. 21, 2016 <http://www.wsj.com/articles/the-impossible-burger-is-ready-for-its-meatless-close-up-1465912323>, 8 pages.

Song, et al., "Contribution of oxidized tallow to aroma characteristics of beef-like process flavour assessed by gas chromatography-mass spectrometry and partial least squares regression," Journal of Chromatography A, 1254:115-124 (Sep. 2012).

Soy Kaas, Products, posted on or before Jan. 20, 2011, retrieved Feb. 11, 2014, http://www.soykaas.com/products, 1 page.

Soyco Cheese Products, Natural Pantry, retrieved Feb. 11, 2014, http://www.natural-pantry.com/search_results.asp?ct=All&site_search_qu=soyco&storeID=D92VLAQVMPDL9L5UHTS2WLU67NADEHUA, 10 pages.

Soymage Cheese Products, Good Earth Natural Foods, retrieved on Feb. 11, 2014, http://www.goodearthnaturalfoods.com/shop/brand2.asp?storeID=PJ102JRNHNGT8G0QMPEQ7LDC7GX6C2W2&alpha=S&brand=Soymage&brand_id=805, 6 pages.

Specht et al., "Identification of Volatile Flavor Compounds with High Aroma Values from Shallow-Fried Beef," J. Agric. Food Chem., 1994, 42:2246-2253.

Spence et al., "Multisensory Flavor Perception," Cell 161: 24-35 (2015).

Ste Martaen Cheese, Products and Nutrition Facts, posted on or before May 28, 2009, retrieved Feb. 11, 2014, http://stemartaen.bigcartel.com/, 14 pages.

Sterling, "Welcome to the Era of Plant-Based Meat," Food & Wine, Apr. 13, 2016, Retrieved Apr. 20, 2016, <http://www.foodandwine.com/blogs/welcome-era-plant-based-meat>, 3 pages.

Supplementary European Search Report for International No. EP 14737909.3, dated Oct. 7, 2016, 10 pages.

Supplementary European Search Report in European Application No. 15774164, dated Oct. 27, 2017, 11 pages.

Supplementary Partial European Search Report in European Application No. 14738061 dated Nov. 7, 2016, 11 pages.

Swanson, "Patenting the Quest for a More Perfect Veggie Burger," JDSUPRA Business Advisor, Jun. 21, 2016, retrieved Jun. 23, 2016 <http://www.jdsupra.com/legalnews/patenting-the-quest-for-a-more-perfect-72212/>. 13 pages.

Tang et al., "Flavor chemistry of 2-methyl-3-furanthiol, an intense meaty aroma compound," Journal of Sulfur Chemistry, 11 pages, (2012)

The Daiya Advantage, Products and Nutrition Facts, posted on or before Jan. 26, 2010, retrieved on Feb. 7, 2014, http://us.daiyafoods.com/our-products, 126 pages.

The Good Scents Company, "The Good Scents Company Information System," 2015, retrieved on Dec. 1, 2016, http://www.thegoodscentscompany.com/, 2 pages.

The Vegetarian Express Parma Zaan Sprinkles, posted on or about Oct. 17, 2009, retrieved Feb. 11, 2014, http://www.thevegetarianexpress.com/cart/home.php?cat=250, 2 pages.

Tofu Rella Mozzarella Cheese, Natural Pantry, retrieved Feb. 11, 2014, http://www.natural-pantry.com/shop/product_view.asp?id=24684&StoreID=D92VLAQVMPDL9L5UHTS2WLU67NADEHUA&private_product=0, 2 pages.

Tofutti Cheese Products and Nutrition, posted on or before Jun. 26, 2013, retrieved Feb. 11, 2014, http://www.tofutti.com/dairy-free-cheeses/, 18 pages.

Tofutti Milk Free, "Premium Dairy Free Cheeses,", posted on or before Jun. 26, 2013, accessed Jan. 7, 2014, http://www.tofutti.com/dairy-free-cheeses/, 2 pages.

Tong et al. "Blood Composition of Different Beef Breed Types" Can. J. Anim Sci, 66:915-924 (Dec. 1986).

Topunov, A.F., et al., "Hemoglobins: Evolution, Abundance, and Heterogeneity," Uspekhi Biologicheskoi Khimii, vol. 41, 2001, p. 207, partial translation, 1 page.

Trader Joe's Sliced Soy Cheese Alternative, Fotki, posted Oct. 27, 2008, retrieved Feb. 11, 2014, http://public.fotki.com/harwons/food/tj-sliced-soy-cheese.html, 1 pages.

Trader Joe's Vegan Mozzarella, A(soy) Bean, posted Jun. 7, 2013, retrieved Feb. 11, 2014, http://a-soy-bean.blogspot.com/2013/06/showdown-trader-joes-vegan-mozzarella.html, 13 pages.

Treeline Treenut Cheese, Products and Nutrition Facts, posted on or before Dec. 10, 2013, retrieved on Feb. 11, 2014, http://www.treelinecheese.com/treeline-cheese-products.html, 3 pages.

Tressl et al., "Formation of Amino Acid Specific Maillard Products and Their Contribution to Thermally Generated Aromas," Thermal Generation of Aromas, American Chemical Society, pp. 156-171 (Oct. 1989).

Uauy et al., "Iron Fortification of Foods: Overcoming Technical and Practical Barriers," J. Nutr. 132:849S-852S (2002).

United States Environmental Protection Agency Document EPA-745-B-99-0145, 1999.

Usami, Aya et al., "Heme-mediated binding of a-casein to ferritin: evidence for preferential a-casein binding to ferrous iron" Biometals, vol. 24, 1217-1224, 2011.

Van Ba et al., "Principles of Meat Aroma flavors and Future Prospect," INTECH Open Science, Open Minds, 2012, Chapter 7, 145-176.

Van Den Ouweland et al., "Process Meat Flavor Development and the Maillard Reaction," In Thermal Generation of Aromas, ACS Symposium Series, American Chemical Society, 1989, 433-441.

Vasilescu et al., "Chapter 6: Meat Freshness: Peroxynitrite's Oxidative Role, Its Natural Scavengers, and New Measuring Tools," American Chemical Society, Dec. 2014, 30 pages.

VBites, "Cheezly," posted on or before 2013, accessed Jan. 7, 2014, http://www.vbitesfoods.com/meat-free/cheezly.html, 2 pages.

Vegan Sun Artisan Aged Raw Cheese, Vegan Essentials, retrieved Feb. 11, 2014, http://store.veganessentials.com/vegan-sun-artisan-aged-raw-cheese-p4201.aspx, 3 pages.

VegCuisine Soy Cheese Products, The Vegan Store, retrieved on Feb. 11, 2014, http://www.veganstore.com/category/s?keyword=vegcuisine, 5 pages.

Veggie Brothers Mozzarella Sticks, Vegan Essentials, Nov. 9, 2013, retrieved Feb. 11, 2014, http://store.veganessentials.com/vegan-mozzarella-sticks-by-veggie-brothers-p3761.aspx, 2 pages.

Victoria Vegan Sauces, Products and Nutrition Facts, posted on or about Sep. 16, 2012, retrieved Feb. 11, 2014, http://www.victoriafinefoods.com/products/specialty-sauces/victoria-vegan, 9 pages.

Walter et al, Effect of bovine-hemoglobin-fortified cookies on iron status of schoolchildren: a nationwide program in Child, Am J Clin Nutr, 1993, 57, pp. 190-194.

Wansink, B "Overcoming the Taste Stigma of Soy" Journal of Food Science: Sensory and Nutritive Qualities of Food, vol. 68, 2604-2606, 2003.

(56) References Cited

OTHER PUBLICATIONS

Wayfare We Can't say It's Cheese Spread, Products and Nutrition Facts, posted on or about Oct. 12, 2013, retrieved Feb. 11, 2014, http://www.wayfarefoods.com/we-cant-say-its-cheese/, 5 pages.
Wisuthiphaet and Kongruang, "Production of Fish Protein Hydrolysates by Acid and Enzymatic Hydrolysis," J Med Bioeng, 2015, 4(6): 466-470.
Withycombe et al., "Identification of 2-Methyl-3-Furanthiol in the Steam Distillate from Canned Tuna Fish," Journal of Food Science, 53(2):658-660 (1988).
Wortham and Miller, "Venture Capitalists Are Making Bigger Bets on Food Start-Ups," The New York Times Online, Apr. 28, 2013, http://www.nytimes.com/2013/04/29/business/venture-capitalists-are-making-bigger-bets-on-food-start-ups.html?pagewanted=all&_r=1&, 4 pages.
Xiaoling, "Practical Technology and Quality Management of Deep Processing of Meat Products," China Textile & Apparel Press, pp. 9 and 10 (English Translation), 10 pages.
Yancey et al., "Effects of total iron, myoglobin, hemoglobin, and lipid oxidation of uncooked muscles on livery flavor development and volatiles of cooked beef steaks," Meat Science, 73:680-686 (2006).
Yves Veggie Cuisine The Good Slice, ShopWell, retrieved on Feb. 11, 2014, http://www.shopwell.com/yves-veggie-cuisine-the-good-slice-cheese-alternative-cheddar-style/soy-foods/p/6082260001, 1 page.
Zhengnong et al., "Cihai biological fascicle," Shanghai Lexicographical Publishing House, p. 243, Dec. 31, 1987 (English Translation).
Charkin, et al., "Fragmentation of heme and hemin+ with sequential loss of carboxymethyl groups: A DFT and mass-spectrometry study," Chemical Physics Letters, 2005, 415:362-369.
FDA Statement and Response, GRAS Notice 540, dated May 29, 2015, 13 pages.
FDA Statement, "Structural comparison of plant hemoglobins and animal myoglobins," annex to communication in opposition to EP Patent No. 2943072, 2019, 5 pages.
Fyrestam and Ostman, "Determination of heme in microorganisms using HPLC-MS/MS and cobalt(III) protoporphyirin IX inhibition of heme acquisition in *Escherichia coli*," Anal. Bioanal. Chem., 2017, 409:6999-7010.
GenBank Accession No. AFB70892.1, Sariam, "Non-symbiotic hemoglobin [Vigna radiata]," dated Feb. 26, 2012, 1 page.
Gledhill, "The detection of iron protoporphyrin (heme b) in phytoplankton and marine particulate material by electrospray ionisation mass spectrometry—comparison with diode array detection," Anal. Chim. Acta., 2014, 841:33-43.
Impossible Foods Response to Opponent's Reply in opposition to EP Patent No. 2943072, dated Nov. 21, 2019, 28 pages.
Jenschke, et al., "Unsaturated fatty acids and sodium affect the liver-like off-flavor in cooked beef," J. Anim. Sci., 2007, 85:3072-3078.
Jianjun Jiang, et al., "Food technology (vol. 1)," Higher Education Press, 2002, 1:31-32, English translation.
Kohler, et al., "Physiological Characterization of a Heme-Deficient Mutant of *Staphylococcus aureus* by a Proteomic Approach," Journal of Bacteriology 2003, 185:6928-6937.
Lane and Nursten, "The Variety of Odors Produced in Maillard Model Systems and How They Are Influenced by Reaction Conditions," in: The Maillard Reaction in Foods and Nutrition, Waller and Feather, eds., ACS Symposium Series, 1983, No. 215, pp. 141-158.
Opponent's Reply Letter in opposition to EP Patent No. 2943072, dated Nov. 21, 2019, 15 pages.
Pashynska, et al., "Characterization of Noncovalent Complexes of Antimalarial Agents of the Artemisinin-Type and Fe(III)-Heme by Electrospray Mass Spectrometry and Collisional Activation Tandem Mass Spectrometry," J. Am. Soc. Mass Spectrom., 2004, 15:1181-1190.
Song, et al., "Agricultural and sideline products processing value-added technology II: Processing of soybean products," Henan Science and Technology Press, 2009, 1:64-69, English translation.

Wang and Wang, "Principles and techniques of food nutrition and health care," China Light Industry Press, 1998, 1:446-449, English translation.
"happycow.net", [online], "For Love of Sea Vegetables", dated Jul. 10, 2019, Internet URL: https://www.happycow.net/blog/for-love-of-sea-vegetables/, 5 pages.
"pacificharvest.com", [online], "Red Seaweeds—Nutritional Benefits & Quick Applications", dated Jul. 14, 2016, Retrieved from Internet on Jul. 26, 2019, Internet URL: https://www.pacificharvest.co.nz/blog/general-information/red-seaweeds, 11 pages.
"vitalitymagazine.com", [online], "Sprouts: The Miracle Food", Vitality Magazine, dated Feb. 1, 2005, Retrieved from Internet Jul. 29, 2019, Internet URL: https://vitalitymagazine.com/article/sprouts-the-miracle-food/, 10 pages.
"www.jackkruse.com", [online], "Brain Gut 6: Epi-Paleo Rx", dated Jul. 2012, Internet URL: https://jackkruse.com/brain-gut-6-epi-paleo-rx/?print=pdf, 12 pages.
"www.maraseaweed.com", [ online], "Smoked Dulse", Applewood Smoked Dulse—Seaweed Flakes | Mara Seaweed, No Date, Retrieved from the Internet Jul. 15, 2019, Internet URL: https://maraseaweed.com/collections/products/products/smoked-dulse, 3 pages.
"www.myliquidsupplements.com", "Red seaweed is a rich source of nutrients, essential fatty acids, fiber, protein, complex cards, and minerals and now red sea vegetables are easy to find", Health Benefits of Red Seaweed, dated 2013, Retrieved from Internet Jul. 29, 2019, Internet URL: https//:www.myliquidsupplements.com/red-seaweed/, 10 pages.
"www.scotsman.com", [online], "Tom Kitchen: ideas for cooking with seaweed", dated Aug. 5, 2012, Retrieved from Internet Jul. 29, 2019, Internet URL: https://www.scotsman.com/news-2-15012/tom-kitchin-ideas-for-cooking-with-seaweed-1-2451932,12 pages.
"www.shop.healthyhealing.com", [online], "What Are Sea Vegetables? (/healthyhealing-safety/what-are-sea-vegetables)", dated Oct. 25, 2012, Retrieved from the Internet Jul. 15, 2019, Internet URL: (https://shop.healthyhealing.com/Seaweed-Products_c_140.html), 5 pages.
"www.universal-tao.com", [online], "Sprouts", No Date, Retrieved from Internet on Jul. 29, 2019, Internet URL: https://www.universal-tao.com/article/sprouts/html, 9 pages.
"www.wildfoodplants.com", [online], "Teriyaki Weed", dated Sep. 9, 2007, Retrieved from Internet Jul. 15, 2019, Internet URL: https://wildfoodplants.com/2007/09/teriyaki-weed/, 2 pages.
Abou El-Ella, "Hard cheese substitute from soy milk", Journal of Food Science, Wiley-Blackwell Publishing, Inc, US, vol. 45, No. 6, Jan. 1, 1980.
Ames et al., "Volatile Components of a Yeast Extract Composition", J Food Sci 50, pp. 125-131, 1985.
Ames, "Volatile Sulfur Compounds in Yeast Extracts", Chapter 12, Sulfur compounds in foods. Washington DC: ACS, pp. 147-159, 1994.
Anderson et al., "A new hemoglobin gene from soybean: A role for hemoglobin in all plants", Proc. Natl. Acad. Sci. USA, 93, 5682-5687, 1996.
Baek et al., "Aroma Extract Dilution Analysis of a Beef like Process Flavor from Extruded Enzyme-Hydrolyzed Soybean Protein", J. Agric. Food Chem., 49, 790-793, 2001.
Bodnar, "Novel approaches to improving qualities of maize endosperm", Graduate Theses and Dissertations. Paper 10271. Ames, Iowa, USA: Iowa State University Digital Repository @ Iowa State University, 2011, 147 pages.
Buttery et al., "Thiamin Odor and Bis(2-methyl-3-furyl) Disulfide", J. Agri. Food Chem., vol. 32, No. 3, pp. 674-676, 1984.
Buttery, "Flavor Chemistry and Odor Thresholds", In: Teranishi, R, Wick, EL, Hornstein, I, editors. Flavor chemistry: thirty years of progress, pp. 353-365, 1999.
Chohan et al., "Catalytic Effect of Cobalt, Copper, Iron, Magnesium, Manganese, Nickel and Zinc Metal ions on the Conversion of Glucose into 5-Bydroxymethylfurfuraldehyde.", Jour. Chem. Soc. Pak. vol. 19, No. 3, pp. 221-223, 1997.
Collman et al., "Regioselective and Enantioselective Epoxidation Catalyzed by Metalloporphyrins", Science, vol. 261, pp. 1404-1411, 1993.

(56) References Cited

OTHER PUBLICATIONS

Derwent, "Cheese-like, soybean-fermented foodstuff prodn.—by inoculating soybean milk with lactic acid bacteria and protein decomposing yeast", 1979.
Duff et al., "Hemoglobin expression in germinating barley.", Seed Science Research, 431-436, 1998.
Erickson et al., "Lipid Oxidation of Muscle Foods", Chapter 12, Food Lipids Chemistry, Nutrition, and Biotechnology Second Edition, 48 pages, 2002.
Evers et al., "Furans Substituted at the Three Position with Sulfur", American Chemical Society: Washington, pp. 184-119, 1976.
Everse, "Heme Proteins.", In Encyclopedia of Biological Chemistry, Elsevier Inc., vol. 2, pp. 354-361, 2004.
Extended European Search Report in Application No. 18203176.5, dated May 31, 2019.
Farmer et al., "Interaction of Lipid in the Maillard Reaction between Cysteine and Ribose: the Effect of a Triglyceride and Three Phospholipids on the Volatile Products", J Sci Food Agric., 53, 505-525, 1990.
Gasser et al., "Identification of volatile flavour compounds with high aroma values from cooked beef", Z Lebensm Un lcrs Forsch, 186: 489-494, 1988.
Gasser et al., "Primary odorants of chicken broth", Z Lebensm Unters Forsch, 190: 3-8, 1990.
Groves et al., "Asymmetric Hydroxylation, Epoxidation, and Sulfoxidation Catalyzed by Vaulted Binaphthyl Metalloporphyrins", J. Org. Chem., 55, 3628-3634, 1990.
Güntert et al., "Identification and Formation of Some Selected Sulfur-Containing Flavor Compounds in Various Meat Model Systems", J. Agri. Food Chem., 38, 2027-2041, 1990.
Gupta e al., "Plant hemoglobin's: Important players at the crossroads between oxygen and nitric oxide.", FEBS Letters, pp. 3843-3849, 2011.
Hardison, R., "Hemoglobin's from bacteria to man. Evolution of different patterns of gene expression.", The Journal of Experimental Biology, 1099-1117, 1998.
Hargrove et al., Characterization of Recombinant Soybean Leghemoglobin and Apolar Distal Histidine Mutants, Journal of molecular biology, 1032-42, 1997.
Hofmann et al., "Evaluation of the Key Odorants in a Thermally Treated Solution of Ribose and Cysteine by Aroma Extract Dilution Techniques", J. Agri. Food Chem., 43, 2187-2194, 1995.
Hofmann et al., "Lactic Fermentation of Ground Soybean for Use in Imitation Cream Cheese Products", Journal of Food Science, vol. 50, No. 2, pp. 325-329, 1985.
Hofmann et al., "Studies on the Formation and Stability of the Roast-Flavor Compound 2-Acetyl-2-thiazoline", J. Agri. Food Chem., 43, 2946-2950, 1995.
Jin et al., "Aroma Properties of Some Oxazoles", Perfumer & Flavorist, vol. 9, August/September, 4 pages, 1984.
Lee et al., "Cloning and Expression Analysis of 2-on-2 Hemoglobin from Soybean.", Journal of Plant Biology, 47(2), 92-98, 2004.
Lendl, "Untersuchung des Rsstzwiebelaromas", Z. Lebensm. Unters.-Forsch. 157, 229-234, 1975.
Lira-Ruan et al., "Expression of non-symbiotic hemoglobin 1 and 2 genes in rice (*Oryza sativa*) embryonic organs.", Communicative and Integrative Biology, 4(4), 457-458, 2011.
Lu et al., "Catalytic C—H functionalization by metalloporphyrins: recent developments and future directions", Chem. Soc. Rev., 40, 1899-1909, 2011.
MacLeod, "The Scientific and Technological Basis of Meat Flavours", 12, 36 pages, 1986.
Meunier et al., "Metal-oxo species in P450 enzymes and biomimetic models. Oxo-hydroxo tautomerism with water-soluble metalloporphyrins", Topics in Catalysis vol. 21, Nos. 1-3, pp. 47-54, 2002.
Mintel, [Online], "Greek Style Cultured Almond Milk Yogurt", retrieved from www.gnpd.com, Nov. 2012 Database accession No. 1943001, 5 pages.

Mottram, "Flavor Compounds Formed during the Maillard Reaction", Chapter 10, 23 pages, 1993.
Mouritsen et al., "Seaweeds for umami flavour in the New Nordic Cuisine", Flavour 1:4, 12 pages, 2012.
Pittet et al., "Comparative Study of Flavor Properties of Thiazole Derivatives", J. Agri. Food Chem., vol. 22, No. 2, pp. 264-269, 1974.
Shaw et al., "Bioavailability of Iron from Purple Laver (*Porphyra* spp.) Estimated in a Rat Hemoglobin Regeneration Bioassay", J. Agric. Food Chem., 48, pp. 1734-1737, 2000.
Strelec et al., "Aminopeptidases of Germinated and Non-Germinated Barley", Barley Aminopeptidases, Food Technol. Biotechnol. 47 (3), 296-303, 2009.
Van Den Ouweland et al., "Components Contributing to Beef Flavor. Volatile Compounds Produced by the Reaction of 4-Hydroxy-5-methyl-3(2.ff)-furanone and Its Thio Analog with Hydrogen Sulfide", J. Agri. Food Chem., vol. 23, No. 3, pp. 501-505, 1975.
Vernin et al., "Mechanisms of Formation of Heterocyclic Compounds in Maillard and Pyrolysis Reactions", Chapter III, Heterocycles in Maillard and Pyrolysis Reactions, pp. 151-217, 1982.
Wajcman et al., "L Hemoglobin, from microorganism to man. A single structural motif, multiple functions.", Comptes Rendus Biologies, 325(12), 1159-1174, 2002.
Weenen, "Process Flavourings", Flavourings, pp. 233-258, 1998.
Weinberger et al., "Different regulation of halo peroxidation during agar oligosaccharide-activated defense mechanisms in two related red algae, *Gracilaria* sp. and Gracilaria chilensis", Journal of Experimental Botany, vol. 58, No. 15/16, pp. 4365-4372, 2007.
Werkhoff et al., "Isolation and Characterization of Volatile Sulfur-Containing Meat Flavor Components in Model Systems", J. Agri. Food Chem., 38, 777-791, 1990.
Whitfield et al., "Effect of Phospholipid on the Formation of Volatile Heterocyclic Compounds in Heated Aqueous Solutions of Amino Acids and Ribose", 1. Sci. Food Agric., 42, 261-272, 1988.
Wu et al., "Characterization of the Aroma of a Meat like Process Flavoring from Soybean-Based Enzyme-Hydrolyzed Vegetable Protein", J. Agric. Food Chem., 50, 2900-2907, 2002.
Yaylayan et al., "Microwave and Thermally Induced Maillard Reactions", Chapter 38, Thermally Generated Flavors, 8 pages, 1993.
Zampronio et al., "Catalytic oxidation of cyclohexane and cyclooctene over a new metalloporphyrin supported on VOPO4 catalyst", Catalysis Letters vol. 104, Nos. 1-2, 4 pages, 2005.
Zhang et al., "Comparison of the Volatile Compounds Formed from the Thermal Reaction of Glucose with Cysteine and Glutathione", J. Agri. Food Chem., 39, 760-76, 1991.
"Peas, green raw," FoodData Central, US Department of Agriculture, retrieved from URL <https:/fdc.nal.usda.gov/fdc-app.html#/food-details/170419/nutrients>, Apr. 1, 2019, 8 pages.
Berrios, et al., "Carbohydrate composition of raw and extruded pulse flours," Food Research International, 2010, 43:531-536.
EP Opposition, in Application No. 14737766.7, dated Jul. 4, 2019, 8 pages.
Jahreis, et al., "Legume flours: nutritionally important sources of protein and dietary fiber," Ernahrungs Umschau, 2016, 63(2):36-42.
Liu, "Comparison of lipid content and fatty acid composition and their distribution within seeds of 5 small grain species," J. Food Sco., 2011, 76(2):C334-C342.
Macnicol, "Developmental changes in the free amino acid pool and total protein amino acids of pea cotyledons (*Pisum sativum* L.)," Plant Physiol., 1983, 72:492-497.
Oldach, "Biochemistry of a Burger: Impossible Foods does science, makes food and tries to change the world," ASBMB Today, retrieved from URL <https://www.asbmb.org/asbmb-today/industry/100119/biochemistry-of-a-burger>, Oct. 1, 2019, 12 pages.
Opponent's Reply Letter in opposition to EP Patent. No. 2943072, dated Jan. 20, 2020, 18 pages.
Rebuttal Declaration of Dr. Jorge Ruiz-Carrascal and Supporting Exhibits, dated Jan. 20, 2020, 12 pages.
Warendorf, et al., "The flavour of bouillon: 2. Sensory analysis of non-volatiles and imitation of a bouillon," Z. Lebensm. Unters. Forsch., 1992, 195(3):215-223, English Abstract.

(56) References Cited

OTHER PUBLICATIONS

Wood, et al., "Fatty deposition, fatty acid composition and meat quality: a review," Meat Science, 2008, 78:343-358.
Analysis of soy hydrolysate, Avomen Analytical Services Laboratory Test Results, Jul. 25, 2019.
Biede, et al., "Swiss cheese flavor: I. chemical analysis," Journal of Dairy Science, 1979, 62:227-237.
Declaration of Dr. Jorge Ruiz-Carrascal, dated Jul. 29, 2019, 72 pages.
EP Opposition Letter from Opponent in EP Appln. No. 14737766.7 dated Aug. 6, 2019, 55 pages.
Estevez, et al., "Analysis of volatiles in meat from Iberian pigs and lean pigs after refrigeration and cooking by using SPME-GC-MS," Journal of Agricultural and Food Chemistry, 2003, 51:3429-3435.
Friedman and Brandon, "Nutritional and health benefits of soy proteins," J. Agric. Food Chem., 2001, 49(3):1069-1086.
Ibrahim, et al., "Mechanism of the CO-sensing heme protein CooA: new insights from the truncated heme domain and UVRR spectroscopy," Journal of Inorganic Biochemistry, 2007, 101:1776-1785.
Kendrick and Watts, "Acceleration of inhibition of lipid oxidation by heme compounds," Lipids, 1969, 4:454-458.
Mahajan, et al., "Aroma compounds in sweet whey powder," Journal of Dairy Science, 2004, 87:4057-4063.
Meisinger, et al., Flavor relationships among muscles from the beef chuck and round, Journal of Animal Science, 2006, 84:2826-2833.
Singh, et al., "Functional and edible uses of soy protein products," Comp. Rev. Food Sci. Food Safety, 2008, 7:14-28.
Vaghefi, et al., "Influence of the extent of hemoglobin hydrolysis on the digestive absorption of heme iron. An in vitro study," Journal of Agricultural and Food Chemistry, 2002, 50:4969-4973.
Yeast Metabolom Database, "Heme (YMDB0041)," (http://www.ymdb.ca/compounds/YMDB00041).
Young and Pellett, "Plant proteins in relation to human protein and amino acid nutrition," Am. J. Clin. Nutr., 1994, 59(Suppl):1203S-1212S.
Dinh et al., "Effects of USDA quality grade and cooking on water-soluble precursors of beef flavor," Meat Science, 2018, 146:122-130.
U.S. Appl. No. 14/796,970, filed Jul. 10, 2015, Marija Vrljic.
U.S. Appl. No. 15/786,776, filed Oct. 18, 2017, Marija Vrljic.
U.S. Appl. No. 16/238,769, filed Jan. 3, 2019, Marija Vrljic.
U.S. Appl. No. 14/152,499, filed Jan. 10, 2014, Patrick O'Reilly Brown.
U.S. Appl. No. 14/752,540, filed Jun. 26, 2015, Patrick O'Reilly Brown.
U.S. Appl. No. 15/985,694, filed May 21, 2018, Patrick O'Reilly Brown.
U.S. Appl. No. 14/797,006, filed Jul. 10, 2015, Rachel Fraser.
U.S. Appl. No. 15/398,479, filed Jan. 4, 2017, Rachel Fraser.
U.S. Appl. No. 15/624,505, filed Jun. 15, 2017, Rachel Fraser.
U.S. Appl. No. 15/624,513, filed Jun. 15, 2017, Rachel Fraser.
U.S. Appl. No. 15/839,994, filed Dec. 13, 2017, Rachel Fraser.
U.S. Appl. No. 15/913,018, filed Mar. 6, 2018, Rachel Fraser.
U.S. Appl. No. 15/912,763, filed Mar. 6, 2018, Rachel Fraser.
U.S. Appl. No. 15/913,090, filed Mar. 6, 2018, Rachel Fraser.
U.S. Appl. No. 13/941,211, filed Jul. 12, 2013, Patrick O'Reilly Brown.
U.S. Appl. No. 15/985,697, filed May 21, 2018, Patrick O'Reilly Brown.
U.S. Appl. No. 15/300,339, filed Sep. 29, 2016, Ranjani Varadan.
U.S. Appl. No. 16/238,698, filed Jan. 3, 2019, Ranjani Varadan.
U.S. Appl. No. 16/238,749, filed Jan. 3, 2019, Ranjani Varadan.

FIGURE 1

SEQ ID NO:1 *Vigna radiata*

MTTTLERGFTEEQEALVVKSWNVMKKNSGELGLKFFLKIFEIAPSAQKLFSFLRDSTVP
LEQNPKLKPHAVSVFVMTCDSAVQLRKAGKVTVRESNLKKLGATHFRTGVANEHFEVTK
FALLETIKEAVPEMWSPAMKNAWGEAYDQLVDAIKYEMKPPSS

SEQ ID NO:2 *Methylacidiphilum infernorum*

MIDQKEKELIKESWKRIEPNKNEIGLLFYANLFKEEPTVSVLFQNPISSQSRKLMQVLG
ILVQGIDNLEGLIPTLQDLGRRHKQYGVVDSHYPLVGDCLLKSIQEYLGQGFTEEAKAA
WTKVYGIAAQVMTAE

SEQ ID NO:3 *Aquifex aeolicus*

MLSEETIRVIKSTVPLLKEHGTEITARMYELLFSKYPKTKELFAGASEEQPKKLANAII
AYATYIDRLEELDNAISTIARSHVRRNVKPEHYPLVKECLLQAIEEVLNPGEEVLKAWE
EAYDFLAKTLITLEKKLYSQP

SEQ ID NO:4 *Glycine max*

MGAFTEKQEALVSSSFEAFKANIPQYSVVFYTSILEKAPAAKDLFSFLSNGVDPSNPKL
TGHAEKLFGLVRDSAGQLKANGTVVADAALGSIHAQKAITDPQFVVVKEALLKTIKEAV
GDKWSDELSSAWEVAYDELAAAIKKAF

SEQ ID NO:5 *Hordeum vulgare*

MSAAEGAVVFSEEKEALVLKSWAIMKKDSANLGLRFFLKIFEIAPSARQMFPFLRDSDV
PLETNPKLKTHAVSVFVMTCEAAAQLRKAGKITVRETTLKRLGGTHLKYGVADGHFEVT
RFALLETIKEALPADMWGPEMRNAWGEAYDQLVAAIKQEMKPAE

*Magnaporthe oryzae*, (SEQ ID NO:6)

```
  1 mdgavrldwt gldltgheih dgvpiasrvq vmvsfplfkd qhiimsskes psrksstigq
 61 strngscqad tqkgqlppvg ekpkpvkenp mkklkemsqr plptqhgdgt yptekkltgi
121 gedlkhirgy dvktllamvk sklkgeklkd dktmlmervm qlvarlptes kkraeltdsl
181 inelwesldh pplnylgpeh syrtpdgsyn hpfnpqlgaa gsryarsvip tvtppgalpd
241 pglifdsimg rtpnsyrkhp nnvssilwyw atiiihdifw tdprdintnk sssyldlapl
301 ygnsqemqds irtfkdgrmk pdcyadkrla gmppgvsvll imfnrfhnhv aenlalineg
361 grfnkpsdll egeareaawk kydndlfqva rlvtsglyin itlvdyvrni vnlnrvdttw
421 tldprqdaga hvgtadgaer gtgnavsaef nlcyrwhsci sekdskfvea qfqnifgkpa
481 sevrpdemwk gfakmeqntp adpgqrtfgg fkrgpdgkfd dddlvrcise avedvagafg
541 arnvpqamkv vetmgiiqgr kwnvaglnef rkhfhlkpys tfedinsdpg vaealrrlyd
601 hpdnvelypg lvaeedkqpm vpgvgiapty tisrvvlsda vclvrgdrfy ttdftprnlt
```

Cont. FIG 1

```
 661 nwgykevdyd lsvnhgcvfy klfirafpnh fkqnsvyahy pmvvpsenkr ilealgradl
 721 fdfeapkyip prvnitsygg aeyiletqek ykvtwheglg flmgegglkf mlsgddplha
 781 qqrkcmaaql ykdgwteavk afyagmmeel lvsksyflqn nkhrhvdiir dvgnmvhvhf
 841 asqvfglplk taknptgvft eqemygilaa ifttiffdld psksfplrtk trevcqklak
 901 lveanvklin kipwsrgmfv gkpakdepls iygktmikgl kahglsdydi awshvvptsg
 961 amvpnqaqvf aqavdyylsp agmhyipeih mvalqpstpe tdalllgyam egirlagtfg
1021 syreaavddv vkedngrqvp vkagdrvfvs fvdaardpkh fpdpevvnpr rpakkyihyg
1081 vgphaclgrd asqiaitemf rclfrrrnvr rvpgpqgelk kvprpggfyv ymredwgglf
1141 pfpvtmrvmw dde
```

*Fusarium oxysporum* (SEQ ID NO:7)

```
  1 MKGSATLAFA LVQFSAASQL VWPSKWDEVE DLLYMQGGFN KRGFADALRT CEFGSNVPGT
 61 QNTAEWLRTA FHDAITHDAK AGTGGLDASI YWESSRPENP GKAFNNTFGF FSGFHNPRAT
121 ASDLTALGTV LAVGACNGPR IPFRAGRIDA YKAGPAGVPE PSTNLKDTFA AFTKAGFTKE
181 EMTAMVACGH AIGGVHSVDF PEIVGIKADP NNDTNVPFQK DVSSFHNGIV TEYLAGTSKN
241 PLVASKNATF HSDKRIFDND KATMKKLSTK AGFNSMCADI LTRMIDTVPK SVQLTPVLEA
301 YDVRPYITEL SLNNKNKIHF TGSVRVRITN NIRDNNDLAI NLIYVGRDGK KVTVPTQQVT
361 FQGGTSFGAG EVFANFEFDT TMDAKNGITK FFIQEVKPST KATVTHDNQK TGGYKVDDTV
421 LYQLQQSCAV LEKLPNAPLV VTAMVRDARA KDALTLRVAH KKPVKGSIVP RFQTAITNFK
481 ATGKKSSGYT GFQAKTMFEE QSTYFDIVLG GSPASGVQFL TSQAMPSQCS
```

*Fusarium graminearum* (SEQ ID NO:8)

```
  1 masatrqfar aatratrngf aiaprqvirq qgrryyssep aqksssawiw ltgaavagga
 61 gyyfygnsas satakvfnps kedyqkvyne iaarleekdd yddgsygpvl vrlawhasgt
121 ydketgtggs ngatmrfape sdhganagla aardflqpvk ekfpwitysd lwilagvcai
181 qemlgpaipy rpgrsdrdvs gctpdgrlpd askrqdhlrg ifgrmgfndq eivalsgaha
241 lgrchtdrsg ysgpwtfspt vltndyfril veekwqwkkw ngpaqyedks tkslmmlpsd
301 ialiedkkfk pwvekyakdn daffkdfsnv vlrlfelgvp faqgtenqrw tfkpthqe
```

SEQ ID NO: 9 *Chlamydomonas eugametos*

MSLFAKLGGREAVEAAVDKFYNKIVADPTVSTYFSNTDMKVQRSKQFAFLAYALGGASE
WKGKDMRTAHKDLVPHLSDVHFQAVARHLSDTLTELGVPPEDITDAMVVASTRTEVLN
MPQQ

SEQ ID NO:10 *Tetrahymena pyriformis*

MNKPQTIYEKLGGENAMKAAVPLFYKKVLADERVKHFFKNTDMDHQTKQQTDFLTMLLG
GPNHYKGKNMTEAHKGMNLQNLHFDAIIENLAATLKELGVTDAVINEAAKVIEHTRKDM
LGK

Cont. FIG 1

SEQ ID NO:11 *Paramecium caudatum*

MSLFEQLGGQAAVQAVTAQFYANIQADATVATFFNGIDMPNQTNKTAAFLCAALGGPNA
WTGRNLKEVHANMGVSNAQFTTVIGHLRSALTGAGVAAALVEQTVAVAETVRGDVVTV

SEQ ID NO:12 *Aspergillus niger*

MPLTPEQIKIIKATVPVLQEYGTKITTAFYMNMSTVHPELNAVFNTANQVKGHQARALA
GALFAYASHIDDLGALGPAVELICNKHASLYIQADEYKIVGKYLLEAMKEVLGDACTDD
ILDAWGAAYWALADIMINREAALYKQSQG

SEQ ID NO:13 *Zea mays*

MALAEADDGAVVFGEEQEALVLKSWAVMKKDAANLGLRFFLKVFEIAPSAEQMFSFLRD
SDVPLEKNPKLKTHAMSVFVMTCEAAAQLRKAGKVTVRETTLKRLGATHLRYGVADGHF
EVTGFALLETIKEALPADMWSLEMKKAWAEAYSQLVAAIKREMKPDA

SEQ ID NO:14 *Oryza sativa subsp. japonica*

*MALVEGNNGVSGGAVSFSEEQEALVLKSWAIMKKDSANIGLRFFLKIFEVAPSASQMFS*
*FLRNSDVPLEKNPKLKTHAMSVFVMTCEAAAQLRKAGKVTVRDTTLKRLGATHFKYGVG*
*DAHFEVTRFALLETIKEAVPVDMWSPAMKSAWSEAYNQLVAAIKQEMKPAE*

SEQ ID NO:15 *Arabidopsis thaliana*

MESEGKIVFTEEQEALVVKSWSVMKKNSAELGLKLFIKIFEIAPTTKKMFSFLRDSPIP
AEQNPKLKPHAMSVFVMCCESAVQLRKTGKVTVRETTLKRLGASHSKYGVVDEHFEVAK
YALLETIKEAVPEMWSPEMKVAWGQAYDHLVAAIKAEMNLSN

Cont. FIG. 1

SEQ ID NO:16 *Pisum sativum*

MGFTDKQEALVNSSWESFKQNLSGNSILFYTIILEKAPAAKGLFSFLKDTAGVEDSPKL
QAHAEQVFGLVRDSAAQLRTKGEVVLGNATLGAIHVQRGVTDPHFVVVKEALLQTIKKA
SGNNWSEELNTAWEVAYDGLATAIKKAMT

SEQ ID NO:17 *Vigna unguiculata*

MVAFSDKQEALVNGAYEAFKANIPKYSVVFYTTILEKAPAAKNLFSFLANGVDATNPKL
TGHAEKLFGLVRDSAAQLRASGGVVADAALGAVHSQKAVNDAQFVVVKEALVKTLKEAV
GDKWSDELGTAVELAYDELAAAIKKAY

SEQ ID NO:18 Bos taurus

MGLSDGEWQLVLNAWGKVEADVAGHGQEVLIRLFTGHPETLEKFDKFKHLKTEAEMKAS
EDLKKHGNTVLTALGGILKKKGHHEAEVKHLAESHANKHKIPVKYLEFISDAIIHVLHA
KHPSDFGADAQAAMSKALELFRNDMAAQYKVLGFHG

SEQ ID NO:19 *Sus scrofa*
MGLSDGEWQLVLNVWGKVEADVAGHGQEVLIRLFKGHPETLEKFDKFKHLKSEDEMKAS
EDLKKHGNTVLTALGGILKKKGHHEAELTPLAQSHATKHKIPVKYLEFISEAIIQVLQS
KH PGDFGADAQGAMSKALELFRNDMAAKYKELGFQG SEQ ID NO: 20 *Equus caballus*

MGLSDGEWQQVLNVWGKVEADIAGHGQEVLIRLFTGHPETLEKFDKFKHLKTEAEMKAS
EDLKKHGTVVLTALGGILKKKGHHEAELKPLAQSHATKHKIPIKYLEFISDAIIHVLHS
KH PGDFGADAQGAMTKALELFRNDIAAKYKELGFQG

SEQ ID NO: 21 Nicotiana benthamiana

MSSFTEEQEALVVKSWDSMKKNAGEWGLKLFLKIFEIAPSAKKLFSFLKDSNVPLEQNA
KLKPHSKSVFVMTCEAAVQLRKAGKVVVRDSTLKKLGATHFKYGVADEHFEVTKFALLE
TIKEAVPEMWSVDMKNAWGEAFDQLVNAIKTEMK

Cont. FIG. 1

SEQ ID NO: 22 Bacillus subtilis

MGQSFNAPYEAIGEELLSQLVDTFYERVASHPLLKPIFPSDLTETARKQKQFLTQYLGG
PPLYTEEHGHPMLRARHLPFPITNERADAWLSCMKDAMDHVGLEGEIREFLFGRLELTA
RHMVNQTEAEDRSS

SEQ ID NO: 23 Corynebacterium glutamicum

MTTSENFYDSVGGEETFSLIVHRFYEQVPNDDILGPMYPPDDFEGAEQRLKMFLSQYWG
GPKDYQEQRGHPRLRMRHVNYPIGVTAAERWLQLMSNALDGVDLTAEQREAIWEHMVRA
ADMLINSNPDPHA

SEQ ID NO: 24 Synechocystis PCC6803

MSTLYEKLGGTTAVDLAVDKFYERVLQDDRIKHFFADVDMAKQRAHQKAFLTYAFGGTD
KYDGRYMREAHKELVENHGLNGEHFDAVAEDLLATLKEMGVPEDLIAEVAAVAGAPAHK
RDVLNQ

SEQ ID NO: 25 Synechococcus sp. PCC 7335

MDVALLEKSFEQISPRAIEFSASFYQNLFHHHPELKPLFAETSQTIQEKKLIFSLAAII
ENLRNPDILQPALKSLGARHAEVGTIKSHYPLVGQALIETFAEYLAADWTEQLATAWVE
AYDVIASTMIEGADNPAAYLEPELTFYEWLDLYGEESPKVRNAIATLTHFHYGEDPQDV
QRDSRG

SEQ ID NO: 26 Nostoc commune

MSTLYDNIGGQPAIEQVVDELHKRIATDSLLAPVFAGTDMVKQRNHLVAFLAQIFEGPK
QYGGRPMDKTHAGLNLQQPHFDAIAKHLGERMAVRGVSAENTKAALDRVTNMKGAILNK

SEQ ID NO: 27 Bacillus megaterium

MREKIHSPYELLGGEHTISKLVDAFYTRVGQHPELAPIFPDNLTETARKQKQFLTQYLG
GPSLYTEEHGHPMLRARHLPFEITPSRAKAWLTCMHEAMDEINLEGPERDELYHRLILT
AQHMINSPEQTDEKGFSH

SEQUENCE LISTING

```
<160> NUMBER OF SEQ ID NOS: 27

<210> SEQ ID NO 1
<211> LENGTH: 161
<212> TYPE: PRT
<213> ORGANISM: Vigna radiata

<400> SEQUENCE: 1

Met Thr Thr Thr Leu Glu Arg Gly Phe Thr Glu Glu Gln Glu Ala Leu
1               5                   10                  15

Val Val Lys Ser Trp Asn Val Met Lys Lys Asn Ser Gly Glu Leu Gly
            20                  25                  30

Leu Lys Phe Phe Leu Lys Ile Phe Glu Ile Ala Pro Ser Ala Gln Lys
        35                  40                  45

Leu Phe Ser Phe Leu Arg Asp Ser Thr Val Pro Leu Glu Gln Asn Pro
    50                  55                  60

Lys Leu Lys Pro His Ala Val Ser Val Phe Val Met Thr Cys Asp Ser
65                  70                  75                  80

Ala Val Gln Leu Arg Lys Ala Gly Lys Val Thr Val Arg Glu Ser Asn
                85                  90                  95

Leu Lys Lys Leu Gly Ala Thr His Phe Arg Thr Gly Val Ala Asn Glu
            100                 105                 110

His Phe Glu Val Thr Lys Phe Ala Leu Leu Glu Thr Ile Lys Glu Ala
        115                 120                 125

Val Pro Glu Met Trp Ser Pro Ala Met Lys Asn Ala Trp Gly Glu Ala
    130                 135                 140

Tyr Asp Gln Leu Val Asp Ala Ile Lys Tyr Glu Met Lys Pro Pro Ser
145                 150                 155                 160

Ser

<210> SEQ ID NO 2
```

```
<211> LENGTH: 133
<212> TYPE: PRT
<213> ORGANISM: Methylacidiphilum infernorum

<400> SEQUENCE: 2
```

| | | | | | | | | | | | | | | | |
|---|---|---|---|---|---|---|---|---|---|---|---|---|---|---|---|
| Met | Ile | Asp | Gln | Lys | Glu | Lys | Glu | Leu | Ile | Lys | Glu | Ser | Trp | Lys | Arg |
| 1 | | | | 5 | | | | | 10 | | | | | 15 | |
| Ile | Glu | Pro | Asn | Lys | Asn | Glu | Ile | Gly | Leu | Leu | Phe | Tyr | Ala | Asn | Leu |
| | | | 20 | | | | | 25 | | | | | 30 | | |
| Phe | Lys | Glu | Glu | Pro | Thr | Val | Ser | Val | Leu | Phe | Gln | Asn | Pro | Ile | Ser |
| | | | 35 | | | | 40 | | | | | 45 | | | |
| Ser | Gln | Ser | Arg | Lys | Leu | Met | Gln | Val | Leu | Gly | Ile | Leu | Val | Gln | Gly |
| | 50 | | | | | 55 | | | | | 60 | | | | |
| Ile | Asp | Asn | Leu | Glu | Gly | Leu | Ile | Pro | Thr | Leu | Gln | Asp | Leu | Gly | Arg |
| 65 | | | | | 70 | | | | | 75 | | | | | 80 |
| Arg | His | Lys | Gln | Tyr | Gly | Val | Val | Asp | Ser | His | Tyr | Pro | Leu | Val | Gly |
| | | | | 85 | | | | | 90 | | | | | 95 | |
| Asp | Cys | Leu | Leu | Lys | Ser | Ile | Gln | Glu | Tyr | Leu | Gly | Gln | Gly | Phe | Thr |
| | | | 100 | | | | | 105 | | | | | 110 | | |
| Glu | Glu | Ala | Lys | Ala | Ala | Trp | Thr | Lys | Val | Tyr | Gly | Ile | Ala | Ala | Gln |
| | | | 115 | | | | 120 | | | | | 125 | | | |
| Val | Met | Thr | Ala | Glu | | | | | | | | | | | |
| | 130 | | | | | | | | | | | | | | |

```
<210> SEQ ID NO 3
<211> LENGTH: 139
<212> TYPE: PRT
<213> ORGANISM: Aquifex aeolicus

<400> SEQUENCE: 3
```

| | | | | | | | | | | | | | | | |
|---|---|---|---|---|---|---|---|---|---|---|---|---|---|---|---|
| Met | Leu | Ser | Glu | Glu | Thr | Ile | Arg | Val | Ile | Lys | Ser | Thr | Val | Pro | Leu |
| 1 | | | | 5 | | | | | 10 | | | | | 15 | |
| Leu | Lys | Glu | His | Gly | Thr | Glu | Ile | Thr | Ala | Arg | Met | Tyr | Glu | Leu | Leu |
| | | | 20 | | | | | 25 | | | | | 30 | | |
| Phe | Ser | Lys | Tyr | Pro | Lys | Thr | Lys | Glu | Leu | Phe | Ala | Gly | Ala | Ser | Glu |
| | | | 35 | | | | 40 | | | | | 45 | | | |
| Glu | Gln | Pro | Lys | Lys | Leu | Ala | Asn | Ala | Ile | Ile | Ala | Tyr | Ala | Thr | Tyr |
| | 50 | | | | | 55 | | | | | 60 | | | | |
| Ile | Asp | Arg | Leu | Glu | Glu | Leu | Asp | Asn | Ala | Ile | Ser | Thr | Ile | Ala | Arg |
| 65 | | | | | 70 | | | | | 75 | | | | | 80 |
| Ser | His | Val | Arg | Arg | Asn | Val | Lys | Pro | Glu | His | Tyr | Pro | Leu | Val | Lys |
| | | | | 85 | | | | | 90 | | | | | 95 | |
| Glu | Cys | Leu | Leu | Gln | Ala | Ile | Glu | Glu | Val | Leu | Asn | Pro | Gly | Glu | Glu |
| | | | 100 | | | | | 105 | | | | | 110 | | |
| Val | Leu | Lys | Ala | Trp | Glu | Glu | Ala | Tyr | Asp | Phe | Leu | Ala | Lys | Thr | Leu |
| | | | 115 | | | | 120 | | | | | 125 | | | |
| Ile | Thr | Leu | Glu | Lys | Lys | Leu | Tyr | Ser | Gln | Pro | | | | | |
| | 130 | | | | | 135 | | | | | | | | | |

```
<210> SEQ ID NO 4
<211> LENGTH: 145
<212> TYPE: PRT
<213> ORGANISM: Glycine max

<400> SEQUENCE: 4
```

| | | | | | | | | | | | | | | | |
|---|---|---|---|---|---|---|---|---|---|---|---|---|---|---|---|
| Met | Gly | Ala | Phe | Thr | Glu | Lys | Gln | Glu | Ala | Leu | Val | Ser | Ser | Ser | Phe |
| 1 | | | | 5 | | | | | 10 | | | | | 15 | |

-continued

Glu Ala Phe Lys Ala Asn Ile Pro Gln Tyr Ser Val Val Phe Tyr Thr
            20                  25                  30

Ser Ile Leu Glu Lys Ala Pro Ala Lys Asp Leu Phe Ser Phe Leu
        35                  40                  45

Ser Asn Gly Val Asp Pro Ser Asn Pro Lys Leu Thr Gly His Ala Glu
50                      55                  60

Lys Leu Phe Gly Leu Val Arg Asp Ser Ala Gly Gln Leu Lys Ala Asn
65                      70                  75                  80

Gly Thr Val Val Ala Asp Ala Ala Leu Gly Ser Ile His Ala Gln Lys
                    85                  90                  95

Ala Ile Thr Asp Pro Gln Phe Val Val Lys Glu Ala Leu Leu Lys
                100                 105                 110

Thr Ile Lys Glu Ala Val Gly Asp Lys Trp Ser Asp Glu Leu Ser Ser
            115                 120                 125

Ala Trp Glu Val Ala Tyr Asp Glu Leu Ala Ala Ile Lys Lys Ala
        130                 135                 140

Phe
145

<210> SEQ ID NO 5
<211> LENGTH: 162
<212> TYPE: PRT
<213> ORGANISM: Hordeum vulgare

<400> SEQUENCE: 5

Met Ser Ala Ala Glu Gly Ala Val Val Phe Ser Glu Glu Lys Glu Ala
1               5                   10                  15

Leu Val Leu Lys Ser Trp Ala Ile Met Lys Lys Asp Ser Ala Asn Leu
            20                  25                  30

Gly Leu Arg Phe Phe Leu Lys Ile Phe Glu Ile Ala Pro Ser Ala Arg
        35                  40                  45

Gln Met Phe Pro Phe Leu Arg Asp Ser Asp Val Pro Leu Glu Thr Asn
    50                  55                  60

Pro Lys Leu Lys Thr His Ala Val Ser Val Phe Val Met Thr Cys Glu
65                  70                  75                  80

Ala Ala Ala Gln Leu Arg Lys Ala Gly Lys Ile Thr Val Arg Glu Thr
                85                  90                  95

Thr Leu Lys Arg Leu Gly Gly Thr His Leu Lys Tyr Gly Val Ala Asp
            100                 105                 110

Gly His Phe Glu Val Thr Arg Phe Ala Leu Leu Glu Thr Ile Lys Glu
        115                 120                 125

Ala Leu Pro Ala Asp Met Trp Gly Pro Glu Met Arg Asn Ala Trp Gly
    130                 135                 140

Glu Ala Tyr Asp Gln Leu Val Ala Ala Ile Lys Gln Glu Met Lys Pro
145                 150                 155                 160

Ala Glu

<210> SEQ ID NO 6
<211> LENGTH: 1153
<212> TYPE: PRT
<213> ORGANISM: Magnaporthe oryza

<400> SEQUENCE: 6

Met Asp Gly Ala Val Arg Leu Asp Trp Thr Gly Leu Asp Leu Thr Gly
1               5                   10                  15

His Glu Ile His Asp Gly Val Pro Ile Ala Ser Arg Val Gln Val Met

```
                    20                  25                  30
Val Ser Phe Pro Leu Phe Lys Asp Gln His Ile Ile Met Ser Ser Lys
                35                  40                  45
Glu Ser Pro Ser Arg Lys Ser Ser Thr Ile Gly Gln Ser Thr Arg Asn
            50                  55                  60
Gly Ser Cys Gln Ala Asp Thr Gln Lys Gly Gln Leu Pro Pro Val Gly
65                  70                  75                  80
Glu Lys Pro Lys Pro Val Lys Glu Asn Pro Met Lys Lys Leu Lys Glu
                85                  90                  95
Met Ser Gln Arg Pro Leu Pro Thr Gln His Gly Asp Gly Thr Tyr Pro
                100                 105                 110
Thr Glu Lys Lys Leu Thr Gly Ile Gly Glu Asp Leu Lys His Ile Arg
                115                 120                 125
Gly Tyr Asp Val Lys Thr Leu Leu Ala Met Val Lys Ser Lys Leu Lys
                130                 135                 140
Gly Glu Lys Leu Lys Asp Asp Lys Thr Met Leu Met Glu Arg Val Met
145                 150                 155                 160
Gln Leu Val Ala Arg Leu Pro Thr Glu Ser Lys Lys Arg Ala Glu Leu
                165                 170                 175
Thr Asp Ser Leu Ile Asn Glu Leu Trp Glu Ser Leu Asp His Pro Pro
                180                 185                 190
Leu Asn Tyr Leu Gly Pro Glu His Ser Tyr Arg Thr Pro Asp Gly Ser
                195                 200                 205
Tyr Asn His Pro Phe Asn Pro Gln Leu Gly Ala Ala Gly Ser Arg Tyr
                210                 215                 220
Ala Arg Ser Val Ile Pro Thr Val Thr Pro Gly Ala Leu Pro Asp
225                 230                 235                 240
Pro Gly Leu Ile Phe Asp Ser Ile Met Gly Arg Thr Pro Asn Ser Tyr
                245                 250                 255
Arg Lys His Pro Asn Asn Val Ser Ser Ile Leu Trp Tyr Trp Ala Thr
                260                 265                 270
Ile Ile Ile His Asp Ile Phe Trp Thr Asp Pro Arg Asp Ile Asn Thr
                275                 280                 285
Asn Lys Ser Ser Ser Tyr Leu Asp Leu Ala Pro Leu Tyr Gly Asn Ser
                290                 295                 300
Gln Glu Met Gln Asp Ser Ile Arg Thr Phe Lys Asp Gly Arg Met Lys
305                 310                 315                 320
Pro Asp Cys Tyr Ala Asp Lys Arg Leu Ala Gly Met Pro Pro Gly Val
                325                 330                 335
Ser Val Leu Leu Ile Met Phe Asn Arg Phe His Asn His Val Ala Glu
                340                 345                 350
Asn Leu Ala Leu Ile Asn Glu Gly Gly Arg Phe Asn Lys Pro Ser Asp
                355                 360                 365
Leu Leu Glu Gly Glu Ala Arg Glu Ala Ala Trp Lys Lys Tyr Asp Asn
                370                 375                 380
Asp Leu Phe Gln Val Ala Arg Leu Val Thr Ser Gly Leu Tyr Ile Asn
385                 390                 395                 400
Ile Thr Leu Val Asp Tyr Val Arg Asn Ile Val Asn Leu Asn Arg Val
                405                 410                 415
Asp Thr Thr Trp Thr Leu Asp Pro Arg Gln Asp Ala Gly Ala His Val
                420                 425                 430
Gly Thr Ala Asp Gly Ala Glu Arg Gly Thr Gly Asn Ala Val Ser Ala
                435                 440                 445
```

-continued

Glu Phe Asn Leu Cys Tyr Arg Trp His Ser Cys Ile Ser Glu Lys Asp
    450                 455                 460

Ser Lys Phe Val Glu Ala Gln Phe Gln Asn Ile Phe Gly Lys Pro Ala
465                 470                 475                 480

Ser Glu Val Arg Pro Asp Glu Met Trp Lys Gly Phe Ala Lys Met Glu
                485                 490                 495

Gln Asn Thr Pro Ala Asp Pro Gly Gln Arg Thr Phe Gly Gly Phe Lys
                500                 505                 510

Arg Gly Pro Asp Gly Lys Phe Asp Asp Asp Leu Val Arg Cys Ile
                515                 520                 525

Ser Glu Ala Val Glu Asp Val Ala Gly Ala Phe Gly Ala Arg Asn Val
    530                 535                 540

Pro Gln Ala Met Lys Val Val Glu Thr Met Gly Ile Ile Gln Gly Arg
545                 550                 555                 560

Lys Trp Asn Val Ala Gly Leu Asn Glu Phe Arg Lys His Phe His Leu
                565                 570                 575

Lys Pro Tyr Ser Thr Phe Glu Asp Ile Asn Ser Asp Pro Gly Val Ala
                580                 585                 590

Glu Ala Leu Arg Arg Leu Tyr Asp His Pro Asp Asn Val Glu Leu Tyr
    595                 600                 605

Pro Gly Leu Val Ala Glu Asp Lys Gln Pro Met Val Pro Gly Val
                610                 615                 620

Gly Ile Ala Pro Thr Tyr Thr Ile Ser Arg Val Val Leu Ser Asp Ala
625                 630                 635                 640

Val Cys Leu Val Arg Gly Asp Arg Phe Tyr Thr Thr Asp Phe Thr Pro
                645                 650                 655

Arg Asn Leu Thr Asn Trp Gly Tyr Lys Glu Val Asp Tyr Asp Leu Ser
                660                 665                 670

Val Asn His Gly Cys Val Phe Tyr Lys Leu Phe Ile Arg Ala Phe Pro
                675                 680                 685

Asn His Phe Lys Gln Asn Ser Val Tyr Ala His Tyr Pro Met Val Val
    690                 695                 700

Pro Ser Glu Asn Lys Arg Ile Leu Glu Ala Leu Gly Arg Ala Asp Leu
705                 710                 715                 720

Phe Asp Phe Glu Ala Pro Lys Tyr Ile Pro Pro Arg Val Asn Ile Thr
                725                 730                 735

Ser Tyr Gly Gly Ala Glu Tyr Ile Leu Glu Thr Gln Glu Lys Tyr Lys
                740                 745                 750

Val Thr Trp His Glu Gly Leu Gly Phe Leu Met Gly Glu Gly Leu
                755                 760                 765

Lys Phe Met Leu Ser Gly Asp Asp Pro Leu His Ala Gln Gln Arg Lys
    770                 775                 780

Cys Met Ala Ala Gln Leu Tyr Lys Asp Gly Trp Thr Glu Ala Val Lys
785                 790                 795                 800

Ala Phe Tyr Ala Gly Met Met Glu Glu Leu Leu Val Ser Lys Ser Tyr
                805                 810                 815

Phe Leu Gly Asn Asn Lys His Arg His Val Asp Ile Ile Arg Asp Val
                820                 825                 830

Gly Asn Met Val His Val His Phe Ala Ser Gln Val Phe Gly Leu Pro
    835                 840                 845

Leu Lys Thr Ala Lys Asn Pro Thr Gly Val Phe Thr Glu Gln Glu Met
    850                 855                 860

Tyr Gly Ile Leu Ala Ala Ile Phe Thr Thr Ile Phe Phe Asp Leu Asp
865                 870                 875                 880

Pro Ser Lys Ser Phe Pro Leu Arg Thr Lys Thr Arg Glu Val Cys Gln
            885                 890                 895

Lys Leu Ala Lys Leu Val Glu Ala Asn Val Lys Leu Ile Asn Lys Ile
            900                 905                 910

Pro Trp Ser Arg Gly Met Phe Val Gly Lys Pro Ala Lys Asp Glu Pro
            915                 920                 925

Leu Ser Ile Tyr Gly Lys Thr Met Ile Lys Gly Leu Lys Ala His Gly
            930                 935                 940

Leu Ser Asp Tyr Asp Ile Ala Trp Ser His Val Val Pro Thr Ser Gly
945                 950                 955                 960

Ala Met Val Pro Asn Gln Ala Gln Val Phe Ala Gln Ala Val Asp Tyr
            965                 970                 975

Tyr Leu Ser Pro Ala Gly Met His Tyr Ile Pro Glu Ile His Met Val
            980                 985                 990

Ala Leu Gln Pro Ser Thr Pro Glu Thr Asp Ala Leu Leu Leu Gly Tyr
            995                 1000                1005

Ala Met Glu Gly Ile Arg Leu Ala Gly Thr Phe Gly Ser Tyr Arg Glu
    1010                1015                1020

Ala Ala Val Asp Asp Val Val Lys Glu Asp Asn Gly Arg Gln Val Pro
1025                1030                1035                1040

Val Lys Ala Gly Asp Arg Val Phe Val Ser Phe Val Asp Ala Ala Arg
            1045                1050                1055

Asp Pro Lys His Phe Pro Asp Pro Glu Val Val Asn Pro Arg Arg Pro
            1060                1065                1070

Ala Lys Lys Tyr Ile His Tyr Gly Val Gly Pro His Ala Cys Leu Gly
            1075                1080                1085

Arg Asp Ala Ser Gln Ile Ala Ile Thr Glu Met Phe Arg Cys Leu Phe
            1090                1095                1100

Arg Arg Arg Asn Val Arg Arg Val Pro Gly Pro Gln Gly Glu Leu Lys
1105                1110                1115                1120

Lys Val Pro Arg Pro Gly Gly Phe Tyr Val Tyr Met Arg Glu Asp Trp
            1125                1130                1135

Gly Gly Leu Phe Pro Phe Pro Val Thr Met Arg Val Met Trp Asp Asp
            1140                1145                1150

Glu

<210> SEQ ID NO 7
<211> LENGTH: 530
<212> TYPE: PRT
<213> ORGANISM: Fusarium oxysporum

<400> SEQUENCE: 7

Met Lys Gly Ser Ala Thr Leu Ala Phe Ala Leu Val Gln Phe Ser Ala
1               5                   10                  15

Ala Ser Gln Leu Val Trp Pro Ser Lys Trp Asp Glu Val Glu Asp Leu
            20                  25                  30

Leu Tyr Met Gln Gly Gly Phe Asn Lys Arg Gly Phe Ala Asp Ala Leu
            35                  40                  45

Arg Thr Cys Glu Phe Gly Ser Asn Val Pro Gly Thr Gln Asn Thr Ala
        50                  55                  60

Glu Trp Leu Arg Thr Ala Phe His Asp Ala Ile Thr His Asp Ala Lys
65                  70                  75                  80

-continued

```
Ala Gly Thr Gly Gly Leu Asp Ala Ser Ile Tyr Trp Glu Ser Ser Arg
            85                  90                  95
Pro Glu Asn Pro Gly Lys Ala Phe Asn Asn Thr Phe Gly Phe Phe Ser
        100                 105                 110
Gly Phe His Asn Pro Arg Ala Thr Ala Ser Asp Leu Thr Ala Leu Gly
        115                 120                 125
Thr Val Leu Ala Val Gly Ala Cys Asn Gly Pro Arg Ile Pro Phe Arg
    130                 135                 140
Ala Gly Arg Ile Asp Ala Tyr Lys Ala Gly Pro Ala Gly Val Pro Glu
145                 150                 155                 160
Pro Ser Thr Asn Leu Lys Asp Thr Phe Ala Ala Phe Thr Lys Ala Gly
                165                 170                 175
Phe Thr Lys Glu Glu Met Thr Ala Met Val Ala Cys Gly His Ala Ile
            180                 185                 190
Gly Gly Val His Ser Val Asp Phe Pro Glu Ile Val Gly Ile Lys Ala
        195                 200                 205
Asp Pro Asn Asn Asp Thr Asn Val Pro Phe Gln Lys Asp Val Ser Ser
    210                 215                 220
Phe His Asn Gly Ile Val Thr Glu Tyr Leu Ala Gly Thr Ser Lys Asn
225                 230                 235                 240
Pro Leu Val Ala Ser Lys Asn Ala Thr Phe His Ser Asp Lys Arg Ile
                245                 250                 255
Phe Asp Asn Asp Lys Ala Thr Met Lys Lys Leu Ser Thr Lys Ala Gly
            260                 265                 270
Phe Asn Ser Met Cys Ala Asp Ile Leu Thr Arg Met Ile Asp Thr Val
        275                 280                 285
Pro Lys Ser Val Gln Leu Thr Pro Val Leu Glu Ala Tyr Asp Val Arg
    290                 295                 300
Pro Tyr Ile Thr Glu Leu Ser Leu Asn Asn Lys Asn Lys Ile His Phe
305                 310                 315                 320
Thr Gly Ser Val Arg Val Arg Ile Thr Asn Asn Ile Arg Asp Asn Asn
                325                 330                 335
Asp Leu Ala Ile Asn Leu Ile Tyr Val Gly Arg Asp Gly Lys Lys Val
            340                 345                 350
Thr Val Pro Thr Gln Gln Val Thr Phe Gln Gly Gly Thr Ser Phe Gly
        355                 360                 365
Ala Gly Glu Val Phe Ala Asn Phe Glu Phe Asp Thr Thr Met Asp Ala
    370                 375                 380
Lys Asn Gly Ile Thr Lys Phe Phe Ile Gln Glu Val Lys Pro Ser Thr
385                 390                 395                 400
Lys Ala Thr Val Thr His Asp Asn Gln Lys Thr Gly Gly Tyr Lys Val
                405                 410                 415
Asp Asp Thr Val Leu Tyr Gln Leu Gln Gln Ser Cys Ala Val Leu Glu
            420                 425                 430
Lys Leu Pro Asn Ala Pro Leu Val Val Thr Ala Met Val Arg Asp Ala
        435                 440                 445
Arg Ala Lys Asp Ala Leu Thr Leu Arg Val Ala His Lys Lys Pro Val
    450                 455                 460
Lys Gly Ser Ile Val Pro Arg Phe Gln Thr Ala Ile Thr Asn Phe Lys
465                 470                 475                 480
Ala Thr Gly Lys Lys Ser Ser Gly Tyr Thr Gly Phe Gln Ala Lys Thr
                485                 490                 495
Met Phe Glu Glu Gln Ser Thr Tyr Phe Asp Ile Val Leu Gly Gly Ser
```

```
                          500                 505                 510
Pro Ala Ser Gly Val Gln Phe Leu Thr Ser Gln Ala Met Pro Ser Gln
            515                 520                 525
Cys Ser
    530

<210> SEQ ID NO 8
<211> LENGTH: 358
<212> TYPE: PRT
<213> ORGANISM: Fusarium graminearum

<400> SEQUENCE: 8

Met Ala Ser Ala Thr Arg Gln Phe Ala Arg Ala Ala Thr Arg Ala Thr
1               5                   10                  15
Arg Asn Gly Phe Ala Ile Ala Pro Arg Gln Val Ile Arg Gln Gln Gly
            20                  25                  30
Arg Arg Tyr Tyr Ser Ser Glu Pro Ala Gln Lys Ser Ser Ser Ala Trp
        35                  40                  45
Ile Trp Leu Thr Gly Ala Ala Val Ala Gly Gly Ala Gly Tyr Tyr Phe
    50                  55                  60
Tyr Gly Asn Ser Ala Ser Ser Ala Thr Ala Lys Val Phe Asn Pro Ser
65                  70                  75                  80
Lys Glu Asp Tyr Gln Lys Val Tyr Asn Glu Ile Ala Ala Arg Leu Glu
                85                  90                  95
Glu Lys Asp Asp Tyr Asp Asp Gly Ser Tyr Gly Pro Val Leu Val Arg
            100                 105                 110
Leu Ala Trp His Ala Ser Gly Thr Tyr Asp Lys Glu Thr Gly Thr Gly
        115                 120                 125
Gly Ser Asn Gly Ala Thr Met Arg Phe Ala Pro Glu Ser Asp His Gly
    130                 135                 140
Ala Asn Ala Gly Leu Ala Ala Ala Arg Asp Phe Leu Gln Pro Val Lys
145                 150                 155                 160
Glu Lys Phe Pro Trp Ile Thr Tyr Ser Asp Leu Trp Ile Leu Ala Gly
                165                 170                 175
Val Cys Ala Ile Gln Glu Met Leu Gly Pro Ala Ile Pro Tyr Arg Pro
            180                 185                 190
Gly Arg Ser Asp Arg Asp Val Ser Gly Cys Thr Pro Asp Gly Arg Leu
        195                 200                 205
Pro Asp Ala Ser Lys Arg Gln Asp His Leu Arg Gly Ile Phe Gly Arg
    210                 215                 220
Met Gly Phe Asn Asp Gln Glu Ile Val Ala Leu Ser Gly Ala His Ala
225                 230                 235                 240
Leu Gly Arg Cys His Thr Asp Arg Ser Gly Tyr Ser Gly Pro Trp Thr
                245                 250                 255
Phe Ser Pro Thr Val Leu Thr Asn Asp Tyr Phe Arg Leu Leu Val Glu
            260                 265                 270
Glu Lys Trp Gln Trp Lys Lys Trp Asn Gly Pro Ala Gln Tyr Glu Asp
        275                 280                 285
Lys Ser Thr Lys Ser Leu Met Met Leu Pro Ser Asp Ile Ala Leu Ile
    290                 295                 300
Glu Asp Lys Lys Phe Lys Pro Trp Val Glu Lys Tyr Ala Lys Asp Asn
305                 310                 315                 320
Asp Ala Phe Phe Lys Asp Phe Ser Asn Val Val Leu Arg Leu Phe Glu
                325                 330                 335
```

```
Leu Gly Val Pro Phe Ala Gln Gly Thr Glu Asn Gln Arg Trp Thr Phe
            340                 345                 350

Lys Pro Thr His Gln Glu
        355

<210> SEQ ID NO 9
<211> LENGTH: 122
<212> TYPE: PRT
<213> ORGANISM: Chlamydomonas eugametos

<400> SEQUENCE: 9

Met Ser Leu Phe Ala Lys Leu Gly Gly Arg Glu Ala Val Glu Ala Ala
1                5                  10                  15

Val Asp Lys Phe Tyr Asn Lys Ile Val Ala Asp Pro Thr Val Ser Thr
                20                  25                  30

Tyr Phe Ser Asn Thr Asp Met Lys Val Gln Arg Ser Lys Gln Phe Ala
            35                  40                  45

Phe Leu Ala Tyr Ala Leu Gly Gly Ala Ser Glu Trp Lys Gly Lys Asp
        50                  55                  60

Met Arg Thr Ala His Lys Asp Leu Val Pro His Leu Ser Asp Val His
65                  70                  75                  80

Phe Gln Ala Val Ala Arg His Leu Ser Asp Thr Leu Thr Glu Leu Gly
                85                  90                  95

Val Pro Pro Glu Asp Ile Thr Ala Met Ala Val Val Ala Ser Thr
            100                 105                 110

Arg Thr Glu Val Leu Asn Met Pro Gln Gln
        115                 120

<210> SEQ ID NO 10
<211> LENGTH: 121
<212> TYPE: PRT
<213> ORGANISM: Tetrahymena pyriformis

<400> SEQUENCE: 10

Met Asn Lys Pro Gln Thr Ile Tyr Glu Lys Leu Gly Gly Glu Asn Ala
1                5                  10                  15

Met Lys Ala Ala Val Pro Leu Phe Tyr Lys Lys Val Leu Ala Asp Glu
                20                  25                  30

Arg Val Lys His Phe Phe Lys Asn Thr Asp Met Asp His Gln Thr Lys
            35                  40                  45

Gln Gln Thr Asp Phe Leu Thr Met Leu Leu Gly Gly Pro Asn His Tyr
        50                  55                  60

Lys Gly Lys Asn Met Thr Glu Ala His Lys Gly Met Asn Leu Gln Asn
65                  70                  75                  80

Leu His Phe Asp Ala Ile Ile Glu Asn Leu Ala Ala Thr Leu Lys Glu
                85                  90                  95

Leu Gly Val Thr Asp Ala Val Ile Asn Glu Ala Ala Lys Val Ile Glu
            100                 105                 110

His Thr Arg Lys Asp Met Leu Gly Lys
        115                 120

<210> SEQ ID NO 11
<211> LENGTH: 117
<212> TYPE: PRT
<213> ORGANISM: Paramecium caudatum

<400> SEQUENCE: 11

Met Ser Leu Phe Glu Gln Leu Gly Gly Gln Ala Ala Val Gln Ala Val
```

```
1               5                   10                  15
Thr Ala Gln Phe Tyr Ala Asn Ile Gln Ala Asp Ala Thr Val Ala Thr
                20                  25                  30

Phe Phe Asn Gly Ile Asp Met Pro Asn Gln Thr Asn Lys Thr Ala Ala
                35                  40                  45

Phe Leu Cys Ala Ala Leu Gly Gly Pro Asn Ala Trp Thr Gly Arg Asn
    50                  55                  60

Leu Lys Glu Val His Ala Asn Met Gly Val Ser Asn Ala Gln Phe Thr
65                  70                  75                  80

Thr Val Ile Gly His Leu Arg Ser Ala Leu Thr Gly Ala Gly Val Ala
                85                  90                  95

Ala Ala Leu Val Glu Gln Thr Val Ala Val Ala Glu Thr Val Arg Gly
                100                 105                 110

Asp Val Val Thr Val
                115

<210> SEQ ID NO 12
<211> LENGTH: 147
<212> TYPE: PRT
<213> ORGANISM: Aspergillus niger

<400> SEQUENCE: 12

Met Pro Leu Thr Pro Glu Gln Ile Lys Ile Lys Ala Thr Val Pro
1               5                   10                  15

Val Leu Gln Glu Tyr Gly Thr Lys Ile Thr Thr Ala Phe Tyr Met Asn
                20                  25                  30

Met Ser Thr Val His Pro Glu Leu Asn Ala Val Phe Asn Thr Ala Asn
                35                  40                  45

Gln Val Lys Gly His Gln Ala Arg Ala Leu Ala Gly Ala Leu Phe Ala
    50                  55                  60

Tyr Ala Ser His Ile Asp Asp Leu Gly Ala Leu Gly Pro Ala Val Glu
65                  70                  75                  80

Leu Ile Cys Asn Lys His Ala Ser Leu Tyr Ile Gln Ala Asp Glu Tyr
                85                  90                  95

Lys Ile Val Gly Lys Tyr Leu Leu Glu Ala Met Lys Glu Val Leu Gly
                100                 105                 110

Asp Ala Cys Thr Asp Asp Ile Leu Asp Ala Trp Gly Ala Ala Tyr Trp
                115                 120                 125

Ala Leu Ala Asp Ile Met Ile Asn Arg Glu Ala Ala Leu Tyr Lys Gln
    130                 135                 140

Ser Gln Gly
145

<210> SEQ ID NO 13
<211> LENGTH: 165
<212> TYPE: PRT
<213> ORGANISM: Zea mays

<400> SEQUENCE: 13

Met Ala Leu Ala Glu Ala Asp Asp Gly Ala Val Val Phe Gly Glu Glu
1               5                   10                  15

Gln Glu Ala Leu Val Leu Lys Ser Trp Ala Val Met Lys Lys Asp Ala
                20                  25                  30

Ala Asn Leu Gly Leu Arg Phe Phe Leu Lys Val Phe Glu Ile Ala Pro
                35                  40                  45

Ser Ala Glu Gln Met Phe Ser Phe Leu Arg Asp Ser Asp Val Pro Leu
```

```
                    50                  55                  60
Glu Lys Asn Pro Lys Leu Lys Thr His Ala Met Ser Val Phe Val Met
 65                  70                  75                  80

Thr Cys Glu Ala Ala Ala Gln Leu Arg Lys Ala Gly Lys Val Thr Val
                 85                  90                  95

Arg Glu Thr Thr Leu Lys Arg Leu Gly Ala Thr His Leu Arg Tyr Gly
             100                 105                 110

Val Ala Asp Gly His Phe Glu Val Thr Gly Phe Ala Leu Leu Glu Thr
             115                 120                 125

Ile Lys Glu Ala Leu Pro Ala Asp Met Trp Ser Leu Glu Met Lys Lys
130                 135                 140

Ala Trp Ala Glu Ala Tyr Ser Gln Leu Val Ala Ile Lys Arg Glu
145                 150                 155                 160

Met Lys Pro Asp Ala
                165

<210> SEQ ID NO 14
<211> LENGTH: 169
<212> TYPE: PRT
<213> ORGANISM: Oryza sativa subsp. japonica

<400> SEQUENCE: 14

Met Ala Leu Val Glu Gly Asn Asn Gly Val Ser Gly Gly Ala Val Ser
  1               5                  10                  15

Phe Ser Glu Glu Gln Glu Ala Leu Val Leu Lys Ser Trp Ala Ile Met
                 20                  25                  30

Lys Lys Asp Ser Ala Asn Ile Gly Leu Arg Phe Phe Leu Lys Ile Phe
             35                  40                  45

Glu Val Ala Pro Ser Ala Ser Gln Met Phe Ser Phe Leu Arg Asn Ser
 50                  55                  60

Asp Val Pro Leu Glu Lys Asn Pro Lys Leu Lys Thr His Ala Met Ser
 65                  70                  75                  80

Val Phe Val Met Thr Cys Glu Ala Ala Ala Gln Leu Arg Lys Ala Gly
                 85                  90                  95

Lys Val Thr Val Arg Asp Thr Thr Leu Lys Arg Leu Gly Ala Thr His
             100                 105                 110

Phe Lys Tyr Gly Val Gly Asp Ala His Phe Glu Val Thr Arg Phe Ala
             115                 120                 125

Leu Leu Glu Thr Ile Lys Glu Ala Val Pro Val Asp Met Trp Ser Pro
130                 135                 140

Ala Met Lys Ser Ala Trp Ser Glu Ala Tyr Asn Gln Leu Val Ala Ala
145                 150                 155                 160

Ile Lys Gln Glu Met Lys Pro Ala Glu
                165

<210> SEQ ID NO 15
<211> LENGTH: 160
<212> TYPE: PRT
<213> ORGANISM: Arabidopsis thaliana

<400> SEQUENCE: 15

Met Glu Ser Glu Gly Lys Ile Val Phe Thr Glu Glu Gln Glu Ala Leu
  1               5                  10                  15

Val Val Lys Ser Trp Ser Val Met Lys Lys Asn Ser Ala Glu Leu Gly
                 20                  25                  30

Leu Lys Leu Phe Ile Lys Ile Phe Glu Ile Ala Pro Thr Thr Lys Lys
```

```
                35                  40                  45
Met Phe Ser Phe Leu Arg Asp Ser Pro Ile Pro Ala Glu Gln Asn Pro
 50                  55                  60

Lys Leu Lys Pro His Ala Met Ser Val Phe Val Met Cys Cys Glu Ser
 65                  70                  75                  80

Ala Val Gln Leu Arg Lys Thr Gly Lys Val Thr Val Arg Glu Thr Thr
                 85                  90                  95

Leu Lys Arg Leu Gly Ala Ser His Ser Lys Tyr Gly Val Val Asp Glu
                100                 105                 110

His Phe Glu Val Ala Lys Tyr Ala Leu Leu Glu Thr Ile Lys Glu Ala
                115                 120                 125

Val Pro Glu Met Trp Ser Pro Glu Met Lys Val Ala Trp Gly Gln Ala
                130                 135                 140

Tyr Asp His Leu Val Ala Ala Ile Lys Ala Glu Met Asn Leu Ser Asn
145                 150                 155                 160

<210> SEQ ID NO 16
<211> LENGTH: 147
<212> TYPE: PRT
<213> ORGANISM: Pisum sativum

<400> SEQUENCE: 16

Met Gly Phe Thr Asp Lys Gln Glu Ala Leu Val Asn Ser Ser Trp Glu
 1               5                  10                  15

Ser Phe Lys Gln Asn Leu Ser Gly Asn Ser Ile Leu Phe Tyr Thr Ile
                 20                  25                  30

Ile Leu Glu Lys Ala Pro Ala Ala Lys Gly Leu Phe Ser Phe Leu Lys
                 35                  40                  45

Asp Thr Ala Gly Val Glu Asp Ser Pro Lys Leu Gln Ala His Ala Glu
 50                  55                  60

Gln Val Phe Gly Leu Val Arg Asp Ser Ala Ala Gln Leu Arg Thr Lys
 65                  70                  75                  80

Gly Glu Val Val Leu Gly Asn Ala Thr Leu Gly Ala Ile His Val Gln
                 85                  90                  95

Arg Gly Val Thr Asp Pro His Phe Val Val Lys Glu Ala Leu Leu
                100                 105                 110

Gln Thr Ile Lys Lys Ala Ser Gly Asn Asn Trp Ser Glu Glu Leu Asn
                115                 120                 125

Thr Ala Trp Glu Val Ala Tyr Asp Gly Leu Ala Thr Ala Ile Lys Lys
                130                 135                 140

Ala Met Thr
145

<210> SEQ ID NO 17
<211> LENGTH: 145
<212> TYPE: PRT
<213> ORGANISM: Vigna unguiculata

<400> SEQUENCE: 17

Met Val Ala Phe Ser Asp Lys Gln Glu Ala Leu Val Asn Gly Ala Tyr
 1               5                  10                  15

Glu Ala Phe Lys Ala Asn Ile Pro Lys Tyr Ser Val Val Phe Tyr Thr
                 20                  25                  30

Thr Ile Leu Glu Lys Ala Pro Ala Ala Lys Asn Leu Phe Ser Phe Leu
                 35                  40                  45

Ala Asn Gly Val Asp Ala Thr Asn Pro Lys Leu Thr Gly His Ala Glu
```

```
                   50                  55                  60
Lys Leu Phe Gly Leu Val Arg Asp Ser Ala Ala Gln Leu Arg Ala Ser
 65                  70                  75                  80

Gly Gly Val Val Ala Asp Ala Leu Gly Ala Val His Ser Gln Lys
                 85                  90                  95

Ala Val Asn Asp Ala Gln Phe Val Val Lys Glu Ala Leu Val Lys
                100                 105                 110

Thr Leu Lys Glu Ala Val Gly Asp Lys Trp Ser Asp Glu Leu Gly Thr
                115                 120                 125

Ala Val Glu Leu Ala Tyr Asp Glu Leu Ala Ala Ile Lys Lys Ala
                130                 135                 140

Tyr
145

<210> SEQ ID NO 18
<211> LENGTH: 154
<212> TYPE: PRT
<213> ORGANISM: Bos taurus

<400> SEQUENCE: 18

Met Gly Leu Ser Asp Gly Glu Trp Gln Leu Val Leu Asn Ala Trp Gly
  1               5                  10                  15

Lys Val Glu Ala Asp Val Ala Gly His Gly Gln Glu Val Leu Ile Arg
                 20                  25                  30

Leu Phe Thr Gly His Pro Glu Thr Leu Glu Lys Phe Asp Lys Phe Lys
                 35                  40                  45

His Leu Lys Thr Glu Ala Glu Met Lys Ala Ser Glu Asp Leu Lys Lys
             50                  55                  60

His Gly Asn Thr Val Leu Thr Ala Leu Gly Gly Ile Leu Lys Lys Lys
 65                  70                  75                  80

Gly His His Glu Ala Glu Val Lys His Leu Ala Glu Ser His Ala Asn
                 85                  90                  95

Lys His Lys Ile Pro Val Lys Tyr Leu Glu Phe Ile Ser Asp Ala Ile
                100                 105                 110

Ile His Val Leu His Ala Lys His Pro Ser Asp Phe Gly Ala Asp Ala
                115                 120                 125

Gln Ala Ala Met Ser Lys Ala Leu Glu Leu Phe Arg Asn Asp Met Ala
            130                 135                 140

Ala Gln Tyr Lys Val Leu Gly Phe His Gly
145                 150

<210> SEQ ID NO 19
<211> LENGTH: 154
<212> TYPE: PRT
<213> ORGANISM: Sus scrofa

<400> SEQUENCE: 19

Met Gly Leu Ser Asp Gly Glu Trp Gln Leu Val Leu Asn Val Trp Gly
  1               5                  10                  15

Lys Val Glu Ala Asp Val Ala Gly His Gly Gln Glu Val Leu Ile Arg
                 20                  25                  30

Leu Phe Lys Gly His Pro Glu Thr Leu Glu Lys Phe Asp Lys Phe Lys
                 35                  40                  45

His Leu Lys Ser Glu Asp Glu Met Lys Ala Ser Glu Asp Leu Lys Lys
             50                  55                  60

His Gly Asn Thr Val Leu Thr Ala Leu Gly Gly Ile Leu Lys Lys Lys
```

```
                65                  70                  75                  80

Gly His His Glu Ala Glu Leu Thr Pro Leu Ala Gln Ser His Ala Thr
                85                  90                  95

Lys His Lys Ile Pro Val Lys Tyr Leu Glu Phe Ile Ser Glu Ala Ile
                100                 105                 110

Ile Gln Val Leu Gln Ser Lys His Pro Gly Asp Phe Gly Ala Asp Ala
                115                 120                 125

Gln Gly Ala Met Ser Lys Ala Leu Glu Leu Phe Arg Asn Asp Met Ala
        130                 135                 140

Ala Lys Tyr Lys Glu Leu Gly Phe Gln Gly
145                 150

<210> SEQ ID NO 20
<211> LENGTH: 154
<212> TYPE: PRT
<213> ORGANISM: Equus caballus

<400> SEQUENCE: 20

Met Gly Leu Ser Asp Gly Glu Trp Gln Gln Val Leu Asn Val Trp Gly
1               5                   10                  15

Lys Val Glu Ala Asp Ile Ala Gly His Gly Gln Glu Val Leu Ile Arg
                20                  25                  30

Leu Phe Thr Gly His Pro Glu Thr Leu Glu Lys Phe Asp Lys Phe Lys
            35                  40                  45

His Leu Lys Thr Glu Ala Glu Met Lys Ala Ser Glu Asp Leu Lys Lys
        50                  55                  60

His Gly Thr Val Val Leu Thr Ala Leu Gly Gly Ile Leu Lys Lys Lys
65                  70                  75                  80

Gly His His Glu Ala Glu Leu Lys Pro Leu Ala Gln Ser His Ala Thr
                85                  90                  95

Lys His Lys Ile Pro Ile Lys Tyr Leu Glu Phe Ile Ser Asp Ala Ile
                100                 105                 110

Ile His Val Leu His Ser Lys His Pro Gly Asp Phe Gly Ala Asp Ala
                115                 120                 125

Gln Gly Ala Met Thr Lys Ala Leu Glu Leu Phe Arg Asn Asp Ile Ala
        130                 135                 140

Ala Lys Tyr Lys Glu Leu Gly Phe Gln Gly
145                 150

<210> SEQ ID NO 21
<211> LENGTH: 152
<212> TYPE: PRT
<213> ORGANISM: Nicotiana benthamiana

<400> SEQUENCE: 21

Met Ser Ser Phe Thr Glu Glu Gln Glu Ala Leu Val Val Lys Ser Trp
1               5                   10                  15

Asp Ser Met Lys Lys Asn Ala Gly Glu Trp Gly Leu Lys Leu Phe Leu
                20                  25                  30

Lys Ile Phe Glu Ile Ala Pro Ser Ala Lys Lys Leu Phe Ser Phe Leu
            35                  40                  45

Lys Asp Ser Asn Val Pro Leu Glu Gln Asn Ala Lys Leu Lys Pro His
        50                  55                  60

Ser Lys Ser Val Phe Val Met Thr Cys Glu Ala Ala Val Gln Leu Arg
65                  70                  75                  80

Lys Ala Gly Lys Val Val Val Arg Asp Ser Thr Leu Lys Lys Leu Gly
```

```
                    85                  90                  95
Ala Thr His Phe Lys Tyr Gly Val Ala Asp Glu His Phe Glu Val Thr
                100                 105                 110

Lys Phe Ala Leu Leu Glu Thr Ile Lys Glu Ala Val Pro Glu Met Trp
                115                 120                 125

Ser Val Asp Met Lys Asn Ala Trp Gly Glu Ala Phe Asp Gln Leu Val
            130                 135                 140

Asn Ala Ile Lys Thr Glu Met Lys
145                 150

<210> SEQ ID NO 22
<211> LENGTH: 132
<212> TYPE: PRT
<213> ORGANISM: Bacillus subtilis

<400> SEQUENCE: 22

Met Gly Gln Ser Phe Asn Ala Pro Tyr Glu Ala Ile Gly Glu Glu Leu
1               5                   10                  15

Leu Ser Gln Leu Val Asp Thr Phe Tyr Glu Arg Val Ala Ser His Pro
                20                  25                  30

Leu Leu Lys Pro Ile Phe Pro Ser Asp Leu Thr Glu Thr Ala Arg Lys
            35                  40                  45

Gln Lys Gln Phe Leu Thr Gln Tyr Leu Gly Gly Pro Pro Leu Tyr Thr
        50                  55                  60

Glu Glu His Gly His Pro Met Leu Arg Ala Arg His Leu Pro Phe Pro
65                  70                  75                  80

Ile Thr Asn Glu Arg Ala Asp Ala Trp Leu Ser Cys Met Lys Asp Ala
                85                  90                  95

Met Asp His Val Gly Leu Glu Gly Glu Ile Arg Glu Phe Leu Phe Gly
                100                 105                 110

Arg Leu Glu Leu Thr Ala Arg His Met Val Asn Gln Thr Glu Ala Glu
            115                 120                 125

Asp Arg Ser Ser
        130

<210> SEQ ID NO 23
<211> LENGTH: 131
<212> TYPE: PRT
<213> ORGANISM: Corynebacterium glutamicum

<400> SEQUENCE: 23

Met Thr Thr Ser Glu Asn Phe Tyr Asp Ser Val Gly Gly Glu Glu Thr
1               5                   10                  15

Phe Ser Leu Ile Val His Arg Phe Tyr Glu Gln Val Pro Asn Asp Asp
                20                  25                  30

Ile Leu Gly Pro Met Tyr Pro Pro Asp Phe Glu Gly Ala Glu Gln
            35                  40                  45

Arg Leu Lys Met Phe Leu Ser Gln Tyr Trp Gly Gly Pro Lys Asp Tyr
        50                  55                  60

Gln Glu Gln Arg Gly His Pro Arg Leu Arg Met Arg His Val Asn Tyr
65                  70                  75                  80

Pro Ile Gly Val Thr Ala Ala Glu Arg Trp Leu Gln Leu Met Ser Asn
                85                  90                  95

Ala Leu Asp Gly Val Asp Leu Thr Ala Glu Gln Arg Glu Ala Ile Trp
                100                 105                 110

Glu His Met Val Arg Ala Ala Asp Met Leu Ile Asn Ser Asn Pro Asp
```

Pro His Ala
    130

<210> SEQ ID NO 24
<211> LENGTH: 124
<212> TYPE: PRT
<213> ORGANISM: Synechocystis sp.

<400> SEQUENCE: 24

Met Ser Thr Leu Tyr Glu Lys Leu Gly Gly Thr Thr Ala Val Asp Leu
1               5                   10                  15

Ala Val Asp Lys Phe Tyr Glu Arg Val Leu Gln Asp Asp Arg Ile Lys
            20                  25                  30

His Phe Phe Ala Asp Val Asp Met Ala Lys Gln Arg Ala His Gln Lys
        35                  40                  45

Ala Phe Leu Thr Tyr Ala Phe Gly Gly Thr Asp Lys Tyr Asp Gly Arg
    50                  55                  60

Tyr Met Arg Glu Ala His Lys Glu Leu Val Glu Asn His Gly Leu Asn
65                  70                  75                  80

Gly Glu His Phe Asp Ala Val Ala Glu Asp Leu Leu Ala Thr Leu Lys
                85                  90                  95

Glu Met Gly Val Pro Glu Asp Leu Ile Ala Glu Val Ala Ala Val Ala
            100                 105                 110

Gly Ala Pro Ala His Lys Arg Asp Val Leu Asn Gln
        115                 120

<210> SEQ ID NO 25
<211> LENGTH: 183
<212> TYPE: PRT
<213> ORGANISM: Synechococcus sp.

<400> SEQUENCE: 25

Met Asp Val Ala Leu Leu Glu Lys Ser Phe Glu Gln Ile Ser Pro Arg
1               5                   10                  15

Ala Ile Glu Phe Ser Ala Ser Phe Tyr Gln Asn Leu Phe His His His
            20                  25                  30

Pro Glu Leu Lys Pro Leu Phe Ala Glu Thr Ser Gln Thr Ile Gln Glu
        35                  40                  45

Lys Lys Leu Ile Phe Ser Leu Ala Ala Ile Ile Glu Asn Leu Arg Asn
    50                  55                  60

Pro Asp Ile Leu Gln Pro Ala Leu Lys Ser Leu Gly Ala Arg His Ala
65                  70                  75                  80

Glu Val Gly Thr Ile Lys Ser His Tyr Pro Leu Val Gly Gln Ala Leu
                85                  90                  95

Ile Glu Thr Phe Ala Glu Tyr Leu Ala Ala Asp Trp Thr Glu Gln Leu
            100                 105                 110

Ala Thr Ala Trp Val Glu Ala Tyr Asp Val Ile Ala Ser Thr Met Ile
        115                 120                 125

Glu Gly Ala Asp Asn Pro Ala Ala Tyr Leu Glu Pro Glu Leu Thr Phe
    130                 135                 140

Tyr Glu Trp Leu Asp Leu Tyr Gly Glu Glu Ser Pro Lys Val Arg Asn
145                 150                 155                 160

Ala Ile Ala Thr Leu Thr His Phe His Tyr Gly Glu Asp Pro Gln Asp
                165                 170                 175

Val Gln Arg Asp Ser Arg Gly

```
                    180

<210> SEQ ID NO 26
<211> LENGTH: 118
<212> TYPE: PRT
<213> ORGANISM: Nostoc commune

<400> SEQUENCE: 26

Met Ser Thr Leu Tyr Asp Asn Ile Gly Gly Gln Pro Ala Ile Glu Gln
1               5                   10                  15

Val Val Asp Glu Leu His Lys Arg Ile Ala Thr Asp Ser Leu Leu Ala
            20                  25                  30

Pro Val Phe Ala Gly Thr Asp Met Val Lys Gln Arg Asn His Leu Val
        35                  40                  45

Ala Phe Leu Ala Gln Ile Phe Glu Gly Pro Lys Gln Tyr Gly Gly Arg
    50                  55                  60

Pro Met Asp Lys Thr His Ala Gly Leu Asn Leu Gln Gln Pro His Phe
65                  70                  75                  80

Asp Ala Ile Ala Lys His Leu Gly Glu Arg Met Ala Val Arg Gly Val
                85                  90                  95

Ser Ala Glu Asn Thr Lys Ala Ala Leu Asp Arg Val Thr Asn Met Lys
            100                 105                 110

Gly Ala Ile Leu Asn Lys
            115

<210> SEQ ID NO 27
<211> LENGTH: 136
<212> TYPE: PRT
<213> ORGANISM: Bacillus megaterium

<400> SEQUENCE: 27

Met Arg Glu Lys Ile His Ser Pro Tyr Glu Leu Leu Gly Gly Glu His
1               5                   10                  15

Thr Ile Ser Lys Leu Val Asp Ala Phe Tyr Thr Arg Val Gly Gln His
            20                  25                  30

Pro Glu Leu Ala Pro Ile Phe Pro Asp Asn Leu Thr Glu Thr Ala Arg
        35                  40                  45

Lys Gln Lys Gln Phe Leu Thr Gln Tyr Leu Gly Gly Pro Ser Leu Tyr
    50                  55                  60

Thr Glu Glu His Gly His Pro Met Leu Arg Ala Arg His Leu Pro Phe
65                  70                  75                  80

Glu Ile Thr Pro Ser Arg Ala Lys Ala Trp Leu Thr Cys Met His Glu
                85                  90                  95

Ala Met Asp Glu Ile Asn Leu Glu Gly Pro Glu Arg Asp Glu Leu Tyr
            100                 105                 110

His Arg Leu Ile Leu Thr Ala Gln His Met Ile Asn Ser Pro Glu Gln
        115                 120                 125

Thr Asp Glu Lys Gly Phe Ser His
130                 135
```

METHODS AND COMPOSITIONS FOR CONSUMABLES

CROSS-REFERENCE TO RELATED APPLICATIONS

This application is a continuation of U.S. application Ser. No. 15/786,776 filed on Oct. 18, 2017, which is a continuation of U.S. application Ser. No. 14/796,970 filed Jul. 10, 2015, which is a continuation of, and claims the benefit of priority under 35 U.S.C. § 120 to, PCT/US2014/011361, which is a continuation of, and claims the benefit of priority under 35 U.S.C. § 120 to U.S. application Ser. No. 13/941,211, filed Jul. 12, 2013, which claims the benefit of priority under 35 U.S.C. § 119(e) to U.S. Application Ser. No. 61/908,634, filed Nov. 25, 2013, and to U.S. Application Ser. No. 61/751,816, filed Jan. 11, 2013; and this application is related to the following co-pending patent applications: Application Serial No. PCT/US2012/46560; Application Serial No PCT/US2012/46552; Application Ser. No. 61/876,676, filed Sep. 11, 2013; Application Ser. No. 61/751,818, filed Jan. 11, 2013, and Application Ser. No. 61/611,999, filed Mar. 16, 2012, all of which are incorporated herein by reference.

TECHNICAL FIELD

This invention relates to consumable products and more particularly, to non-animal based replicas of animal-based food products, that can be produced, in some embodiments, by breaking down non-animal materials into their constituent parts and reassembling those parts into the consumables.

BACKGROUND

Animal farming has a profound negative environmental impact. Currently it is estimated that 30% of Earth's land surface is dedicated to animal farming and that livestock account for 20% of total terrestrial animal biomass. Due to this massive scale, animal farming accounts for more than 18% of net greenhouse gas emissions. Animal farming may be the largest human source of water pollution, and animal farming is by far the world's largest threat to biodiversity. It has been estimated that if the world's human population could shift from a meat containing diet to a diet free of animal products, 26% of Earth's land surface would be freed for other uses. Furthermore the shift to a vegetarian diet would massively reduce water and energy consumption.

The consumption of meat has a profound negative impact on human health. The health benefits of a vegetarian diet are well established. If the human population would shift to a more vegetarian diet, there would be a decrease in health care costs.

Hunger is a worldwide problem, yet the world's 4 major commodity crops (soybeans, maize, wheat, and rice) already supply more than 100% of the human population's requirements for calories and protein, including every essential amino acid.

Plant based meat substitutes have largely failed to cause a shift to a vegetarian diet. The current state of the art for meat substitute compositions involves the extrusion of soy/grain mixture, resulting in products which largely fail to replicate the experience of cooking and eating meat. Common limitations of these products are a texture and mouthfeel that are more homogenous than that of equivalent meat products. Furthermore, as the products must largely be sold pre-cooked, with artificial flavors and aromas built in, they fail to replicate aromas, flavors, and other key features associated with cooking meat. As a result, these products appeal mainly to a limited consumer base that is already committed to vegetarianism/veganism, but have failed to appeal to the larger consumer segment accustomed to eating meat.

Food is any substance that is either eaten or drunk by any animal, including humans, for nutrition or pleasure. It is usually of plant or animal origin, and contains essential nutrients, such as carbohydrates, fats, proteins, vitamins, or minerals. The substance is ingested by an organism and assimilated by the organism's cells in an effort to produce energy, maintain life, or stimulate growth.

Food typically has its origin in a photosynthetic organism, typically from plants. Some food is obtained directly from plants; but even animals that are used as food sources are raised by feeding them food derived from plants. Edible fungi and bacteria are used to transform materials from plants or animals into other food products, mushrooms, bread, yogurt and the like.

In most cases, the plant or animal is fractionated into a variety of different portions, depending upon the purpose of the food. Often, certain portions of the plant, such as the seeds or fruits, are more highly prized by humans than others and these are selected for human consumption whilst other less desirable portions, such as the stalks of grasses, are typically used for feeding animals.

Animals are typically butchered into smaller cuts of meat with specific flavor and handling properties before consumption.

While many foods can be eaten raw, many also undergo some form of preparation for reasons of safety, palatability, texture, or flavor. At the simplest level, this may involve washing, cutting, trimming, or adding other foods or ingredients. It may also involve mixing, heating or cooling or fermentation and individual foods may be combined with other food products to achieve the desired mix of properties.

In recent years, attempts have been made to bring scientific rigor to the process of food preparation, under the fields of food science and molecular gastronomy. Food science broadly studies the safety, microbiology, preservation, chemistry, engineering and physics of food preparation, whereas molecular gastronomy focuses on the use of scientific tools such as liquid nitrogen, emulsifying agents such as soy lecithin and gelling agents such as calcium alginates to transform food products into unexpected forms.

However, the raw material is typically an entire organism (plant or animal) or an isolated tissue such as a steak, the fruiting body of a fungus, or the seed of a plant. In some cases, the isolated tissue is modified before food preparation, such as making flour or isolating oils and bulk proteins from seeds.

Despite that fact that all of these items comprise a mixture of proteins, carbohydrates, fats, vitamins and minerals, the physical arrangement of these materials in the original plant or animal determines the use to which the plant or animal tissue will be put. Disclosed herein are improved methods and composition for the production of consumables.

SUMMARY

Provided herein are consumable products and methods of making the same. The consumables can be non-animal based consumable goods, e.g., containing mainly plant or entirely-plant based proteins and/or fats, and can be in the form of a beverage (e.g., an alcoholic beverage such as cream liquor, or a protein drink), a protein supplement, a baked good (e.g., a bread or a cookie), a condiment (e.g., a mayonnaise, a mustard), a meat product, or a meat substitute product (e.g., a ground beef product). For example, the protein drink can be a meal replacement beverage, a beer supplemented with the protein, or a distilled alcoholic beverage (e.g., vodka or rum) supplemented with the protein. The condiment can be mayonnaise. The meat product can be a pate, a sausage, or a meat substitute that can include a muscle replica, plant-based adipose and/or connective tissue. Coacervates that include one or more proteins can be used to help bind the ingredients to each other in the consumable products (e.g., a ground beef product).

Accordingly, provided herein is a consumable product comprising an isolated and purified plant protein, wherein the isolated and purified plant protein has (i) a solubility in a solution of at least 25 g/L at a temperature between about 2° C. and about 32° C., wherein the solution has a pH between 3 and 8, and has a sodium chloride content of 0 to 300 mM or (ii) a solubility in a solution of at least 1 mg/ml at a temperature of between 90° C. and 110° C., wherein the solution has a pH between 5 and 8 and has a sodium chloride content of 0 to 300 mM. In some embodiments, the consumable product is a beverage, a protein supplement, a baked good, a condiment, a meat product, or a meat substitute product. In some embodiments, the beverage is an alcoholic beverage or a protein drink. In some embodiments, the alcoholic beverage is a cream liquor. The cream liquor can further include a non-dairy lipid emulsion, where the cream liquor is free of animal products. In some embodiments, the protein drink is a meal replacement beverage, a beer supplemented with said protein, or a distilled alcoholic beverage supplemented with the protein. A condiment can be a mayonnaise replica. In some embodiments, the meat product can be a pate, a sausage replica, or a meat substitute. In some embodiments, the isolated and purified plant protein is at least 10 kDa in size. In some embodiments, the isolated and purified plant protein is not fully denatured. In some cases, the isolated and purified plant protein is not derived from soy. In some embodiments, the isolated and purified plant protein comprises one or more of RuBisCo, moong 8S globulin, a pea globulin, a pea albumin, a lentil protein, zein, or an oleosin.

In some embodiments, the isolated and purified plant protein comprises a dehydrin, a hydrophilin, an intrinsically disordered protein, or a protein identified based on its ability to stay soluble after boiling at a pH and a salt concentration comparable to a food. In some embodiments, the consumable product further comprises a plant derived lipid or a microbial-derived lipid. In some embodiments, the consumable product further includes a second isolated and purified protein, and/or a seasoning agent, a flavoring agent, an emulsifier, a gelling agent, a sugar, or a fiber.

The disclosure also provides a consumable product comprising a coacervate comprising one or more isolated and purified proteins. In some embodiments, the consumable product is a meat replica. In some embodiments, the consumable product further includes a plant derived lipid or a microbial-derived lipid. The plant derived lipid or microbial-derived lipid can comprise lecithin and/or an oil. The product can include up to about 1% lecithin by weight. The product can include lecithin and the oil. In some embodiments, the oil is canola oil, palm oil, or cocoa butter. The product can include about 1% to about 9% of the oil. The one or more isolated and purified proteins can comprise plant proteins. The one or more plant proteins can comprise one or more pea proteins, chickpea proteins, lentil proteins, lupine proteins, other legume proteins, or mixtures thereof. In some embodiments, the one or more pea proteins are legumins, vicilin, a convicilin, or a mixture thereof.

The disclosure also provides a meat replica comprising a muscle replica, a connective tissue replica, an adipose tissue replica, and a coacervate comprising one or more isolated and purified proteins. The coacervate further can comprise a plant-derived lipid or microbial-derived lipid. The plant derived lipid or microbial-derived lipid can be lecithin and/or an oil. The meat replica can be a ground beef replica.

Also provided is a consumable product comprising a comprising a cold set gel comprising one or more isolated and purified proteins from a non-animal source and a salt. In some embodiments, the isolated and purified plant protein comprises one or more of RuBisCo, moong 8S globulin, a pea globulin, a pea albumin, a lentil protein, zein, or an oleosin. In some embodiments, the isolated and purified plant protein comprises a dehydrin, a hydrophilin, or an intrinsically disordered protein. In some embodiments, the cold set gel further comprises a plant derived lipid or microbial derived lipid. In some embodiments, the plant derived lipid or microbial derived lipid is lecithin and/or oil.

The disclosure further provides an adipose tissue replica comprising one or more isolated plant proteins, one or more plant or algal derived oils, and optionally a phospholipid. In some embodiments, the phospholipid is lecithin. In some embodiments, the plant based oils are selected from the group consisting of corn oil, olive oil, soy oil, peanut oil, walnut oil, almond oil, sesame oil, cottonseed oil, rapeseed oil, canola oil, safflower oil, sunflower oil, flax seed oil, palm oil, palm kernel oil, coconut oil, babassu oil, shea butter, mango butter, cocoa butter, wheat germ oil, rice bran oil, and combinations thereof. In some embodiments, the fat release temperature of the adipose tissue replica is between 23° C. to 33° C., 34° C. to 44° C., 45° C. to 55° C., 56° C. to 66° C., 67° C. to 77° C., 78° C. to 88° C., 89° C. to 99° C., 100° C. to 110° C., 111° C. to 121° C., 122° C. to 132° C., 133° C. to 143° C., 144° C. to 154° C., 155° C. to 165° C., 166° C. to 167° C., 168° C. to 169° C., 170° C. to 180° C., 181° C. to 191° C., 192° C. to 202° C., 203° C. to 213° C., 214° C. to 224° C., 225° C. to 235° C., 236° C. to 246° C., 247° C. to 257° C., 258° C. to 268° C., 269° C. to 279° C., 280° C. to 290° C., or 291° C. to 301° C. In some embodiments, the percent fat release of the adipose tissue replica is 0 to 10%, 10% to 20%, 20% to 30%, 30% to 40%, 40% to 50%, 50% to 60%, 60% to 70%, 70% to 80%, 80% to 90%, or 90% to 100% upon cooking. In some embodiments, the isolated and purified plant protein comprises one or more of RuBisCo, moong 8S globulin, a pea globulin, a pea albumin, a lentil protein, zein, or an oleosin.

In some embodiments, the adipose tissue replica comprises from about 40% to about 90% of the oil. In some embodiments, the adipose tissue replica comprises from about 1% to about 6% of the isolated and purified plant protein. In some embodiments, the adipose tissue replica comprises from about 0.05 to about 2% of the phospholipid. In some embodiments, the firmness of the adipose tissue replica is similar to that of beef adipose tissue.

Also provided is a consumable product comprising a heme-containing protein and (i) carbon monoxide and/or (ii) a nitrite, wherein the consumable product does not comprise meat. In some embodiments, the heme-containing protein accounts for at least 0.01% of the composition. In some embodiments, the consumable product further comprises one or more ammonium, sodium, potassium, or calcium salts. In some embodiments, the isolated and purified proteins are crosslinked.

Further provided is a consumable product comprising a gelled emulsion, wherein the gelled emulsion comprises:

a) an isolated and purified protein;

b) a first lipid that when not in the consumable product is solid at a selected temperature range; and c) a second lipid that when not in the consumable product is liquid at the selected temperature range; wherein the melting temperature of the mixture of the first and second lipids is similar to the melting temperature of lipids found in meat, and wherein the first and second lipids are plant derived lipids or microbial derived lipids.

The disclosure also provides a method for making a consumable product comprising:

a) preparing a solution comprising an isolated and purified plant protein, wherein the isolated and purified plant protein has (i) a solubility in the solution of at least 25 at a temperature between about 2° C. and 32° C., wherein the solution has a pH between 3 and 8, and has a sodium chloride content of 0 to 300 mM or (ii) a solubility in the solution of at least 1 mg/ml at a temperature of between 90° C. and 110° C., wherein the solution has a pH between 5 and 8 and has a sodium chloride content of 0 to 300 mM; and b) adding the solution to a beverage.

In some embodiments, the solution comprises two or more isolated and purified plant proteins. In some embodiments, the beverage is clear. In some embodiments, the isolated and purified plant protein is at a concentration of at least 1% by weight in the solution. In some embodiments, the isolated and purified plant protein is selected from the group consisting of RuBisCo, a moong globulin, a soy globulin, a pea globulin, a pea albumin, a prolamin, a lentil protein, a dehydrin, a hydrophilin, and an intrinsically disordered protein. In some embodiments, the isolated and purified plant protein is lyophilized prior to making said solution. In some embodiments, the beverage has an improved mouthfeel compared to a corresponding beverage without the isolated and purified protein.

Also provided is a method for extending the shelf-life of a meat-free consumable product, the method comprising adding a heme-containing protein to the consumable product, wherein the heme containing protein oxidizes more slowly than myoglobin under equivalent storage conditions. In some embodiments, the heme-containing protein comprises an amino acid sequence with at least 70% homology to an amino acid sequence set forth in any one of SEQ ID NOs: 1-27.

Further provided is a method for making a meat replica comprising a cold set gel, wherein the method includes:

a) denaturing a solution comprising at least one isolated and purified protein from a non-animal source under conditions wherein the isolated and purified protein does not precipitate out of the solution;

b) optionally adding any heat-labile components to the solution of denatured protein;

c) gelling the solution of denatured protein at about 4° C. to about 25° C. by increasing the ionic strength of the solution to form a cold set gel; and d) incorporating the cold set gel into a meat replica.

In some embodiments, the gelling is induced using 5 to 100 mM sodium or calcium chloride. In some embodiments, the heat-labile components are proteins or lipids, or mixtures thereof. In some embodiments, the protein is a heme-containing protein. In some embodiments, the cold set gel is formed in a matrix comprising a freeze-aligned plant protein.

In some embodiments, the isolated and purified protein from a non-animal source is a plant protein. In some embodiments, the plant protein is selected from the group consisting of RuBisCo, a moong globulin, a soy globulin, a pea globulin, a pea albumin, a prolamin, a lentil protein, a dehydrin, a hydrophilin, and an intrinsically disordered protein.

Further provided is an adipose tissue replica, comprising a) an isolated and purified non-animal protein;

b) a non-animal lipid; and c. a three-dimensional matrix comprising fibers derived from non-animal sources, wherein the lipid and the protein are dispersed in the three-dimensional matrix, and wherein the three-dimensional matrix stabilizes the structure of the adipose tissue replica.

Also provided is a connective tissue replica comprising one or more isolated and purified proteins assembled into fibrous structures by a solution spinning process. In some embodiments, the fibrous structures are stabilized by a cross-linking agent.

Provided herein is a method for imparting a beef like flavor to a consumable product, comprising adding to the consumable composition a heme-containing protein, wherein after cooking, a beef-like flavor is imparted to the consumable composition.

Also provided is a method for making a poultry or a fish composition taste like beef, the method comprising adding a heme protein to the poultry or fish composition, respectively.

In some embodiments, the heme-containing protein has an amino acid sequence with at least 70% homology to any one of the amino acid sequences set forth in SEQ ID NOs: 1-27.

Further provided is a method of making a coacervate, the method comprising a) acidifying a solution of one or more plant proteins to a pH between 3.5 and 5.5, wherein the solution comprises 100 mM or less of sodium chloride; and b) isolating the coacervate from the solution. In some embodiments, the pH is between 4 and 5. In some embodiments, the plant proteins comprise one or more pea proteins, chickpea proteins, lentil proteins, lupine proteins, other legume proteins, or mixtures thereof. In some embodiments, the pea proteins comprise isolated and purified legumins, isolated and purified vicilins, isolated and purified convicilins, or combinations thereof. In some embodiments, the isolated and purified pea proteins comprise isolated and purified vicilins and isolated and purified convicilins. In some embodiments, the acidifying step is done in the presence of a plant derived lipid or microbial derived lipid. In some embodiments, the plant derived lipid or microbial derived lipid comprises oils and/or phospholipids.

Provided herein is a method of making an adipose tissue replica, the method comprising forming an emulsion comprising one or more isolated plant proteins, one or more plant or algal derived oils, and optionally a phospholipid. In some embodiments, when the phosoholipid is included, it is lecithin. In some embodiments, the plant based oils are selected from the group consisting of corn oil, olive oil, soy oil, peanut oil, walnut oil, almond oil, sesame oil, cottonseed oil, rapeseed oil, canola oil, safflower oil, sunflower oil, flax seed oil, palm oil, palm kernel oil, coconut oil, babassu oil, shea butter, mango butter, cocoa butter, wheat germ oil, rice bran oil, and combinations thereof. In some embodiments, the fat release temperature of the adipose tissue replica is between 23° C. to 33° C., 34° C. to 44° C., 45° C. to 55° C., 56° C. to 66° C., 67° C. to 77° C., 78° C. to 88° C., 89° C. to 99° C., 100° C. to 110° C., 111° C. to 121° C., 122° C. to 132° C., 133° C. to 143° C., 144° C. to 154° C., 155° C.

to 165° C., 166° C. to 167° C., 168° C. to 169° C., 170° C. to 180° C., 181° C. to 191° C., 192° C. to 202° C., 203° C. to 213° C., 214° C. to 224° C., 225° C. to 235° C., 236° C. to 246° C., 247° C. to 257° C., 258° C. to 268° C., 269° C. to 279° C., 280° C. to 290° C., or 291° C. to 301° C. In some embodiments, the percent fat release of the adipose tissue replica is 0 to 10%, 10% to 20%, 20% to 30%, 30% to 40%, 40% to 50%, 50% to 60%, 60% to 70%, 70% to 80%, 80% to 90%, or 90% to 100% upon cooking. In some embodiments, the isolated and purified plant protein comprises one or more of RuBisCo, moong 8S globulin, a pea globulin, a pea albumin, a lentil protein, zein, or an oleosin. In some embodiments, the emulsion comprises from about 40% to about 90% of the oil. In some embodiments, the emulsion comprises from about 1% to about 4% of the isolated and purified plant protein. In some embodiments, the adipose tissue replica comprises from about 0.05 to about 1% of the phospholipid. In some embodiments, the emulsion is formed by high-pressure homogenization, sonication, or hand homogenization.

Further provided is a method of minimizing undesirable odors or flavors in a composition comprising plant proteins, the method comprising contacting the composition with a ligand having affinity for one or more lipoxygenases.

Also provided is a method of minimizing undesirable odors or flavors in a composition comprising plant proteins, the method comprising contacting the composition with activated carbon then removing the activated carbon from the composition.

Also provided is a method of minimizing undesirable odors or flavors in a composition comprising plant proteins, the method comprising adding a lipoxygenase inhibitor and/or an antioxidant to the composition.

The disclosure further provides a chocolate flavored spread comprising:
 a) sugar
 b) a chocolate flavoring, and
 c) a cream fraction from a plant based milk.

Provided herein is a method for altering the texture of a consumable during or after cooking comprising incorporating within the consumable one or more plant proteins with a low denaturation temperature. In some embodiments, at least one of the one or more plant proteins is isolated and purified. In some embodiments, the one or more plant proteins are selected from the group consisting of rubisco, pea proteins, lentil proteins, or other legume proteins. In some embodiments, the pea proteins comprise pea albumin proteins. In some embodiments, the consumable becomes firmer during or after cooking.

Also provided is a tissue replica, which comprises a freeze-aligned non-animal protein. In some embodiments, the non-animal protein is a plant protein. In some embodiments the non-animal protein is isolated and purified. In some embodiments the tissue replica is a muscle tissue replica.

The disclosure also provides a meat replica which includes a tissue replica comprising a freeze-aligned non-animal protein.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims. The word "comprising" in the claims may be replaced by "consisting essentially of" or with "consisting of," according to standard practice in patent law.

DESCRIPTION OF THE DRAWING

FIG. 1 contains amino acid sequences of exemplary heme-containing proteins.

DETAILED DESCRIPTION

I. Consumables

Figure 2A:
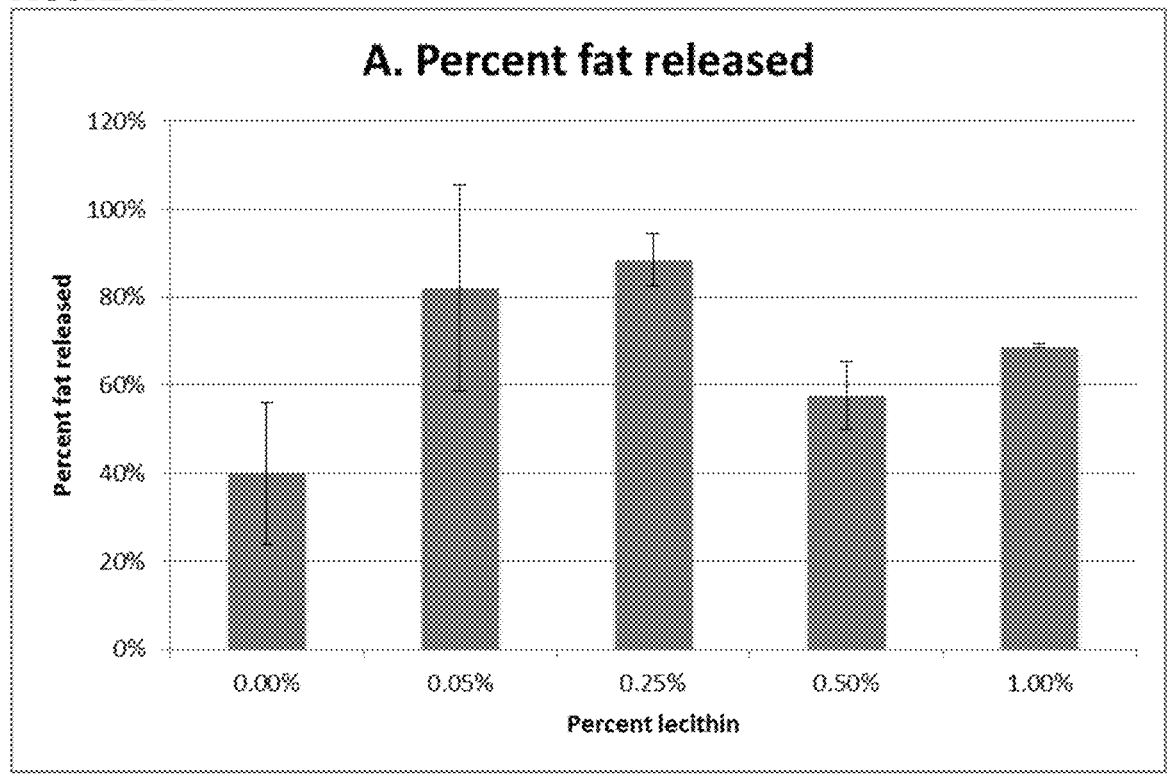
FIG. 2A is a bar graph depicting the percent fat release based on the amount of lecithin.

Methods and compositions for producing consumables are described herein. In some cases, the consumables are non-animal based replicas of animal-based food products that can be produced by breaking down non-animal materials into their constituent parts and reassembling those parts into the consumables. In certain instances, the consumables are not intended to replicate an animal-based food and instead have their own unique characteristics desirable as a food. Additionally, the consumables may, in some instances, act as nutraceuticals or carriers for pharmaceutical compositions rather than serving a primary function as food.

The advantages of the consumables described herein can include, for example, the using less energy or water in the production of the consumable compared to similar food products, using no animals in the production of the consumable, making a healthier product, using raw materials that would otherwise be discarded, or allowing for the elimination (or lack of incorporation) of certain components (e.g., allergens) from the consumables. The consumables also may have a higher degree of production consistency, allowing for improved quality control of the products. Another advantage is that the consumables can be designed intentionally to have desirable characteristics for food preparation that are superior to traditional food products.

The consumables can be for animal consumption, including human consumption. The consumables can be food for domestic animals (e.g., dog food could be produced according to the present inventions) or wild animals (e.g., food for non-domesticated predatory animals).

The consumables can be sold in grocery stores, convenience stores, mass merchandisers, and club stores or prepared in restaurants, including fast food restaurants, schools, event locations, hospitals, military facilities, prisons, shelters, or long-term care facilities, similar to already existing human foods.

The consumable can be approved by suitable regulatory authorities. For example, the consumable could be prepared to be suitable for the U.S. Food and Drug Administration. Methods of the invention can include steps necessary to satisfy regulatory agencies.

The consumables of the present invention can replicate, compete with, supplement or replace conventional food products (herein referred to as "food products"). Food products can be any foods which presently exist. The consumables of the invention can be made to replicate the food products, e.g., an equivalent meat product. The equivalent meat product can be a white meat or a dark meat. The equivalent meat product can be derived from any animal. Non-limiting examples of animals used to derive the equivalent meat product include farmed animals such as, e.g., cattle, sheep, pig, chicken, turkey, goose, duck, horse, dog or game animals (whether wild or farmed) such as, e.g., rabbit, deer, bison, buffalo, boar, snake, pheasant, quail, bear, elk, antelope, pigeon, dove, grouse, fox, wild pig, goat, kangaroo, emu, alligator, crocodile, turtle, groundhog, marmot, possum, partridge, squirrel, raccoon, whale, seal, ostrich, capybara, nutria, guinea pig, rat, mice, vole, any variety of insect or other arthropod, or seafood such as, e.g., fish, crab, lobster, oyster, muscle, scallop, abalone, squid, octopus, sea urchin, tunicate and others.

Many meat products are typically derived from skeletal muscle of an animal but it is understood that meat can also come from other muscles or organs of the animal. In some embodiments, the equivalent meat product is a cut of meat derived from skeletal muscle. In other embodiments, the equivalent meat product is an organ such as, e.g., kidney, heart, liver, gallbladder, intestine, stomach, bone marrow, brain, thymus, lung, or tongue. Accordingly, in some embodiments, the compositions of the present invention are consumables similar to skeletal muscle or organs.

A consumable (e.g., a meat substitute) can comprise one or more of a first composition comprising a muscle tissue replica, a second composition comprising an adipose tissue replica, and/or a third composition comprising a connective tissue replica, wherein the one or more compositions are combined in a manner that recapitulates the physical organization of meat. The present invention also provides distinct compositions for a muscle tissue replica (herein referred to as "muscle replica"), an adipose tissue replica (herein referred to as an "adipose replica" or "fat replica"), and a connective tissue replica (herein referred to as "connective tissue replica"). In some embodiments, these compositions are principally or entirely composed of ingredients derived from non-animal sources (e.g., 10% or less of the ingredients are from animal sources). In alternative embodiments, the muscle, fat, and/or connective tissue replica, or the meat substitute products comprising one or more of the replicas, are partially derived from animal sources but supplemented with ingredients derived from non-animal sources. In some embodiments, as much as 90% of the food product is derived from animal sources. In some embodiments about 75% of the food product is derived from animal sources. In some embodiments, about 50% of the food product is derived from animal sources. In some embodiments about 10% of the food product is derived from animal sources. In yet other alternative embodiments, the invention provides meat products substantially derived from animal sources (e.g., a beef, chicken, turkey, or a pork product) that are supplemented with one or more of a muscle tissue replica, a fat replica, and/or a connective tissue replica, wherein the replicas are derived substantially or entirely from non-animal sources. A non-limiting example of such a meat product is an ultra-lean ground beef product supplemented with a non-animal derived fat replica which improves texture and mouthfeel while preserving the health benefits of a consumable low in animal fat. Such alternative embodiments can result in products with properties that more closely recapitulate key features associated with preparing and consuming meat but which are less costly and associated with a lesser environmental impact, less animal welfare impact, or improved health benefits for the consumer.

Examples of other food products which the consumable can replicate or replace include: beverages (e.g., cream liquor or milk), protein drinks (e.g., RuBisCo can be used as a protein supplement in beer, distilled alcohol beverages such as vodka, fruit juices, meal replacement beverages, or water), pastes (e.g. Nutella™, cream, nacho cheese or mayonnaise replicas), pate, blood sausage, meat extenders, eggs, fish, sausage, tenders, spam or chilled foods (e.g., ice cream, yogurt, kefir, sour cream or butter replicas).

The consumables can be a meat replica. The consumables can be made to mimic the cut or appearance of meat. For instance, a consumable may be visually similar to or indistinguishable from ground beef or a particular cut of beef. In an example embodiment, the replicas are combined in a manner that approximates the physical organization of natural ground meat (e.g., ground beef, ground chicken, or ground turkey). In other embodiments, the replicas are combined in a manner that approximates different cuts of beef, such as, e.g., rib-eye, filet mignon, London broil, among others. Alternatively, the consumables can be a made with a unique look or appearance. For instance, the consumable could contain patterns (e.g., lettering or pictures) that are formed from the structure of the consumable. In some instances, the consumables look like traditional food products after they are prepared. For example, a consumable may be produced which is larger than a traditional cut of beef but which, after the consumable is sliced and cooked, appears the same as a traditional cooked meet. In some embodiments the consumable may resemble a traditional food product shape in two dimensions, but not in a third. For example the consumable may resemble a cut of meat in two dimensions (for example when viewed from the top), but may be much longer (or thicker) than the traditional cut. In this example the composition can be cut repeatedly into traditionally meat shaped products.

The consumables can be made from local products. For instance the consumables can be made from plants grown within a certain radius of the eventual consumer. That radius could be 1, 10, 100, or 1000 miles for example. Thus, in some embodiments, the invention provides method for producing a consumable which does not contain products which have been shipped over 1, 10, 100, or 1000 miles.

The present invention provides methods for producing consistent properties from the consumables when they are produced from various sources. For example, a plant based meat replica produced from local plants in Iowa, USA, will have substantially similar taste, odor, and texture as a plant based meat replica produced from local plants in Lorraine, France. This consistency allows for methods for advertising locally grown foods with consistent properties. The consistency can arise from the concentration or purification of similar components at different locations. These components can be combined in predetermined ratios to insure consistency. In some embodiments, a high degree of characteristic consistency is possible using components (e.g. isolated or concentrated proteins and fats) which come from the same plant species. In some embodiments, a high degree of characteristic consistency is possible using components (e.g., isolated or concentrated proteins and fats) which come from the different plant species. In some embodiments, the same proteins can be isolated from different plant species (i.e. homologous proteins). In some embodiments, the invention provides for a method comprising isolating similar plant constituents from plant sources in different locations, assembling in both locations compositions provided herein, and selling the compositions, wherein the compositions assembled and sold at different the geographic locations have consistent physical and chemical properties. In some embodiments, the isolated constituents are from different plant populations in different locations. In some embodiments one or more of the isolated constituents are shipped to the separate geographic locations.

The consumables may require fewer resources to produce than consumables produced from domesticated animals. Accordingly, the present invention provides for meat replicates which require less water or energy to produce than meat. For example a consumable described herein can require less than about 10, 50, 100, 200, 300, 500, or 1000 gallons of water per pound of consumable. For comparison producing beef can require over 2000 gallons of water per pound of meat.

The consumable may require less land area to produce than a meat product with similar protein content. For example, a consumable described herein may require 30% or less of the land area required to produce a meat product with similar protein content.

The consumable may have health benefits compared to an animal product it replaces in the diet. For example it may have less cholesterol or lower levels of saturated fats than comparable meat products. The American Heart Association and the National Cholesterol Education Program recommends limiting cholesterol intake from food to 300 mg per day, which is equivalent to the consumption of 12 ounces of beef or two egg yolks. Consumables described herein that are indistinguishable to animal products such as ground beef, and having a reduced cholesterol content or no cholesterol, can help maintain a low cholesterol diet. In another example, a consumable described herein may contain no cholesterol, or higher levels of poly-unsaturated fatty acids compared to the animal product it replaces.

The consumable may have animal welfare benefits compared to an animal product it replaces in the diet. For instance, it may be produced without requiring confinement, forced feeding, premature weaning, disruption of maternal-offspring interactions, or slaughter of animals for their meat.

The consumable may have a smaller "carbon footprint" than the meat products they replace. For example the consumable may result in net greenhouse gas emissions of 1%, 5%, 10%, 25%, 50% or 75% of the greenhouse gas emissions attributable to the animal product it replaces. By way of example, according to the Environmental Working Group (2011) "meat eaters guide to Climate Change and Health," the production of beef causes the emission of 27 kg equivalents of carbon dioxide per kilogram of beef that is consumed, and the production of lamb causes the emission of 39 kg equivalents of carbon dioxide per kilogram of beef that is consumed.

The consumable described herein may provide alternatives to animal products or combinations of animal products whose consumption is forbidden by religious beliefs. For example, the consumable may be a kosher replica pork chop.

The consumable can also be shipped in components and produced or assembled at a different location. When available, local components can be used for production of the consumable. The local components can be supplemented with components that are not locally available. This allows for methods of producing consumables, for instance meat replicates, using less energy in shipment than is required for meat. For example, local water can be used in combination with a kit which provides other components of the consumable. Using local water reduces shipping weight, thereby reducing cost and environmental impact.

The consumables described herein can be produced or assembled wholly or in part in areas where animal farming is not practical or is not allowed. The consumable can be produced or assembled within an urban environment. For example, a kit may be provided to a user to enable the user to produce the consumable. The user could use local water or use plants from a rooftop garden, for instance in Shanghai. In another example, the consumables could be produced aboard a space craft, space station, or lunar base. Accordingly, the present invention provides methods and systems for the production of meat replicas for use in space travel or for training for the same. For instance the present invention could be used in earth based training for space travel. The consumables could also be produced on an island or upon a manmade platform at sea where the keeping of livestock is difficult or prohibited.

II. Properties of the Consumable

The consumables described herein are typically designed to replicate the experience of eating a food product, e.g., meat. The look, texture, and taste of the consumable can be such that it is similar to, or indistinguishable from, a food product, e.g., meat. The consumable can also be produced to have the desirable characteristics of food products without incorporating other undesirable characteristics. For example, a consumable can be a replica steak that does not have gristle or other components not typically consumed in a predicate food product.

The invention provides, in certain embodiments, methods for determining the suitability for a consumable to qualify as a replica of a food product, for example, by determining whether an animal or human can distinguish the consumable from a predicate food product, e.g., a particular meat. One method to determine whether the consumable is comparable to a food product (e.g. meat) is to a) define the properties of meat and b) determine whether the consumable has similar properties.

Properties that can be tested or used to compare or describe a food product or the consumable include mechanical properties such as hardness, cohesiveness, brittleness, chewiness, gumminess, viscosity, elasticity, and adhesiveness. Properties of food products that can be tested also include geometric properties such as particle size and shape, and particle shape and orientation. The three dimensional organization of particles may also be tested. Additional properties can include moisture content and fat content. These properties can be described using terms such as "soft," "firm" or "hard" describe hardness; "crumbly," "crunchy," "brittle," "chewy," "tender," "tough," "short," "mealy," "pasty," or "gummy," to describe cohesiveness; "thin" or "viscous" to describe viscosity; "plastic" or "elastic" to describe elasticity; "sticky," "tacky" or "gooey" to describe adhesiveness; "gritty," "grainy" or "course" to describe particle shape and size; "fibrous," "cellular" or "crystalline" to describe particle shape and orientation, "dry," "moist," "wet," or "watery" to describe moisture content; or "oily" or "greasy" to describe fat content. Accordingly, in one embodiment, a group of people can be asked to rate a certain food product, for instance ground beef, according to properties which describe the food product. A consumable described herein can be rated by the same people to determine equivalence.

Flavor of the food product can also be assessed. Flavors can be rated according to similarity to food products, e.g., "eggy," "fishy," "buttery," "chocolaty," "fruity", "peppery," "baconlike," "creamy," "milky," "or "beefy." Flavors can be rated according to the seven basic tastes, i.e., sweet, sour, bitter, salty, umami (savory), pungent (or piquant), and metallic. Flavors can be described according to the similarity to an experience caused by a chemical, e.g., diacetyl (buttery), 3-hydroxy-2 butanone (buttery), nona-2E-enal (fatty), 1-octene-3-ol (mushroom), hexanoic acid (sweaty), 4-hydroxy-5-methyl furanone (HMF, meaty), pyrazines (nutty), bis(2-methyl-3-furyl) disulfide (roast meat), decanone (musty/fruity), isoamyl acetate (banana), benzaldehyde (bitter almond), cinnamic aldehyde (cinnamon), ethyl propionate (fruity), methyl anthranilate (grape), limonene (orange), ethyl decadienoate (pear), allyl hexanoate (pineapple), ethyl maltol (sugar, cotton candy), ethylvanillin (vanilla), butanoic acid (rancid), 12-methyltridecanal (beefy), or methyl salicylate (wintergreen). These ratings can be used as an indication of the properties of the food product. The consumables of the present invention can be compared to the food product to determine how similar the consumable is to the food product. In some instances the properties of the consumables are then altered to make the consumable more similar to the food product. Accordingly, in some embodiments, the consumable is rated similar to a food product according to human evaluation. In some embodiments the consumable is indistinguishable from real meat to a human.

The consumables can be made to eliminate properties associated with the source of the components of the consumables. For example a consumable can be made from components obtained from beans but can be made to lack a "beany" flavor or texture. One way this can be achieved is by breaking down the component source materials into isolated and purified components and not using components that cause undesired characteristic properties of the source. In addition, as described herein, off-flavors or aromas (e.g., undesirable flavors or aromas) in isolated and/or purified components can be minimized by deodorizing with activated charcoal or by removing enzymes such as lipoxygenases (LOX), which can be present in trace amounts and which can convert unsaturated triacylglycerides (such as linoleic acid or linolenic acid) into smaller and more volatile molecules. LOX are naturally present in legumes such as peas, soybeans, and peanuts, as well as rice, potatoes, and olives. When legume flours are fractionated into separate protein fractions, LOX can act as undesirable "time-bombs" that can cause undesirable flavors or aromas on aging or storage. As shown in Example 34, compositions containing plant proteins (e.g., from ground plant seeds) can be subjected to purification to remove LOX using, for example, an affinity resin that binds to LOX and removes it from the protein sample. The affinity resin can be linoleic acid, linolenic acid, stearic acid, oleic acid, propyl gallate, or epigalloccatechin gallate attached to a solid support such as a bead or resin. See, e.g., WO2013138793. In addition, depending on the protein component, certain combinations of antioxidants and/or LOX inhibitors can be used as effective agents to minimize off-flavor or off-odor generation in protein solutions, especially in the presence of fats and oils. Such compounds can include, for example, one or more of β-carotene, α-tocopherol, caffeic acid, propyl gallate, or epigallocatechin gallate. These may be included during purification of the proteins or during subsequent food processing steps to mitigate generation of off-flavors or off-odors in protein-based foods.

In some compositions, subjects asked to identify the consumable identify it as a form of a food product, or as a particular food product, e.g., a subject will identify the consumable as meat. For example, in some compositions a human will identify the consumable as having properties equivalent to meat. In some embodiments one or more properties of the consumable are equivalent to the corresponding properties of meat according to a human's perception. Such properties include the properties that can be tested. In some embodiments a human identifies a consumable of the present invention as more meat like than any meat substitutes found in the art.

Experiments can demonstrate that a consumable is acceptable to consumers. A panel can be used to screen a variety of consumables described herein. A number of human panelists can test multiple consumable samples, namely, natural meats vs. the consumable compositions described herein, or a meat substitute vs. a consumable composition described herein. Variables such as fat content can be standardized, for example to 20% fat using lean and fat meat mixes. Fat content can be determined using the Babcock for meat method (S. S. Nielson, Introduction to the Chemical Analysis of Foods (Jones & Bartlett Publishers, Boston, 1994)). Mixtures of ground beef and consumables of the invention prepared according to the procedure described herein can be formulated.

Panelists can be served samples (e.g., in booths), under red lights or under white light, in an open consumer panel. Samples can be assigned random three-digit numbers and rotated in ballot position to prevent bias. Panelists can be asked to evaluate samples for tenderness, juiciness, texture, flavor, and overall acceptability using a hedonic scale from 1=dislike extremely, to 9=like extremely, with a median of 5=neither like nor dislike. Panelists can be encouraged to rinse their mouths with water between samples, and given opportunity to comment on each sample.

The results of this experiment can indicate significant differences or similarities between the traditional meats and the compositions of the invention.

These results can demonstrate that the compositions described herein are judged as acceptably equivalent to real meat products. Additionally, these results can demonstrate that compositions described herein are preferred by panelist over other commercially available meat substitutes. Thus, in some embodiments the present invention provides for consumables that are similar to traditional meats and are more meat like than previously known meat alternatives.

Consumables of the invention can also have similar physical characteristics as food products, e.g., traditional meat. In one embodiment, the force required to pierce a 1 inch thick structure (e.g., a patty) made of a consumable of the invention with a fixed diameter steel rod is not significantly different than the force required to pierce a 1 inch thick similar food product structure (e.g., a ground beef patty) with a similar fixed diameter steel rod. Accordingly, the invention provides for consumables with similar physical strength characteristics to meat. In another embodiment, the force required to tear a sample of the invention with a cross-sectional area of 100 mm$^2$ is not significantly different than the force required to tear a sample of animal tissue (muscle, fat or connective tissue) with a cross-sectional area 100 mm$^2$ measured the same way. Force can be measured using, for example, TA.XT Plus Texture Analyzer (Textrue Technologies Corp.). Accordingly, the invention provides for consumables with similar physical strength characteristics to meat.

Consumables described herein can have a similar cook loss characteristic as a food product, e.g., meat. For example a consumable can have a similar fat and protein content to ground beef and have the same reduction in size when cooked as real ground beef. Similarities in size loss profiles can be achieved for various compositions of consumables described herein matched to various meats. The cook loss characteristics of the consumable also can be engineered to be superior to food products. For example a consumable can be produced that has less loss during cooking but achieves similar tastes and texture qualities as the cooked products. One way this is achieved is by altering the proportions of lipids based on melting temperatures in the consumable composition. Another way this is achieved is by altering the protein composition of the consumable by controlling the concentration of protein or by the mechanism by which the tissue replica is formed.

In some embodiments, the consumable is compared to an animal based food product (e.g., meat) based upon olfactometer readings. In various embodiments the olfactometer can be used to assess odor concentration and odor thresholds, or odor suprathresholds with comparison to a reference gas, hedonic scale scores to determine the degree of appreciation, or relative intensity of odors. In some embodiments, the olfactometer allows the training and automatic evaluation of expert panels. So in some embodiments the consumable is a product that causes similar or identical olfactometer readings. In some embodiments the differences are sufficiently small to be below the detection threshold of human perception.

Gas chromatography-mass spectrometry (GCMS) is a method that combines the features of gas-liquid chromatography and mass spectrometry to separate and identify different substances within a test sample. GCMS can, in some embodiments, be used to evaluate the properties of a consumable. For example volatile chemicals can be isolated from the head space around meat. These chemicals can be identified using GCMS. A profile of the volatile chemicals in the headspace around meat is thereby created. In some instances each peak of the GCMS can be further evaluated. For instance, a human could rate the experience of smelling the chemical responsible for a certain peak. This information could be used to further refine the profile. GCMS could then be used to evaluate the properties of the consumable. The GCMS profile can be used to refine the consumable.

Characteristic flavor and fragrance components are mostly produced during the cooking process by chemical reactions molecules including amino acids, fats and sugars which are found in plants as well as meat. Therefore, in some embodiments, the consumable is tested for similarity to meat during or after cooking. In some embodiments human ratings, human evaluation, olfactometer readings, or GCMS measurements, or combinations thereof, are used to create an olfactory map of cooked meat. Similarly, an olfactory map of the consumable, for instance a meat replica, can be created. These maps can be compared to assess how similar the cooked consumable is to meat. In some embodiments the olfactory map of the consumable during or after cooking is similar to or indistinguishable from that of cooked or cooking meat. In some embodiments the similarity is sufficient to be beyond the detection threshold of human perception. The consumable may be created so its characteristics are similar to a food product after cooking, but the uncooked consumable may be have properties that are different from the predicate food product prior to cooking.

Shelf life is the length of time that consumables are given before they are considered unsuitable for sale, use, or consumption. Generally, it is important to maintain a meat product at about 2° C. as the shelf life decreases with exposure to higher temperatures.

The shelf life of meat is determined through research into the meat products' sensory cues over time (odor, visual appearance of the package, color, taste and texture), and through laboratory analysis under controlled conditions to determine how long a product remains safe, wholesome and enjoyable. Ground beef is being used as an example, but similar conditions would apply to steaks, chops and roasts from other meat types. Beef in its natural state is dark bluish-purple. However, oxygen can permeate into the meat and cause a chemical reaction with the myoglobin in meat, leading to a red color. Ongoing exposure to oxygen causes oxidation of myoglobin and causes red meat to become brown and develop "off" flavors. To control this oxidation, there has been significant research into different methods of storing and displaying meat products to increase the shelf life of meat products. These include the use of vacuum packing, modified atmosphere packing (high oxygen), modified atmosphere packaging (low oxygen with carbon monoxide), and/or High Pressure Pasteurization (HPP).

The main determinant of the color of meat is the concentration of iron carrying proteins in the meat. In the skeletal muscle component of meat products, one of the main iron-carrying proteins is myoglobin. It is estimated that the white meat of chicken has under 0.05% myoglobin; pork and veal have 0.1-0.3% myoglobin; young beef has 0.4-1.0% myoglobin; and old beef has 1.5-2.0% myoglobin. Normally, myoglobin in meat exists in three states: Oxymyoglobin ($Fe^{2+}$) (oxygenated=bright red); myoglobin ($Fe^{2+}$) (non-oxygenated=purplish/magenta); and metmyoglobin ($Fe^{3+}$) (oxidized=brown). The transition of oxymyoglobin to metmyoglobin in the presence of oxygen is thought to be the cause of the color change of ground meat from red to brown. Meat shelf life extenders have been developed to extend the lifetime of the red color of meat products including but not limited to carbon monoxide, nitrites, sodium metabisulfite, Bombal, vitamin E, rosemary extract, green tea extract, catechins and other anti-oxidants.

However an intrinsically more stable heme protein such a hemoglobin isolated from *Aquifex aeolicus* (SEQ ID NO:3) or *Methylacidiphilum infernorum* (SEQ ID NO: 2) will oxidize more slowly than a mesophilic hemoglobin such as myoglobin. The heme proteins described herein (see, e.g., FIG. 1) also may have the lifetime of the reduced heme-$Fe^{2+}$ state extended by meat shelf life extenders such as carbon monoxide and sodium nitrite. Heme proteins may be selected for the desired color retention properties. For example for low temperature sous-vide cooking, a relatively unstable heme protein such as one from *Hordeum vulgare* may provide a brown product that appears cooked under conditions wherein myoglobin would retain its red, uncooked appearance. In some embodiments the heme protein may be selected to have increased stability where for example the meat replica may retain an attractive medium rare appearance despite being thoroughly cooked for food safety.

The main determinant of rancidity and production of off flavors or off odors is the oxidation of components of the consumable, including but not limited to, the fats. For example, oxidation of unsaturated fatty acids is a known cause of rancid odors. In some embodiments, meat replicas have extended shelf life because the makeup of the chemical properties of the meat replica are controlled such that the taste, texture, smell, and chemical properties do not react with oxygen to create off flavors or off odors. In some embodiments the meat replicas are less sensitive to oxidation due to the presence of higher degree of unsaturated fatty acids than present in beef. In some embodiments the meat replica contains no unsaturated fatty acids. In other embodiments the meat replica contains higher levels of anti-oxidants such as glutathione, vitamin C, vitamin A, and vitamin E as well as enzymes such as catalase, superoxide dismutase and various peroxidases than are present in meat. In other embodiments, off flavor or off odor generating components such as lipoxygenase are not present.

In some embodiments, a consumable described herein shows increased stability under commercial packaging conditions. In some embodiments, the improved shelf life is improved by using components with increased oxidative stability such as lipids with reduced levels of unsaturated fatty acids, and/or by using a more stable heme protein such a hemoglobin isolated from *Aquifex aeolicus* (SEQ ID NO:3) or *Methylacidiphilum infernorum* (SEQ ID NO: 2). In some embodiments, the improved shelf life is due to the combination of components used in the consumable. In some embodiments, the consumable is designed specifically for the desired packaging method.

III. Composition of the Consumables

A consumable described herein includes one or more isolated and purified proteins. "Isolated and purified protein" refers to a preparation in which the cumulative abundance by mass of protein components other than the specified protein, which can be a single monomeric or multimeric protein species, is reduced by a factor of 2 or more, 3 or more, 5 or more, 10 or more, 20 or more, 50 or more, 100 or more or 1000 or more relative to the source material from which the specified protein was isolated. For clarity, the isolated and purified protein is described as isolated and purified relative to its starting material (e.g., plants or other non-animal sources). In some embodiments, the term "isolated and purified" can indicate that the preparation of the protein is at least 60% pure, e.g., greater than 65%, 70%, 75%, 80%, 85%, 90%, 95%, or 99% pure. The fact that a consumable may comprise materials in addition to the isolated and purified protein does not change the isolated and purified nature of the protein as this definition typically applies to the protein before addition to the composition.

In some embodiments, the one or more isolated and purified proteins accounts for at least 1%, at least 5%, at least 10%, at least 20%, at least 30%, at least 40%, or at least 50% of the protein content of the consumable by weight. In some embodiments, each of the one or more isolated proteins is isolated and purified separately.

A consumable described herein may be substantially or entirely composed of ingredients derived from non-animal sources, e.g., plant, fungal, or microbial based sources. The plant sources can be organically grown sources. Proteins can be extracted from the source material (e.g., extracted from animal tissue, or plant, fungal, algal, or bacterial biomass, or from the culture supernatant for secreted proteins) or from a combination of source materials (e.g., multiple plant species). The consumables also can be made from a combination of plant based and animal based sources. For instance, the consumable may be a ground beef product supplemented with plant based products of the invention.

A. Sources of Components of the Consumable

As described above, isolated and purified proteins can be derived from non-animal sources such as plants, algae, fungi (e.g., yeast or filamentous fungi), bacteria, or Archaea. In some embodiments, the isolated and purified proteins can be obtained from genetically modified organisms such as genetically modified bacteria or yeast. In some embodiments, the isolated and purified proteins are chemically synthesized or obtained via in vitro synthesis.

In some embodiments, the one or more isolated and purified proteins are derived from plant sources. The isolated and purified proteins can be isolated from a single plant source or, alternatively, multiple plant sources can serve as the starting material for the isolation and purification of proteins. As described herein, isolated and purified plant proteins are soluble in solution. The solution can comprise EDTA (0-0.1M), NaCl (0-1M), KCl (0-1M), $NaSO_4$ (0-0.2M), potassium phosphate (0-1M), sodium citrate (0-1M), sodium carbonate (0-1M), sucrose (0-50%), Urea (0-2M) or any combination thereof. The solution can have a pH of 3 to 11. In some embodiments, plant proteins can have a solubility in a solution of >25 g/L (e.g., at least 25, 30, 35, 40, 45, 50, 75, 100, 125, 150, 175, 200, or 225 g/L) at a temperature between about 2° C. and about 32° C. (e.g., between 3° C. and 8° C., 10° C. and 25° C., or 18° C. and 25° C.), wherein the solution has a pH between 3 and 8 (e.g., pH of 3-6, 4, 4.5, 5, 5.5, 6, 6.5, 7, 7.5, or 8), and has a sodium chloride content of 0 to 300 mM (e.g., 50, 100, 150, 200, 250, or 300 mM). In some embodiments, the isolated and purified proteins are soluble in solution at greater than 10, 15, 20, 25, 50, 100, 150, 200, or 250 g/L.

One of skill in the art will understand that proteins that can be isolated from any organism in the plant kingdom may be used to produce the consumables described herein. Non-limiting examples of plant sources include grain crops such as, e.g., maize, oats, rice, wheat, barley, rye, millet, sorghum, buckwheat, amaranth, *quinoa*, triticale (a wheat rye hybrid), teff (*Eragrostis tef*); oilseed crops including cottonseed, sunflower seed, safflower seed, *Crambe, Camelina*, mustard, rapeseed (*Brassica napus*); Acacia, or plants from the legume family, such as, e.g., clover, *Stylosanthes, Sesbania*, vetch (*Vicia*), *Arachis, Indigofera, Leucaena, Cyamopsis*, peas such as cowpeas, english peas, yellow peas, or green peas, or beans such as, e.g., soybeans, fava beans, lima beans, kidney beans, garbanzo beans, mung beans, pinto beans, lentils, lupins, mesquite, carob, soy, and peanuts (*Arachis hypogaea*); leafy greens such as, e.g., lettuce, spinach, kale, collard greens, turnip greens, chard, mustard greens, dandelion greens, broccoli, or cabbage; or green matter not ordinarily consumed by humans, including biomass crops such as switchgrass (*Panicum virgatum*), *Miscanthus, Arundo donax*, energy cane, Sorghum, or other grasses, alfalfa, corn stover, kelp or other seaweeds, green matter ordinarily discarded from harvested plants, sugar cane leaves, leaves of trees, root crops such as cassava, sweet potato, potato, carrots, beets, or turnips; or coconut.

Protein can be isolated from any portion of the plant, including the roots, stems, leaves, flowers, or seeds. For example, ribulose-1,5-bisphosphate carboxylase/oxygenase (RuBisCo) can be isolated from, for example, alfalfa, carrot tops, corn stover, sugar cane leaves, soybean leaves, switchgrass, *Miscanthus*, energy cane, *Arundo donax*, seaweed, kelp, algae or mustard greens.

Proteins that are abundant in plants can be isolated in large quantities from one or more source plants and thus are an economical choice for use in any of compositions provided herein (e.g., the muscle, fat, or connective tissue replicas, meat substitute products or others). Accordingly, in some embodiments, the one or more isolated and purified proteins comprise an abundant protein found in high levels in a plant and capable of being isolated and purified in large quantities. In some embodiments, the abundant protein comprises about 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, or 70% of the total protein content of the source plant material. In some embodiments, the abundant protein comprises about 0.5-10%, about 5-40%, about 10-50%, about 20-60%, or about 30-70% of the total protein content of the source plant material. In some embodiments, the abundant protein comprises about 0.5%, 1%, 2%, 3%, 4%, 5%, 6%, 7%, 8%, 9%, 10%, 15%, 20%, 25%, 30%, 35%, 40%, 45%, or 50% of the total weight of the dry matter of the source plant material. In some embodiments, the abundant protein comprises about 0.5-5%, about 1-10%, about 5-20%, about 10-30%, about 15-40%, or about 20-50% of the total weight of the dry matter of the source plant material.

The one or more isolated and purified proteins can comprise an abundant protein that is found in high levels in the leaves of plants. In some embodiments, the abundant protein comprises about 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, or 80% of the total protein content of the leaves of the source plant. In some embodiments, the abundant protein comprises about 0.5-10%, about 5%-40%, about 10%-60%, about 20%-60%, or about 30-70% of the total protein content of the leaves of the source plant. In some embodiments, the one or more isolated proteins comprise RuBisCo, which is a particularly useful protein for meat replicas because of its high solubility and an amino acid composition that is close to the optimum proportions of essential amino acids for human nutrition. In particular embodiments, the one or more isolated proteins comprise ribulose-1,5-bisphosphate carboxylase oxygenase activase (RuBisCo activase). In some embodiments, the one or more isolated and purified proteins comprise a vegetative storage protein (VSP).

The one or more isolated proteins can comprise an abundant protein that is found in high levels in the seeds of plants. In some embodiments, the abundant protein comprises about 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85% or 90% or more of the total protein content of the seeds of the source plant. In some embodiments, the abundant protein comprises about 0.5-10%, about 5%-40%, about 10%-60%, about 20%-60%, or about 30-70% or >70% of the total protein content of the seeds of the source plant. Non-limiting examples of proteins found in high levels in the seeds of plants include seed storage proteins, e.g., albumins, glycinins, conglycinins, legumins, globulins, vicilins, conalbumin, gliadin, glutelin, gluten, glutenin, hordein, prolamins, phaseolin (protein), proteinoplast, secalin, triticeae gluten, or zein, or oil body proteins such as oleosins, caloleosins, or steroleosins.

The one or more isolated and purified proteins can include highly soluble proteins such as dehydrins, hydrophilins, natively unfolded proteins (also referred to as intrinsically disordered proteins), or other proteins of the late-embryogenesis abundant (LEA) family. LEA proteins have been found in animals, plants and microorganisms and are thought to act as osmoprotectants and stress response proteins. See, e.g., Battaglia, et al., *Plant Physiol.*, 148:6-24 (2008). Such proteins also are heat stable. Such LEA proteins can have a solubility in a solution of at least 1 g/L (e.g., 2, 4, 6, 8, 10, 15, 20, 25, 50, 100, 150, 200, or 250 g/L) at a temperature of between 90° C. and 110° C. (e.g., between 95° C. and 105° C., 95° C., or 100° C.), wherein the solution has a pH between 5 and 8 (e.g., pH of 5, 5.5, 6, 6.5, 7, 7.5, or 8) and has a sodium chloride content of 0 to 300 mM (e.g., 50, 100, 150, 200, 250, or 300 mM). In some cases, the LEA proteins may be isolated by heating a protein extract to 90° C.-110° C. (e.g., 95° C. or 100°) and, after centrifugation or filtration of insoluble material, concentrating the LEA protein fraction by, for example, ultrafiltration. In some cases, isoionic pH precipitation, trichloroacetic acid precipitation, and/or ammonium sulfate precipitation steps can be done before or after the heating step to additionally remove non-LEA proteins. Heating the solution to 90° C.-110° C. denatures most proteins, allows the majority of the proteins to be removed from solution.

B. Proteins

Without being bound by theory, it is believed that by isolating and purifying non-animal proteins (e.g., plant proteins), consumables can be made with greater consistency and greater control over the properties of the consumable. In some embodiments, about 0.1%, 0.2%, 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 99% or more of the protein component of the consumable is comprised of one or more isolated and purified proteins. The isolated and purified protein may be greater than 60%, 70%, 80%, 85%, 90%, 95%, 99% or 100% pure.

The isolated and purified proteins can be isolated from one or more other components of a non-animal source. For example, a protein fraction may be isolated from an isolate of a plant. The isolated proteins may in some cases be purified, wherein a certain kind of protein is separated from other components found in the non-animal source. Proteins can be separated on the basis of their molecular weight, for example, by size exclusion chromatography, ultrafiltration through membranes, or density centrifugation. In some embodiments, the proteins can be separated based on their surface charge, for example, by isoelectric precipitation, anion exchange chromatography, or cation exchange chromatography. Proteins also can be separated on the basis of their solubility, for example, by ammonium sulfate precipitation, isoelectric precipitation, surfactants, detergents or solvent extraction. Proteins also can be separated by their affinity to another molecule, using, for example, hydrophobic interaction chromatography, reactive dyes, or hydroxyapatite. Affinity chromatography also can include using antibodies having specific binding affinity for the protein of interest, nickel NTA for His-tagged recombinant proteins, lectins to bind to sugar moieties on a glycoprotein, or other molecules which specifically binds the protein of interest.

Isolating proteins allows for the elimination of unwanted material. In some embodiments, an isolated and purified protein is a protein that has been substantially separated from unwanted material (e.g., nucleic acids such as RNA and DNA, lipid membranes, phospholipids, fats, oils, carbohydrates such as starch, cellulose, and glucans, phenolic compounds, polyphenolic compounds, aromatic compounds, or pigments) in the seeds, leaves, stems, or other portion of the plant.

The isolated and purified proteins also can be recombinantly produced using polypeptide expression techniques (e.g., heterologous expression techniques using bacterial cells, insect cells, fungal cells such as yeast cells, plant cells, or mammalian cells). In some cases, standard polypeptide synthesis techniques (e.g., liquid-phase polypeptide synthesis techniques or solid-phase polypeptide synthesis techniques) can be used to produce proteins synthetically. In some cases, cell-free translation techniques can be used to produce proteins synthetically.

The protein or proteins incorporated into the consumable can serve a nutritional function. In some instance, the protein also serves to alter the properties of the consumable, e.g., the flavor, color, odor, and/or texture of the consumable. For example, a meat substitute product can comprise a protein indicator that indicates cooking progression from a raw state to a cooked state, wherein the meat substitute product is derived from non-animal sources.

Examples of proteins that can be isolated and purified, and used in the consumables described herein include ribosomal proteins, actin, hexokinase, lactate dehydrogenase, fructose bisphosphate aldolase, phosphofructokinases, triose phosphate isomerases, phosphoglycerate kinases, phosphoglycerate mutases, enolases, pyruvate kinases, proteases, lipases, amylases, glycoproteins, lectins, mucins, glyceraldehyde-3-phosphate dehydrogenases, pyruvate decarboxylases, actins, translation elongation factors, histones, ribulose-1,5-bisphosphate carboxylase oxygenase (RuBisCo), ribulose-1,5-bisphosphate carboxylase oxygenase activase (RuBisCo activase), albumins, glycinins, conglycinins, globulins, vicilins, conalbumin, gliadin, glutelin, gluten, glutenin, hordein, prolamin, phaseolin (protein), proteinoplast, secalin, extensins, triticeae gluten, collagens, zein, kafirin, avenin, dehydrins, hydrophilins, late embyogenesis abundant proteins, natively unfolded proteins, any seed storage protein, oleosins, caloleosins, steroleosins or other oil body proteins, vegetative storage protein A, vegetative storage protein B, moong seed storage 8S globulin, globulin, pea globulins, and pea albumins.

In some embodiments, an isolated and purified protein can be a protein that interacts with lipids and helps to stabilize lipids in a structure, a protein that binds lipids and helps crosslink lipid structures, or a protein that binds lipids and helps crosslink lipid structures and non-lipid interacting proteins. Without wishing to be bound by a particular theory, using such proteins in a consumable described herein may improve the integration of lipids and/or fat replicas with other components of the meat substitute product, resulting in improved mouthfeel and texture of the final product. A non-limiting example of a lipid-interacting plant protein includes proteins in the oleosin family. Oleosins are lipid-interacting proteins that are found in oil bodies of plants. Other non-limiting examples of plant proteins that can interact with lipids and stabilize emulsions include seed storage proteins from Great Northern beans, albumins from peas, globulins from peas, 8S globulins from moong bean, 8S globulins from Kidney bean, prolamin and lipid transfer proteins.

In some embodiments, one or more of the isolated and purified proteins can be an iron-carrying protein such as a heme-containing protein. As used herein, the term "heme containing protein" can be used interchangeably with "heme containing polypeptide" or "heme protein" or "heme polypeptide" and includes any polypeptide that can covalently or noncovalently bind a heme moiety. In some embodiments, the heme-containing polypeptide is a globin and can include a globin fold, which comprises a series of seven to nine alpha helices. Globin type proteins can be of any class (e.g., class I, class II, or class III), and in some embodiments, can transport or store oxygen. For example, a heme-containing protein can be a non-symbiotic type of hemoglobin or a leghemoglobin. A heme-containing polypeptide can be a monomer, i.e., a single polypeptide chain, or can be a dimer, a trimer, tetramer, and/or higher order oligomers. The lifetime of the oxygenated Fe' state of a heme-containing protein can be similar to that of myoglobin or can exceed it by 10%, 20%, 30% 50%, 100% or more under conditions in which the heme-protein-containing consumable is manufactured, stored, handled or prepared for consumption. The life-time of the unoxygenated $Fe^{2+}$ state of a heme-containing protein can be similar to that of myoglobin or can exceed it by 10%, 20%, 30% 50%, 100% or more under conditions in which the heme-protein-containing consumable is manufactured, stored, handled or prepared for consumption Non-limiting examples of heme-containing polypeptides can include an androglobin, a cytoglobin, a globin E, a globin X, a globin Y, a hemoglobin, a leghemoglobin, a flavohemoglobin, Hell's gate globin I, a myoglobin, an erythrocruorin, a beta hemoglobin, an alpha hemoglobin, a protoglobin, a cyanoglobin, a cytoglobin, a histoglobin, a neuroglobins, a chlorocruorin, a truncated hemoglobin (e.g., HbN or HbO), a truncated 2/2 globin, a hemoglobin 3 (e.g., Glb3), a cytochrome, or a peroxidase.

Heme-containing proteins that can be used in the consumables described herein can be from mammals (e.g., farms animals such as cows, goats, sheep, horses, pigs, ox, or rabbits), birds, plants, algae, fungi (e.g., yeast or filamentous fungi), ciliates, or bacteria. For example, a heme-containing protein can be from a mammal such as a farm animal (e.g., a cow, goat, sheep, pig, ox, or rabbit) or a bird such as a turkey or chicken. Heme-containing proteins can be from a plant such as *Nicotiana tabacum* or *Nicotiana sylvestris* (tobacco); *Zea mays* (corn), *Arabidopsis thaliana*, a legume such as *Glycine max* (soybean), *Cicer arietinum* (garbanzo or chick pea), *Pisum sativum* (pea) varieties such as garden peas or sugar snap peas, *Phaseolus vulgaris* varieties of common beans such as green beans, black beans, navy beans, northern beans, or pinto beans, *Vigna unguiculata* varieties (cow peas), *Vigna radiata* (Mung beans), *Lupinus albus* (lupin), or *Medicago sativa* (alfalfa); *Brassica napus* (canola); *Triticum* sps. (wheat, including wheat berries, and spelt); *Gossypium hirsutum* (cotton); *Oryza sativa* (rice); *Zizania* sps. (wild rice); *Helianthus annuus* (sunflower); *Beta vulgaris* (sugarbeet); *Pennisetum glaucum* (pearl millet); *Chenopodium* sp. (*quinoa*); *Sesamum* sp. (sesame); *Linum usitatissimum* (flax); or *Hordeum vulgare* (barley). Heme-containing proteins can be isolated from fungi such as *Saccharomyces cerevisiae, Pichia pastoris, Magnaporthe oryzae, Fusarium graminearum*, or *Fusarium oxysporum*. Heme-containing proteins can be isolated from bacteria such as *Escherichia coli, Bacillus subtilis, Bacillus megaterium, Synechocistis* sp., *Aquifex aeolicus, Methylacidiphilum infernorum*, or thermophilic bacteria (e.g, that grow at temperatures greater than 45° C.) such as *Thermophilus*. Heme-containing proteins can be isolated from algae such as *Chlamydomonas eugametos*. Heme-containing proteins can be isolated from protozoans such as *Paramecium caudatum* or *Tetrahymena pyriformis*. In some embodiments, the bacterial hemoglobins are selected from the group consisting of *Aquifex aeolicus, Thermobifida fusca, Methylacidiphilum infernorum* (Hells Gate), *Synechocystis* SP, or *Bacillus subtilis*. The sequences and structure of numerous heme-containing proteins are known. See for example, Reedy, et al., *Nucleic Acids Research*, 2008, Vol. 36, Database issue D307-D313 and the Heme Protein Database available on the world wide web at http://hemeprotein.info/heme.php.

For example, a non-symbiotic hemoglobin can be from a plant selected from the group consisting of soybean, sprouted soybean, alfalfa, golden flax, black bean, black eyed pea, northern, garbanzo, moong bean, cowpeas, pinto beans, pod peas, dried peas, *quinoa*, sesame, sunflower, wheat berries, spelt, barley, wild rice, or rice.

Any of the heme-containing proteins described herein that can be used for producing consumables can have at least 70% (e.g., at least 75%, 80%, 85%, 90%, 95%, 97%, 98%, 99%, or 100%) sequence identity to the amino acid sequence of the corresponding wild-type heme-containing protein or fragments thereof that contain a heme-binding motif. For example, a heme-containing protein can have at least 70% sequence identity to an amino acid sequence set forth in FIG. 1, including a non-symbiotic hemoglobin such as that from *Vigna radiata* (SEQ ID NO:1), *Hordeum vulgare* (SEQ ID NO:5), *Zea mays* (SEQ ID NO:13), *Oryza sativa* subsp. *japonica* (rice) (SEQ ID NO:14), or *Arabidopsis thaliana* (SEQ ID NO:15), a Hell's gate globin I such as that from *Methylacidiphilum infernorum* (SEQ ID NO:2), a flavohemoprotein such as that from *Aquifex aeolicus* (SEQ ID NO:3), a leghemoglobin such as that from *Glycine max* (SEQ ID NO:4), *Pisum sativum* (SEQ ID NO:16), or *Vigna unguiculata* (SEQ ID NO:17), a heme-dependent peroxidase such as from *Magnaporthe oryzae*, (SEQ ID NO:6) or *Fusarium oxysporum* (SEQ ID NO:7), a cytochrome c peroxidase from *Fusarium graminearum* (SEQ ID NO:8), a truncated hemoglobin from *Chlamydomonas moewusii* (SEQ ID NO:9), *Tetrahymena pyriformis* (SEQ ID NO:10, group I truncated), *Paramecium caudatum* (SEQ ID NO:11, group I truncated), a hemoglobin from *Aspergillus niger* (SEQ ID NO:12), or a mammalian myoglobin protein such as the *Bos taurus* (SEQ ID NO:18) myoglobin, *Sus scrofa* (SEQ ID NO:19) myoglobin, or *Equus caballus* (SEQ ID NO:20) myoglobin, a heme-protein from *Nicotiana benthamiana* (SEQ ID NO:21), *Bacillus subtilis* (SEQ ID NO:22), *Corynebacterium glutamicum* (SEQ ID NO:23), *Synechocystis* PCC6803 (SEQ ID NO:24), *Synechococcus* sp. PCC 7335 (SEQ ID NO:25), *Nostoc commune* (SEQ ID NO:26), or *Bacillus megaterium* (SEQ ID NO:27). See FIG. 1.

The percent identity between two amino acid sequences can be determined as follows. First, the amino acid sequences are aligned using the BLAST 2 Sequences (Bl2seq) program from the stand-alone version of BLASTZ containing BLASTP version 2.0.14. This stand-alone version of BLASTZ can be obtained from Fish & Richardson's web site (e.g., www.fr.com/blast/) or the U.S. government's National Center for Biotechnology Information web site (www.ncbi.nlm.nih.gov). Instructions explaining how to use the Bl2seq program can be found in the readme file accompanying BLASTZ. Bl2seq performs a comparison between two amino acid sequences using the BLASTP algorithm. To compare two amino acid sequences, the options of Bl2seq are set as follows: -i is set to a file containing the first amino acid sequence to be compared (e.g., C:\seq1.txt); -j is set to a file containing the second amino acid sequence to be compared (e.g., C:\seq2.txt); -p is set to blastp; -o is set to any desired file name (e.g., C:\output.txt); and all other options are left at their default setting. For example, the following command can be used to generate an output file containing a comparison between two amino acid sequences: C:\Bl2seq c:\seq1.txt -j c:\seq2.txt -p blastp -o c:\output.txt. If the two compared sequences share homology, then the designated output file will present those regions of homology as aligned sequences. If the two compared sequences do not share homology, then the designated output file will not present aligned sequences. Similar procedures can be following for nucleic acid sequences except that blastn is used.

Once aligned, the number of matches is determined by counting the number of positions where an identical amino acid residue is presented in both sequences. The percent identity is determined by dividing the number of matches by the length of the full-length polypeptide amino acid sequence followed by multiplying the resulting value by 100. It is noted that the percent identity value is rounded to the nearest tenth. For example, 78.11, 78.12, 78.13, and 78.14 is rounded down to 78.1, while 78.15, 78.16, 78.17, 78.18, and 78.19 is rounded up to 78.2. It also is noted that the length value will always be an integer.

It will be appreciated that a number of nucleic acids can encode a polypeptide having a particular amino acid sequence. The degeneracy of the genetic code is well known to the art; i.e., for many amino acids, there is more than one nucleotide triplet that serves as the codon for the amino acid. For example, codons in the coding sequence for a given enzyme can be modified such that optimal expression in a particular species (e.g., bacteria or fungus) is obtained, using appropriate codon bias tables for that species.

Heme-containing proteins can be extracted from the source material (e.g., extracted from animal tissue, or plant, fungal, algal, or bacterial biomass, or from the culture supernatant for secreted proteins) or from a combination of source materials (e.g., multiple plant species). Leghemoglobin is readily available as an unused by-product of commodity legume crops (e.g., soybean, alfalfa, or pea). The amount of leghemoglobin in the roots of these crops in the United States exceeds the myoglobin content of all the red meat consumed in the United States.

In some embodiments, extracts of heme-containing proteins include one or more non-heme-containing proteins from the source material (e.g., other animal, plant, fungal, algal, or bacterial proteins) or from a combination of source materials (e.g., different animal, plant, fungi, algae, or bacteria).

In some embodiments, heme-containing proteins are isolated and purified from other components of the source material (e.g., other animal, plant, fungal, algal, or bacterial proteins) using techniques described above. As used herein, the term "isolated and purified" indicates that the preparation of heme-containing protein is at least 60% pure, e.g., greater than 65%, 70%, 75%, 80%, 85%, 90%, 95%, or 99% pure.

Heme-containing proteins also can be recombinantly produced using polypeptide expression techniques (e.g., heterologous expression techniques using bacterial cells, insect cells, algal cells, fungal cells such as yeast cells, plant cells, or mammalian cells). For example, the heme-containing protein can be expressed in *E. coli* cells. The heme-containing proteins can be tagged with a heterologous amino acid sequence such as FLAG, polyhistidine (e.g., hexahistidine, HIS tag), hemagluttinin (HA), glutathione-S-transferase (GST), or maltose-binding protein (MBP) to aid in purifying the protein. In some embodiments, a recombinant heme containing protein including a HIS-tag and a protease (e.g., TEV) site to allow cleavage of the HIS-tag, can be expressed in *E. coli* and purified using His-tag affinity chromatography (Talon resin, CloneTech). In some cases, standard polypeptide synthesis techniques (e.g., liquid-phase polypeptide synthesis techniques or solid-phase polypeptide synthesis techniques) can be used to produce heme-containing proteins synthetically. In some cases, cell-free translation techniques can be used to produce heme-containing proteins synthetically.

In some embodiments, the isolated and purified protein is substantially in its native fold and water soluble. In some embodiments, the isolated and purified protein is more than 50, 60, 70, 80, or 90% in its native fold. In some embodiments, the isolated and purified protein is more than 50, 60, 70, 80, or 90% water soluble.

The proteins used in the consumable can be altered (e.g., hydrolyzed, cleaved, crosslinked, denatured, polymerized, extruded, electrospun, spray dried or lyophilized, or derivatized or chemically modified). For example, the proteins can be modified by covalent attaching sugars, lipids, cofactors, peptides, or other chemical groups including phosphate, acetate, methyl, and other natural or unnatural molecule. For example, the peptide backbones of the proteins can be cleaved by exposure to acid or proteases or other means. For example, the proteins can be denatured, i.e., their secondary, tertiary, or quaternary structure can be altered, by exposure to heat or cold, changes in pH, exposure to denaturing agents such as detergents, urea, or other chaotropic agents, or mechanical stress including shear. The alignment of proteins in a solution, colloid, or a solid assembly can be controlled to affect the mechanical properties including tensile strength, elasticity, deformability, hardness, or hydrophobicity.

Proteins also can be assembled into fibers that can form a matrix for a structure for the compositions. A 3-dimensional matrix of protein fibers can, for example, contain chemicals that promote formation of inter-molecular disulfide crosslinks (mixed glutathione, dithiothreitol (DTT), beta-mercaptoethanol (BME)). In some embodiments, the chemicals are proteins (thioredoxin, glutaredoxin). In some embodiments, the proteins are enzymes (disulfide isomerase). In some embodiments, fibers are crosslinked by chemical crosslinkers with two reactive groups selected from the group consisting of N-hydroxysuccinimide (NHS) esters, imidoesters, aryl fluorides, aldehydes, maleimides, pyridyldithiols, haloacetyls, aryl azides, diazirines, carbodiimides, hydrazides and isocyanates.

In some embodiments, coacervates comprising one or more plant proteins can be formed and used, for example, as binding agents in meat or other replicas. Coacervation is the process during which a homogeneous solution of charged polymers undergoes a phase separation to result in a polymer-rich dense phase (the 'coacervate') and a solvent-rich phase (supernatant). Protein-polysaccharide coacervates have been used in the development of biomaterials. See, for example, Boral and Bohidar (2010) *Journal of Physical Chemistry B*. Vol 114 (37): 12027-35; and Liu et al., (2010) *Journal of Agricultural and Food Chemistry, Vol* 58:552-556. Formation of such coacervates is driven by associative interactions between oppositely charged polymers. However, as described herein, coacervates can be formed using proteins (e.g., plant proteins comprise one or more pea proteins, chickpea proteins, lentil proteins, lupine proteins, other legume proteins, or mixtures thereof). In general, a coacervate can be formed by acidifying a low ionic strength solution (e.g., a buffered solution at or below 100 mM sodium chloride) comprising one or more isolated and purified plant proteins such as pea legumins or vicilins (e.g., a vicilin fraction comprising convicilins), a combination of both vicilins and legumins, or unfractionated pea proteins to a pH of 3.5 to 5.5. (e.g., pH 4 to 5). Under these conditions, the proteins separate out of solution and the mixture can be centrifuged to cleanly separate out the coacervate. This coavervate, unlike a precipitate, is a viscous material that can be stretched by pulling and that melts on heating. The process can be carried out in the presence of oils (up to 70%, e.g., palm or other oil), to form a creamy material. By varying the composition of the solution (ratio of vicilin: legumin, type and amount of oil used), the binding properties of the coacervate can be tuned as desired. In some embodiments, one or more gums (e.g., acacia gum or xanthan gum) can be used to form a coacervate. Coacervates can be used as binding agents in beef patty replicas to bind and hold together the adipose-, muscle- and connective tissue replicas.

Binding materials with different adhesive and cooking characteristics can be prepared by combining wheat gluten (0-20%) and pea protein fractions (0-50%) in the presence of a plasticizer such as glycerol (0-30%) or polyethylene glycol. Leghemoglobin or other heme-containing protein can be added to the mixture if necessary. Upon mixing to remove any clumps, the material may be incorporated into beef patty replicas.

In some embodiments, proteins can be subjected to freeze alignment to texturize the proteins without extrusion. The method involves slow freezing of protein comprising materials to allow for formation of ice crystals. When cooled from one side, ice crystals form preferentially in a direction perpendicular to the cooled side. After freezing, the ice can be removed from the material in a freeze-dryer, leaving behind material with several layers. The structure can then be stabilized by heating under pressurized, moist conditions to produce a material that can be used in meat replicas. Freeze-alignment of soy proteins has been described by Lugay and Kim (1981) (see Freeze alignment: A novel method for protein texturization. Page 177-187, Chapter 8 in: D. W. Stanley, E. D. Murray and D. H. Lees eds. 1981. Utilization of Protein Resources. Westport, Conn.: Food & Nutrition Press, Inc). The freeze-aligned proteins can be subjected to further processing (by soaking in solutions comprising beef flavors and/or leghemoglobin) and used in combination with adipose- and connective-tissue replicas to form beef replicas. The replicas may also be used as structures around which cold-set gels (comprising, for example, pea proteins and myoglobin) or crosslinked gels (comprising, for example, pea proteins and leghemoglobin) can be formed prior to their combination with adipose- and connective-tissues.

C. Lipids

Consumables described herein can include a lipid component. Lipids can be isolated and/or purified and can be in the form of triglycerides, monoglycerides, diglycerides, free fatty acids, sphingosides, glycolipids, phospholipids, or oils, or assemblies of such lipids (e.g., membranes, lecithin, lysolecithin, or fat droplets containing a small amount of lipid in a bulk water phase). In some embodiments, the lipid sources are oils obtained from non-animal sources (e.g., oils obtained from plants, algae, fungi such as yeast or filamentous fungi, seaweed, bacteria, or Archae), including genetically engineered bacteria, algae, archaea or fungi. Non-limiting examples of plant oils include corn oil, olive oil, soy oil, peanut oil, walnut oil, almond oil, sesame oil, cottonseed oil, rapeseed oil, canola oil, safflower oil, sunflower oil, flax seed oil, palm oil, palm kernel oil, coconut oil, babassu oil, shea butter, mango butter, cocoa butter, wheat germ oil, or rice bran oil; or margarine. The oils can be hydrogenated (e.g., a hydrogenated vegetable oil) or non-hydrogenated.

In some embodiments, the lipid can be triglycerides, monoglycerides, diglycerides, free fatty acids, sphingosides, glycolipids, lecithin, lysolecithin, phospholipids such as phosphatidic acids, lysophosphatidic acids, phosphatidyl cholines, phosphatidyl inositols, phosphatidyl ethanolamines, or phosphatidyl serines; sphingolipids such as sphingomyelins or ceramides; sterols such as stigmasterol, sitosterol, campesterol, brassicasterol, sitostanol, campestanol, ergosterol, zymosterol, fecosterol, dinosterol, lanosterol, cholesterol, or episterol; lipid amides, such as N-palmitoyl proline, N-stearoyl glycine, N-palmitoyl glycine, N-arachidonoyl glycine, N-palmitoyl taurine, N-arachidonoyl histidine, or anandamide; free fatty acids such as palmitoleic acid, palmitic acid, myristic acid, lauric acid, myristoleic acid, caproic acid, capric acid, caprylic acid, pelargonic acid, undecanoic acid, linoleic acid (C18:2), eicosanoic acid (C22:0), arachidonic acid (C20:4), eicosapentanoic acid (C20:5), docosapentaenoic acid (C22:5), docosahexanoic acid (C22:6), erucic acid (C22:1), conjugated linoleic acid, linolenic acid (C18:3), oleic acid (C18: 1), elaidic acid (trans isomer of oleic acid), trans-vaccenic acid (C18:1 trans 11), or conjugated oleic acid; or esters of such fatty acids, including monoacylglyceride esters, diacylglyceride esters, and triacylglyceride esters of such fatty acids.

The lipids can comprise phospholipids, lipid amides, sterols or neutral lipids. The phospholipids can comprise a plurality of amphipathic molecules comprising fatty acids (e.g., see above), glycerol and polar groups. In some embodiments, the polar groups are, for example, choline, ethanolamine, serine, phosphate, glycerol-3-phosphate, inositol or inositol phosphates. In some embodiments, the lipids are, for example, sphingolipids, ceramides, sphingomyelins, cerebrosides, gangliosides, ether lipids, plasmalogens or pegylated lipids.

In some embodiments, the lipids used in the consumable are the cream fraction created from seeds, nuts, and legumes, including but not limited to sunflower seeds, safflower seeds, sesame seeds, rape seeds, almonds, macadamia, grapefruit, lemon, orange, watermelon, pumpkin, cocoa, coconut, mango, butternut squash, cashews, brazilnuts, chestnuts, hazelnuts, peanuts, pecans, walnuts and pistachios. As used herein, the term "cream fraction" can refer to an isolated emulsion comprising lipids, proteins and water.

To obtain a cream fraction from seeds, nuts, or legumes, one or more of the following steps can be performed. Seeds, nuts or legumes can be blended from 1 minute up to 30 minutes. For example, the seeds, nuts, or legumes can be blended by increasing the speed gradually to maximum speed over 4 minutes, then blending at maximum speed for 1 minute. The seeds, nuts or legumes can be blended in water or solutions that contain all or some of the following: EDTA (0-0.1M), NaCl (0-1M), KCl (0-1M), $NaSO_4$ (0-0.2M), potassium phosphate (0-1M), sodium citrate (0-1M), sodium carbonate (0-1M), and/or sucrose (0-50%), from pH of 3 to 11 to obtain a slurry. The slurry can be heated to 20° C. to 50° C. and centrifuged to obtain the cream fraction (the top layer, also referred to as the "cream"). Further purification of the cream fraction may be achieved by washing the cream fraction with 0.1M to 2M urea solution before re-isolating the cream fraction by centrifugation. The residual liquid (referred to as the "skim" layer) that is a solution comprising proteins in water can also be used.

The "cream" can be used as is, or subjected to further purification steps. For example, washing and heating can remove color and flavor molecules (e.g., unwanted molecules), or unwanted grainy particles to improve the mouth feel and creaminess. In particular, washing with a high pH buffer (pH >9) can remove bitter tasting compounds and improve mouth feel, washing with urea can remove storage proteins, washing below pH 9, followed by washing with a pH above pH 9 can remove unwanted color molecules, and/or washing with salts can decrease taste compounds. Heating can increase the removal of grainy particles, color and flavor compounds. For example, the cream fraction can be heated from 0-24 hours, at temperatures ranging from 25° C. to 80° C. In some embodiments, the resulting creamy fraction comprises seed storage proteins. In some embodiments, the seed storage proteins are substantially removed from the resulting creamy fraction.

D. Fiber

Fiber can be isolated and/or purified for inclusion in the consumables described herein. Fiber can refer to non-starch polysaccharides such as arabinoxylans, cellulose, and other plant components such as resistant starch, resistant dextrins, inulin, lignin, waxes, chitins, pectins, beta-glucans, and oligosaccharides from any plant source.

Fibers can refer to extruded and solution spun proteins as described herein.

E. Sugars

In some embodiments, the consumable also can comprise sugars. For example the consumable can comprise: monosaccharides, including but not limited to glucose (dextrose), fructose (levulose), galactose, mannose, arabinose, xylose (D- or L-xylose), and ribose, disaccharides including but not limited to sucrose, lactose, melibiose, trehalose, cellobiose, or maltose, sugar alcohols such as arabitol, mannitol, dulcitol, or sorbitol, sugar acids such as galacturonate, glucuronate, or gluconate, oligosaccharides and polysaccharides such as glucans, starches such as corn starch, potato starch, pectins such as apple pectin or orange pectin, raffinose, stachyose, or dextrans; plant cell wall degradation products such as salicin, and/or sugar derivatives such as N-acetylglucosamine.

F. Gel Formation

The components of the composition can be formed into a gel. In some embodiments, gels comprise protein, where the protein is derived from non-animal source (e.g., a plant source or other non-animal source such as a genetically modified yeast or bacteria). Gels can be formed using a variety of methods. The protein concentration, enzyme concentration, pH, and/or process temperature will affect the rate of gel formation and quality of the final tissue replica.

Gels can be stabilized entirely by physical cross-links between the components. In some embodiments, gels can be produced by heat/cool cycles, in which case the gel is stabilized by physical interactions (entanglements, hydrophobic interactions) between protein molecules. For example, a gel can be formed by heating a protein solution to a temperature of at least 40° C., 45° C., 50° C., 60° C., 70° C., 80° C., 90° C., or 100° C. and then cooling to room temperature, or to a temperature below 40° C.

In some embodiments, a gel can be formed by subjecting the composition containing the protein and any other components (e.g., a lipid) to high pressure processing.

In some embodiments, gels can be produced by adjusting the pH of the solution. For example, the pH of a concentrated protein solution can be adjusted to near the isoelectric pH of the main protein component by adding hydrochloric acid or other acid, or sodium hydroxide or other base.

In some embodiments, gels can be produced by soaking protein powders in solutions. For example, protein powder can be soaked with at least 1%, 5%, 10%, 20% (wt/v) or more of a concentrated sodium hydroxide solution. In other examples, protein powder can be soaked in mixed water/ethanol solutions.

In some embodiments, a cold set gel is formed to avoid denaturing or the breakdown of any heat-labile components (e.g., oxidizing the iron in a heme moiety or generating undesirable flavors). See, Ju and Kilara A. (1998) *J. Food Science*, Vol 63(2): 288-292; and Maltais et al., (2005) *J. Food Science*, Vol 70 (1): C67-C73) for general methodologies for forming cold set gels. In general, cold set gels are formed by first heat denaturing a protein solution below its minimum gelling concentration (dependent on pH and type of protein, typically <8% (w/v) at pH 6-9 for globular plant proteins such as pea proteins). The protein solution can heated to a temperature above the denaturation temperature of the protein under conditions where it does not precipitate out of solution (e.g., 0-500 mM sodium chloride, pH 6-9). The solution can be cooled back to room temperature or below, and any heat-labile components (e.g., heme-containing proteins and/or oils) can be mixed in when the solution is sufficiently cool, but before gelling. Gelation can be induced by adding sodium chloride or calcium chloride (e.g., 5 to 100 mM), and the solution can be incubated at or below room temperature to allow for gel formation (typically minutes-hours). The resulting gel can be used as-is in meat replicas or processed further (e.g., stabilized) before incorporation in meat replicas.

In some embodiments, gels can comprise or be produced (e.g., stabilized by) at least in part by a cross-linking enzyme. The cross-linking enzyme can be, for example, a transglutaminase, a tyrosinase, a lipoxygenase, a protein disulfide reductase, a protein disulfide isomerase, a sulfhydryl oxidase, a peroxidase, a hexose oxidase, a lysyl oxidase, or an amine oxidase.

In some cases, gels can comprise chemicals that promote formation of inter-molecular disulfide cross-links between the proteins. In some embodiments, the chemicals are proteins (e.g., thioredoxin, glutaredoxin). In some embodiments, the proteins are enzymes (disulfide isomerase).

Gels can be stabilized by chemical crosslinking by chemical cross-linkers with two reactive groups selected from the group consisting of N-hydroxysuccinimide (NHS) esters, imidoesters, aryl fluorides, aldehydes, maleimides, pyridyldithiols, haloacetyls, aryl azides, diazirines, carbodiimides, hydrazides and isocyanates.

In some embodiments, gels can be stabilized by the addition of starches and gums.

In some embodiments, more than one of these approaches are used in combination. For example, a transglutaminase cross-linked gel can be further stabilized by a heat/cool treatment.

G. Muscle Replicas

A large number of meat products comprise a high proportion of skeletal muscle. Accordingly, the present invention provides a composition, which can be derived from non-animal sources which replicates or approximates key features of animal skeletal muscle. A composition derived from non-animal sources, which replicates or approximates animal skeletal muscle can be used as a component of a consumable, for example, a meat replica. Such a composition will be labeled herein as "muscle replica." In some embodiments, the muscle replica and/or meat substitute product comprising the muscle replica are partially derived from animal sources. In some embodiments, the muscle replica and/or meat substitute product comprising the muscle replica are entirely derived from non-animal sources.

The muscle tissue replica can comprise a protein content, wherein the protein content comprises one or more isolated and purified proteins, wherein the muscle tissue replica approximates the taste, texture, or color of an equivalent muscle tissue derived from an animal source.

Many meat products comprise a high proportion of striated skeletal muscle in which individual muscle fibers are organized mainly in an anisotropic fashion. Accordingly, in some embodiments, the muscle replica comprises fibers that are to some extent organized anisotropically. The fibers can comprise a protein component. In some embodiments, the fibers comprise about 1% (wt/wt), about 2%, about 5%, about 10%, about 15%, about 20%, about 30%, about 40%, about 50%, about 60%, about 70%, about 80%, about 90%, about 95%, about 99% (wt/wt) or more of a protein component.

The connective tissue component of skeletal muscle substantially contributes to texture, mouth feel and cooking behavior of meat products. Connective tissue is composed of protein (collagen, elastin) fibers in the range of 0.1-20 microns. In some embodiments, a mixture of fibers of diameters of <1-10 microns, and 10-300 microns is produced to replicate the fiber composition of animal connective tissue. In some embodiments, the 3-dimensional matrix of fibers is stabilized by protein crosslinks to replicate the tensile strength of animal connective tissue. In some embodiments, the 3-dimensional matrix of fibers contains an isolated, purified cross-linking enzyme. The cross-linking enzyme can be, for example, a transglutaminase, a tyrosinase, a lipoxygenase, a protein disulfide reductase, a protein disulfide isomerase, a sulfhydryl oxidase, a peroxidase, a hexose oxidase, a lysyl oxidase, or an amine oxidase.

Some proteins (e.g., 8S globulin from Moong bean seeds, or the albumin or globulin fraction of pea seeds) have favorable properties for constructing meat replicas because of their ability to form gels with textures similar to animal muscle or adipose tissue. See also the proteins identified in Section III A and B. The proteins may be artificially designed to emulate physical properties of animal muscle tissue.

In some embodiments, one or more isolated and purified proteins accounts for about 0.1%, 0.2%, 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 99% or more of the protein component by weight of the meat replica. In some embodiments, one or more isolated and purified proteins accounts for about 0.1%, 0.2%, 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 99% or more of the protein content of a consumable.

Skeletal muscles of animals such as beef cattle typically contain substantial quantities of glycogen, which can comprise on the order of 1% of the mass of the muscle tissue at the time of slaughter. After slaughter, a fraction of this glycogen continues to be metabolized, yielding products including lactic acid, which contributes to lowering the pH of the muscle tissue, a desirable quality in meat. Glycogen is a branched polymer of glucose linked together by alpha (1→4) glycosidic bonds in linear chains, with branch points comprising alpha (1→6) glycosidic bonds. Starches from plants, particularly amylopectins are also branched polymers of glucose linked together by alpha (1→4) glycosidic bonds in linear chains, with branch points comprising alpha (1→6) glycosidic bonds and can therefore be used as an analog of glycogen in constructing meat replicas. Thus, in some embodiments, the muscle or meat replica includes a starch or pectin.

Additional components of animal muscle tissue include sodium, potassium, calcium, magnesium, and other metal ions, lactic acid and other organic acids, free amino acids, peptides, nucleotides, and sulfur compounds. Thus, in some embodiments, a muscle replica can include sodium, potassium, calcium, magnesium, other metal ions such as iron, zinc, copper, nickel, lithium, or selenium, lactic acid, and other organic acids such as fatty acids, free amino acids, peptides, nucleotides and sulfur compounds glutathione, beta mercaptoethanol, or dithiothreitol. In some embodiments, the concentration of sodium, potassium, calcium, magnesium, other metal ions, lactic acid, other organic acids, free amino acids, peptides, nucleotides and/or sulfur compounds in the muscle replica or consumable are within 10% of the concentrations found in a muscle or meat being replicated.

The invention also provides methods for making a muscle replica. In some embodiments, the method includes forming the composition into asymmetric fibers prior to incorporation into the consumable. In some embodiments, these fibers replicate muscle fibers. In some embodiments the fibers are spun fibers. In other embodiments the fibers are extruded fibers. Accordingly, the present invention provides for methods for producing asymmetric or spun protein fibers. In some embodiments, the fibers are formed by extrusion of the protein component through an extruder. Methods of extrusion are well known in the art, and are described, for example, in U.S. Pat. Nos. 6,379,738, 3,693,533, and U.S. Patent Publication No. 20120093994, which are herein incorporated by reference. These methods can be applied to making the compositions provided herein.

Extrusion can be conducted using, for example, a Leistritz Nano-16 twin-screw co-rotating extruder (American Leistritz Extruder Corp. USA, Sommerville, N.J.). Active cooling of the barrel section can be used to limit denaturation of proteins. Active cooling of the die section can be used to limit expansion of the extruded product and excessive moisture loss. Protein feed and liquid are added separately: protein is fed by a volumetric plunger feeder or a continuous auger-type feeder, and liquid can be added into the barrel through a high pressure liquid injection system. Die nozzles with various inner diameters and channel length can be used for precise control of extrudiate pressure, cooling rate and product expansion. In some examples, extrusion parameters were: screw speed 100-200 rpm, die diameter 3 mm, die length 15 cm, product temperature at the end of the die of 50° C., feed rate of 2 g/min, and water-flow rate of 3 g/min. Product temperature at the die during extrusion is measured by a thermocouple.

Spun fibers can be produced by preparing a high viscosity protein "dope" by adding sodium hydroxide to concentrated protein solutions or to precipitated proteins, and forcing the solution with a plunger-type device (in some examples, a syringe with a syringe pump) through a small steel capillary (in some examples, 27 gauge hypodermic needle) into a coagulating bath. In some examples, the bath is filled with a concentrated acid solution (e.g. 3 M hydrochloric acid). In some examples, the bath is filled with a buffer solution at a pH approximately equal to the isoionic point of the protein. Coagulating protein solution jet forms a fiber that collects at the bottom of the bath.

Bundles of spun fibers can be produced by forcing protein "dope" through spinnerets with many small holes. In some examples, spinnerets are stainless steel plates with approximately 25,000 holes per $cm^2$, with diameter of each hole approximately 200 microns. In some embodiments muscle tissue replica is produced by immersing the 3-dimensional matrix of fibers (connective tissue replica) in solutions of proteins and creating protein gels incorporating 3-dimensional matrix of fibers.

H. Fat Replicas

Animal fat is important for the experience of eating cooked meat and are important for some of the nutritional value of meat. Accordingly, the present invention provides compositions derived from non-animal sources, which recapitulate key features of animal fat, including the texture and/or flavor, by using components that mimic the chemical composition and physical properties of, for example, ground beef. In another aspect, the present invention provides a meat substitute product that comprises a composition derived from non-animal sources, which recapitulates animal fat. Such a composition will be labeled herein as an "adipose replica" or a "fat replica." In some embodiments, the adipose replica and/or meat substitute product comprising the adipose replica are partially derived from animal sources. The consumable can also include adipose replicas that recapitulate key features of non-animal fats, including texture, flavor, firmness, percent fat release, and/or temperature of fat release. The fat content of the consumable can be at least 1%, 5%, 10%, 15%, 20%, 25%, 30%, 35%, 40%, 45%, 50%, 55%, 60%, 70%, 80%, 90%, or 95% fat.

Ground beef is typically prepared by mixing lean beef with adipose (fat) that is cut from steaks, with the adipose tissue added to 16-30% (Cox 1993). Without adipose, meat passed through a grinder is tough, crumbly, and dries out quickly. Fat is added to lean beef so that fat released during cooking provides a liquid surface to aid in cooking, and to generate key beef flavors, which largely are products of the fatty acids. Engineering an adipose tissue replica that plays the same key roles in texture and flavor of the plant-based ground beef is an important driver for texture and flavor.

The adipose tissue replicas described here have a great health benefit over the beef adipose tissue as the fatty acid composition can be controlled such that the amount of saturated fats can be decreased. Additionally, the plant-based adipose replicas are cholesterol free. The plant-based adipose replicas can contain a lower percent total fat, and still have the same amount of fat being released or retained for the desired cooking properties, flavor, and texture.

As described herein, adipose replicas comprising emulsions of plant-derived lipids and one or more isolated and purified proteins can be produced in which the composition (e.g., fatty acid composition), cooking characteristics (e.g., fat release temperature or percent fat release), and physical properties (e.g., firmness) can be controlled, allowing the plant based composition to mimic animal based adipose. The adipose tissue replica includes (1) a vegetable oil containing triacylglycerides of fatty acids; (2) one or more isolated and purified proteins from non-animal sources (e.g., a plant protein); and (3) a phospholipid such as lecithin. The proteins can be plant or microbial proteins as described above (e.g., RuBisCo, an oleosin, an albumin, a globulin, or other seed storage protein). See, also the proteins described in Sections III A and B. The vegetable oils can be any of the oils described herein. See, e.g., Section III C.

The fat replica can be a gelled emulsion. In some embodiments, the gel is a soft, elastic gel comprising proteins and optionally carbohydrates. The gelled emulsion can comprise a protein solution comprising multiple proteins, e.g., 1-5 or 1-3 isolated and purified proteins, wherein the protein solution accounts for 1-30% of the volume of the emulsion. The gelled emulsion can comprise a fat droplet, wherein the fat droplet accounts for 70-99% of the volume of the emulsion. The gelled emulsion can comprise an isolated, purified cross-linking enzyme, wherein the cross-linking enzyme accounts for 0.0005% to 0.5% of the emulsion weight by volume, 0.5-2.5% of the emulsion weight by volume, or 0.001% or lower of the emulsion weight by volume. The emulsion of fat droplets in the protein solution can be stabilized by forming the emulsion into a gel by the cross-linking enzyme, e.g., a transglutaminase, by gelling proteins via heating and cooling protein solutions, by forming a cold-set gel, by formation of a coacervate, or by combinations of these techniques as described for coacervates in section C and gel formation in section F.

In some embodiments, the fat replica comprises cross-linking enzymes that catalyze reactions leading to covalent crosslinks between proteins. Cross-linking enzymes can be used to create or stabilize the desired structure and texture of the adipose tissue replica, to mimic the desired texture of an equivalent desired animal fat. In some embodiments, the cross-linking enzymes are isolated and purified from a non-animal source, examples and embodiments of which are described herein. In some embodiments, the fat replica comprises at least 0.0001%, at least 0.001%, at least 0.01%, at least 0.1%, or at least 1% (wt/vol) of a cross-linking enzyme. The cross-linking enzyme can be selected from, for example, transglutaminases, tyrosinases, lipoxygenases, protein disulfide reductases, protein disulfide isomerases, sulfhydryl oxidases, peroxidases, hexose oxidases, lysyl oxidases, and amine oxidases. In some embodiments, the cross-linking enzyme is transglutaminase, a lysyl oxidase (e.g., a *Pichia pastoris* lysyl oxidase), or other amine oxidase.

The fat replica can comprise a gel with droplets of fat suspended therein. The fat droplets used in some embodiments of the present invention can be from a variety of sources. In some embodiments, the sources are non-animal sources (e.g., plant sources). See, e.g., the examples provided in Section III C. In some embodiments, the fat droplets are derived from animal products (e.g., butter, cream, lard, and/or suet). In some embodiments, fat droplets are derived from pulp or seed oil. In other embodiments, the source may be algae, yeasts, oleaginous yeasts such as *Yarrowia lipolytica*, or mold. For instance, in one embodiment, triglycerides derived from *Mortierella isabellina* can be used. In some embodiments, the fat droplets contain synthetic or partially synthetic lipids In some embodiments, the fat droplets are stabilized by addition of surfactants, including but not limited to phospholipids, lecithins, and lipid membranes. The lipid membranes may be derived from algae, fungi or plants. In some embodiments the surfactants comprise less than 5% of the fat replica. The fat droplets can in some examples range from 100 nm to 150 μm in diameter. The diameter of these stabilized droplets may be obtained by homogenization, high-pressure homogenization, extrusion or sonication.

In some embodiments, plant oils are modified to resemble animal fats. The plant oils can be modified with flavoring or other agents such as heme proteins, amino acids, organic acids, lipids, alcohols, aldehydes, ketones, lactones, furans, sugars, or other flavor precursor, to recapitulate the taste and smell of meat during and after cooking. Accordingly, some aspects of the invention involve methods for testing the qualitative similarity between the cooking properties of animal fat and the cooking properties of plant oils in the consumable.

In some embodiments, additional polysaccharides can be added to a fat replica, including flax seed polysaccharides and xanthan gum.

The creation of a plant-based adipose replica requires stabilization of the oil in water emulsions. Typically animal adipose tissue contains ~95% fat, and is stabilized by the phospholipid bilayer and associated proteins. Adipose replicas described herein can be created with up to 95% fat in some instances, with 80% fat under many conditions, or with lower amounts of fat (e.g., 50% or less) while mimicking the properties of animal fat. Achieving a high percent fat is controlled by the stabilization of the emulsion.

The composition (e.g., fatty acid composition), cooking characteristics (e.g., fat release temperature or percent fat release), and physical properties (e.g., firmness) can be manipulated by controlling the type and amount of fat, the amount of protein, the type and amount of lecithin, the presence of additives, and the method of gelling.

In some embodiments, the protein component comprises about 0.1%, 0.5%, 1%, 2%, 5%, 10%, 15%, or 20%, 25%, or more of the fat replica by dry weight or total weight. In some embodiments, the protein component comprises about 0.1-5% or about 0.5-10% or more of the fat replica by dry weight or total weight. In some embodiments, the protein component is 0.5 to 3.5% or 1 to 3% of the fat replica by dry weight or total weight. In some embodiments, the protein component comprises a solution containing one or more isolated, purified proteins. The type of protein can affect the stability of the emulsion, RuBisCo and pea albumins allow for fat replicas to made a greater than 90% fat. Addition of polysaccharides including flax seed and xanthan gum aid in emulsifying the mixture, allowing for an increase in fat content.

The type and amount of fat can be controlled by choosing the source of the fat and its lipid composition. In general, oils with higher amounts of saturated fatty acids are better able to be emulsified at lower protein concentrations, while oils with more unsaturated fatty acids require higher protein concentrations to be emulsified. Protein is required to stabilize the emulsion, and an increase in protein content increases the stability. If the amount of protein added is too little to emulsify the amount of fat, the mixture will separate into layers.

Lecithin also is a modulator of emulsion, and can either stabilize or disrupt the emulation depending on the amount of protein present and type of oil used. For example, lecithin may disrupt the protein/fat matrix to make a less stable emulsion, but can be added at low levels to modulate other physical properties. Emulsions made from oils with higher amounts of unsaturated fats can be de-stabilized by a high amount of lecithin (1%), such that the emulsion does not solidify. Emulsions made from oils with higher amounts of saturated fats can solidify at high amounts of lecithin (1%), but are very soft.

As described herein adipose replicas can be prepared that can range from very soft to very firm. The composition and amount of the fat controls the firmness of the replica. Firmer oils, which contain more long-chained saturated fats, make firmer gels. Oils that produce softer gels typically contain more unsaturated fatty acids or short-chained saturated fatty acids. In general, the firmness of the gel increases as total percent fat increases, as long as the emulsion is held and does not separate. The amount of protein also contributes to the firmness of the replica. In general, an increase in protein concentration increases replica firmness. The amount of lecithin is a modulator of replica firmness. Higher amounts of lecithin (1%) are much softer than lower amounts of lecithin (0.05%) when gels are formed with high percent protein (3%). When protein is decreased (1.8%), all gels are softer, and there is little difference in firmness between low level of lecithin (0.05%) and high (1%) if emulsion is held.

Addition of polysaccharides to replicas including but not limited to xanthan gum and flax seed paste can increase the firmness of adipose-replica gels.

When an adipose replica is cooked, fat leaks from the structured replica as it is cooked. Often there is fat that remains in the cooked product; it is important to achieve the balance between fat released to aid in cooking and fat retained for texture and taste. The percent fat released (per total fat) can be determined by measuring the amount of fat released upon cooking to completion. Percent fat released is reported as the weight of fat released per the total fat of the replica. For example, the percent fat release of an adipose tissue replica described herein can be 0 to 10%, 10% to 20%, 20% to 30%, 30% to 40%, 40% to 50%, 50% to 60%, 60% to 70%, 70% to 80%, 80% to 90%, or 90% to 100% upon cooking. Adipose replicas typically release 0-90% fat under standard cooking conditions. In comparison, beef adipose tissue typically releases 40-55% fat under equivalent conditions.

While vegetable oils have set melting temperatures, the range of temperatures over which adipose replicas can be made to release fat is wide. Fat release temperature is the temperature at which fat is visibly released from the replica at the cooking surface. As described herein, the fat release temperature of the adipose replica can be tailored based on the type and amount of fat, the amount of protein, the type and amount of lecithin, the presence of additives, the method of emulsification, and the method of gelling. The resulting adipose replicas can have a fat release temperature of between 23° C. to 33° C., 34° C. to 44° C., 45° C. to 55° C., 56° C. to 66° C., 67° C. to 77° C., 78° C. to 88° C., 89° C. to 99° C., 100° C. to 110° C., 111° C. to 121° C., 122° C. to 132° C., 133° C. to 143° C., 144° C. to 154° C., 155° C. to 165° C., 166° C. to 167° C., 168° C. to 169° C., 170° C. to 180° C., 181° C. to 191° C., 192° C. to 202° C., 203° C. to 213° C., 214° C. to 224° C., 225° C. to 235° C., 236° C. to 246° C., 247° C. to 257° C., 258° C. to 268° C., 269° C. to 279° C., 280° C. to 290° C., or 291° C. to 301° C. Beef fat was measured to release fat at 100-150° C.

Emulsification also is a factor in controlling the temperature of fat release: Once fats are incorporated into a replica with protein, or protein and lecithin, the temperature at which the fat is released increases significantly above the temperature at which the fat alone melts.

Fatty acid composition also is a factor in the fat release temperature and percent fat release. Vegetable oils that contain a higher proportion of unsaturated fatty acids have low melting temperatures and many are liquid at room temperature. Vegetable oils that contain a higher proportion of saturated fatty acids have a higher melting temperature, and are solid at room temperature. Replicas with a greater amount of unsaturated fats have a higher temperature of fat leakage than the same replica made with more saturated fatty acids. Gels made from 75% oils with higher amounts of unsaturated fatty acids, a high protein content (3%), and minimal lecithin content (0.05%), where the mixture was emulsified by a hand-held homogenizer and gelled using the heat-cool method, can be heated to 200° C. with little or no fat release. Replicas containing oils with more long-chained saturated fats typically have more fat release at high protein content, but release less percent total fat compared to replicas containing oils with more short chained fats and at low percent protein. Gels made from oils with a higher proportion of short-chained saturated fatty acids, high protein content (3%), and minimal lecithin content (0.05%), can be heated to 200° C. with little fat release.

The percent of fat release as an adipose replica is cooked is also is a function of the amount of protein and the amount of lecithin. Typically, the adipose replica contains 1-3% protein by mass. Increasing protein content leads to increasing temperatures of fat release, and reduces the fraction of fat released. Increasing the lecithin content to 1% can decrease the fat release temperature to 60-115° C., and increase the fraction of fat released (e.g., 25-30%). The source or composition of the lecithin used can modulate the amount of fat release and the temperature threshold for fat release. Without being bound to a particular mechanism, it is thought that lecithin destabilizes the emulsion by disrupting the protein-protein interactions. In one embodiment, at a high protein concentration of 3%, increasing the lecithin content to 1% decreased the fat release temperature to 55-60° C., and increased the percent fat leaked to 60-65%.

The method of making the emulsion also is a factor in determining the amount of fat release. Emulsification forms a homogenous mixture of the fat held in a matrix of proteins and lecithin. Methods of emulsification can include high-pressure homogenization, sonication, or hand homogenization. The alternative methods result in characteristic differences in the size of the oil droplets in the emulsion, which influences the stability of the resulting emulsions and the maximum fat concentration at which stable emulsions can be formed.

The method of gelling the replica also is a factor in determining the amount of fat release. While adipose replicas can be formed without forming gels, gelation results in a firmer and more stable emulsion. Methods of gelling are described above, and can include, for example, the addition of a crosslinking enzyme such as a transglutaminase (TG), or subjecting the emulsion to a heat/cool cycle. For example, either treatment with TG or the heat/cool method can convert an emulsion, as described above, into a gel. Furthermore, gelled emulsions formed by crosslinking catalyzed by TG typically release fat at a temperature higher than that at which emulsions gelled by the heat/cool technique do so. Gels formed by crosslinking with a TG also typically release less fat than do gels formed by the heat-cool technique.

In some embodiments, a fat replica can be made with a protein content <1.5% and a minimal lecithin content (0.05%) and have a fat release temperature of 45-65° C., and a high amount of fat released (e.g., 70-90%). These gels are at the higher end of percent fat released.

In some embodiments, a fat replica can be made with a lower protein content (<1.5%) and a high lecithin (>1%), and have a lower fat release temperature (e.g., 30-50° C., e.g., 30 to 45° C.), and with an intermediate percent fat leaked (45-65%). Thus, in gels formed from oils with short-chained fatty acids or long-chained fatty acids at low protein concentrations, lecithin may play a role in stabilizing the emulsion.

In some embodiments, >2% rubisco or pea albumin can be used to produce adipose replicas with greater than 70% fat. In some embodiments, gels formed with >3% isolated and purified protein can result in adipose replicas with greater than 70% fat.

In some embodiments, adipose replicas made from oils with a higher proportion of long-chained saturated fatty acids, a protein content of 3%, and a minimal lecithin content (0.05%), can release fat at a temperature similar to that at which beef fat does so (50-100° C.), and can release a low to intermediate level of fat (15-45%).

In some embodiments, an adipose replica with a higher protein concentration (>3%), and a lecithin content >1% can have a fat release temperature of 50-70° C., and a higher amount of fat release (50-80%). At high protein and low lecithin concentration, gels with higher saturated fatty acids typically leak about 10% more fat than do corresponding gels formed with unsaturated fats.

In some embodiments, protease treatment of the protein constituents before gel formation can lead to an increase in fat release.

In some embodiments, a adipose tissue replica matrix stabilized by crosslinking enzymes releases more fat than a adipose tissue replica matrix stabilized by heat/cool protein denaturation. In one embodiment, an adipose tissue matrix comprised of moong bean 8S protein and canola oil, or an equal mixture of coconut, cocoa, olive, and palm oils, retains more mass when formed upon heat/cool denaturation than when formed by cross-linking with an enzyme. In one embodiment, an adipose tissue matrix formed by heat/cool denaturation of a preformed protein-oil emulsion containing Rubisco and cocoa butter, has a higher melting temperature than an adipose replica of similar composition stabilized by a cross-linking enzyme.

In some embodiments, adipose tissue replicas constructed from 1.4% wt/v moong bean 8S protein with 90% v/v canola oil and 0.45% wt/v soybean lecithin, can be homogenized in the presence of variable concentrations of sunflower oleosins. Concentration of oleosins can be varied from 1:10 to 1:$10^6$ molar ratio of oleosin:triglyceride. An increase in mass retention after cooking is observed as the concentration of oleosins in the adipose tissue replica increase.

Firmness of an adipose tissue replica constructed as stabilized protein-fat emulsion can be modified by varying the concentration of the protein within adiopose tissue replica matrix. For example, a series of adipose tissue replicas formed with varying concentrations of Rubisco with 70-80% v/v sunflower oil, varied in firmness. Adipose tissue replicas with 0% and 0.18% (wt/vol) Rubisco were very soft, whereas replicas formed with 1.6% (wt/vol) Rubisco were soft, and replicas formed with 1.9% (wt/vol) Rubisco were medium in firmness.

In one embodiment, the firmness of adipose replica formed by stabilizing protein oil emulsion can be modified by varying amount of protein in the adipose replica. In one embodiment, adipose tissue replicas made from Rubisco and 70% sunflower oil are softer at lower concentrations, such as 1%, of RuBisCo than at higher concentrations of Rubisco, such as 3%, in adipose tissue replicas.

In another aspect, the invention provides methods for making a fat replica. The fat can be isolated and homogenized. For example an organic solvent mixture can be used to help solubilize a lipid in a gel and then removed to provide the final gel. At this point, the lipid can be frozen, lyophilized, or stored. So in one aspect, the invention provides for a method for isolating and storing a lipid, which has been selected to have characteristics similar to animal fat. The lipid film or cake can then be hydrated. The hydration can utilize agitation or temperature changes. The hydration can occur in a precursor solution to a gel. After hydration the lipid suspension can be sonicated, homogenized, high-pressure homogenized or extruded to further alter the properties of the lipid in the solution.

In some embodiments, the fat replica is assembled to approximate the organization of adipose tissue in meat. In some embodiments some or all of the components of the fat replica are suspended in a gel (e.g., proteinaceous gel). In other embodiments, the gel can be a hydrogel, an organogel, or a xerogel. In some embodiments, the gel can be thickened to a desired consistency using an agent based on polysaccharides or proteins. For example fecula, arrowroot, cornstarch, katakuri starch, potato starch, sago, tapioca, alginin, guar gum, locust bean gum, xanthan gum, collagen, egg whites, furcellaran, gelatin, agar, carrageenan, cellulose, methylcellulose, hydroxymethylcellulose, acadia gum, konjac, starch, pectin, amylopectin or proteins derived from legumes, grains, nuts, other seeds, leaves, algae, bacteria, of fungi can be used alone or in combination to thicken the gel, forming an architecture or structure for the consumable.

In some embodiments, the tensile strength of the fat replica mimics the tensile strength of adipose tissue. The tensile strength of the gelled emulsions can be increased by incorporation of fibers. The fibers may be derived from non-animal sources including, but not limited to, watermelon, jack fruit, squash, coconut, green hair algae, corn and/or cotton. In some embodiments, the fibers are derived from self-polymerization of proteins, e.g., oleosins and prolamins. In some embodiments the fibers are derived from electrospun or extruded proteins. The fibers may form a three dimensional mesh or strands wherein each fiber may be less than 1 mm in diameter.

The adipose replica can be an emulsion comprising a solution of one or more proteins and one or more fats suspended therein as droplets. Slowly adding the oil phase to the aqueous phase can provide a more robust emulsion and prevents occasional failures to emulsify. Adding lecithin can, in some circumstances, destabilize a protein-stabilized emulsion, allowing for increased fat leakage when the replica is cooked. In some embodiments, the emulsion is stabilized by one or more cross-linking enzymes into a gel. In some embodiments, the emulsion is stabilized by a matrix formed by proteins induced to gel by a heat-cool technique or a cold-set-gel technique. Heating a protein-stabilized emulsion can heat denature the proteins leading to an increase in the firmness of the adipose replica. Heating to a sufficient temperature also can reduce the viability of natural microflora by at least 100×. In some embodiments, the emulsion is stabilized by gelled protein matrix formed by a combination of one or more protein cross-linking enzymes and a heat/cool technique or a cold-set gel technique. After the emulsion has sufficiently cooled, but before gelling is complete, one or more optional ingredients can be added, such as a heme-containing protein (e.g., up to about 0.4% such as 0.15, 0.2, 0.25, 0.3, or 0.4%) to give the adipose a more natural looking pink color and/or one of more flavor compounds such as amino acids, sugars, thiamine, or phospholipids to provide an improved flavor to the final product.

The one or more proteins in solution can comprise isolated and purified proteins, e.g. a purified pea albumin enriched fraction, a purified pea globulin enriched fraction, a purified Moong bean 8S globulin enriched fraction, and/or a Rubisco enriched fraction. In other embodiments, the one or more fats are derived from plant-derived oils (a rice bran oil or canola oil). See, e.g., Section III C. In some cases the composition comprises a cross-linking enzyme such as a transglutaminase, lysyl oxidase, or other amine oxidase. Thus, in some embodiments, an adipose tissue replica can be made by isolating and purifying one or more proteins; preparing a solution comprising one or more proteins; emulsifying one or more fats in the solution; and stabilizing the solution into a gelled emulsification with one or more cross-linking reagents.

In some embodiments, the fat replica is a high fat emulsion comprising a protein solution of purified pea albumin emulsified with 40-80% rice bran oil, stabilized with 0.5-5% (wt/vol) transglutaminase into a gel.

In some embodiments, the fat replica is a high fat emulsion comprising a protein solution of isolated moong bean 8S globulin emulsified with 40-80% rice bran oil or 40-80% canola oil, stabilized with 0.5-5% (wt/vol) transglutaminase into a gel.

The fat can be isolated from plant tissues and emulsified. The emulsification can utilize high-speed blending, homogenization, high pressure homogenization, sonication, shearing, agitation or temperature changes. The lipid suspension can be sonicated or extruded to further alter the properties of the lipid in the solution. At this point, in some embodiments other components of the consumable are added to the solution followed by a gelling agent. In some embodiments crosslinking agents (e.g. transglutaminase or lysyl oxidase) are added to bind the components of the consumable. In other embodiments the gelling agent is added and the lipid/gel suspension is later combined with additional components of the consumable.

Control of Melting Point by Control of Fat Composition

The process of cooking meat is integral to the experience of using and enjoying meat. One important property of meat is that as the meat is heated, fats are released from the meat, which lubricates the cooking surface and increases heat transfer and is a component of the visual, aural and olfactory experience of cooking meat. The amount of fat that is released rather than retained during cooking varies with cooking temperature and contributes to the visual, aural and olfactory experience of cooking meat.

The composition and ratio of fatty acids in triglycerides and phospholipids, along with the ratio of phospholipid headgroups, contribute to the generation of distinct flavor profiles of cooked meat. For example, increased levels of phosphatidylcholine and phosphatidylethanolamine in fat provide a more intense beef flavor. As discussed above, the flavor of meat replicas can be modified by varying the ratios and type of different oils, and phospholipids that comprise the meat replica. For example, the flavor of the cooked meat replica can be controlled by varying the amount of phospholipids, sterols and lipids (e.g., 0.2-1% wt/wt). In one embodiment, the flavor of the cooked meat replica can be controlled by varying the ratio of different phospholipid headgroups.

In some embodiments, the phospholipids comprise a plurality of amphipathic molecules comprising fatty acids, glycerol and polar groups. See, e.g., Section III C for examples of fatty acids, phospholipids, polar groups, and sterols associated with phospholipids. See also section III C for examples of useful plant oils.

In different cuts of meat, the fat has different properties, ranging from the structurally important nature of fat in bacon to the soft melting behavior of the marbling fat in Wagyu beef.

By controlling the melting point of adipose tissue replicas in the consumables, it is possible to replicate the cooking experience of different meat types. For example, adipose tissue replicas created from fats with a melting point of 23° C. to 27° C. can have melting points analogous to adipose tissue from wagyu beef; adipose tissue replicas created from fats with a melting point of 35° C. to 40° C. can have melting points analogous to adipose tissue from regular ground beef; and adipose tissue replicas created from fats with a melting point of 36° C. to 45° C. can have melting points analogous to adipose tissue from bacon. Adipose tissue replicas can be created and incorporated into consumables such that a ratio of fat which is released and the ratio of fat which is retained by adipose tissue replica during cooking is similar to the fat properties of meat, e.g. from ground beef.

In some embodiments, the fat release temperature of a fat replicas can be controlled by mixing different ratios of vegetable oils containing triacylglycerides and phospholipids (e.g., lecithin). The melting point of fats is governed by the chemical composition of fatty acids. In general, fats comprising saturated fatty acids (e.g., C10:0, C12:0, C14:0, C16:0, C18:0, C20:0, C22:0) are solid at refrigeration temperatures (e.g., about 1° C. to about 5° C. and at room temperature (e.g., about 20° C. to 25° C.). By controlling the fat release temperature upon cooking in a adipose tissue replica, the firmness of a adipose tissue replica during refrigeration (e.g., about 1.5° C. to about 4° C.) and at ambient temperature (e.g., about 20° C. to 25° C.) can be controlled. Fats comprising monounsaturated fatty acids (e.g., C16:1 or C18:1) are generally solid at refrigeration temperatures and liquid at room temperatures. Fats comprising polyunsaturated fatty acids (e.g., C18:2, C18:3, C20:5, or C22:6) are generally liquid at refrigeration temperatures and at room temperatures. For example, virgin coconut oil melts at about 24° C. while hydrogenated coconut oil melts at 36-40° C.

For example, adipose tissue replicas containing triglycerides and phospholipids that are liquid at room temperature (about 20° C. to 25° C.) will be softer than adipose tissue replicas containing triglycerides and phospholipids that are solid at refrigeration temperatures.

Adipose tissue replicas can contain oils from a single or multiple sources that are liquid at both refrigeration and ambient room temperatures (e.g., canola oil, sunflower oil, and/or hazelnut oil). In one embodiment, a adipose tissue replica contains oils from single or multiple sources that are solid at refrigeration temperature, but liquid at room temperature (e.g., olive oil, palm oil, and/or rice brain oil). In one embodiment, a adipose tissue replica contains oils from single or multiple sources that are solid at room temperature but liquid at mouth-temperatures (about 37° C.) (e.g., palm kernel oil, coconut oil, and/or cocoa butter. In one embodiment, a adipose tissue replica contains oils from single or multiple sources that are solid at mouth temperature (about 37° C.) (e.g., oil from mango butter).

In one embodiment, a adipose tissue replica includes triglycerides and phospholipids with a high ratio of saturated fatty acids, and is firmer than a adipose tissue replica containing a higher ratio of monounsaturated and polyunsaturated triglycerides and lipids. For example, a adipose tissue replica containing sunflower oil is softer than a adipose tissue replica containing cocoa butter. Adipose tissue replicas can be formed with 0%, 0.18%, 1.6%, or 2.4% wt/v Rubisco with 70%, 80%, or 90% v/v sunflower or cocoa butter. Each adipose tissue replica that contained cocoa butter was firmer than the replicas that were formed with sunflower oil.

In one embodiment, a adipose tissue replica made as a stable emulsion of moong bean 8S protein with sunflower oil is softer than a adipose tissue replica made as a stable emulsion of moong bean 8S protein and cocoa butter. Adipose tissue replicas formed with 2%, 1%, or 0.5% wt/v moong bean 8S protein with 70%, 80%, or 90% v/v sunflower or cocoa butters. Each adipose tissue replica that contained cocoa butter was firmer than the replicas that were formed with sunflower oil.

In one embodiment, a adipose tissue replica made as a stable emulsion of moong bean 8S protein with canola oil is softer than a adipose tissue replica made as a stable emulsion of moong bean 8S protein with an equal mixture of coconut, cocoa, olive, and palm oils. Adipose tissue replicas can be formed with 1.4% wt/v moong bean 8S protein with 50%, 70%, or 90% v/v sunflower or a mixture of oils. Each adipose tissue replica that contained a mixture of oils was firmer than the replicas that were formed with sunflower oil.

In one embodiment, an adipose tissue replica made as a stable emulsion of soy proteins with sunflower oil is softer than a adipose tissue replica made as a stable emulsion of soy proteins and cocoa butter. Adipose tissue replicas were formed with 0.6%, 1.6%, or 2.6% wt/v Soy with 50%, 70%, 80%, or 90% v/v sunflower or mixture of oils. Each adipose tissue replica that contained a mixture of oils was firmer than the replicas that were formed with sunflower oil.

In some embodiments, the adipose tissue replicas comprising 0%, 0.18%, 1.6%, and 2.4% wt/v Rubisco with 70%, 80%, and 90% v/v cocoa butter are solid at room temperature but melt at about mouth temperature. In some embodiments, the adipose tissue replicas comprising 0.6%, 1.6%, and 2.6% wt/v soy with 50%, 70%, 80%, and 90% v/v cocoa butter are solid at room temperature but melt at about mouth temperature.

In some embodiments, the adipose tissue replicas comprising 1.4% wt/v moong bean 8S protein with 50%, 70%, and 90% v/v of an equal mixture of coconut, cocoa, olive, and palm oil is solid at room temperature but melts at about mouth temperature. In one embodiment, the melting temperature of adipose tissue replicas will be similar to beef fat. In some embodiments the fat replicas comprise oils with a 1:1 ratio of saturated to unsaturated fatty acids. In some embodiments, the adipose tissue replica contains equal amounts of cocoa and mango butters. In some embodiments, the adipose tissue replica contains equal amounts of coconut oil, cocoa butter, olive oil and palm oil.

In one embodiment, a adipose tissue replica that comprises triglycerides and phospholipids will contain a ratio of fatty acids similar to that found in beef (C14:0 0-5% wt/wt, C16:0 0-25%, C18:0 0-20%, C18:1 0-60%, C18:2 0-25%, C18:3, 0-5%, C20:4 0-2%, and C20:6 0-2%). For example the adipose tissue replica may comprise equal proportions of olive oil, cocoa butter, coconut oil and mango butter. In another example, the adipose tissue replica may comprise equal proportions of olive oil and rice brain oil.

In one embodiment, the melting temperature of adipose tissue replicas will be similar to Wagyu beef fat. In some embodiments the fat replicas comprise oils with a 1:2 ratio of saturated to unsaturated fatty acids (e.g., for example 1 part coconut oil to 2 parts sunflower oil). In some embodiments, the adipose tissue replica contains equal amounts of olive oil, rice bran oil, cocoa butter and mango butter.

I. Connective Tissue Replica

Animal connective tissue provides key textural features that are an important component of the experience of eating meat. Accordingly, the present invention provides a composition derived from non-animal sources which recapitulates key features of animal connective tissue. The present invention additionally provides a meat substitute product that comprises a composition derived from non-animal sources, which recapitulates important textural and visual features of animal connective tissue. Such compositions will be labeled herein as "connective tissue replicas". In some embodiments, the connective tissue replica and/or meat substitute product comprising the connective tissue replica are partially derived from animal sources.

Animal connective tissue can generally be divided into fascia-type and cartilage-type tissue. Fascia-type tissue is highly fibrous, resistant against extension (has high elastic modulus), and has a high protein content, a moderate water content (ca. 50%), and low-to-no fat and polysaccharide content. Accordingly, the present invention provides a connective tissue replica that recapitulates key features of fascia type tissue. In some embodiments, the connective tissue replica comprises about 50% protein by total weight, about 50% by liquid weight, and has a low fat and polysaccharide component.

The fibrous nature of fascia type connective tissue is largely comprised of collagen fibers. Collagen fibers are observed to be cord or tape shaped species, 1-20 microns wide. These fibers consist of closely packed thin collagen fibrils 30 to 100 nanometers thick. These fibrils also associate into elastic and reticular fibrous networks with individual fibers that may be 200 nanometers thick.

In one embodiment, the fascia-type connective tissue replica consists of a fibrous or fibrous-like structure which can consist of proteins. In some embodiments, the protein content is derived from non-animal source (e.g., a plant source, algae, bacteria, or fungi, see e.g., Sections IIIA and B). In some embodiments, the isolated proteins account for 50%, 60%, 70%, 80%, or 90% or more of the protein content by weight. In some embodiments, multiple isolated proteins are isolated and purified separately and account for the total protein content.

In fascia-type connective tissue, the prolamin family of proteins, individually or combinations thereof, demonstrates suitability for the protein component because they are highly abundant, similar in global amino acid composition to collagen (high fraction of proline and alanine), and amenable to processing into films. In some embodiments, the prolamin family proteins are selected from the group consisting of zein (found in corn), hordein from barley, gliadin from wheat, secalin, extensins from rye, kafirin from sorghum, or avenin from oats. In some embodiments, the one or more isolated and purified proteins is zein. In some embodiments, other proteins can be used to supplement prolamins in order to achieve targets specifications for physicochemical and nutritional properties. See, the list in Sections III A and B, including any major seed storage proteins, animal-derived or recombinant collagen, or extensins (hydroxyproline-rich glycoproteins abundant in cell walls e.g. *Arabidopsis thaliana*, monomers of which are "collagen-like" rod-like flexible molecules).

The proteins can be freeze-dried and milled and combined with one or more other ingredients (e.g., wheat gluten, fiber such as bamboo fiber, or soy protein isolate).

The fibrous or fibrous-like structures can be formed by extrusion. In some embodiments extrusion are conducted using Leistritz Nano-16 twin-screw co-rotating extruder (American Leistritz Extruder Corp. USA, Sommerville, N.J.). Active heating and cooling of the barrel section is used to optimize the mechanical properties, extent of puffing and water content of fibers. For example, water content can be adjusted to about 50% to make a hard connective tissue replica. Protein feed and liquid are added separately: protein is feed by a volumetric plunger feeder, and liquid is added into the barrel through a high pressure liquid injection system. In some examples, extrusion parameters were: screw speed 200 rpm, product temperature at the die of 120° C., feed rate of 2.3 g/min, and water-flow rate of 0.7 g/min. Product temperature at the die during extrusion is measured by a thermocouple.

The fibrous or fibrous-like structures can be formed by extrusion through filament and multi-filament dies to produce fibrous structures. In some embodiments, dies incorporating multiple different orifice sizes in the range 10-300 microns can be used to create mixed fibrous tissue replicas with precise control over dimensions and compositions of fibers. Fibers of different sizes can be incorporated into the compositions to control the properties of the compositions.

Electrospinning can be used to create fibers in the <1-10 micron range. In some embodiments, electrospinning is used to create fibers in the <1-10 micron diameter range. For example, a concentrated solution of moong bean globulin (140 mg/ml) containing 400 mM sodium chloride can be mixed with solution of poly(vinyl alcohol) or poly(ethylene oxide) (9% w/v) to obtain mixed solutions with 22.5 mg/ml moong bean globulin and 6.75% w/v of the respective polymer. The resulting solution is slowly (for example, at 3 µl/min) pumped, using a syringe pump, from a 5 ml syringe through a Teflon tube and a blunted 21 gauge needle. The needle is connected to a positive terminal of a high voltage supply (for example, Spellman CZE 30 kV) and fixed 20-30 cm from a collection electrode. Collection electrode is an aluminum drum (ca. 12 cm long, 5 cm in diameter) that is wrapped in aluminum foil. The drum is attached to a spindle that is rotated by an IKA RW20 motor at about 600 rpm. The spindle is connected to a ground terminal of the high voltage supply. Protein/polymer fiber accumulate on foil and, after electrospinning is completed, are removed from foil and added to tissue replicas.

The dimension and composition of the fibers produced by the methods of the invention has an effect upon the taste, texture, and mechanical properties of the tissue replicas. Tissues comprising between 1 and 50% of the fibers in the <1-10 micron range, and between 10 and 50% of fibers in the 10-300 micron range most closely approach animal connective tissues in terms of taste, mouthfeel and mechanical properties.

Cartilage-type tissue is macroscopically homogenous, resistant against compression, has higher water content (up to 80%), lower protein (collagen) content, and higher polysaccharide (proteoglycans) contents (ca. 10% each). Compositionally, cartilage-type connective tissue replicas are similar to fascia-type tissue replicas with the relative ratios of each adjusted to more closely mimic 'meat' connective tissue. During extrusion, water content can be adjusted to about 60% to make a soft connective tissue replica.

Methods for forming cartilage-type connective tissue are similar to those for fascia-type connective tissue, but methods that produce isotropic non-fibrous gels are preferred.

A connective tissue replica can be made by isolating and purifying one or more proteins; and precipitating the one or more proteins, wherein the precipitating results in the one or more proteins forming physical structures approximating the physical organization of connective tissue. The precipitating can comprise solubilizing the one or more proteins in a first solution; and extruding the first solution into a second solution, wherein the one or more proteins is insoluble in the second solution, wherein the extruding induces precipitation of the one or more proteins.

In some embodiments some or all of the components of the consumable are suspended in a gel (e.g., a proteinacious gel). In various embodiments the gel can be a hydrogel, an organogel, or a xerogel. The gel can be thickened using an agent based on polysaccharides or proteins. For example fecula, arrowroot, cornstarch, katakuri starch, potato starch, sago, tapioca, alginin, guar gum, locust bean gum, xanthan gum, collagen, egg whites, furcellaran, gelatin, agar, carrageenan, cellulose, methylcellulose, hydroxymethylcellulose, acadia gum, konjac, starch, pectin, amylopectin or proteins derived from legumes, grains, nuts, other seeds, leaves, algae, bacteria, of fungi can be used alone or in combination to thicken the gel, forming an architecture or structure for the consumable. Enzymes that catalyze reactions leading to covalent crosslinks between proteins can also be used alone or in combination to form an architecture or structure for the consumable. For example transglutaminase, tyrosinases, lysyl oxidases, or other amine oxidases (e.g. *Pichia pastoris* lysyl oxidase (PPLO)) can be used alone or in combination to form an architecture or structure for the consumable by crosslinking the component proteins. In some embodiments, multiple gels with different components are combined to form the consumable. For example a gel containing a plant-derived protein can be associated with a gel containing a plant-derived fat. In some embodiments fibers or strings of proteins are oriented parallel to one another and then held in place by the application of a gel containing plant based fats.

The compositions of the invention can be puffed or expanded by heating, such as frying, baking, microwave heating, heating in a forced air system, heating in an air tunnel, and the like, according to methods well known in the art.

In some embodiments multiple gels with different components are combined to form the consumable. For example a gel containing a plant-derived protein can be associated with a gel containing a plant-derived fat. In some embodiments fibers or strings of proteins are oriented parallel to one another and then held in place by the application of a gel containing plant based fats.

J. Omissions from the Compositions

Because the consumable can be put together from defined ingredients, which may themselves be isolated and purified, it is possible to produce consumables that do not contain certain components. This, in some cases, allows for the production of consumables that are lacking ingredients that may be not desirable to consumers (e.g., proteins that some humans are allergic to can be omitted or additives). In some embodiments, the consumable contains no animal products. In some embodiments the consumable contains no or less than 1% wheat gluten. In some embodiments the consumable contains no methylcellulose. In some embodiments the consumable contains no carrageenan. In some embodiments the consumable contains no caramel color. In some embodiments the consumable contains no Konjac flour. In some embodiments the consumable contains no gum arabic (also known as acacia gum). In some embodiments the consumable contains no wheat gluten. In some embodiments the consumable contains no soy protein isolate. In some embodiments the consumable contains no tofu. In some embodiments the consumable contains less than 5% carbohydrates. In some embodiments the consumable contains less than 1% cellulose. In some embodiments the consumable contains less than 5% cellulose. In some embodiments the consumable contains less than 5% insoluble carbohydrates. In some embodiments the consumable contains less than 1% insoluble carbohydrates. In some embodiments the consumable contains no artificial color. In some embodiments the consumable contains no artificial flavorings.

In some embodiments the consumable contains one or more of the following characteristics: no animal products; no methylcellulose; no carrageenan; no Konjac flour; no gum arabic; less than 1% wheat gluten; no wheat gluten; no tofu; about 5% carbohydrates; less than 5% cellulose; less than 5% insoluble carbohydrates; less than 1% insoluble carbohydrates; no edible colorants such as caramel color, paprika, cinnamon, beet color, carrot oil, tomato lycopene extract, raspberry powder, carmine, cochineal extract, annatto, turmeric, saffron, F.D&C Red No. 3, Yellow number 5, Yellow No 6, Green No. 3, Blue No. 2, Blue No. 1, Violet No. 1, FD&C Red No. 40—Allura Red AC, and/or E129 (red shade); and/or no artificial flavorings. In some embodiments the consumable contains no soy protein isolate. In other embodiments, the consumable contains no soy protein or protein concentrate.

In some embodiments, the muscle tissue replica additionally contains less than 10%, less than 5%, less than 1%, or less than 0.1% wheat gluten. In some embodiments, the muscle tissue replica contains no wheat gluten.

IV. Combinations of the Components

A. Meat Replicas

A meat substitute product (alternatively a meat replica) can comprise compositions described herein. For example a meat replica can comprise a muscle replica; a fat tissue replica; and a connective tissue replica (or a sub-combination thereof). The muscle replica, adipose tissue replica, and/or connective tissue replica can be assembled in a manner that approximates the physical organization of meat. In some embodiments, a binding agent such as a coacervate is used to help binding the replicas to each other.

The percentage of different components may also be controlled. For example non-animal-based substitutes for muscle, adipose tissue, connective tissue, and blood components can be combined in different ratios and physical organizations to best approximate the look and feel of meat. The various components can be arranged to insure consistency between bites of the consumable. The components can be arranged to insure that no waste is generated from the consumable. For example, while a traditional cut of meat may have portions that are not typically eaten, a meat replicate can improve upon meat by not including these inedible portions (e.g, bone, cartilage, connective tissue, or other materials commonly referred to as gristle). Such an improvement allows for all of the product made or shipped to be consumed, which cuts down on waste and shipping costs. Alternatively, a meat replica may include inedible portions to mimic the experience of meat consumption. Such portions can include bone, cartilage, connective tissue, or other materials commonly referred to as gristle, or materials included simulating these components. In some embodiments the consumable may contain simulated inedible portions of meat products which are designed to serve secondary functions. For example a simulated bone can be designed to disperse heat during cooking, making the cooking of the consumable faster or more uniform than meat. In other embodiments a simulated bone may also serve to keep the consumable at a constant temperature during shipping. In other embodiments, the simulated inedible portions may be biodegradable (e.g., a biodegradable plastic).

In some embodiments, a meat substitute composition comprises between 10-30% protein, between 5-80% water, and between 5-70% fat, wherein the composition includes one or more isolated and purified proteins. Such a meat substitute can include no animal protein. In some embodiments, the meat substitute compositions comprise a transglutaminase.

In some embodiments, a meat substitute product includes a muscle replica, an adipose tissue replica, and connective tissue replica, where the muscle replica accounts for 40-90% of the product by weight, the adipose tissue replica accounts for 1-60% of the product by weight, and the connective tissue replica accounts for 1-30% of the product by weight.

In some embodiments, the meat substitute product comprises 60-90% water; 5-30% protein content; and 1-20% of a fat; wherein the protein content comprises one or more isolated and purified plant proteins.

In some embodiments the consumable contains components to replicate the components of meat. The main component of meat is typically skeletal muscle. Skeletal muscle typically consists of roughly 75 percent water, 19 percent protein, 2.5 percent intramuscular fat, 1.2 percent carbohydrates and 2.3 percent other soluble non-protein substances. These include organic acids, sulfur compounds, nitrogenous compounds, such as amino acids and nucleotides, and inorganic substances such as minerals. Accordingly, some embodiments of the present invention provide for replicating approximations of this composition for the consumable. For example, in some embodiments, the consumable is a plant-based meat replica comprising roughly 75% water, 19% protein, 2.5% fat, 1.2% carbohydrates; and 2.3 percent other soluble non-protein substances. In some embodiments the consumable is a plant-based meat replica comprising between 60-90% water, 10-30% protein, 1-20% fat, 0.1-5% carbohydrates; and 1-10 percent other soluble non-protein substances. In some embodiments the consumable is a plant-based meat replica comprising between 60-90% water, 5-10% protein, 1-20% fat, 0.1-5% carbohydrates; and 1-10 percent other soluble non-protein substances. In some embodiments the consumable is a plant-based meat replica comprising between 0-50% water, 5-30% protein, 20-80%% fat, 0.1-5% carbohydrates; and 1-10 percent other soluble non-protein substances.

In some embodiments, a meat replica contains between 0.01% and 5% by weight of a heme containing protein. In some embodiments, the replica contains between 0.01% and 5% by weight of leghemoglobin. Some meat also contains myoglobin, a heme containing protein, which accounts for most of the red color and iron content of some meat. It is understood that these percentages can vary in meat and the meat replicas can be produced to approximate the natural variation in meat. In embodiments that include a heme-containing protein and optional flavors, k-carrageenan can be used absorb some of the liquid contributed from the flavor and heme solution so the ground tissue is not excessively wet. During addition of flavor heme mix solution and the k-carrageenan powder are distributed evenly over the tissue mixture to ensure homogeneity in the final ground product.

It will be appreciated that when proteins are supplied as a solution, water removal techniques such as freeze-drying or spray drying can optionally be used to concentrate the protein. The proteins may then be reconstituted in an amount of liquid that prevents the ground tissue from being too moist.

Additionally, in some instances, the present invention provides for improved meat replicas, which comprise these components in unnatural percentages. The concentration of heme containing protein is an important determinant of meat flavor and aroma. Thus for example a meat replica could have a higher heme protein content than typical beef. For example a meat replica can be produced with a higher than typical average fat content. The percentages of these components may also be altered to increase other desirable properties.

In some instances a meat replica is designed so that, when cooked, the percentages of components are similar to cooked meat. So, in some embodiments, the uncooked consumable has different percentages of components than uncooked meat, but when cooked, the consumable is similar to cooked meat. For example, a meat replica may be made with a higher than typical water content for raw meat, but when cooked in a microwave, the resulting product has non-starch polysaccharides such as arabinoxylans, cellulose, and many other plant components such as resistant starch, resistant dextrins, inulin, lignin, waxes, chitins, pectins, beta-glucans, and oligosaccharide percentages of components similar to meat cooked over a fire.

In some embodiments, the consumable is a meat replica with a lower that typical water content for meat. In some embodiments the inventions provides for methods for hydrating a meat replica to cause the meat replica to have a water content similar to meat. For example a meat replica with a water content that would be low for meat, for example 1%, 10%, 20%, 30%, 40% or 50% water, can be hydrated to roughly 75% water. Once hydrated, in some embodiments, the meat replica is then cooked for human consumption.

The consumable can have a protein component. In some embodiments the protein content of the consumable is 10%, 20%, 30%, or 40%. In some embodiments the protein content of the consumable is similar to meat. In some embodiments the protein content in the consumable is greater than that of meat. In some embodiments the consumable has less protein than meat.

The protein in the consumable can come from a variety or combination of sources. Non-animal sources can provide some or all of the protein in the consumable. Non-animal sources can include vegetables, non food biomass such as carrot tops and *Miscanthus*, seaweed, fruits, nuts, grains, algae, bacteria, or fungi. See, e.g, Sections III A and B. The protein can be isolated or concentrated from one or more of these sources. In some embodiments the consumable is a meat replica comprising protein only obtained from non-animal sources.

In some embodiments protein is formed into asymmetric fibers for incorporation into the consumable. In some embodiments these fibers replicate muscle fibers. In some embodiments the protein are spun fibers. Accordingly, the present invention provides for methods for producing asymmetric or spun protein fibers. In some embodiments the consumable contains a protein or proteins that have all of the amino acids found in proteins that are essential for human nutrition. In some embodiments the proteins added to the consumable are supplemented with amino acids.

The physical organization can be a determinant of the response of the meat substitute to cooking. For example, the flavor of meat is modified by the size of the particles. Ground meat that has been reduced to a paste provides different flavors than more crudely ground beef upon cooking. The ability to control the relative size and orientation of individual tissue replicas enables the flavor and aroma profile of consumables to be modified during cooking. For example, muscle tissue replicas and adipose tissue replicas provide different flavor profiles when cooked independently or when mixed. Further changes in the flavor profile are observed based on the method by which the different tissue replicas are mingled.

The physical organization of the meat substitute product can be manipulated by controlling the localization, organization, assembly, or orientation of the muscle, fat, and/or connective tissue replicas described herein. In some embodiments the product is designed in such a way that the replicas described herein are associated with one another as in meat. In some embodiments the consumable is designed so that after cooking the replicas described herein are associated with one another as in cooked meat.

Characteristic flavor and fragrance components of meat are mostly produced during the cooking process by chemical reactions, the substrates for which are amino acids, fats and sugars which are found in plants as well as meat. Therefore in some embodiments the consumable is tested for similarity to meat during or after cooking. In some embodiments human ratings, human evaluation, olfactometer readings, or GCMS measurements, or combinations thereof, are used to create an olfactory map of cooked meat. Similarly, an olfactory map of the consumable, for instance a meat replica, can be created. These maps can be compared to assess how similar the cooked consumable it so meat. In some embodiments the olfactory map of the consumable during or after cooking is similar to or indistinguishable from that of cooked or cooking meat. In some embodiments the differences are sufficiently small as to be below the detection threshold of human perception.

In some embodiments the individual tissue replicas are assembled in layers, sheets, blocks and strings in defined positions and orientations.

In some embodiments, the replicas are combined in the process of passing through the plates of a meat grinder with the holes set at less than ½ inch (e.g., at ¼ inch). The grinder provides multiple functions of reducing the particle size, providing additional mixing or working, and forming the material into cylindrical portions like what is typically done for ground beef. During the assembly, grinding, and forming, it is important to keep the replica tissues cold (e.g., 4-15° C.) to control microbial growth, limit flavor reactions, and also to maintain the adipose in a solid state so discrete pieces of adipose will be maintained through the grinding process.

Prior to grinding, the replica tissues are usually broken down in some manner to a defined particle size. For example, in some embodiments, the individual tissue replicas can be formed into small pieces less than 1 cm in diameter or less than 5 mm in diameter before combination with the other tissue replicas. Adipose tissue can be crumbled into about 3-7 mm particles. This is important to both the appearance of the final material and the behavior of fat leakage during cooking. This size range allows for a natural appearance of adipose flecks in the final raw product. If the adipose tissues are too small (e.g., less than 2 mm), there will be an insufficient amount of fat leaked from the product when cooked.

Soft connective tissue replicas can be broken down into pieces of about 1-3 mm in length with ragged edges. If the pieces are too large (e.g., greater than about 4 mm), the texture of the final product can be too beady.

Sticky tissue or noodles tissue replicas, composed of amorphous or long noodle like tissue replica pieces, respectively, and raw tissue replicas can be manually broken down into pieces about 1-3 cm in diameter. Achieving particles in this size range allows for adequate mixing and suitable homogeneity in the final ground material.

In some embodiments, hard connective tissue replicas can be chopped to three levels, (e.g., coarse, intermediate, and fine). Chopping to three levels provides a greater amount of heterogeneity than a single step chopping process, and makes the mouthfeel of the final product more similar to ground beef.

In formulations containing gluten an additional function of the food grinder is to work the gluten and develop a gluten network of aligned gluten molecules. For gluten containing formulations it is important to minimize interaction of the adipose with the gluten network. This is done by prechilling the adipose replicas and ground tissue replicas prior to combining and also by minimizing the amount of manipulation after the adipose is added. Overworking of adipose replicas into the gluten will break down or "shorten" the gluten network.

Finally for gluten containing formulations the patties are allowed to rest at room temperature for 30 min or overnight at 4 C prior to cooking. This allows time for the gluten network to relax, giving an overall better texture.

In some embodiments, the connective tissue replica is incorporated into the protein solution before formation of the muscle tissue replica.

In some embodiments, the connective tissue replica is directly incorporated into the emulsion before formation of the adipose tissue replica.

In some embodiments, the adipose tissue replica is added to the muscle tissue replica in strands and sheets to replicate the effect of "marbling," or streaky bacon.

Mixed meat tissue replicas can increase the sense of flavors, such flavors including, but not limited to, multiple aromatic compounds associated with fruity/grean bean/metallic, nutty/green, peanut butter/musty, raw potato/roasted/earthy, vinegary, spicy/caramel/almond, creamy, sweet, fruity/stale beer, musty/nutty/coumarin/licorice/walnut/bread, coconut/woody/sweet, penetrating/sickening, minty, or toasty caramel aromas.

In some embodiments the mixed meat replicas increase the presence of volatile odorants, such as 2-pentyl-furan; 4-methylthiazole; ethyl pyrazine; 2,3-dimethylpyrazine, acetic acid; 5-methyl-2-furancarboxaldehyde; butyrolactone; 2,5-dimethyl-3-(3-methyl butyl) pyrazine; 2-cyclopentene-1-one, 2-hydroxy-3-methyl; 3-acetyl-1h-pyrolline; pantolactone; 1-methyl 1(H)-pyrrole-2-2carboxaldehyde; caprolactam; 2,3-dihydro-3,5-dihydroxy-6-methyl-4(H)-pyran-4-one. in some embodiments, the undesired flavors including but not limited to gasoline-like, petroleum, sour/putrid/fish-like, bland/woody/yogurt, fatty/honey/citrus, pungent/sweet/caramelic and nutty/burnt green aromas, form only in individual tissue replicas, but do not accumulate in mixed meat replicas. In some embodiments, the individual tissue replicas increase the presence of volatile odorants including but not limited to nonane, 2,6-dimethyl, 3-methyl 3-hexene; pyridine; acetoin; octanal; 1-hydroxy-2-propanone; and/or ethenyl pyrazine. In some embodiments the levels to which all of the above compounds accumulate during cooking depend on the sizes of tissue replica units and how they are mixed (coarse, fine, or blended).

In some embodiments, the mixed meat tissue replicas increase the sense of flavors including but not limited to, multiple aromatic compounds associated with fruity/green bean/metallic, nutty/green, peanut butter/musty, raw potato/roasted/earthy, vinegary, spicy/caramel/almond, creamy, sweet, fruity/stale beer, musty/nutty/coumarin/licorice/walnut/bread, coconut/woody/sweet, penetrating/sickening, minty, or toasty caramel aromas. In some embodiments, the mixed meat replicas increase the presence of volatile odorants including but not limited to phenylacetaldehyde, 1-octen-3-one, 2-n-heptylfuran, 2-thiophenecarboxaldehyde, 3-thiophenecarboxaldehyde, butyrolactone, 2-undecenal, methyl-pyrazine, furfural, 2-decanone, pyrrole, 1-octen-3-ol, 2-acetylthiazole, (E)-2-octenal, decanal, benzaldehyde, (E)-2-nonenal, pyrazine, 1-hexanol, 1-heptanol, dimethyl trisulfide, 2-nonanone, 2-pentanone, 2-heptanone, 2,3-butanedione, heptanal, nonanal, 2-octanone, 1-octanol, 3-ethylcyclopentanone, 3-octen-2-one, (E,E)-2,4-heptadienal, (Z)-2-heptenal, 2-heptanone, 6-methyl-, (Z)-4-heptenal, (E,Z)-2,6-nonadienal, 3-methyl-2-butenal, 2-pentyl-furan, thiazole, (E, E)-2,4-decadienal, hexanoic acid, 1-ethyl-5-methylcyclopentene, (E,E)-2,4-nonadienal, (Z)-2-decenal, dihydro-5-pentyl-2(3H)-furanone, trans-3-nonen-2-one, (E,E)-3,5-octadien-2-one, (Z)-2-octen-1-ol, 5-ethyldihydro-2(3H)-furanone, 2-butenal, 1-penten-3-ol, (E)-2-hexenal, formic acid, heptyl ester, 2-pentyl-thiophene, (Z)-2-nonenal, 2-hexyl-thiophene, (E)-2-decenal, 2-ethyl-5-methyl-pyrazine, 3-ethyl-2,5-dimethyl-pyrazine, 2-ethyl-1-hexanol, thiophene, 2-methyl-furan, pyridine, butanal, 2-ethyl-furan, 3-methyl-butanal, trichloromethane, 2-methyl-butanal, methacrolein, 2-methyl-propanal, propanal, acetaldehyde, 2-propyl-furan, dihydro-5-propyl-2(3H)-furanone, 1,3-hexadiene, 4-decyne, pentanal, 1-propanol, heptanoic acid, trimethyl-ethanethiol, 1-butanol, 1-penten-3-one, dimethyl sulfide, 2-ethyl furan, 2-pentyl-thiophene, 2-propenal, 2-tridecen-1-ol, 4-octene, 2-methyl thiazole, methyl-pyrazine, 2-butanone, 2-pentyl-furan, 2-methyl-propanal, butyrolactone, 3-methyl-butanal, methyl-thiirane, 2-hexyl-furan, butanal, 2-methyl-butanal, 2-methyl-furan, furan, octanal, 2-heptenal, 1-octene, formic acid heptyl ester, 3-pentyl-furan, and 4-penten-2-one. In some embodiments the levels to which all of the above compounds accumulate during cooking depend on the sizes of tissue units and how they are mixed (coarse, fine, or blended).

The production of volatile odorants can be enhanced when the adipose, muscle and connective tissue replicas are contacting one another. In some embodiments, the production of volatile odorants is enhanced when the adipose, muscle and connective tissues are intimately mixed with a mean size of the individual tissue replicas of 5 mm. In some embodiments, the production of volatile odorants is enhanced when the fat, muscle and connective tissues are intimately mixed with mean size of the individual tissue replicas of 2 mm. In some embodiments, said production of volatile odorants is enhanced when the fat, muscle and connective tissue replicas are intimately mixed with mean size of the individual tissue replicas of 1 mm.

In some embodiments, the meat substitute is optimized for particular cooking methods (optimized for cooking in a microwave oven, or optimized for cooking in a stew).

In some embodiments, the meat substitute is optimized for dehydration.

In some embodiments, said meat substitute is optimized for fast rehydration upon exposure of the dehydrated meat replica to water.

In some embodiments, said meat substitute is optimized for use as emergency, camping or astronaut food.

The methods described herein can be used to provide a meat replica with defined cooking characteristics to allow the production of meat replicas that are optimized for particular cooking techniques. For example, stews require slow cooking to gelatinize the connective tissue in the meat, whereas meat replicas can be designed wherein the connective tissue replica is more easily gelatinized thus allowing stews to be prepared quickly.

B. Indicators of Cooking Meat

The consumable can include compositions which can indicate that the consumable is cooking or has cooked. The release of odorants upon cooking is an important aspect of meat consumption. In some embodiments, the consumable is a meat replica entirely composed of non-animal products that when cooked generates an aroma recognizable by humans as typical of cooking beef. In some embodiments, the consumable when cooked generates an aroma recognizable by humans as typical of cooking pork, bacon, chicken, lamb, fish, or turkey. In some embodiments the consumable is a meat replica principally or entirely composed of ingredients derived from non-animal sources, with an odorant that is released upon cooking or that is produced by chemical reactions that take place upon cooking. In some embodiments the consumable is a meat replica principally or entirely composed of ingredients derived from non-animal sources, containing mixtures of proteins, peptides, amino acids, nucleotides, sugars and polysaccharides and fats in combinations and spatial arrangements that enable these compounds to undergo chemical reactions during cooking to produce odorants and flavor-producing compounds.

In some embodiments, the consumable is a meat replica principally or entirely composed of ingredients derived from non-animal sources, with a volatile or labile odorant that is released upon cooking.

In some embodiments, the indicator is a visual indicator that accurately mimics the color transition of a meat product during the cooking progression. The color transition can be, for example, from red to brown, from pink to white or tan, or from a translucent to opaque color during the cooking progression.

In some embodiments, the indicator is an olfactory indicator that indicates cooking progression. In one embodiment, the olfactory indicator is one or more volatile odorants released during cooking.

In some embodiments, the indicator comprises one or more isolated, purified iron-containing proteins. In some embodiments, the one or more isolated, purified iron-containing proteins (e.g., a heme-containing protein, see section III B) is in a reduced state before cooking. In some embodiments, the one or more isolated and purified iron carrying proteins in a reduced or oxidized state has a similar UV-VIS profile to a myoglobin protein derived from an animal source when in an equivalent reduced or oxidized state. The *Aquifex aeolicus* hemoglobin has a peak absorbance wavelength at 413 nm; the *Methylacidiphilum infernorum* hemoglobin has a peak absorbance wavelength at 412 nm; the *Glycine max* leghemoglobin has a peak absorbance wavelength at 415 nm; the *Hordeum vulgare* and *Vigna radiata* non-symbiotic hemoglobins each have a peak absorbance wavelength at 412 nm. The *Bos taurus* myoglobin has a peak absorbance wavelength at 415 nm.

In some embodiments, the difference between the peak absorbance wavelength of the one or more isolated and purified iron-containing proteins and the peak absorbance wavelength of myoglobin derived from an animal source is less than 5%.

Odorants released during cooking of meat are generated by reactions that can involve as reactants fats, protein, amino acids, peptides, nucleotides, organic acids, sulfur compounds, sugars and other carbohydrates. In some embodiments the odorants that combine during the cooking of meat are identified and located near one another in the consumable, such that upon cooking of the consumable the odorants combine. So, in some embodiments, the characteristic flavor and fragrance components are produced during the cooking process by chemical reactions involving amino acids, fats and sugars found in plants as well as meat. So, in some embodiments, the characteristic flavor and fragrance components are mostly produced during the cooking process by chemical reactions involving one or more amino acids, fats, peptides, nucleotides, organic acids, sulfur compounds, sugars and other carbohydrates found in plants as well as meat.

Some reactions that generate odorants released during cooking of meat can be catalyzed by iron, in particular the heme iron of myoglobin. Thus in some embodiments, some of the characteristic flavor and fragrance components are produced during the cooking process by chemical reactions catalyzed by iron. In some embodiments, some of the characteristic flavor and fragrance components are produced during the cooking process by chemical reactions catalyzed by heme. In some embodiments, some of the characteristic flavor and fragrance components are produced during the cooking process by chemical reactions catalyzed by the heme iron in leghemoglobin. In some embodiments, some of the characteristic flavor and fragrance components are produced during the cooking process by chemical reactions catalyzed by the heme iron in a heme protein. For example, hemeproteins (e.g., from *Aquifex aeolicusm, Methylacidiphilum infernorum, Glycine max, Hordeum vulgare,* or *Vigna radiate*) provide a significantly different profile of volatile odorants when heated in the presence of cysteine and glucose than any subset of the three components when analysed by GC-MS. Volatile flavor components that are increased under these conditions include but are not limited to furan, acetone, thiazole, furfural, benzaldehyde, 2-pyridinecarboxaldehyde, 5-methyl-2-thiophenecarboxaldehyde, 3-methyl-2-thiophenecarboxaldehyde, 3-thiophenmethanol and decanol. Under these conditions, cysteine and glucose alone or in the presence of iron salts such as ferrous glucanate produced a sulfurous, odor but addition of heme proteins reduced the sulfurous odor and replaced it with flavors including but not limited to chicken broth, burnt mushroom, molasses, and bread.

Additionally, a hemeprotein (e.g., from *Aquifex aeolicus, Methylacidiphilum infernorum, Glycine max, Hordeum vulgare,* or *Vigna radiata*) when heated in the presence of ground chicken increased specific volatile odorants that are elevated in beef compared to chicken when analyzed by GC-MS. Volatile flavor components that are increased under these conditions include but are not limited to propanal, butanal, 2-ethyl-furan, heptanal, octanal, trans-2-(2-pentenyl)furan, (Z)-2-heptenal (E)-2-octenal pyrrole, 2,4-dodecadienal, 1-octanal, or (Z)-2-decenal 2-undecenal.

C. Color Indicators

The color of meat is an important part the experience of cooking and eating meat. For instance, cuts of beef are of a characteristic red color in a raw state and gradually transition to a brown color during cooking. As another example, white meats such as chicken or pork have a characteristic pink color in their raw state and gradually transition to a white or brownish color during cooking. The amount of the color transition is used to indicate the cooking progression of beef and titrate the cooking time and temperature to produce the desired state of done-ness. In some aspects, the invention provides a non-meat based meat substitute product that provides a visual indicator of cooking progression. In some embodiments, the visual indicator is a color indicator that undergoes a color transition during cooking. In some embodiments, the color indicator recapitulates the color transition of a cut of meat as the meat progresses from a raw to a cooked state. In more embodiments, the color indicator colors the meat substitute product a red color before cooking to indicate a raw state and causes the meat substitute product to transition to a brown color during cooking progression. In other embodiments, the color indicator colors the meat substitute product a pink color before cooking to indicate a raw state and causes the meat substitute product to transition to a white or brown color during cooking progression.

The main determinant of the nutritional definition of the color of meat is the concentration of iron carrying proteins in the meat. In the skeletal muscle component of meat products, one of the main iron-carrying proteins is myoglobin. As described above, the myoglobin content of varies from under 0.05% in the white meat of chicken to 1.5-2.0% in old beef. So, in some embodiments, the consumable is a meat replica which comprises an iron-carrying protein (e.g., a heme-containing protein). In some embodiments, the meat replica comprises about 0.05%, about 0.1%, about 0.2%, about 0.3%, about 0.4%, about 0.5%, about 0.6%, about 0.7%, about 0.8%, about 0.9%, about 1%, about 1.1%, about 1.2%, about 1.3%, about 1.4%, about 1.5%, about 1.6%, about 1.7%, about 1.8%, about 1.9%, about 2%, or more than about 2% of an iron-carrying protein (e.g., a heme-containing protein) by dry weight or total weight. In some cases, the iron carrying protein has been isolated and purified from a source. In other cases, the iron carrying protein has not been isolated and purified. In some cases, the source of the iron-carrying protein is an animal source, or a non-animal source such as a plant, fungus, or genetically modified organisms such as, e.g., plant, algae, bacteria or fungus. In some cases, the iron-carrying protein is myoglobin. In some embodiments the consumable is a plant based meat replica that has animal myoglobin added. So, for example a replica of young beef can have about 0.4-1% myoglobin. In some embodiments the consumable is a plant based meat replica that has a leghemoglobin or a cytochrome added. So, for example, a replica of young beef can have about 0.4-1% leghemoglobin or cytochrome.

Another example of iron-carrying proteins is hemoglobin, the iron-containing oxygen-binding protein in the red blood cells of vertebrates. Hemoglobin is similar in color to myoglobin. In some embodiments the invention provides methods of saving and recycling blood from animal farming to supplement the color of a consumable. For example, blood is saved from a slaughter house, and hemoglobin from the blood is used to enhance the color of a consumable. In some aspects the consumable is a plant-based meat replica containing hemoglobin.

Figure 3:
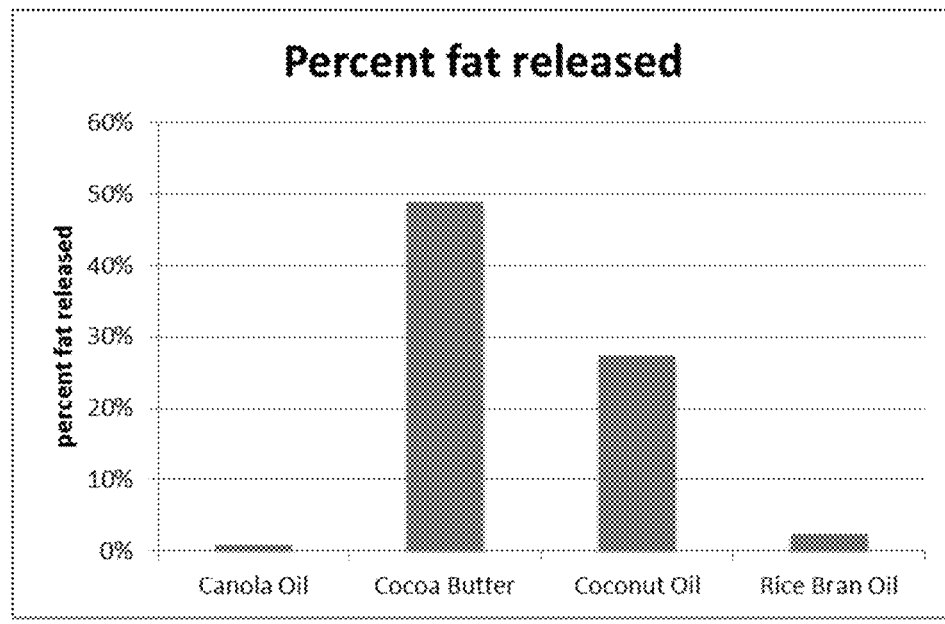
FIG. 3 is a bar graph depicting the percent fat release of adipose replicas containing different oils (canola oil, cocoa butter, coconut oil, or rice bran oil).

Additional iron containing proteins exist in nature. In some embodiments the consumable comprises an iron containing protein that is not myoglobin. In some embodiments the consumable does not contain myoglobin. In some embodiments the consumable does not contain hemoglobin. In some embodiments the consumable is a meat replica that comprises an iron containing protein other than myoglobin or hemoglobin. See, for example, Section III B for examples of heme-containing proteins, as well as FIG. 3. For example, in some embodiments the consumable comprises a hemoprotein (e.g., a hemoglobin, myoglobin, neuroglobin, cytoglobin, leghemoglobin, non-symbiotic hemoglobin, Hell's gate globin I, a bacterial hemoglobin, a ciliate myoglobin, or a flavohemoglobin).

Leghemoglobin, similar in structure and physical properties to myoglobin, is readily available as an unused byproduct of commodity legume crops (e.g., soybean or pea). The leghemoglobin in the roots of these crops in the US exceeds the myoglobin content of all the red meat consumed in the US.

In some embodiments, the consumable is a meat replica principally or entirely composed of ingredients derived from non-animal sources, and containing a heme protein (e.g., a leghemoglobin or member of the globin protein family). For example, a meat replica can be principally or entirely composed of ingredients derived from non-animal sources, including a muscle tissue replica, an adipose tissue replica, a connective tissue replica, and a heme protein. In some embodiments the consumable is a meat replica principally or entirely composed of ingredients derived from non-animal sources, with a high iron content from a heme protein. In some embodiments the iron content is similar to meat. In some embodiments the consumable has the distinctive red color of meat, such color provided by leghemoglobin.

A heme protein (e.g., a heme-containing protein described in Section III B) can be used as an indicator that the consumable is finished cooking. So, one embodiment of the invention is a method for cooking a consumable comprising detecting leghemoglobin, which has migrated from the interior of the consumable to the surface when the product is cooked. Another embodiment of the invention is a method for cooking a consumable comprising detecting the change in color of from red to brown when the product is cooked.

In some embodiments, the increased shelf life is provided by an extension of the lifetime of the desired red color of food products (e.g., a non-meat based meat substitute).

In one embodiment, this invention provides hemoproteins that provide a desired color to non-meat meat substitutes. In some embodiments, the hemoproteins are derived from a non-animal source such as a plant, fungus, or genetically modified organisms such as, e.g., plant, algae, bacteria or fungus. See, e.g., section III B. In some embodiments the life time of the hemoproteins is extended by treatment with meat shelf life extenders.

In some embodiments, the meat shelf life extenders are selected from a groups consisting of carbon monoxide, nitrites, sodium metabisulfite, Bombal, rosemary extract, green tea extract, catechins and other anti-oxidants.

In one embodiment, this invention provides hemoproteins that provide a desired flavor profiles to food products (e.g., non-meat meat substitutes). In some embodiments, the ability of the hemoproteins to generate the desired flavor profile is similar to that of myoglobin In some embodiments, the life time of the ability of the hemoproteins to generate the desired flavor profile is 10%, 20%, 30% 50%, or 100% or more greater than that of myoglobin.

D. Food Products Comprising Isolated, Purified Heme Proteins

In some embodiments, heme proteins described herein are added to meat or a consumable described herein to enhance the properties of the meat or consumable. For example, a heme protein containing solution can be injected into raw (e.g., raw white meat) or cooked meat to improve the organoleptic properties of the meat during cooking adding a "beefy" flavor (e.g., to white meats such as chicken).

In another example, a heme protein solution can be dripped over meat or a consumable of the invention to enhance appearance. In one embodiment, advertising, photography, or videography of food products such as meat or a meat substitute can be enhanced with a heme protein.

In another embodiment, a heme protein is added to the consumable as an iron supplement.

In one application of the invention, hemeproteins may be used as food dyes. In one embodiment, the heme proteins may be used as a safe, digestible replacement for FD&C Red No. 40—Allura Red AC, E129 (red shade) in a variety of applications. A non-limiting list of such potential uses would include making pictures, especially in forms such as bodypainting or as theatrical blood.

In some embodiments, the present invention provides methods for obtaining hemeproteins (e.g., leghemoglobin) from a plant. Leghemoglobin can be obtained from a variety of plants. Various legumes species and their varieties (e.g., soybean, fava bean, lima bean, cowpeas, English peas, yellow peas, Lupine, kidney beans, garbanzo beans, peanuts, Alfalfa, Vetch hay, clover, *Lespedeza*, or pinto bean) contain nitrogen-fixing root nodules in which leghemoglobin has a key role in controlling oxygen concentrations (for example root nodules from a pea plant). In one embodiment leghemoglobin protein is purified from root nodules of legume plants (e.g., soybeans, favabeans, or peas) using ion-exchange chromatography. In an embodiment, leghemoglobin is purified from soybean, favabean or sweet pea root nodules.

Plants can be grown using standard agricultural methods, with the exception that, in some instances, fertilizer is not applied and soil is enriched in natural nitrogen-fixing bacteria from the *Rhizobium* genus. Either whole roots or root nodules can be harvested and lysed, for example in 20 mM potassium phosphate pH 7.4, 100 mM potassium chloride and 5 mM EDTA using grinder-blender. During this process, leghemoglobin is released into the buffer. Root-nodule lysate containing leghemoglobin can be cleared from cell debris by filtration through 5 µm filter. In some embodiments, filtration is followed by centrifugation (7000 g, 20 min). Clarified lysate containing leghemoglobin is then filtered through 200 nm filter and applied onto anion-exchange chromatography column (High Prep Q; High Prep DEAE, GE Healthtcare) on fast protein liquid chromatography machine (GE Healthcare). Leghemoglobin is collected in the flowthrough fraction and concentrated over 3 kDa filtration membrane to a desired concentration. Purity (partial abundance) of purified leghemoglobin is analyzed by SDS-PAGE gel: in lysate leghemoglobin is present at 20-40%, while after anion-exchange purification it is present at 70-80%. In another embodiment, soybean leghemoglobin flowthrough from anion-exchange chromatography is applied onto size-exclusion chromatography (Sephacryl S-100 HR, GE Healthcare). Soybean leghemoglobin is eluted as two fractions corresponding to dimer and monomer species. Purity (partial abundance) of leghemoglobin was analyzed by SDS-PAGE and determined to be ~90-100%.

Proteins in legume root-nodule lysate can be transferred into 10 mM sodium carbonate pH 9.5, 50 mM sodium chloride buffer, filtered through 200 nm filter and applied onto anion-exchange chromatography column on fast protein liquid chromatography instrument (GE Healthcare). Leghemoglobin can be bound to anion-exchange chromatography matrix and eluted using sodium chloride gradient. Purity (partial abundance) of leghemoglobin can be analyzed by SDS-PAGE and determined to be ~60-80%.

Undesired small molecules from legume roots can be removed from purified leghemoglobin by passing leghemoglobin in solution over anion-exchange resin. These small molecules imbue varying shades of brown color to root-root nodule lysates, thus decreasing the color quality of leghemoglobin solution. In one embodiment, anion-exchange resin is FFQ, DEAF, Amberlite IRA900, Dowex 22, or Dowex 1×4. Leghemoglobin purified either by ammonium sulfate fractionation (60% wt/v and 90% wt/v ammonium sulfate) or by anion-exchange chromatography was buffer exchanged into 20 mM potassium phosphate pH 7.4, 100 mM sodium chloride and solution passed over one of the above mentioned anion-exchange resins. Flowthrough can be collected and its colored compared to the color of the solution before passage over anion-exchange resins. Color improvement to purified leghemoglobin solution as evaluated by visual inspection can be observed (from yellow/brown to more apparent red), however to different extent of removal of yellow-brown tinge.

Alternatively, the heme-containing protein can be recombinantly produced as described in section III B. For example, a non-symbiotic hemoglobin from moong bean can be recombinantly expressed in *E. coli* and purified using anion-exchange chromatography or cation-exchange chromatography. A cell lysate can be loaded over FF-Q resin on fast protein liquid chromatography instrument (GE Healthcare). Moong bean non-symbiotic hemoglobin eluted in the flowthrough fractions. Purity (partial abundance) of Moong bean non-symbiotic hemoglobin was analyzed by SDS-PAGE and determined to be as a fraction of total protein: 12% in *E. coli* lysate, and 31% after purification on FFQ. UV-Vis analysis of purified protein showed spectra characteristic of heme bound protein.

Alternatively, the cell lysate can be loaded over a FF-S resin on a fast protein liquid chromatography instrument (GE Healthcare). Moong bean non-symbiotic hemoglobin can be bound to FF-S column and eluted using sodium chloride gradient (50 mM-1000 mM). Purity (partial abundance) of Moong bean non-symbiotic hemoglobin can be analyzed by SDS-PAGE and determined to be: *E. coli* lysate 13%, after purification on FFQ 35%. UV-Vis analysis of purified protein can show spectra characteristic of heme bound protein.

In some embodiments, the heme proteins are utilized as ingredients in food products where the flavor of blood is desired. Heme-containing proteins of the invention were tasted by a panel of volunteers and in each case described as tasting like blood.

Heme proteins, for example leghemoglobin, can be combined with other plant based meat replica components. In some embodiments the heme proteins are captured in a gel which contains other components, for example lipids and or other proteins. In some aspects, multiple gels are combined with non-gel based heme proteins. In some embodiments, the combination of the heme proteins and the other compounds of the consumable are done to insure that the heme proteins are able to diffuse through the consumable. In some embodiments the consumable is soaked in a heme-protein containing solution, for instance a leghemoglobin solution, e.g., for 1, 5, 10, 15, 30, or 45 minutes or for 1, 5, 10, 15, 20 or 30 hours.

Given the usefulness of heme proteins for coloring consumables, it is useful to detect whether a product contains a particular heme protein. Accordingly the present invention includes in some embodiments methods to determine whether a product contains a heme protein. For example, an ELISA, a proximity-ligation assay, a luminex assay, or western blot analysis can be performed to determine whether leghemoglobin or other heme-containing protein is present in a food product such as meat or a meat replica. In one embodiment the detection methods are performed to determine whether meat has been altered with leghemoglobin or other heme-containing protein.

E. Mayonnaise Spread Replica.

Mayonnaise is thick, creamy sauce. Traditional mayonnaise is a stable emulsion of oil and egg yolk. It is thought that lecithin and proteins from egg yolk stabilize the emulsion. Traditional commercial mayonnaise typically contains 70-80% (wt/wt) fat and 5% (wt/wt) of egg yolk. Lower fat commercial products can contain ~20% wt/wt fat. The consumable can comprise a composition that has comparable properties to mayonnaise.

In one embodiment, purified plant proteins can be used as substitute for egg proteins to make stable, creamy protein-fat emulsions whose visual and mouth-feel appearance resemble traditional mayonnaise. Fat (~20-80% wt/wt) can be from a single source or from multiple sources as described herein. Non-traditional mayonnaise products can be used for all the culinary applications that traditional mayonnaise is used for. In one embodiment, vinegar and/or lemon and/or lime juice are added as flavor additives. In one embodiment, the purified plant proteins are not soy proteins. In one embodiment, the flavor can be modified by addition of mustard, spices, herbs, and/or pickles.

A mayonnaise replica can comprise a mixture of non-animal proteins. In one embodiment, a mayonnaise replica is a mixture of 50% (wt/v) rice bran oil and 7% (wt/v) Moong bean 8S protein. In one embodiment, a mayonnaise replica is a mixture of 70% (wt/v) sunflower oil or cocoa butter, 2.4% (wt/v) RuBisCo, 0.29% (wt/wt) soybean lecithin, and optionally 8 µM oleosin.

The mixture can be emulsified, and the stability of the emulsion can be controlled by modifying the size of the oil-water-protein particles by high pressure homogenization or sonication. Oil can be added as liquid. Protein can be added as solution in buffer. Soybean lecithin can be resuspended in water and sonicated prior to mixing with an oil and protein solution. A resulting oil, protein and lecithin solution can be homogenized, for example, first at 5000 psi and then at 8000 psi, or can be sonicated at 40% duty cycle for 2 minutes at maximum setting. Thickness, texture, creaminess and visual appearance of resulting products are similar to one of traditional mayonnaise. In some instances (e.g. using Moong bean 8S protein and rice bran oil), a product is a light off-white in color.

F. Cream Liquor Replica

Traditionally, cream liquors contain dairy cream and liquor as their base. Examples of liquor include whiskey, Irish whiskey, Scotch whiskey, rum, vodka, grappa, or fermented fruits (e.g., cherry liquor), plum brandy, tequila, or herbal bitters. A cream liquour replica can be produced by substituting the dairy cream in cream liquor with a non-dairy cream fraction from plant sources. In one embodiment, dairy cream in a cream liquor can be substituted by a stable emulsion of plant fats and isolated or purified proteins of a consistency similar to dairy cream. In one embodiment, purified plant proteins and/or plant fats can be from single or multiple sources as described herein. For example, a cream liquor can include a sunflower cream fraction, RuBsiCo and whiskey, and one or more optional flavorings (e.g., vanilla, chocolate, and or coffee).

G. Protein Enriched Alcoholic Beverage

Traditionally, alcoholic beverages contain negligible to low amounts of protein. Addition of plant proteins to various alcoholic beverages would positively modify their flavor, mouthfeel, physical state and increase their nutritional protein content. In addition, the presence of protein in various alcoholic beverages used in cocktails would positively modify the cocktail's flavor, mouthfeel, physical state and increase their nutritional protein content. Different classes of alcoholic beverages contain different amounts of alcohols. For example, wine coolers contain about 4-7% alcohol, beer contains about ~3-10% alcohol, wine contains about 8-14% v/v alcohol, dessert wines contain about 17-20% alcohol, whiskey contains about ~40% alcohol, and vodka contains about 35-50% alcohol. In addition, some traditional alcoholic beverages include sugars (for example, Bacardi Razz at 10% wt/v).

Accordingly beverages containing alcohol can be supplemented by addition of purified plant proteins at for example 0.1-5% wt/v and optionally sugar (1-15% wt/v). The sugar can be, for example, cane sugar, brown sugar, sucrose, or glucose. For example, purified Rubisco at 180 mg/ml in 20 mM K-phosphate pH 7.0, 150 mM NaCl can be added to a whiskey. Jameson whiskey supplemented with 5% wt/v Rubsico formed a soft gel, with a consistency similar to traditional Jello shots.

For example, Rubsico, moong bean 8S, and pa Globulin enriched alcoholic beverages were made by adding purified Rubsico, Moong bean 8S and pea globulin proteins at final protein concentrations of 0.5%, 1% and 5% wt/v, respectively, to Corona beer, Pinot grigio wine and Jameson whiskey. Zein was added at 0.5%, 1% and 5% wt/v to a 60% ethanol, 5% sucrose solution in water.

Pea proteins were extracted from pea flour by resuspending the flour in 5%, 20% or 40% ethanol, 5% sucrose solutions in water, followed by incubation for 1 hr at room temperature. Any undissolved solids were removed by centrifugation at 5000 g for 10 min. The resultant supernatant solution was clear in appearance. The 5% ethanol solution was particularly useful.

A sensory panel evaluated all protein enriched alcoholic beverages as having aromas and flavors different from beverages not-enriched in protein. In some cases, generated aromas and flavors were judged as neutral, in some cases as more appealing and in some cases as less appealing than controls. In particular example, addition of both 0.5% wt/v and 1% wt/v of Moong bean 8S protein to Jameson whiskey softened the aroma and mouthfeel of Jameson. Addition of 0.5% wt/v of moong bean to Jameson whisky added a slightly creamy flavor to Jameson, with an aroma similar to a traditional White Russian cocktail. Addition of 5% wt/v zein to Jameson whiskey generated aromas and flavor characterized as moldy beans and raw potato.

In another example where Corona beer was enriched with 0.5% wt/v pea Globulin, the aroma changed to hoppy and resembled one of Indian Pale Ale, and the flavor changed to carrying pea notes. Addition of 0.5% wt/v and 5% wt/v of moong bean 8S protein changed the Corona aroma towards sweet peony flower with an intensified hop aroma. The flavor was neutral in the case of 0.5% wt/v moong bean 8S and carried planty-nutty notes in the case of 5% wt/v moong bean 8S.

In another example where Pinot Grigio wine was enriched with 1% wt/v moong bean 8S protein, additional aroma notes of sweet and citrus were detected, and the flavor changed to that of carrying notes of peanut-butter. Addition of 1% wt/v of Pea Globulins modified the aroma to that of strong moldy oak and wet leaves. Flavor was modified to carry notes of mud. Addition of 5% wt/v of Rubisco generated aroma and flavor of wet hay.

A zein enriched 60% ethanol, 5% sucrose solution carried burnt tortilla chip aroma notes compared to a corresponding solution without zein. There was no difference in flavor.

Pea proteins enriched 5%, 20% and 40% ethanol, 5% sucrose solutions all developed earthy aroma and flavor compared to protein free controls. In addition, flavor of peas was detected and bitter flavor increased at higher alcohol content.

H. Chocolate Spread

Chocolate spread is a chocolate flavored spread whose traditional main ingredients are cocoa powder, dairy milk, plant oil, and sugar. Traditional chocolate spreads are either firm or soft solids at ambient room temperature and melt at temperatures below that of cocoa butter. The product can be used as a spread on bread, crepes, pancakes, icing for cakes and cookies, filling for chocolate confectionary, or non-dairy chocolate cake filling.

In one embodiment, dairy milk and milk products such as ice cream, whey, cream, yoghurt, sour cream or butter fat are substituted by a non-dairy cream fraction made as described herein. In one embodiment, a non-dairy cream fraction comes from a single source or multiple sources described herein. In one embodiment, dairy milk and milk products are substituted by any non-dairy milk described herein. In one embodiment, dairy milk and milk products are substituted by purified plant proteins described herein. In one embodiment, dairy milk and milk products are substituted by soft solid stable emulsions made from single or multiple plant oil and single or multiple purified plant proteins.

I. Other Applications:

In one embodiment, non-dairy plant cream fraction can be used as a substitute for dairy milk and dairy milk products to make non-dairy milk chocolate bars or non-dairy milk chocolate confectionary.

In one embodiment, non-dairy plant cream fraction and purified plant proteins can be used as substitute for dairy milk and dairy milk products to make non-dairy milk chocolate bars or a non-dairy milk chocolate confectionary.

In one embodiment, non-dairy plant cream fraction and plant proteins can be used to make chocolate mousse. Traditional main chocolate mousse ingredients are bittersweet or semisweet chocolate, dairy butter and eggs. In one embodiment, dairy butter can be substituted by a non-dairy plant cream fraction. In one embodiment, dairy butter and eggs can be substituted by a non-dairy plant cream fraction and a foam stabilizing plant seed storage proteins such as pea albumin.

In one embodiment, a vegan consumable such as pate analog can be made. Vegan pate analog can be made by finely chopping 10 g of fat replica and heating it on a frying pan with finely chopped shallots for 2-3 min. Muscle replica (20 g) made without connective tissue replica fibers can be chopped into ½-inch cubes and browned in the fat and shallots mix for another 3-5 min. The mixture can be forced through a sieve until homogeneous. The pan, while still warm, can be rinsed with a tablespoon of madeira without allowing it to evaporate fully. The liquid from the pan is added to the homogenized mix, spices (salt, pepper) are added to taste, and the mix is forced through a sieve again. After chilling in a refrigerator (e.g., for 15 minutes), the pate is ready to be served.

In some embodiments, other fat-to-muscle replica ratios are used to create leaner or richer pates. For example, pate can contain 0.5-10%, about 5%-40%, about 10%-60%, or about 30-70%, or >70% of an adipose tissue replica.

In some embodiments, a muscle tissue replica with a higher iron content can be used for pate to make it a closer imitation of pig or bird liver pate. For example, muscle tissue replica can contain about 1%, about 1.5%, about 2%, or >2% of a heme protein.

In some embodiments, muscle tissue replica with lower iron content can be used for pate to make it closer imitation of bird meat or fish pate. For example, muscle tissue replica can contain about 1%, about 0.5%, about 0.2%, or <0.2% of a heme protein.

In one embodiment, a vegan consumable such as a blood sausage analog can be made. Vegan blood sausage is made from a blood analog created by mixing solutions of heme protein and purified plant protein. For example, 35 ml of a mixed solution of leghemoglobin (120 mg/ml) and pea albumin (100 mg/ml), which approximates the composition of blood, can be carefully mixed with a slurry of corn flour in salt water (6:5 w/v flour to water ratio). A tablespoon of chopped onion can be fried with 10 g of chopped adipose tissue replica, mixed with a few raisins and cooled to room temperature before mixing with blood/flour mix. The mixture can be seasoned to taste (for example, using salt, pepper, parsley and/or cinnamon), loaded into vegetarian sausage casings, and poached in near-boiling water for about 45 min. After cooling, the sausage can be consumed as is or further cooked, for example smoked, crisped in an oven or roasted.

In some embodiments, muscle replica can be included in the recipe to imitate meat/blood sausages. In some embodiments, barley, buckwheat, oat, rice, rye, sorghum, wheat or other grains can be used in the blood sausage. In some embodiments, bread, chestnuts, potato, sweet potato, starch or other fillers can be added to, or substitute for, grains in blood sausage.

EXAMPLES

Example 1: Protein Isolation

All steps were carried out at 4° C. or room temperature. Centrifugation steps were at 8000 g for 20 mins, 4° C. or room temperature. The flour is suspended in a specific buffer, the suspension is centrifuged and the supernatant is microfiltered through a 0.2 micron PES membrane and then concentrated by ultrafiltration on a 3 kDa, 5 kDa, or 10 kDa molecular weight cutoff PES membrane on a Spectrum Labs KrosFlo hollow fiber tangential flow filtration system.

Once fractionated, all ammonium sulfate precipitate fractions of interest were stored at −20° C. until further use. Prior to their use in experiments, the precipitates were resuspended in 10 volumes of 50 mM K Phosphate buffer, pH 7.4, +0.5 M NaCl. The suspensions were centrifuged and the supernatants microfiltered through a 0.2 micron PES membrane and then concentrated by ultrafiltration on a 3 kDa, 5 kDa, or 10 kDa molecular weight cutoff PES membrane on a Spectrum Labs KrosFlo hollow fiber tangential flow filtration system. Protein composition at individual fractionation steps was monitored by SDS-PAGE and protein concentrations were measured by standard UV-Vis methods.

(i) Pea-albumins: Dry green or yellow pea flour was used as a source of pea albumins. The flour was suspended in 10 volumes of 50 mM sodium acetate buffer pH 5 and stirred for 1 hr. Soluble protein was separated from un-extracted protein and pea seed debris by either centrifugation (8000 g, 20 minutes) or filtration through a 5 micron filter. Supernatant or filtrate, respectively, was collected. To this crude protein extract, solid ammonium sulfate was added to 50% wt/v saturation. The solution was stirred for 1 hour and then centrifuged. To the supernatant from this step, ammonium sulfate was added to bring to 90% wt/v saturation. The solution was stirred for 1 hour, and then centrifuged to collect the pea albumin proteins in the pellet. The pellet was stored at −20° C. until further use. Protein was recovered from the pellet and prepared for use as described above, with the exception that final buffer can contain 0-500 mM sodium chloride.

In some embodiments, the flour was suspended in 10 volumes of 50 mM NaCl, pH 3.8 and stirred for 1 hour. Soluble protein was separated from un-extracted protein and pea seed debris by centrifugation (8000 g, 20 minutes). The supernatant was collected and filtered through a 0.2 micron membrane and concentrated using a 10 Kda cutoff PES membrane.

(ii) Pea-globulins: Dry green pea flour was used to extract pea globulin proteins. The flour was suspended in 10 volumes of 50 mM potassium phosphate buffer pH 8 and 0.4M sodium chloride and stirred for 1 hr. Soluble protein was separated from pea seed debris by centrifugation. The supernatant was subjected to ammonium sulfate fractionation in two steps at 50% and 80% saturation. The 80% pellet containing globulins of interest was stored at −20° C. until further use. Protein was recovered from the pellet and prepared for use as described above.

iii) Soybean 7S and 11S globulins: Globulins from soybean flour were isolated by first suspending lowfat/defatted soy flour in 4-15 volumes of 10 (or 20) mM potassium phosphate pH 7.4. The slurry was centrifuged at 8000 rcf for 20 mins or clarified by 5 micron filtration and the supernatant was collected. The crude protein extract contained both the 7S and 11S globulins. The solution then was 0.2 micron filtered and concentrated using a 10 kDa molecular weight cutoff PES membrane on a Spectrum Labs KrosFlo hollow fiber tangential flow filtration system or by passing over anion-exchange resin prior to use in experiments. The 11S globulins were separated from the 7S proteins by isoelectric precipitation. The pH of the crude protein extract was adjusted to 6.4 with dilute HCl, stirred for 30 min-1 hr and then centrifuged to collect the 11S precipitate and 7S proteins in the supernatant. The 11S fraction was resuspended with 10 mM Potassium phosphate pH 7.4 and the protein fractions were microfiltered and concentrated prior to use.

Soybean proteins also can be extracted by suspending the defatted soy flour in 4-15 volumes (e.g., 5 volumes) of 20 mM sodium carbonate, pH 9 (or water, pH adjusted to 9 after addition of the flour) or 20 mM potassium phosphate buffer pH 7.4 and 100 mM sodium chloride to decrease off-flavors in the purified protein. The slurry is stirred for one hour and centrifuged at 8000×g for 20 minutes. The extracted proteins are ultrafiltered and then processed as above or alternatively, the supernatant was collected and filtered through a 0.2 micron membrane and concentrated using a 10 KDa cutoff PES membrane.

(iv) Moong bean 8S globulins: Moong bean flour was used to extract 8S globulins by first suspending the flour in 4 volumes of 50 mM KPhosphate buffer pH 7 (+0.5M NaCl for lab scale purifications). After centrifugation, proteins in the supernatant were fractionated by addition of ammonium sulfate in 2 steps at 50% and 90% saturation respectively. The precipitate from the 90% fraction contained the 8S globulins and was saved at −20° C. until further use. Protein was recovered from the pellet and prepared for use as described above.

Moong bean globulins also can be extracted by suspending the flour in 4 volumes of 20 mM sodium carbonate buffer, pH 9 (or water adjusted to pH 9 after addition of the moong flour) to reduce off-flavors in the purified protein fractions. The slurry is centrifuged (or filtered) to remove solids, ultrafiltered and then processed as described above.

(v) Late embryogenesis abundant proteins: Flour (including but not limited to moong bean and soy flour) was suspended in 20 mM Tris-HCl, pH 8.0, 10 mM NaCl, and stirred at room temperature for 1 hour then centrifuged. Acid (HCl or acetic acid) was added to the supernatant to a 5% concentration (v/v), stirred at room temperature then centrifuged. The supernatant was heated to 95° C. for 15 minutes, and then centrifuged. The supernatant was precipitated by adding Trichoroacetic acid to 25%, centrifuged, then washed with acetone. Heating and acid wash steps can be carried out in the reverse direction as well.

(vi) Pea-Prolamins: Dry green pea flour was suspended in 5× (w/v) 60% ethanol, stirred at room temperature for one hour, then centrifuged (7000 g, 20 min) and the supernatant collected. The ethanol in the supernatant was evaporated by heating the solution to 85° C. and then cooling to room temperature. Ice-cold acetone was added (1:4 v/v) to precipitate the proteins. The solution then was centrifuged (4000 g, 20 min), and protein recovered as the light-beige colored pellet.

(vii) Zein-Prolamins: Corn protein concentration or flour was suspended in 5× (w/v) 60% ethanol, stirred at room temperature for one hour, then centrifuged. Ethanol in supernatant was evaporated with heat, and then the solution is centrifuged, and the protein recovered as the pellet.

(viii) RuBisCO was fractionated from alfalfa greens by first grinding leaves with 4 volumes of cold 50 mM potassium phosphate buffer pH 7.4 buffer (0.5M NaCl+2 mM DTT+1 mM EDTA) in a blender. The resulting slurry was centrifuged to remove debris, and the supernatant (crude lysate) was used in further purification steps. Proteins in the crude lysate were fractionated by addition of ammonium sulfate to 30% (wt/v) saturation. The solution was stirred for 1 hr and then centrifuged. The pellet from this step was discarded and additional ammonium sulfate was added to the supernatant to 50% (wt/v) ammonium sulfate saturation. The solution was centrifuged again after stirring for 1 hr. The pellet from this step contains RuBisCO, and was kept at −20° ° C. until used. Protein was recovered from the pellet and prepared for use as described above.

RuBisCO also can be purified by adjusting the crude lysate to 0.1M NaCl and applying to an anion exchange resin. The weakly bound protein contaminants are washed with 50 mM KPhosphate buffer pH 7.4 buffer+0.1M NaCl. RuBisCO was then eluted with high ionic strength buffer (0.5M NaCl).

RuBisCO solutions were decolorized (pH 7-9) by passing over columns packed with activated carbon. The colorants bound to the column while Rubisco was isolated in the filtrate.

RuBisCO solutions were also alternatively decolorized by incubating the solution with FPX66 (Dow Chemicals) resin packed in a column (or batch mode). The slurry is incubated for 30 mins and then the liquid is separated from the resin. The colorants bind to the resin and RuBisCO was collected in the column flow-through.

In some embodiments, RuBisCO was isolated from spinach leaves by first grinding the leaves with 4 volumes of 20 mM potassium Phosphate buffer pH 7.4 buffer+150 mM NaCl+0.5 mM EDTA) in a blender. The resulting slurry was centrifuged to remove debris, and the supernatant (crude lysate) was filtered through a 0.2 micron membrane and concentrated using a 10 KDa cutoff PES membrane.

In some embodiments, RuBisCO was extracted from alfalfa or wheatgrass juice powder by mixing the powder with 4 volumes of 20 mM potassium Phosphate buffer pH 7.4 buffer+150 mM NaCl+0.5 mM EDTA) in a blender. The resulting slurry was centrifuged to remove debris, and the supernatant (crude lysate) was filtered through a 0.2 micron membrane and concentrated using a 10 KDa cutoff PES membrane.

(ix) Leghemoglobin. Soy root nodules were suspended and lysed in 20 mM potassium phosphate pH 7.4, 100 mM potassium chloride and 5 mM EDTA using grinder-blender. During this process leghemoglobin is released into the buffer. Root-nodule lysate containing leghemoglobin was cleared from cell debris by filtration through 5 micron filter. In some embodiments, filtration was followed by centrifugation (7000 g, 20 min). Clarified lysate containing leghemoglobin was then filtered through 0.2 micron filter and applied onto anion-exchange chromatography column (High Prep Q; High Prep DEAE, GE Healhtcare) on fast protein liquid chromatography instrument (GE Healthcare). Leghemoglobin was collected in flowthrough fraction and concentrated over 3 kDa molecular weight cutoff PES membrane on a Spectrum Labs KrosFlo hollow fiber tangential flow filtration system to a desired concentration. Purity (partial abundance) of purified leghemoglobin was analyzed by SDS-PAGE gel: in lysate leghemoglobin is present at 20-40%, while after anion-exchange purification it is present at 70-80%. In another embodiment, soybean leghemoglobin flow through from anion-exchange chromatography was applied onto size-exclusion chromatography (Sephacryl S-100 HR, GE Healthcare). Soybean leghemoglobin eluted as two fractions corresponding to dimer and monomer species. Purity (partial abundance) of leghemoglobin was analyzed by SDS-PAGE and determined to be ~90-100%. Analysis of UV-VIS spectra (250-700 nm) revealed spectral signature consistent with heme loaded leghemoglobin.

(x) Non-symbiotic hemoglobin from moong bean was cloned into pJexpress401 vector (DNA2.0) and transformed into E. coli BL21. Cells were grown in LB media containing soytone instead of tryptone, kanamycin, 0.1 mM ferric chloride and 10 μg/ml 5-aminolevulinic acid. Expression was induced by 0.2 mM IPTG and cells grown at 30° C. for 20 hr. E. coli cells expressing moong bean non-symbiotic hemoglobin were collected and resuspended in 20 mM IVIES buffer pH 6.5, 50 mM NaCL, 1 mmM $MgCl_2$, 1 mM $CaCl_2$). Add a bit of DNAaseI, and protease inhibitors. Cells were lysed by sonication. Lysate was cleared from cell debris by centrifugation at 16 000 g for 20 min, followed by filtration over 200 nm filter. Cell lysate was then loaded over FF-S resin on fast protein liquid chromatography instrument (GE Healthcare). Moong bean non-symbiotic hemoglobin bound to FF-S column and was eluted using sodium chloride gradient (50 mM-1000 mM). Purity (partial abundance) of moong bean non-symbiotic hemoglobin was analyzed by SDS-PAGE and determined to be: E. coli lysate 13%, after purification on FFQ 35%. UV-Vis analysis of purified protein showed spectra characteristic of heme bound protein.

(xi) Hemeproteins were synthesized with an N-terminal His6 epitope tag and a TEV cleavage site, cloned into pJexpress401 vector (DNA2.0), and transformed into E. coli BL21. Transformed cells were grown in LB media containing soytone instead of tryptone, kanamycin, 0.1 mM ferric chloride and 10 μg/ml 5-aminolevulinic acid. Expression was induced by 0.2 mM IPTG and cells grown at 30° C. for 20 hr. E. coli cells expressing heme proteins were collected and resuspended in 50 mM potassium phosphate pH 8, 150 mM NaCl, 10 mM imidazole, 1 mM $MgCl_2$, 1 mM $CaCl_2$), DNAaseI, and protease inhibitors. Cells were lysed by sonication and clarified by centrifugation at 9000×g. Lysate was incubated with NiNTA resin (MCLAB), washed with 5 column volumes (CV) of 50 mM potassium phosphate pH 8, 150 mM NaCl, 10 mM imidazole, and eluted with 50 mM potassium phosphate pH 8, 150 mM NaCl, 500 mM imidazole. SDS-PAGE and UV-vis spectra confirmed expected molecular weights and complete heme-loading, respectively.

In some embodiments, transformed cells were grown in seed media comprised of 10 g/L glucose monohydrate, 8 g/L Monopotassium Phosphate, 2.5 g/L Sensient Amberferm 6400, 2.5 g/L Sensient Tastone 154, 2 g/L Diammonium Phosphate, 1 mL/L Trace Metals Mixture (Teknova 1000× Trace Metals Mixture Cat. No. T1001), 1 g/L Magnesium Sulfate, 0.25 mL 0.1M solution Ferric Chloride, 0.5 mL/L Sigma. Anti-foam 204, 1 mL/L Kanamycin Sulfate 1000× solution. 250 mL of media was used in a (4)-1 L baffeled shakeflasks, innoculated with 0.25 mL each from a single vial of glycerol stock culture. Shakeflasks were grown for 5.5 hours, with 250 RPM agitation at 37° C. 40 L of seed media was steam-sterilized in a 100 L bioreactor, cooled to 37° C., pH-adjusted to 7.0 and innoculated with 800 mL of shakeflask culture once a shakeflask OD of 2.5 was achieved. Aeration to the bioreactor was supplied at 40 L/m and agitation was 250 RPM. After 2.2 hours of growth, an OD of 2.20 was reached and 22 L of culture was transferred to the final 4 $m^3$ bioreactor. The starting media for the final bioreactor comprised of the following components steamed-in-place: 1775 L deionised water, 21.75 kg Monopotassium Phosphate, 2.175 kg Diammonium Phosphate, 4.35 kg Ammonium Ferric Citrate, 8.7 kg Ammonium Sulfate, 10.875 kg Sensient Amberferm 6400, 10.875 kg Sensient Tastone 154. After 30 minutes of steaming, the media components were cooled to 37° C. and post-sterilization additions were made: 2.145 L of 0.1M Ferric Chloride solution, 59.32 kg 55% w/w Glucose Monohydrate, 3.9 L of Trace Metals Mixture (Teknova 1000× Trace Metals Mixture Cat. No. T1001), 10.88 L of 200 g/L Diammonium Phosphate, 36.14 L 1M Magnesium Sulfate, and 2.175 L Sigma Anti-foam 204, 2.175 L Kanamycin Sulfate 1000× solution. pH was controlled at 7.0 via the addition of 30% Ammonium Hydroxide. Aeration was supplied at 2.175 $m^3$/min, dissolved oxygen was controlled at 25% by varying agitation between 60-150 RPM. At two timepoints (EFT=4 and EFT8), bolus additions of additional nutrients were supplied. Each addition added 5.5 kg of Sensient Amberferm 6400, 5.5 kg of Sensient Tastone 154 and 4.4 kg of Diammonium Phosphate, in autoclaved solutions (100 g/L solution for Amberferm and Tastetone, 200 g/L for Diammonium Phosphate). A sterile glucose solution of 55% w/w Glucose Monohydrate was fed into the bioreactor to maintain a level of residual glucose of 2-5 g/L. Once an OD of 25 was reached, the temperature was reduced to 25° C. and the culture was induced with 0.648 L of 1M Isopropyl β-D-1-thiogalactopyranoside. The culture was allowed to grow for a total time of 25 hours, at which point the culture was diluted 1:1 with deionized water, then centrifuged, concentrating the centrate to 50% v/v solids content. Cell centrate was frozen at −20° C. Centrate was thawed to 4° C. and diluted in 20 mM potassium phosphate pH 7.8, 100 mM NaCl, 10 mM imidazole, and homogenized at 15,000 PSI. Homogenized cells were 0.2 urn filtered by tangential flow filtration (TFF) and filtered lysate was loaded directly onto a zinc-charged IMAC column (GE). Bound proteins were washed with 10 column volumes (CV) 20 mM potassium phosphate pH 7.4, 100 mM NaCl, 5 mM histidine and eluted with 10 CV 500 mM potassium phosphate monobasic, 100 mM NaCl. Eluted leghemoglobin was concentrated and diafiltered using a 3 kDa molecular weight cutoff PES membrane and TFF. The concentrated sample was reduced with 20 mM sodium dithionite and desalted using G-20 resin (GE). Desalted leghemoglobin samples were frozen in liquid nitrogen and stored at −20 C. Leghemoglobin concentration and purity were determined by SDS-PAGE and UV-vis analysis.

(xi) Oleosin. Sunflower oil bodies were purified from sunflower seeds. Sunflower seeds were blended in 100 mM sodium phosphate buffer pH 7.4, 50 mM sodium chloride, 1 mM EDTA at 1:3 wt/v. Oil-bodies were collected by centrifugation (5000 g, 20 min), and resuspended at 1:5 (wt/v) in 50 mM sodium chloride, 2M urea and stir for 30 min, 4° C. 2M urea wash and centrifugation steps were repeated. Oil-bodies collected by centrifugation were resuspended in 100 mM sodium phosphate buffer pH 7.4, 50 mM sodium chloride. Centrifugation and washing steps were repeated once more, and the final washed oil-bodies fraction was obtained from a last centrifugation step. Oil-bodies were resuspended at 10% wt/w in 100 mM sodium phosphate buffer pH 7.4, 50 mM sodium chloride, 2% wt/v vegetable oil fatty acid salts, homogenized at 5000 psi and incubated at 4° C. for 12 hr. Solution was centrifuged (8000 g, 30 min), top layer removed and soluble fraction collected. SDS-PAGE analysis suggested that oleosins are a major protein present in the soluble fraction. Oleosin concentration was 2.8 mg/ml.

(xii) Pea total proteins: Dry green or yellow pea flour was used to extract total pea proteins. The flour was suspended in 10 volumes of 20 mM potassium phosphate buffer pH 8 and 100 mM sodium chloride and stirred for 1 hr. Soluble protein was separated from pea seed debris by centrifugation. The supernatant was collected and filtered through a 0.2 micron membrane and concentrated using a 10 Kda cutoff PES membrane.

(xiii) Pea vicilin and Pea legumin: Dry green or yellow pea flour was used to extract total pea proteins as described above. The crude pea mixture obtained thereof was fractionated into pea vicilin and pea legumin using ion-exchange chromatography.

Material was loaded on Q Sepharose FastFlow resin and fractions were collected as salt concentration was varied from 100 mM to 500 mM NaCl. Pea vicilin was collected at 350 mM sodium chloride while pea legumin was collected at 460 mM sodium chloride. The collected fractions were concentrated using a 10 KDa cutoff PES membrane.

(xv) Lentil total proteins: Air classified lentil flour was used to extract crude mixture of lentil proteins. Flour was suspended in 5 volumes of 20 mM potassium phosphate buffer pH 7.4 and 0.5 M sodium chloride and stirred for 1 hr. Soluble protein was separated from un-extracted protein and lentil seed debris by centrifugation (8000 g, 20 minutes). The supernatant was collected and filtered through a 0.2 micron membrane and concentrated using a 10 KDa cutoff PES membrane.

(xvi) Lentil albumins: Air classified lentil flour was suspended in 5 volumes of 50 mM sodium chloride, pH 3.8 and stirred for 1 hr. Soluble protein was separated from un-extracted protein and lentil seed debris by centrifugation (8000 g, 20 minutes). The supernatant was collected and filtered through a 0.2 micron membrane and concentrated using a 10 KDa cutoff PES membrane.

(xvii) Chickpea/Garbanzo bean total proteins: Garbanzo bean flour was suspended in 5 volumes of 20 mM potassium phosphate buffer pH 7.4 and 0.5 M sodium chloride and stirred for 1 hr. Soluble protein was separated from un-extracted protein and chickpea seed debris by centrifugation (8000 g, 20 minutes). The supernatant was collected and filtered through a 0.2 micron membrane and concentrated using a 10 KDa cutoff PES membrane.

(xviii) Chickpea/Garbanzo bean albumins: Garbanzo bean flour was suspended in 5 volumes of 50 mM sodium chloride, pH 3.8 and stirred for 1 hr. Soluble protein was separated from un-extracted protein and lentil seed debris by centrifugation (8000 g, 20 minutes). The supernatant was collected and filtered through a 0.2 micron membrane and concentrated using a 10 KDa cutoff PES membrane.

(xix) Amaranth flour dehydrins: Amaranth flour was suspended in 5 volumes of 0.5 M sodium chloride, pH 4.0 and stirred for 1 hr. Soluble protein was separated from un-extracted protein and lentil seed debris by centrifugation (8000 g, 20 minutes). The supernatant was collected and filtered through a 0.2 micron membrane and concentrated using a 3 KDa cutoff PES membrane. Further enrichment of dehydrins from this fraction was obtained by boiling the concentrated protein material, spinning at 8000 g for 10 minutes and collecting the supernatant.

Example 2: Constructing a Muscle Tissue Analog

To prepare a muscle tissue replica, 8 ml of moong bean protein solution (114 mg/ml in 20 mM phosphate buffer (pH 7.4) and 400 mM sodium chloride) were mixed with 16 ml of leghemoglobin solution (6 mg/ml leghemoglobin in 20 mM potassium phosphate, 400 mM NaCl, pH 7.3). The resulting mixture was concentrated using Amicon spin concentrators (10 kDa cut-off) to a final concentration of moong bean 8S globulin 61 mg/ml, and of leghemoglobin 6.5 mg/ml. Approximately 400 mg of transglutaminase powder were added to the solution, which were thoroughly mixed, and divided into two 50 ml Falcon tubes and incubated overnight at room temperature. Final total protein concentrations was 67.5 mg/ml total protein. The muscle tissue replica formed an opaque gel of reddish-brown color, with small amounts (<1 ml) of inclusions of dark red, venous blood colored liquid.

Example 3: Increased Tensile Strength Adipose Tissue Replica

A 40 ml aliquot of rice bran oil and a 40 ml aliquot of moong bean protein (114 mg/ml) were combined in a 250 ml Pyrex beaker. The beaker was placed in a water bath and emulsified using a Branson Sonifer 450 sonicator with a 12 mm tip for a 6 minute, 60% duty cycle at power level 5.

In an 18 cm×18 cm×2.5 cm synthetic rubber Ikea plastic ice cube tray, 48 mg of electrospun fibers (from connective tissue Example 14) were laid longitudinally and as homogenously as possible across the bottom of one triangular 13.97 cm×1.27 cm×1.5875 cm mold. Approximately 20 ml of the rice bran oil/moong bean protein emulsions then were poured on top of the fibers. An additional 20 ml of the emulsions were then poured into a similarly sized blank mold on the same tray to be used as a control.

The ice cube tray was floated in boiling water for 15 minutes, removed, and cooled to room temperature.

Using a razor blade, each of the resulting gels was cut into 3 segments, each 4.66 cm long with a cross-sectional area of 1 cm$^2$. A Stable Micro Systems TA XTExpress Enhanced texture analyser with attached TA-96B probe was used to assess the tensile strength. The fiber containing the fat replica had a tensile strength of 23 kPa, whereas the fat replica with no fibers had a tensile strength of 20 kPa.

Example 4 High Percentage Fat Adipose-Replica

An adipose tissue replica comprising a protein-oil emulsification formed with 3.3% wt/v pea globulin, 70% v/v oil that consisted of an equal mixture of coconut, cocoa, olive, and palm oils, and 0.5% wt/v lecitin, was cross-linked with a 2% transglutaminase (Ajinomoto Activa® TI). After draining and dehydrating, the resulting gel was medium soft and the fat content was confirmed to be 75% (wt/wt).

An adiose tissue matrix comprising a protein-oil emulsification was formed with 1.6% wt/v Rubisco and 80% v/v cocoa butter. The resulting gel was soft.

Example 5: Method of Preparing Adipose Tissue Replicas

Oils are melted if necessary by warming to room temperature or gently heated. If the oils are solid at room temperature, they are kept near the melting point during the rest of the procedure. Proteins are obtained per specified protocols (see Example 1). Lecithin is weighed and resuspended in water, then sonicated to create a homogenous solution. Components are combined at specified ratios and brought to volume with buffer if necessary (20 mM sodium phosphate pH 7.4 with 50 mM sodium chloride) then are subjected to homogenization or sonication to control particle size within an emulsion. Afterwards, emulsions are gelled by either: (a) heating/cooling, (b) cross-linking with a transglutaminase enzyme or (c) heating/cooling followed by addition of a transglutaminase enzyme. Control samples (no heating/cooling nor transglutaminase cross-linking treatments) were prepared for comparisons. Emulsions stabilized by heating/cooling treatment are prepared by placing emulsion in 90-100° C. water bath for five minutes, then letting samples slowly cool to room temperature. Emulsions stabilized by transglutaminase cross-linking are prepared by adding transglutaminase to 2% wt/v and incubating at 37° C. for 12-18 hr. Emulsions stabilized by heating/cooling followed by addition of transglutaminase enzyme were prepared by first undergoing the heat/cool protocol, then adding the enzyme once the samples cooled to room temperature. All emulsifications are incubated for 8-12 hours at 37° C.

Example 6: Method to Analyze Adipose Tissue Replicas

After different gelling treatments, gelled emulsions are moved to room temperature for evaluation. The total volume of gelled emulsions, and volumes of phase separated water and/or oil volumes (if gelled emulsions are not in a single phase) are recorded. Firmness of the adipose tissue replica is evaluated by gentle poking of gelled emulsions. Cooking experiments are performed by transferring the mass to a heated surface and measuring the temperature of the liquid immediately after cooking.

Example 7: Adipose Replica of Beef Fat

An adipose tissue replica was made by gelling a solution of purified moong bean 8S protein emulsified with equal amounts of cocoa butter, coconut butter, olive oil and palm oil. Moong bean 8S protein was purified as described in Example 1, and had a concentration of 140 mg/ml in 20 mM K-phosphate pH 7.4, 400 mM NaCl. A fat mixture was prepared by melting individual fats from solid to liquid state at 45° C. for 30 min. Individual fats (cocoa butter, coconut butter, olive oil and palm oil) in liquid states were then mixed at a 1:1:1:1 (v/v) ratio. A protein-fat emulsion was formed by mixing a 70% v/v liquid fat mixture with 4.2% wt/v moong bean 8S protein, 0.4% wt/v soybean lecithin and emulsified by vortexing for 30 sec followed by sonication for 1 min. After homogenization, the fat-protein emulsion was in a single liquid phase as judged by visual observation.

One adipose tissue replica emulsion was stabilized by cross-linking with 0.2% wt/v transglutaminase enzyme at 37° C. for 12 hr. Another fat tissue replica was stabilized by gelling of proteins by heating to 100° C. in a water bath followed by cooling to ambient room temperature. The resulting adipose tissue replicas were in a single phase. The adipose tissue replica matrix formed by the transglutaminase was a softer solid than the adipose tissue replica matrix formed by heat/cool induced gelling.

Example 8: An Adipose Replica of Wagyu Beef Fat

An adipose tissue replica was made by gelling an emulsion of purified pea globulin proteins and equal amounts of cocoa butter, coconut butter, olive oil and palm oil. Pea globulin proteins were purified as described in Example 1 and had a concentration of 100 mg/ml, in 20 mM K-phosphate pH 8, 400 mM NaCl. A fat mixture was prepared by melting individual fats from solid to a liquid state at 45° C. for 30 min. Individual fats (cocoa butter, mango butter, olive oil) in liquid state where then mixed at 2:1:1 (olive oil:cocoa butter:mango butter) v/v ratio. A protein-fat emulsion was formed by mixing a liquid fat mixture with a 5% wt/v solution of pea globulins in a 1:1 ration, and emulsifying using a hand-held homogenizer at the maximum setting for 30 sec. After homogenization, the fat-protein emulsion was in a single liquid phase as judged by visual observation. Emulsion was stabilized by cross-linking with 0.2% wt/v transglutaminase enzyme at 37° C. for 12 hr. The resulting adipose tissue replica was in a single phase, was a soft solid and was salty in flavor.

Example 9: Adipose Tissue Replica with Fatty Acid Distribution of Beef

An adipose tissue replica was made by gelling an emulsion of purified pea globulin proteins and equal amounts of cocoa butter, mango butter, olive oil and rice bran oil. Pea globulin proteins were purified as described in Example 1, and had a concentration of 100 mg/ml, in 20 mM K-phosphate pH 8, 400 mM NaCl. A fat mixture was prepared by melting individual fats from solid to liquid state at 45° C. for 30 min. Individual fats (cocoa butter, mango butter, olive oil and rice bran oil) in a liquid state where then mixed at 1:1:1:1 v/v ratio. A protein-fat emulsion was formed by mixing 50% v/v liquid fat mixture with 5% wt/v Pea globulins, and emulsifying using a hand-held homogenizer at the maximum setting for 30 sec. After homogenization, the fat-protein emulsion was in a single liquid phase as judged by visual observation. The emulsion was stabilized by cross-linking with 0.2% wt/v transglutaminase enzyme at 37° C. for 12 hr. The resulting adipose tissue replica was in a single phase, was a soft solid and was salty in flavor.

Example 10: Adipose Tissue Replica where Firmness of Fat Tissue at Refrigeration and Ambient Temperatures is Controlled by Melting Temperature of Fat in Adipose Tissue Replica A adipose tissue replica made as a stable emulsion of RuBisCo with sunflower oil is softer than a adipose tissue replica made as a stable emulsion of RuBisCo and cocoa butter. Adipose tissue replicas were formed with 0.18%, 1.6%, and 2.4% wt/v Rubisco with 70%, 80%, and 90% v/v sunflower or cocoa butters. Each adipose tissue replica that contained cocoa butter was firmer than the corresponding replicas that were formed with sunflower oil. Adipose tissue replicas comprising 0.18%, 1.6%, and 2.4% wt/v Rubisco with 70%, 80%, and 90% v/v cocoa butter were solid at room temperature but melted at close to mouth temperature. In the adipose tissue replicas formed with varying concentrations of Rubisco (0.18, 1.6 1.9% wt/v) and 70-80% v/v sunflower oil, the replicas were firmer as the amount of protein in the adipose tissue replica matrix increased. Adipose tissue replicas with 0.18% wt/v Rubisco were very soft; adipose tissue replicas with 1.6% wt/v Rubisco were soft; and adipose tissue replicas with 1.9% wt/v RuBisco were of medium firmness.

Adipose tissue replicas made as a stable emulsion of Moong Bean 8S protein with sunflower oil were softer than adipose tissue replicas made as a stable emulsion of Moong Bean 8S protein and cocoa butter. Adipose tissue replicas were formed with 2%, 1%, and 0.5% wt/v Moong Bean 8S protein with 70%, 80%, and 90% v/v sunflower or cocoa butters. Each adipose tissue replica that contained cocoa butter was firmer than the corresponding replica that was formed with sunflower oil.

Adipose tissue replicas made as stable emulsions of Moong Bean 8S protein with canola oil were softer than the corresponding adipose tissue replicas made as stable emulsions of Moong Bean 8S protein with an equal mixture of coconut, cocoa, olive, and palm oils. Adipose tissue replicas were formed with 1.4% wt/v Moong Bean 8S protein with 50%, 70%, and 90% v/v sunflower or mixture of oils. Each adipose tissue replica that contained a mixture of oils was firmer than the corresponding replica that was formed with sunflower oil. A adipose tissue replica comprising 1.4% wt/v Moong Bean 8S protein with 50%, 70%, and 90% v/v of an equal mixture of coconut, cocoa, olive, and palm oil was solid at room temperature but melted at close to mouth temperature.

Adipose tissue replica made as a stable emulsion of soy proteins with sunflower oil was softer than the adipose tissue replica made as stable emulsion of soy proteins and cocoa butter. Adipose tissue replicas were formed with 0.6%, 1.6%, and 2.6% wt/v Soy with 50%, 70%, 80%, and 90% v/v sunflower or mixture of oils. Each adipose tissue replica that contained mixture of oils was firmer than the corresponding replica that was formed with sunflower oil. Adipose tissue replicas comprising 0.6%, 1.6%, and 2.6% wt/v soy proteins with 50%, 70%, 80%, and 90% v/v cocoa butter were solid at room temperature but melted at close to mouth temperature.

Example 11: Adipose Tissue Replica Cooking: Structure of Fat Tissue Matrix Controls Melting Point During Cooking An adipose tissue comprising a stabilized protein-oil emulsion constructed as described in Example 5 and Example 6 above, formed with 2% w/v Rubisco and 50%, 70%, and 90% v/v cocoa butter, melted at a higher temperature when formed upon heat/cool denaturation and at a lower temperature than when formed by cross-linking with a transglutaminase.

Example 12: Cooking Adipose Tissue: Arrangement and Structural Organization of Proteins and Fat within a Fat Tissue Matrix Controls Amount of Fat Released and Fat Retained by the Adipose Tissue Replica During Cooking During cooking of a adipose tissue replica matrix comprising a protein-oil emulsion formed with 2% w/v Rubisco and 50%, 70%, or 90% v/v cocoa butter, more adipose tissue replica mass was retained after cooking when the adipose tissue replica was formed upon heat/cool denaturation than when formed by cross-linking with a transglutaminase. Released mass was liquid and appeared oily.

During cooking of adipose tissue replica matrix comprising a protein-oil emulsion formed with 2.6 and 0.6% w/v Soybean protein and 50%, 70%, or 90% v/v cocoa butter, more adipose tissue replica mass was retained when formed upon heat/cool denaturation than when formed by cross-linking with transglutaminase. Released mass was liquid and appeared oily.

Example 13: Cooking an Adipose Tissue Replica: Concentration of Particular Proteins within Fat Tissue Matrix Controls Mass of Adipose Tissue Replica that Remains after Cooking A series of adipose tissue replicas constructed from 1.4% wt/v moong bean 8S protein with 90% v/v canola oil and 0.45% wt/v soybean lecithin, were homogenized and increasing concentration of sunflower oleosins were added at varying concentrations to the emulsion. The concentration of oleosin varied from 1:10 to 1:10$^6$ oleosin to triglyceride molar ratio. An increase in mass retention after cooking was observed when the ratio of oleosins to oil in adipose tissue replica was greater.

A series of adipose tissue replicas formed with varying concentrations of Rubisco with 70% v/v sunflower oil, retained more mass upon cooking as the concentration of Rubisco increased. Adipose tissue replicas containing RuBisCo at 0% wt/v completely melted, while 1.9% wt/v Rubisco retained 10% mass, and adipose tissue replica containing 2.4% wt/v Rubisco retained 20% mass upon cooking

Example 14: Connective Tissue Analog

Connective tissue fiber replicas were manufactured by electrospinning a solution of moong bean globulin (22.5 mg/ml) containing 400 mM sodium chloride, 6.75% w/v of poly(vinyl alcohol) and trace amounts of sodium azide (0.007% w/v). The resulting solution was pumped at 3 µl/min using a syringe pump, from a 5 ml syringe through a Teflon tube and a blunted 21 gauge needle. The needle was connected to a positive terminal of a Spellman CZE 30 kV high voltage supply set at 17 kV and fixed 12 cm from a an aluminum drum (ca. 12 cm long, 5 cm in diameter) that was wrapped in aluminum foil. The drum was attached to a spindle that is rotated by an IKA RW20 motor at about 220 rpm. The spindle was connected to a ground terminal of the high voltage supply. The protein/polymer fibers that accumulated on the foil were scraped off and used as the connective tissue replicas.

Example 15: Extending the Lifetime of Reduced (Heme-Fe2+) Leghemoglobin

Equine myoglobin was purchased from Sigma. Myoglobin was resuspended at 10 mg/ml in 20 mM potassium phosphate, pH 8.0, 100 mM NaCl. SDS-PAGE analysis suggested that protein purity was ~90%.

Soy leghemoglobin was purified from *Glycine max* root nodules via ammonium sulfate precipitation (60%/90% fractionation) as detailed in Example 1. Resuspended 90% ammonium sulfate leghemoglobin was further purified by anion-exchange chromatography (HiTrap Q FF 5 mL FPLC column) in 20 mM potassium phosphate, pH 8.0, 100 mM NaCl. The leghemoglobin eluted in flow through fractions. SDS-PAGE analysis suggested that protein purity was ~70%. Leghemoglobin was buffer exchanged into 20 mM potassium phosphate, pH 7.4, 100 mM NaCl and concentrated to 10 mg/ml on 3.5 kDa membrane concentrators.

Carbon monoxide treatment: Myoglobin at 10 mg/ml in 20 mM potassium phosphate, pH 8.0, 100 mM NaCl and leghemoglobin at 10 mg/ml in 20 mM potassium phosphate, pH 7.4, 100 mM NaCl were first degassed under vacuum for 1 hour at 4° C. then perfused with carbon monoxide gas for 2 minutes. Globins were then reduced from heme-Fe$^{3+}$ to heme-Fe$^{2+}$ state by adding 10 mM sodium dithionite, 0.1 mM sodium hydroxide for 2 minutes. Sodium dithionite and sodium hydroxide were removed from the protein solution by using size-exclusion chromatography (PD-10 desalting column) in 20 mM potassium phosphate, pH 8.0, 100 mM NaCl and 20 mM potassium phosphate, pH 7.4, 100 mM NaCl respectively. Globins fractions were collected as a peak red colored fractions as evaluated by visual estimation. UV-VIS spectra confirmed the presence of heme-Fe$^{2+}$ state for both proteins. After desalting, the solution was again perfused with gas for another 2 minutes. The color of the solutions was evaluated by taking UV-Vis spectra (250 nm-700 nm) every 20 minutes using the nanodrop spectrophotometer. Control samples were not treated with carbon monoxide.

Sodium nitrite treatment: Myoglobin at 10 mg/ml in 20 mM potassium phosphate, pH 8.0, 100 mM NaCl and leghemoglobin at 10 mg/ml in 20 mM potassium phosphate, pH 7.4, 100 mM NaCl were reduced from heme-Fe$^{3+}$ to heme-Fe$^{2+}$ by adding 10 mM sodium dithionite, 0.1 mM sodium hydroxide for 2 minutes. Sodium dithionite and sodium hydroxide were removed from the protein solution by using size-exclusion chromatography (PD-10 desalting column) in 20 mM potassium phosphate, pH 8.0, 100 mM NaCl and 20 mM potassium phosphate, pH 7.4, 100 mM NaCl, respectively. Globins fractions were collected as peak red colored fractions as evaluated by visual estimation. UV-VIS spectra confirmed the presence of heme-Fe$^{2+}$ state for both proteins. Sodium nitrite was then added to a final concentration of 1 mM from 100 mM nitrite in phosphate buffer pH 7.4. The lifetime of heme-$Fe^{2+}$ state was followed by recording UV-VIS spectra (250-700 nm) using spectrophotometer as a function of time. Control samples were not treated with sodium nitrite.

Data analysis of heme-$Fe^{2+}$ life-times for myoglobin and leghemoglobin samples treated with carbon monoxide and sodium nitrite was performed in Microsoft Excel by plotting the amplitude of the absorbance peak at the 540 nm wavelength. The "baseline" of the 540 nm absorbance was determined by the state of the UV-vis spectrum of the globin solutions prior to the addition of any additives, dithionite reduction, or desalting. The built-in curve fit function was used to produce an exponential line-of-best-fit, the exponent of which directly relates to the half life of the peak amplitude.

The life-time of the heme-$Fe^{2+}$ state and accompanying red color of myoglobin and leghemoglobin solutions in the absence of carbon monoxide and sodium nitrite were ~6 hr and ~4 hr respectively. Addition of sodium nitrite extended the life-time of the heme-$Fe^{2+}$ state and accompanying red color to more than seven days. Addition of carbon monoxide extended the life-time of heme-$Fe2^+$ state and accompanying red color to more than two weeks.

Example 16: Preparation of Meat Replicas in which the Particle Size of Individual Tissue Replica Units is Varied to Control Aroma Generation During Cooking Muscle tissue replica and adipose tissue replica were prepared separately and then combined into a meat tissue replica such that the size of individual tissue replica units was varied to control aroma generation during cooking. Individual fat, muscle and connective tissue replicas were constructed in the following manner.

A muscle tissue replica was prepared as in Example 2. The muscle tissue replica formed an opaque gel of reddish-brown color, with small amounts (<1 ml) of inclusions of dark red, venous blood colored liquid. A connective tissue replica was prepared as in Example 14. An adipose tissue replica was prepared as in Example 7.

Meat replicas with a lean-to-fat ratio 85/15 were prepared by combining individual muscle, connective and adipose tissues such that particle size of individual tissues replicas varied. (a) 2.1 g of muscle replica with 0.9 g of chunks of fat replica 5-10 mm in size ("coarse mix"); (b) 2.1 g of muscle replica with 0.9 g of fat replica chopped to 2-3 mm in size ("fine mix"); and (c) 2.1 g of muscle replica with 0.9 g of fat replica thoroughly blended to <1 mm in size ("blend"). "Muscle only" control sample contained 3 g of muscle replica alone. "Fat only" control sample contained 3 g of fat replica alone as 5-10 mm sized particle. Meat, muscle and fat tissue samples were cooked in sealed glass vials at 150° C. for 10 min. Aroma profiles of the samples were analyzed by a panel of testers, and by GC-MS.

Sensory olfactory analysis of meat replica samples performed by a panel of testers, suggested that the size of individual tissue units and the extent of their mixing within meat tissue replicas correlated with generation of different aromas. Muscle tissue replica cooked by itself generated aromas associated with store-bought gravy, faint citrus and star anise. Adipose tissue replica cooked by itself generated aromas associated with musty, rancid and sweet aromas. Cooked meat tissue replica (coarse particle size) generated aromas of store-bought gravy, sweet, slightly musty and star-anise. Cooked meat tissue replica (fine particle size) generated aromas associated with soy sauce, musty, slightly rancid and beef bouillon. Cooked meat tissue replica (very fine particle size) generated aromas associated with sweet, musty and soy-sauce. All samples with the exception of adipose tissue replica generated aromas associated with burnt meat smell, however to varying intensities.

Analysis of GCMS data indicated that the size of individual tissue units and the extent of their mixing within meat tissue replicas had profound effects on the generation of aromatic compounds upon cooking. In particular, multiple aromatic compounds associated with fruity/green bean/metallic (2-pentyl-furan); nutty/green (4-methylthiazole); peanut butter/musty (pyrazine, ethyl); raw potato/roasted/earthy (Pyrazine, 2,3-dimethyl); vinegary (acetic acid); spicy/caramel/almond (5-methyl-2-furancarboxaldehyde); creamy (butyrolactone); sweet (2,5-dimethyl-3-(3-methyl butyl) pyrazine); fruity/stale beer (2-cyclopentene-1-one, 2-hydroxy-3-methyl); musty/nutty/coumarin/licorice/walnut/bread (3-acetyl-1H-pyrolline); coconut/woody/sweet (pantolactone); penetrating (1-H-pyrrole-2-2carboxaldehyde, 1-methyl); minty (caprolactam); toasty caramel (4H-pyran-4-one, 2,3-dihydro-3,5-dihydroxy-6-methyl) aromas appeared only in mixed meat replicas, but not in individual tissue replicas. Some other aromatic compounds, for example associated with gasoline-like (nonane, 2,6-dimethyl), petroleum-like (3-hexene, 3-methyl); sour/putrid/fish-like (pyridine); bland/woody/yogurt (acetoin); fatty/honey/citrus (octanal); pungent/sweet/caramelic (2-propanone, 1-hydroxy) and nutty/burnt green (ethenyl pyrazine) aromas appeared only in individual tissue replicas, but did not accumulate in mixed meat replicas. Furthermore, the levels to which all of the above compounds accumulated during cooking depended on the sizes of tissue units and how they are mixed (coarse particle size, fine particle size, or very fine particle size (blended)).

Similar to meat tissue replica, it was found that structural organization and particle size of beef tissues modify response of beef tissues to cooking. For example, the flavor of meat is modified by the size of the particles. Beef samples were prepared as following: samples of beef muscle and beef fat were cut separately with a knife and: (a) "ground", where knife-cut tissue cubes were passed through standard meat grinder. 80/20 (wt/wt) lean/fat ground beef sample was prepared by mixing muscle and fat tissue cubes at appropriate ratio prior to grinding. This sample preparation is referred to as a "fine size particle mix". (b) Ground tissue particle size was further reduced by freezing ground tissue in liquid nitrogen and crushing it using mortar and pestle to a very fine powder (particle size <1 mm). This sample preparation is referred to as a "very fine size particle mix". All samples were cooked in sealed glass vials at 150° C. for 10 min. Aroma profiles of the samples were analyzed by a panel of testers, and by GC-MS, as described in Example 1. "Muscle only" control sample contained 3 g of muscle tissue alone. "Fat only" control sample contained 3 g of fat tissue alone. Ground beef sample contained 3 g of a 80/20 (wt/wt) muscle/fat mixture.

Sensory olfactory analysis of beef samples performed by a panel of testers, suggested that the size of individual tissue units and the extent of their mixing within the samples correlated with generation of different aromas. Beef muscle cooked by itself generated typical aromas associated with cooked ground beef. Fat tissue replica cooked by itself generated slightly sweet aromas, and aromas associated with burnt mushrooms. Cooked ground beef with "fine size particle mix" generated typical aromas associated with cooked ground beef, with presence of slightly sweet aromas characteristic of cooked fat. Cooked ground beef with "very fine size particle mix" generated aromas associated with cooked ground beef, but no slightly sweet aroma characteristic of cooked fat was detected.

Analysis of GCMS data indicated that the particle size of the individual tissue units has effect on generation of aromatic compounds upon cooking. In particular generation and/or amount of multiple aromatic compounds by individual tissue samples or ground beef sample varied in correlation with particle size of the tissue. Some of the aromatic compounds that differed between fine and very fine particle size of muscle tissue: 4H-Pyran-4-one, 2,3-dihydro-3,5-dihydroxy-6-methyl, 3-Acetyl-1H-pyrolline, 1-(6-methyl-2-pyrazinyl)-1-ethanone, 2,5-dimethyl-3-(3-methyl butyl) pyrazine, 2-furancarboxyaldehyde, 5-methyl, Acetic acid, Ethenyl pyrazine, Pyrazine, 2,3-dimethyl, 2-Propanone, 1-hydroxy, Octanal, Acetoin, 4-Methylthiazole, Pseudo-2-pentyl-furan, 2-pentyl-furan. Some of the aromatic compounds that differed between fine and very fine particle size of fat tissue: triethylene glycol: 4H-Pyran-4-one, 2,3-dihydro-3,5-dihydroxy-6-methyl, Caprolactam, 1-(6-methyl-2-pyrazinyl)-1-ethanone, 2-Cyclopentene-1-one, 2-hydroxy-3-methyl, Butyrolactone, 2-furancarboxyaldehyde, 5-methyl, Ethanone, 1(2 furanyl), Acetic acid, 2-ethyl-5-methyl pyrazine, Pyrazine, 2,3-dimethyl, Pyrazine, ethyl, Octanal, Acetoin, 4-Methylthiazole, Pseudo-2-pentyl-furan, Pyridine, Nonane, 2,6-dimethyl. Some of the aromatic compounds that differed between fine and very fine particle size of 80/20 muscle/fat sample: 4H-Pyran-4-one, 2,3-dihydro-3,5-dihydroxy-6-methyl, Caprolactam, 1H-1Pyridine, 3-carbonitrile, 4-ethyl-2-oxo-2,5, 1-H-Pyrrole-2-2carboxaldehyde, 1-methyl, 2-Cyclopentene-1-one, 2-hydroxy-3-methyl, 2,5-dimethyl-3-(3-methyl butyl) pyrazine, Butyrolactone, 2-furancarboxyaldehyde, 5-methyl, Ethanone, 1(2 furanyl), Acetic acid, Ethenyl pyrazine, 2-ethyl-5-methyl pyrazine, Pyrazine, 2,3-dimethyl; 2-Propanone, 1-hydroxy, Octanal, Acetoin, 2-pentyl-furan.

Example 17: Leghemoglobin Contribution to Flavor

Beef flavors and aromas can be created in non beef consumables by addition of heme proteins. Ground chicken (90% lean, 10% fat) was strained with cheesecloth and mixed with recombinant soy leghemoglobin or recombinant bovine myoglobin to a final concentration of 0.5-1.0% wt/wt. The recombinant heme proteins were expressed in $E.$ $coli$ and purified by nickel affinity purification as described in Example 1. Prior to being mixed with chicken, the heme proteins were reduced with 20 mM Na Dithionite. Na dithionite was removed from the sample with a Zeba desalting column (Thermo Scientific). Leghemoglobin was desalted into 20 mM potassium phosphate pH 7.4, 100 mM NaCl. Myoglobin was desalted into either 20 mM potassium phosphate pH 7.4, 100 mM NaCl or 20 mM Na citrate pH 6.0, 100 mM NaCl. The reduced heme protein samples were divided in two, and half the sample was bubbled with carbon monoxide (CO) for 2 minutes. After mixing the heme protein samples with ground chicken, the mixture was poured into nugget-shaped molds and incubated overnight at 4° C. The nuggets were oven baked or pan fried at 165° C. until each nugget reached an internal temperature of 165° C. A panel of judges tasted nuggets containing chicken alone, chicken mixed with buffer, chicken mixed with either leghemoglobin or myoglobin+/−CO, or beef (90% lean, 10% fat). Judges filled out a survey to evaluate the aroma and flavor of each nugget. Judges rated the aroma and flavor of each nugget as follows: 1=chicken, 2=chicken+faint beef, 3=50/50 chicken+beef, 4=beef+faint chicken, 5=beef. Shown in Table 2 are the average scores received for each nugget. Percentages indicate the final concentration of heme protein wt/wt (abbreviations: KP=20 mM potassium phosphate pH 7.4, 100 mM NaCl buffer. NC=20 mM Na citrate pH 6.0, 100 mM NaCl buffer. n/d=not determined). Adding recombinant leghemoglobin or myoglobin to chicken resulted in an increased beef aroma and flavor. The perceived levels of beef flavor and aroma increased with the myoglobin and leghemoglobin content. Leghemoglobin and myoglobin provide the same benefit to the flavor and aroma.

TABLE 2

|  | Oven Baked | | Pan Fried | |
| --- | --- | --- | --- | --- |
|  | Aroma | Flavor | Aroma | Flavor |
| Chicken | 1 | 1 | 1 | 1 |
| Chicken KP | 1 | 1 | 2.5 | 1.2 |
| Chicken NC | 1.5 | 1.5 | 1.5 | 1 |
| Chicken 0.5% legH KP | 1.5 | 2.5 | 3.67 | 3.2 |
| Chicken 0.5% legH + CO KP | 2.5 | 2.5 | 2.67 | 2.2 |
| Chicken 0.5% Myo NC | 2 | 2 | 1.5 | 2.4 |
| Chicken 0.5% Myo + CO NC | 2 | 2 | 2.5 | 3 |
| Chicken 0.5% Myo + CO KP | 2.5 | 2.5 | 2.33 | 2 |
| Chicken 0.8% Myo + CO NC | 2 | 3 | 4 | 2.6 |
| Chicken 1% Myo NC | 4.5 | 4 | n/d | n/d |
| Chicken 1% legH NC | 4 | 4 | n/d | n/d |
| Beef | 5 | 5 | 5 | 5 |

Example 18: Preparation of a Non-Dairy Cream Liquor

A cream liquor was made from a sunflower cream fraction, RuBsiCo and whiskey (Jameson). A sunflower cream fraction was made by blending sunflower seeds in 40 mM sodium phosphate pH 8.0, 400 mM sodium chloride buffer. Seed debris was pelleted by centrifugation at 5000 g for 20 min, and the cream fraction collected. The cream fraction was resuspended in 10 mM potassium phosphate pH 7.4 buffer and collected by centrifugation at 5000 g, 20 min. Rubsico was purified as described in Example 1 and used as 25 mg/ml stock solution in 20 mM K-phosphate pH 7.0, 150 mM NaCl.

In one example, cream liquor was made as follows: 11.4% wt/v of sunflower cream fraction, 40% v/v Jameson whiskey, 0.4-1.6% wt/v Rubsico, 0.5% wt/v vanilla extract, 0.5% v/v espresso coffee, and 1.5% wt/v chocolate powder. The resulting mixture was homogenized at 5000 psi.

In another example, cream liquor was made from sunflower cream fraction and whiskey (Jameson) and sugar: 11.4% wt/v of sunflower cream fraction, 40% v/v Jameson whiskey, 0.5% v/v vanilla extract, 0.5% v/v espresso coffee, 1.5% wt/v chocolate powder and 8% wt/v sugar.

Beverages were served either at ambient room temperature or chilled. Resulting beverages were beige to light chocolate in color. The tasting results suggested that the beverage had a very creamy alcoholic flavor similar to dairy cream liquor. Chilled product was preferred. The emulsion was stable at room temperature for at least 1 week (maximum time tested).

Example 19—Chocolate Spread

A chocolate spread was made from 34% (wt/wt) cane sugar, 22% (wt/wt) cocoa powder, 19% (wt/wt) pistachio cream fraction, and 12% (v/v) almond milk. Cane sugar and cocoa powder (Ghirardelli) were commercially purchased. Almond skim milk was made in a following manner:

Almonds were blanched by immersion into 100° C. water for 30 sec. Blanched nuts were recovered and cooled by immersion into ice-cold water. Almonds were air dried. Almonds were then rehydrated by immersion in 2° C. water for 16 hr. Rehydrated almonds were drained, mixed with water at 1:2 wt/v ratio and blended in a Vitamix blender for 5 min. The blended slurry was collected in chilled container and stirred with a frozen cooling stick to cool. Once the slurry cooled to 10° C., the slurry was placed at 2° C. for up to 12 hours. Almond skim and cream were separated by centrifugation at 7480 g for 30 min at 4° C. Almond milk separated into 3 layers, a dense pellet of insoluble solids, a clear to translucent aqueous layer (which is referred to as the "almond skim milk"), and a lighter, creamy, opaque layer (which is referred to as the "almond cream"). Almond milk was then was pasteurized at 75° C. for 16 seconds, chilled and stored at 2° C.

A pistachio cream fraction was prepared by blending pistachios in 100 mM sodium carbonate pH 9.5 buffer with 400 mM sodium chloride and 1 mM EDTA, then centrifuging 5000×g for 20 min. The cream fraction was collected and washed into the same buffer once more. After centrifugation at 5000 g for 20 min, the cream fraction was collected and washed into 20 mM sodium phosphate pH 7.4 buffer with 50 mM sodium chloride and 1 mM EDTA. After centrifugation at 5000 g for 20 min, the cream fraction was collected an washed once more in the neutral (pH 7.4) buffer, centrifuged at 5000 g for 20 min. Pistachio cream fraction was collected and stored at 4° C.

Chocolate spread was made in the following way. Cane sugar was melted in almond milk, cocoa powder was added to sugar-milk mixture with stirring and melted. Sugar, milk and cocoa were then added to the pistachio cream fraction and whisked together. Resulting mixture was then poured into molds and let sit for 24 hours at refrigeration and freezer temperatures.

In another example, chocolate spread was made from 42% (wt/wt) cane sugar, 27% (wt/wt) cocoa powder, 31% (wt/v) sunflower cream fraction, and 23% (v/v) almond skim milk. All ingredients and procedures apart from sunflower cream fraction were as described above.

The sunflower cream fraction was created from blending sunflower seeds in 5 times the weight to volume of a solution of 40 mM potassium phosphate pH 8, with 400 mM NaCl, 1 mM EDTA, then cooled to 20° C., and the slurry was then centrifuged. The top cream layer was removed and is blended in the same buffer, followed by heating for 1 hour at 40° C. The slurry is cooled down to 20° C. then centrifuged; the cream layer is removed and mixed with 5 times the weight to volume of 100 mM sodium carbonate pH 10 with 400 mM NaCl, then centrifuge. The top layer is then mixed with 5 times the weight to volume of water and centrifuged again, the resulting cream fraction is very creamy, white, and neutral tasting.

In another example, a chocolate spread was made from 37% (wt/wt) cane sugar, 23% (wt/wt) cocoa powder, 13% (wt/v) sunflower cream fraction, and 7% (wt/wt) cocoa butter, and 20% v/v almond skim milk.

In another example, a chocolate spread was made from 37% (wt/wt) cane sugar, 23% (wt/wt) cocoa powder, 13% (wt/v) sunflower cream fraction, and 7% (wt/wt) coconut oil 20% v/v almond skim milk.

In another example a chocolate spread was made from 37% (wt/wt) cane sugar, 23% (wt/wt) cocoa powder, 13% (wt/v) sunflower cream fraction, and 7% (wt/wt) palm oil, and 20% v/v almond skim milk.

In another example a chocolate spread was made from 1.8% (wt/wt) cane sugar, 1.13% (wt/wt) cocoa powder, 88% (wt/v) pistachio cream fraction, and 9% almond skim milk, by whisking equal amounts of spread described above and pistachio oil bodies.

In another example, a chocolate spread was made from 8.5% (wt/wt) cane sugar, 5.4% (wt/wt) cocoa powder, 81% (wt/v) sunflower cream fraction, and 4.6% (v/v) almond skim milk, by mixing chocolate spread described above with sunflower cream at ratio 2:1.

Visual and textural inspection of all products suggested that they formed stable, solid, creamy spreads at room temperatures. All products were firm solids at refrigeration and freezer temperatures. Tasting results of all products suggested very pleasant, rich creamy texture with product melting in the mouth reviewed positively by tasters. Individual tasters preferences varied with respect to like or dislike of pistachio flavor, coconut flavor, preference for more or less sweet product and more or less cocoa flavor. One particular sample was described as being similar to a milk chocolate spread, as the sunflower cream fraction contributed a neutral flavor.

Example 20—Generation of Adipose Tissue Replica

Adipose tissue replicas were generated using the ingredients recited in Table 3.

TABLE 3

| Adipose Tissue Replica | |
| --- | --- |
| Ingredient | % |
| Coconut oil | 65 |
| Pea vicillin protein in buffer | 21.3 |
| Cocoa butter | 10 |
| Buffer | 2.7 |
| Lecithin slurry, 50 mg/ml | 1 |
| Total | 100 |

Lecithin (SOLEC™ F Deoiled Soy Lecithin, The Solae Company, St. Louis, Mo.) was prepared at a concentration of 50 mg/ml in 20 mM potassium phosphate, 100 mM NaCl, pH 8.0 buffer and sonicated (Sonifier Analog Cell Disruptor model 102C, BRANSON Ultrasonics Corporation, Danbury, Conn.) for 30 seconds.

The pea vicilin protein was supplied as a liquid containing approximately 140 mg/g pea vicilin in 20 mM potassium phosphate, 100 mM NaCl, pH 8.0 buffer.

Coconut oil (Shay and Company, Milwaukie, Oreg.) and cocoa butter (Cocoa Family, Duarte, Calif.) were melted by heating to 50-70° C. and then combined and held warm until needed.

The buffered protein solution, additional buffer, and lecithin slurry were mixed in a 32 ounce sized metal beaker and equilibrated to room temperature. An emulsion was formed using a hand held homogenizer (OMNI model GLH fitted with G20-195ST 20 mm generator probe, OMNI International, Kennesaw, Ga.). The homogenizer probe was put into the protein lecithin mixture and turned on to speed 4. The warmed oil was then added slowly over the course of about 2 minutes while continuously moving the probe around in the mixture.

The emulsion was then heat set by placing the metal beaker into a 95° C. waterbath. Using a clean spatula, the emulsion was stirred every 20 seconds for 3 minutes total.

The beaker was then removed from the waterbath and stored at 4° C. for several hours until thoroughly cooled.

Example 21—Generation of Raw Tissue Replica

A raw tissue replica was generated using the ingredients recited in Table 4.

TABLE 4

Raw Tissue Replica

| Ingredient | % |
| --- | --- |
| Buffer | 41.6 |
| Heme protein in buffer | 26.7 |
| Pea legumin in buffer, dried | 12.1 |
| Pea vicilin in buffer, dried | 9.4 |
| Flavor precursor mix, 17x | 6.2 |
| Transglutaminase preparation | 4 |
| Total | 100 |

The buffer was 20 mM potassium phosphate, 100 mM NaCl, pH 7.4. The heme protein was prepared at a concentration of 55 mg/g in 20 mM potassium phosphate, 100 mM NaCl, pH 7.4 buffer. The 17× flavor precursor mix precursor is described in Example 27. The pea legumin was prepared in 20 mM potassium phosphate, 500 mM NaCl, pH 8 buffer and then freeze dried prior to use. The final protein concentration of the dried material was 746 mg/g. The pea vicilin was prepared in 20 mM potassium phosphate, 200 mM NaCl, pH 8 buffer and then freeze dried prior to use. The final protein concentration of the dried material was 497 mg/g.

The liquid ingredients (buffer, heme, and flavor precursor mix) were mixed in a plastic beaker. The dry pea legumin and pea vicilin were then added and allowed to fully rehydrate while gently stirring for 1 hour at room temperature. The dry transglutaminase preparation (ACTIVA® TI, Ajinomoto, Fort Lee, N.J.) was then added and stirred for about 5 minutes until dissolved. The stirring was then turned off and the mixture was allowed to gel at room temperature until firm. After the gel had formed the raw tissue replica was stored refrigerated until used.

Example 22—Hard Connective Tissue Replica

A hard connective tissue replica was made as following using soy protein isolate (Supro Ex38, Solae), wheat gluten (Cargill), and bamboo fiber (Alpha-Fiber B-200, The Ingredient House). The purified proteins were freeze-dried and milled using a standard coffee grinder. Commercially available powders of soy protein isolate and wheat gluten were used as received.

The connective tissue replica contained 49% soy protein isolate, 49% wheat gluten and 2% bamboo fiber. The ingredients were thoroughly mixed and loaded into the loading tube of the extruder's batch feeder. A twin-screw extruder (Nano 16, Leistritz Extrusion Corp.), with a high-pressure water injection pump (Eldex) and custom-made die nozzles (stainless steel tube, 3 mm ID, 15 cm length, pressure rating 3000+PSI) attached using a Hy-Lok two-ferule tube fitting and a custom-made die with a threaded nozzle and 10 mm ID, 20 mm long flow channel was used.

The dry mixture was fed into the extruder at the rate 1 g/min. Water was fed by the pump into the second zone of the extruder's barrel. The rate of water feeding is adjusted to the rate of dry mixture feeding such as to provide 55% moisture level in the final extrudiate. A temperature gradient was maintained along the extruder barrel as follows: feed zone—25° C., zone 1—30° C., zone 2—60° C., zone 3—130° C., zone 4—130° C. The die plate was neither actively heated, nor cooled. The die nozzle was actively cooled (by applying moist tissue replica) to maintain extrudate temperature below 100° C.

Hard connective tissue replica obtained by this process was dark off-white ("cappuccino") colored material shaped into 3 mm thick filaments that had tensile strength similar to animal connective tissue (3 MPa).

Example 23. Soft Connective Tissue Replica

A soft connective tissue replica was made as in Example 22, except that the rate of water feeding was adjusted to the rate of dry mixture feeding to provide 60% moisture level in the final extrudate. A temperature gradient was maintained along the extruder barrel as follows: feed zone—25° C., zone 1—30° C., zone 2—60° C., zone 3—115° C., zone 4—115° C. The die plate was neither actively heated, nor cooled. The die nozzle was actively cooled (by applying moist tissue) to maintain extrudate temperature below 100° C.

Soft connective tissue replica obtained by this process was light off-white colored material shaped into 3 mm thick filaments that had low tensile strength (<0.1 MPa) and had a significant propensity to split longitudinally into bands and thin fibers Example 24. Thin Connective Tissue Replica (Zein Fibers) Process A thin connective tissue replica was prepared using zein protein powder, glycerol (FCC grade), polyethylene glycol (PEG 400 or PEG3350), ethanol, sodium hydroxide (FCC grade), and water. The zein powder and PEG3350 at a 35% w/w ratio to zein were dissolved in 85% aqueous ethanol to reach a final zein concentration of 57% w/w. The pH of the solution was adjusted to 7.0 with 1M solution of sodium hydroxide in ethanol. A syringe pump with A 1-12 ml syringe, spinning nozzle (hypodermic needle, 18-27 gauge, or a plastic nozzle, 18-24 gauge), heating silicon tape, and a heating fan was used, with a collector assembled using a computer-controlled motor rotating a Delrin rod, which serves as a collector.

This solution was loaded into the syringe, which was mounted onto the syringe pump, with an 18 gauge plastic tip attached. A silicon heating tape was looped around the tip to maintain it at elevated temperature. After solution was extruded out of the tip and forms a drop, it was picked up with a spatula and carefully transferred towards the collector rod to form a filament between the tip and the collector. The extrusion rate was optimized to produce even flow of material from the tip (5 ml/h for a 12 ml syringe and 18 gauge tip). The collector rotation speed was 3 RPM. The heating fan was positioned to blow hot air onto the spooling fiber. After spooling, the fibers were cured in a 120° C. oven for 24 hours.

Thin connective tissue replica obtained by this process was semi-clear yellow colored material shaped into 300-micrometer thick fibers that were semi-flexible in air, and became very flexible and elastic in presence of water, maintaining high tensile strength similar to animal connective tissue (6 MPa)

Example 25. Noodles

Noodles were prepared using purified pea vicilin (freeze-dried), and soy protein isolate (Supro EX38 by Solae, Solbar Q842 (CHS)) or soy protein concentrate (Hisolate, Harvest Innovations). To prepare the noodles, 67% soy protein concentrate or isolate, and 33% ground pea vicilin powder were thoroughly mixed and loaded into the loading tube of the extruder's batch feeder. The dry mixture was fed into the extruder at the rate in the range of 1-2 g/min. Water was fed by the pump into the second zone of the extruder's barrel at the rate 3.6-5.3 ml/min such as to maintain the final moisture content in the extrudate at 72.5%. A temperature gradient was maintained along the extruder barrel as follows: feed zone—25° C., zone 1—30° C., zone 2—60° C., zone 3—100° C., zone 4—100° C. Zone 1 temperature can be varied in the range of 25—45° C. Zone 2 temperature can be varied in the range of 45-65° C. Zone 3 and 4 temperatures can be varied in the range of 95-100° C. The die plate was neither actively heated, nor cooled. The die nozzle was passively cooled by ambient air ensuring extrudate temperature below 100° C.

Noodles obtained by this process were light yellow colored material shaped into 1.5 mm thick filaments that had low tensile strength (<0.1 MPa) and a moderately sticky texture.

Example 26. Sticky Tissue Replica Preparation

Sticky tissue replica was prepared using purified pea vicilin (freeze-dried) and purified pea legumin (freeze-dried). To prepare the sticky tissue replica, 50% ground pea vicilin powder and 50% ground pea legumin powder were thoroughly mixed and loaded into the loading tube of the extruder's batch feeder. The dry mixture was fed into the extruder at the rate in the range 0.4-0.8 g/min. Water was fed by the pump into the second zone of the extruder's barrel at the rate in the range 1.6-3.2 ml/min, such that the final moisture content of the extrudate was maintained at 80%. As the total throughput increased from 2 g/min to 4 g/min, the screw speed was increased from 100 to 200 RPM. Larger die diameters (4 mm and above) are also helpful for preventing backflow at higher throughputs. A temperature gradient was maintained along the extruder barrel as follows: feed zone—25° C., zone 1—30° C., zone 2—60° C., zone 3—90° C., zone 4—90° C. The die plate was neither actively heated, nor cooled. The die nozzle was passively cooled by ambient air. The die nozzle is kept free of obstructions by solidifying gel material.

Sticky tissue replica obtained by this process was semi-transparent water-white colored material shaped into irregular 1-5 cm sized bulbs that had sticky paste-like texture.

Example 27. Preparation of the Flavor Precursor Mix

A flavor precursor mix was prepared by mixing concentrated stock solutions of each additive to make a 17× solution. Table 5 contains the chemical composition of the mix and the mM concentration of each component in the final burger. The concentrated flavor precursor mix was sterile filtered and adjusted to pH 5.5-6.0 using NaOH, and used at a 1× concentration in burgers.

TABLE 5

Chemical composition of the flavor precursor mix.

| Chemical entity | mM |
| --- | --- |
| Alanine | 5.6 |
| Arginine | 0.6 |
| Asparagine | 0.8 |
| Aspartate | 0.8 |
| Cysteine | 0.8 |
| Glutamic acid | 3.4 |
| Glutamine | 0.7 |
| Glycine | 1.3 |
| Histidine | 0.6 |
| Isoleucine | 0.8 |
| Leucine | 0.8 |
| Lysine | 0.7 |
| Methionine | 0.7 |
| Phenylalanine | 0.6 |
| Proline | 0.9 |
| Threonine | 0.8 |
| Tryptophan | 0.5 |
| Tyrosine | 0.6 |
| Valine | 0.9 |
| glucose | 5.6 |
| Ribose | 6.7 |
| Maltodextrin | 5.0 |
| Thiamine | 0.5 |
| GMP | 0.2 |
| IMP | 0.6 |
| Lactic acid | 1.0 |
| creatine | 1.0 |
| NaCl | 10 |
| KCl | 10 |
| Kphos pH 6.0 | 10 |

Example 28—Freeze-Alignment to Produce Texturized Protein for Use as Muscle Replicas This example describes a non-extrusion based method to produce texturized protein materials that can be used in meat replicas.

A muscle tissue-replica was prepared by first preparing a gel of lentil proteins by mixing a 4.5% (w/v) solution of lentil proteins in 20 mM potassium phosphate buffer pH 7.4+100 mM sodium chloride with 20% (v/v) canola oil (from Jedwards International). The mixture was gelled by heating at 95° C. for 15 minutes and slow cooled to room temperature (at the rate of 1° C./minute). The gel was then poured into a vessel and frozen at −40° C. by placing above a liquid nitrogen bath until completely frozen. The frozen material was then dried in a freeze-dryer. When the material was completely dried, the material was stabilized by autoclaving (121° C., 15 minutes). The resulting material is a texturized muscle tissue replica formed with plant proteins.

The aligned muscle replica then was presoaked in water for 5 minutes, cut into pieces of length 3-4 mm and then combined with 10 g adipose-replica, 10 g connective tissue replica and 5 g cold-set gels to form 50 g beef patty replicas. An in-house sensory panel attributed inclusion of freeze-aligned tissue to impart improved fibrous texture to the patty.

A muscle-tissue replica also was prepared by first forming freeze-aligned material as described above. After the tissue replica was steam cooked at 121° C. for 10 minutes, the material was allowed to soak in a solution of heat-denatured pea vicilins (at 6% w/v in 20 mM potassium phosphate buffer pH 7.4+100 mM sodium chloride, heat denatured by heating at 95° C. for 30 minutes), 1% equine myoglobin (w/v) (Sigma), and 40% (v/v) canola oil (from Jedwards International). Gelation of the medium was induced by addition of calcium chloride at 20 mM. The sample was allowed to sit for 5 minutes at room temperature to allow for gel formation. The resulting muscle-replica contained aligned material in a cold-set gel reminiscent of beef muscle in steak.

Example 29—Cold Gelation of Proteins for Meat Applications

In one example, a cold-set gel comprising myoglobin was prepared by first heat denaturing a 6% (w/v) solution of pea-vicilins in 20 mM potassium phosphate buffer, pH 7.4 with 100 mM sodium chloride at 100° C. for 30 minutes. The solution was allowed to cool back to room temperature. Canola oil (from Jedwards International) and equine myoglobin (Sigma) were added to a final concentration of 20% (v/v) and 1% (w/v), respectively. Gel formation was induced by adding calcium chloride at 20 mM. A 50 g beef patty replica was formed by combining 5 g of the cold gel with 10 g of adipose tissue-replica, 10 g of connective tissue-replica, and 25 g of muscle tissue-replica. Five mls of a 7% (w/w) solution of crude lentil protein was added to the mixture and patties were formed.

Example 30—Binding Materials in Meat Replicas

In one example, a beef replica was made by first preparing a coacervate from a 3% (w/v) solution of pea vicilins and legumins (vicilin:legumin ratio of 3:1) in 20 mM potassium phosphate pH 7.4+100 mM sodium chloride. Melted palm oil (from Jedwards International) was added to the solution to a final concentration of 5% and mixed by vortexing. The emulsion then was acidified by adding hydrochloric acid while stirring to a pH of 5. The slurry was then centrifuged at 5000×g for 10 minutes and the liquid top layer was decanted from the coacervate.

A 50 g beef patty replica was formed by combining the coacervate at 10% with adipose tissue-replica (20%), connective tissue-replica (20%) and muscle tissue-replica (50%). Five mls of a 7% solution of crude lentil protein was added to the mixture and patties were formed. Patties that included coacervate as binding material were observed to be more cohesive than patties that did not.

Example 31—Assembly of a Sticky and Noodle Type Ground Tissue Replica and Burger Replica Ground tissue replica and burger replicas were prepared using the ingredients in Table 6. During all pre-processing steps, the temperature of the materials was maintained cold (4-15° C.).

TABLE 6

| Composition of sticky and noodle type formulation | |
|---|---|
| Ingredient | % |
| Adipose | 26 |
| Soft connective | 20.6 |
| Sticky | 12 |
| Raw | 10 |
| Noodles | 10 |
| Hard connective | 10 |
| Flavor and heme solution | 10 |
| k-carrageenan | 1.4 |
| Total | 100 |

Adipose tissue replica from Example 6 was chilled following the final heat-cool step into a solid block. Optionally 0.2% by weight of heme protein can be added as a 20 mg/ml liquid solution and manually worked into the adipose. The adipose was then crumbled manually into small bits 3-7 mm in diameter while cold.

Soft connective tissue replica from Example 23 was produced by an extrusion process as long string-like pieces. The soft connective was chopped with a mini chopper (Mini-Prep® Plus Processor model DLC-2L Cuisinart, Stamford, Conn.) in a single step process. Approximate 200 g of soft connective was placed in the mini chopper and processed on the chop setting for 60 seconds to yield pieces of 1-3 mm in length with ragged edges.

Sticky tissue replica and noodles tissue replica (see Examples 25 and 26) were produced by an extrusion process as long noodle-like pieces or amorphous pieces, respectively. Raw tissue replica of Example 21 was provided from the enzymatic crosslinking process as a solid block. All three of these tissue replicas were manually broken down into pieces 1-3 cm in diameter.

Hard connective tissue replica from Example 22 was produced from an extrusion process as long string-like pieces. The hard connective tissue replica was chopped to three levels, named coarse, intermediate, and fine, in a mini chopper (Mini-Prep® Plus Processor model DLC-2L Cuisinart, Stamford, Conn.). 160-200 g of hard connective tissue replica was placed in the mini chopper and processed on the chop setting for 90 seconds. One third of the material was removed as the coarse chopped fraction. The material remaining in the chopper was then processed for an additional 60 seconds and one third of the original weight was removed as the intermediate chopped fraction. The material remaining in the chopper was then processed for an additional 30 seconds to produce the fine fraction.

Leghemoglobin was freeze-dried and then reconstituted in a 17× flavor precursor mix (see Example 27) adjusted to pH 6.0 with 10 N NaOH to make the flavor and heme protein solution.

Following pre-processing described above, the soft connective, sticky, raw, noodles, hard connective, and ⅔ of the adipose were mixed by hand in a bowl. A typical batch size was 100 g to 2000 g. The flavor and heme solution was then dribbled onto the mixed tissue replicas and mixed gently by hand, then k-carrageenan powder was tsprinkled over the mixture and mixed in by hand. During the assembly, grinding, and forming all materials were kept cold (4-15° C.). The mixture was ground using a stand mixer fitted with a food grinder attachment (KitchenAid® Professional 600 Series 6 Quart Bowl-Lift Stand Mixer model KP26M1XER and KitchenAid® Food Grinder model FGA, St. Joseph, Mich.) on speed setting 1. The food grinder material was fed by a screw conveyor past a rotating knife installed in front of a fixed hole plate.

The ground tissue replica mix was collected in a bowl and the remaining ⅓ of the crumbled adipose was then added to the ground tissue replica mix and mixed in by hand. Approximately 30 g or 90 g portions of ground tissue replica were then formed by hand into round patty shapes. Typical dimensions for 30 g patties were 50 mm×12 mm. Typical dimensions for 90 g patties were 70 mm×18 mm. Patties were refrigerated until cooked. Cooked patties had appearance, texture, and flavor similar to ground beef as judged by a trained sensory panel. In addition to cooking in patty format, the ground tissue replica can also be used in a variety of dishes such as taco filling, casseroles, sauces, toppings, soups, stews, or loaves.

Example 32—Assembly of a Wheat Gluten Containing Ground Tissue Replica and Burger Replicas Ground tissue replica and burgers were prepared using the ingredients in Table 7.

TABLE 7

Composition of Wheat Gluten Type formulation

| Ingredient | % |
|---|---|
| Adipose | 25 |
| Soft connective | 30 |
| Raw tissue replica with heme and flavor | 35 |
| Wheat gluten | 5 |
| Hard connective | 5 |
| Total | 100 |

Adipose, soft connective, and hard connective were pre-processed as described in Example 31. During all pre-processing steps, the temperature of the materials was maintained cold (4-15° C.).

Raw muscle with heme protein and flavor was then prepared as follows. Freeze-dried pea vicilin and pea legumin were dissolved in water and 16× flavor stock. The freeze-dried heme protein was dissolved in this mixture and the pH was adjusted with citric acid to 5.8. A dry transglutaminase preparation (ACTIVA® TI Ajinomoto Fort Lee, N.J.) was then added and mixed for about 5 min to fully dissolve. The mixture was then allowed to stir for an additional 10 minutes until some increase in viscosity was observed. The soft connective and hard connective were then added and the mixture was allowed to sit for 1 hour at room temperature to cure and form a solid mass.

Wheat gluten powder (vital wheat gluten, Great Northern, item 131100, Giusto's Vita-Grain, South San Francisco, Calif.) then was added to the gelled raw muscle and mixed to distribute. This mixture was then immediately ground using a stand mixer fitted with a food grinder attachment as described in the previous example. Ground tissue replica was then chilled for 5 min at −20° C. Finally, the chopped adipose, pre-chilled to 4° C., was added to the chilled ground tissue replica.

Ground tissue replica mix with adipose tissue replica added was then formed by hand into two 90 g round patties. 90 g patties are typically 70 mm×18 mm. A typical batch size was 180-200 g and produced two patties. The patties were then allowed to rest at room temperature for 30 minutes. After resting the patties can be cooked or refrigerated until ready to cook.

Example 33: Generation of Beef Flavor in Replica Burgers by the Addition of Heme and Flavor Precursors Characteristic flavor and fragrance components in meat are mostly produced during the cooking process by chemical reactions molecules (precursors) including amino acids, fats and sugars that are found in plants as well as meat. Flavor precursors along with 1% Leghemoglobin were added to the muscle component of the burger replicas as indicated in Table 8. Three replicas, one with no precursors, and two different mixtures of precursors, along with 80:20 beef were cooked then served to a trained sensory panel to describe the flavor attributes shown in Table 9. The addition of precursors increased the beefy flavor, the bloody notes, overall flavor quanity, and decreased the off notes in the replica. The replicas and beef sample also were analyzed by GCMS by adding 3 grams of uncooked replica or beef into a GCMS vial. All samples were cooked at 150° C. for 3 mins, cooled to 50° C. to extract for 12 minutes using GCMS (SPME fiber sampling of headspace). A search algorithm analyzed the retention time and mass fingerprint information to assign chemical names to peaks. In the replica burger with 1% Leg hemeoglobin, and precursor mixture 2, 136 beef compounds were created. In Table 10, all the compounds created in the replica burger that were also identified by GCMS in the beef samples are indicated.

TABLE 8

Flavor precursors added to the beef replicas before cooking.

| | Samples | | |
|---|---|---|---|
| Additive (mm) | 767 Precursor Mix 1 | 804 No Precursors | 929 Precursor Mix 2 |
| Alanine | 5.61 | | 5.61 |
| Cysteine | 0.83 | | 0.83 |
| Glutamic acid | 3.40 | | 3.40 |
| Leucine | 0.76 | | 0.76 |
| Lysine | 0.68 | | 0.68 |
| Methionine | 0.67 | | 0.67 |
| Tryptophan | 0.49 | | 0.49 |
| Tyrosine | 0.55 | | 0.55 |
| Valine | 0.85 | | 0.85 |
| Glucose | 5.55 | | 5.55 |
| Ribose | 6.66 | | 6.66 |
| Lactic acid | 1.00 | | 1.00 |
| creatine | 1.00 | | 1.00 |
| Thiamine | 0.50 | | 0.50 |
| IMP + GMP | 0.40 | | 0.40 |
| Sucrose | | | 2.00 |
| Fructose | | | 2.00 |
| Xylose | | | 2.00 |
| Maltodextrin | 0.50% | | 0.50% |

TABLE 9

The sensory score determined by the sensory panel for the replica burgers and 80:20 beef sample.

| Sample # | | Beef | 767 | 804 | 929 |
|---|---|---|---|---|---|
| Flavor Quality | mean | 7.0 | 3.8 | 3.2 | 4.3 |
| | STDEV | 0.0 | 1.3 | 1.0 | 1.2 |
| Flavor Intensity | mean | 4.3 | 4.2 | 4.3 | 4.3 |
| | STDEV | 0.8 | 1.2 | 1.4 | 1.2 |
| Flavor: Beefy | mean | 5.8 | 3.3 | 2.3 | 4.2 |
| | STDEV | 1.0 | 1.2 | 0.8 | 1.2 |
| Flavor: bloody/Metallic | mean | 4.5 | 2.0 | 2.2 | 3.2 |
| | STDEV | 1.2 | 1.0 | 0.9 | 1.4 |
| Flavor: Savory | mean | 3.3 | 3.8 | 3.7 | 4.2 |
| | STDEV | 1.2 | 1.2 | 1.2 | 1.8 |
| Off Flavors: chemical/oxidized/beany | mean | 1.5 | 2.3 | 3.5 | 2.7 |
| | STDEV | 0.8 | 1.2 | 1.8 | 1.0 |

TABLE 10

Beef flavor compounds created in replica burger with
1% LegH and precursor mix 2 as detected by GCMS.

| | | |
|---|---|---|
| 3-octen-2-one | octanoic acid | (Z)-2-decenal, |
| 1-penten-3-ol | octane | carbon disulfide |
| n-caproic acid vinyl ester | octanal | butyrolactone |
| 2-acetylthiazole | nonanal | butanoic acid |
| thiophene | 4,7-dimethyl-undecane, | 3-methyl-butanal, |
| methyl-thiirane, | methyl ethanoate | 2-methyl-butanal, |
| thiazole | methional | butanal |
| styrene | methacrolein | 3,6,6-trimethyl-bicyclo[3.1.1]hept-2-ene, |
| | isovaleric acid | benzyl alcohol |
| pyrrole | isopropyl alcohol | 1,3-dimethyl-benzene |
| pyridine | hexanoic acid | benzene |
| trimethyl-pyrazine | 2,2,4,6,6-pentamethyl-heptane, | benzaldehyde |
| tetramethyl-pyrazine, | 2-methyl-heptane, | acetophenone |
| methyl-pyrazine, | heptane | acetonitrile |
| ethyl-pyrazine | heptanal | acetone |
| 3-ethyl-2,5-dimethyl-pyrazine | furfural | acetoin |
| 2,5-dimethyl-pyrazine | furaneol | acetic acid ethenyl ester |
| 2,3-dimethyl-pyrazine | 3-methyl-furan | acetic acid |
| 2-ethyl-5-methyl-pyrazine | 2-propyl-furan | acetamide |
| 2-ethenyl-6-methyl-pyrazine, | 2-pentyl-furan | acetaldehyde |
| pyrazine | 2-methyl-furan | 4-methyl-5-thiazoleethanol |
| 2-methyl-propanal, | 2-ethyl-furan | 6-methyl-5-hepten-2-one |
| propanal | furan | trans-2-(2-pentenyl)furan |
| phenylacetaldehyde | formamide | (E)-4-octene, |
| phenol | ethyl acetate | 4-cyclopentene-1,3-dione |
| pentanoic acid | 1-(2-furanyl)-ethanone | 4-cyanocyclohexene |
| 3-ethyl-2,2-dimethyl-pentane | 1-(1H-pyrrol-2-yl)-ethanone | dihydro-2-methyl-3(2H)-furanone, |
| pentanal | dimethyl trisulfide | (E,E)-3,5-octadien-2-one |
| p-cresol | dimethyl sulfide | 3,5-octadien-2-one |
| oxalic acid, butyl propyl ester | d-limonene | 2,2-dimethyl-undecane |
| 1-heptene | 1-octen-3-ol | toluene |
| 1-ethyl-5-methylcyclopentene | 1-octanol | 1-pentanol |
| 1-butanol | 1-hexanol | 1-octen-3-one |
| 1H-pyrrole-2-carboxaldehyde | 2-methyl-1H-pyrrole | 2-butanone |
| 2-nonanone | 3-methyl-2-butenal | 2-thiophenecarboxaldehyde |
| 2-n-butylacrolein | 3-ethylcyclopentanone | 2-pyrrolidinone |
| 2-methyl-2-heptene | 2(5H)-furanone | 2-propenal |
| (E)-2-hexenal, | dihydro-5-pentyl-2(3H)-furanone | 1-hydroxy-2-propanone |
| (E)-2-heptenal, | 5-ethyldihydro-2(3H)-furanone | 1-(acetyloxy)-2-propanone |
| 6-methyl-2-heptanone | 5-acetyldihydro-2(3H)-furanone | 2-pentanone |
| 2-heptanone | 2,6-dimethylpyrazine | (E)-2-octenal |
| 2-furanmethanol | (E,E)-2,4-nonadienal | 2-octanone |
| 3-ethyl-2-1,4-dioxin | (E,E)-2,4-heptadienal | (E)-2-nonenal |
| 3-ethyl-2-methyl-1,3-hexadiene | (E,E)-2,4-decadienal | 8-methyl-1-undecene |
| 2-butenal | 2,3-dimethyl-5-ethylpyrazine | 1-propanol |
| 1-penten-3-one | | |

Example 34—Removal of Off-Flavors from Plant Protein Solutions i) Synthesis of Ligand Modified LOX Removal Resin A 1 mL settled volume of CM Sepharose resin (Sigma Aldrich Catalog # CCF100) was loaded into a BioRad minicolumn. 3 mL of 50 mM MES (2-morpholinoethanesulfonic acid) buffer preset to a pH range of 5.5 to 6 was allowed to pass through the resin bed. Separately, to 1 mL of the same buffer was added in succession, 0.044 mL of 4,7,10-trioxa-1,13-tridecanediamine, 0.030 mL of 12 N HCl, 23 mg of NHS (N-hydroxy-succinimide), and 38 mg of EDC (1-ethyl-3-(3-dimethylaminopropyl)carbodiimide hydrochloride) with dissolution after each addition. The resulting solution was added to the top of the column bed and allowed to gravity flow through and the effluent was collected. The resulting effluent was returned to the top of the column bed. The cycle of addition of solution, elution and return was done four times. When the last elution was finished, 3 mL of 50 mM MES buffer preset to a pH of 5.5 to 6 was allowed to gravity flow through the column. Linoleic acid (0.03 mL) was dissolved in 0.5 mL DMF (N,N-dimethylformamide), followed in sequence by 12 mg NHS, 19 mg EDC, and 0.5 mL of 50 mM MES buffer preset to a pH of 5.5 to 6. The NHS/EDC mixture was shaken to mix, resulting in a two-phase liquid which was applied to the top of the column and eluted through the resin bed, allowed to gravity flow through the column and effluent collected. The effluent was returned to the top of the column bed. The cycle of addition of solution, elution and return was done four times. Once the last collection was finished a solution of 70% ethanol in water (5 mL) was added to the top of the column, followed by 3 mL of 0.1 M sodium hydroxide. This was followed by 0.1 M buffer of potassium phosphate preadjusted to pH 7 to 8.

ii) Removal of Off-Flavors from Pea Proteins Using the Ligand Modified LOX Removal Resin.

A solution of pea proteins (30 mls at 20 mg/ml protein concentration in 20 mM potassium phosphate buffer pH 7.4, 100 mM sodium chloride) was passed through a 100 ml resin bed described above. All unbound material was collected and the resin further washed with 200 mls of buffer. Both fractions were combined and resin was stripped of bound protein by washing with 2 bed volumes of 20 mM phosphate, 1M sodium chloride. Resin bed was regenerated by washing with 2 bed volumes of 0.1M NaOH followed by 3 bed volumes of water and re-equilibration with buffer.

Depletion of LOX activity in the pooled unbound fraction was confirmed by assaying for enzyme activity. Sodium linoleate was used as substrate for LOX and formation of hydroperoxide intermediates was monitored by absorbance at 234 nm. Assays were performed at pH9 in 50 mM sodium borate buffer. Assays confirmed depletion of LOX activity in the pooled unbound fraction. LOX was removed from resin in washes with 0.5M and 1M sodium chloride.

Improvement in flavor in the LOX depleted protein solutions (both as-is and incubated with canola oil at 10%) was confirmed by a panel of 4 tasters. Samples of pea proteins at same concentration, but not depleted of LOX was used at control. Tasters described LOX -depleted samples as mild tasting and control samples as having beany, planty taste. In addition, GC-MS analysis of samples showed 5× reduction in overall volatiles in the LOX-depleted samples.

Reduction of Off-Flavors Using Dialysis and Activated Carbon

A solution of pea albumins (30 mls at 40 mg/ml in 20 mM potassium phosphate buffer pH 7.4, 100 mM sodium chloride) was dialyzed against 100 volumes of buffer overnight at 4° C. The solution was then poured over a bed of activated carbon (100-mesh, Sigma-Aldrich) prewetted with buffer. The slurry was centrifuged at 5000×g for 10 minutes and the supernatant containing protein was decanted off. This solution was tested for improvement in flavor by both taste and GC-MS. Improved flavor (less bitter, less soapy flavor) was noted by tasters and GC-MS confirmed a >2× reduction in volatile compounds; in particular, samples treated with activated carbon showed a decrease in C6- and C7 compounds (e.g., 1-heptanal, 2-heptenal, or 2-heptanone) that are associated with green/grassy/planty flavors.

Reduction of Off-Flavors Using Antioxidants and/or LOX Inhibitors

A 7% solution of pea-vicilins was heated with coconut oil (20%) to 95° C. for 15 min in the presence of antioxidants or LOX inhibitors and compared for off-flavors sample against a control without any antioxidants or LOX inhibitors. In a similar experiment, soymilk was heated in the presence of antioxidants or LOX inhibitors and tasted in-house for off-flavors. Table 11 summarizes off-flavors noted by tasters. Both epigallocetechin gallate and propyl gallate were effective at minimizing off-flavors in pea samples. However, in case of soymilk, epigallocatechin gallate did not appear to reduce beaniness; propyl gallate and α-tocopherol were found to slightly improve flavor in soymilk.

TABLE 11

| Compound | soymilk | Pea |
| --- | --- | --- |
| α-tocopherol | Slightly improved flavor | Oxidized oil |
| caffeic acid (0.02%) | Beany | Oxidized oil |
| epigallocatechin gallate | Beany | Improved flavor |
| propyl gallate (0.02%) | Slightly improved flavor | Improved flavor |
| β-carotene | Beany | Oxidized oil |

Example 35—Adipose Replica with Lecithin Gradient

Lecithin (SOLEC™ F Deoiled Soy Lecithin, The Solae Company, St. Louis, Mo.) was prepared at a concentration of 50 mg/mL in 20 mM potassium phosphate, 100 mM NaCl, pH 8.0 buffer and sonicated (Sonifier Analog Cell Disruptor model 102C, BRANSON Ultrasonics Corporation, Danbury, Conn.) for 30 seconds. Moong protein was supplied as a liquid in 20 mM potassium phosphate, 100 mM NaCl, pH 8.0 buffer. Coconut oil was melted by heating to 50-70° C. and held warm until needed. The coconut oil, buffered protein solution, additional buffer, and lecithin slurry were mixed at 70° C., and an emulsion was formed using a hand held homogenizer. The emulsion was then heat set by placing the tube into a 95° C. waterbath for a total of 5 mins. The tube was then removed from the waterbath and stored at 4° C. for twelve hours or longer prior to analysis.

To observe the effect of lecithin on the adipose tissue replica replica, a formulation was prepared that contained 1% w/v moong protein and 75% v/v coconut oil, with the lecithin amount increasing from 0%, 0.05%, 0.25%, 0.5%, and 1.0% w/v.

Properties of the adipose replica were measured by weighing small portions of the material and forming uniform round balls, which were then cooked on a non-stick pan with temperature slowly ramping up to 150° C. The temperature of the pan at which fat visibly released from the balls was measured as the fat release temperature. After cooking to completion, the point at which fat no longer released, the total fat released was measured.

Figure 2B:
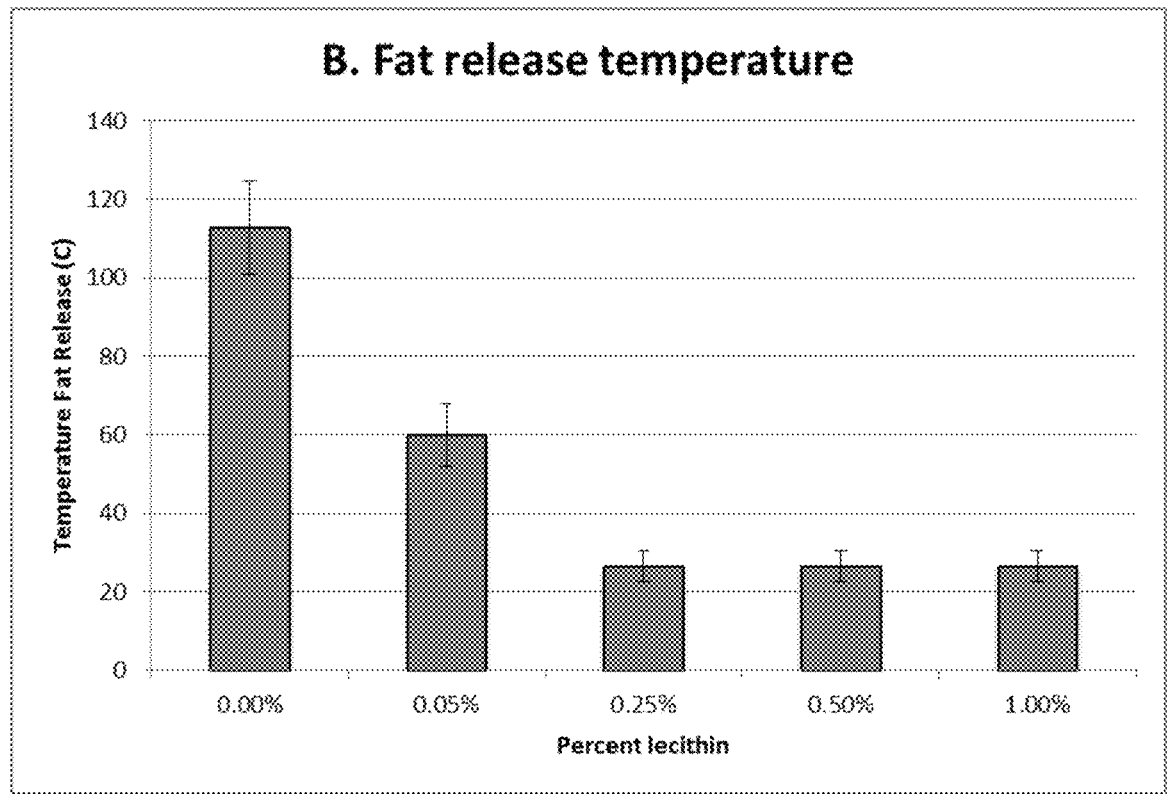
FIG. 2B is a bar graph depicting the temperature of the fat release based on the amount of lecithin.

An increase in the amount of lecithin in the adipose replica correlated with an increase in the percent fat released, and with a decrease in the fat release temperature (see FIGS. 2A and 2B). With 0% lecithin, there was an average of 40% fat released, and when lecithin was increased to 0.05%, there was an average of 82% fat released, which further increased to 88% with 0.25% lecithin, then leveled off to an average of 60% with further increases in lecithin. With 0% lecithin, a high temperature of 217° C. was required to begin the fat release. The fat release temperature decreased to 122° C. with 0.25% lecithin, then leveled off to an average of 62° C. with further increases of lecithin.

Figure 2C:
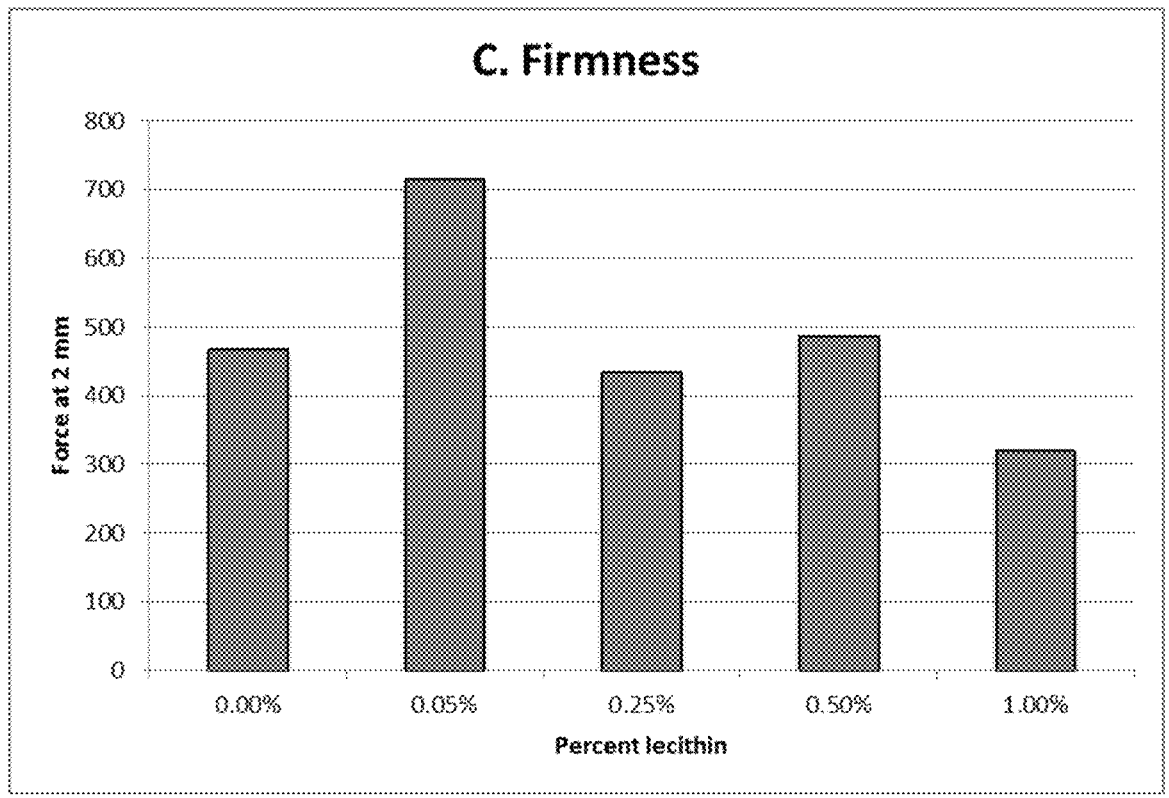
FIG. 2C is a bar graph depicting the firmness of adipose replicas based on the amount of lecithin.

Firmness of the adipose replica was measured by texture analyzer (TA XT plus). A probe penetrated a flat surface of the adipose replica, and the force at 2 mm penetration was recorded. A small amount of lecithin (0.05%) increased the firmness, and at 0.25% and above, the firmness of the adipose replica decreased. See FIG. 2C.

Example 36—Adipose Replica with Varying Vegetable Oil Type

To observe the effect of vegetable oil type on the adipose replica, a formulation was prepared that contained a 1.5% w/v moong protein and 0.05% w/v lecithin, and 75% v/v of different vegetable oils (canola oil, cocoa butter, coconut oil, and olive oil) using the same methodology as Example 35. Properties of the adipose replica were measured by weighing small portions of the material and forming uniform round balls, which were then cooked on a non-stick pan with temperature slowly ramping up to 250° C. The temperature of the pan at which fat visibly released from the balls was measured as the fat release temperature. After cooking to completion, the point at which fat no longer released, the total fat released was measured.

Figure 4:
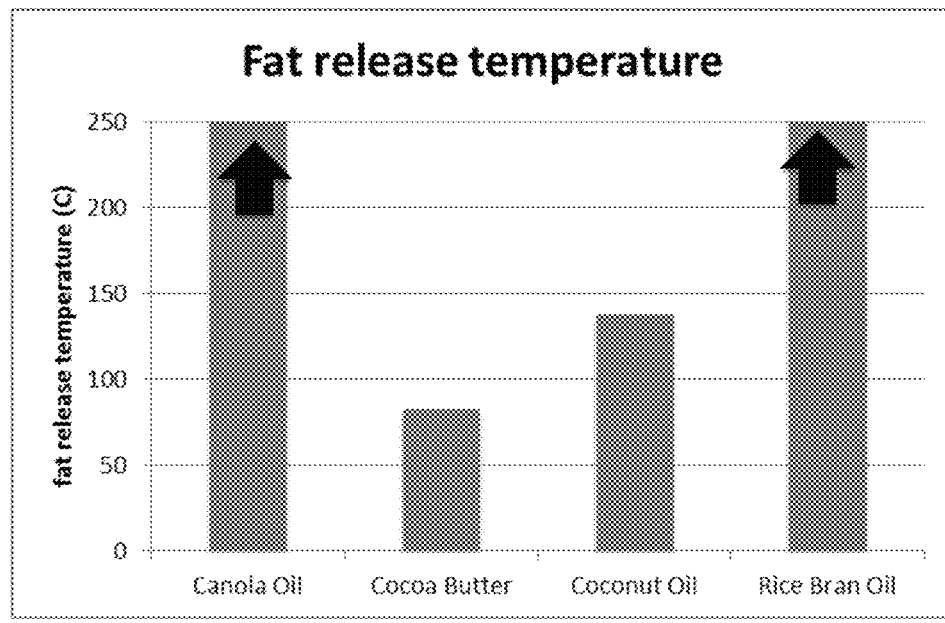
FIG. 4 is a bar graph depicting the fat release temperature of adipose replicas containing different oils (canola oil, cocoa butter, coconut oil, or rice bran oil).

Varying the vegetable oil type had a large effect on the adipose replica. Oils with a higher amount of unsaturated fats, including canola and rice bran oils, released very little fat (1 and 2% fat released, see FIG. 3), while oils with a higher amount of saturated fats, including cocoa butter and coconut oil released significantly more fat (30% and 50% fat released, see FIG. 4). The adipose replicas with canola and rice bran oils required a temperature greater than 250° C. to melt (not measured), while the adipose replicas with cocoa butter and coconut oil released fat at a lower temperature (82° C. and 137° C.).

Example 37—Adipose Replica Made with Coacervate

Lecithin (SOLEC™ F Deoiled Soy Lecithin, The Solae Company, St. Louis, Mo.) was prepared at a concentration of 50 mg/ml in 20 mM potassium phosphate, 100 mM NaCl, pH 8.0 buffer and sonicated (Sonifier Analog Cell Disruptor model 102C, BRANSON Ultrasonics Corporation, Danbury, Conn.) for 30 seconds. Pea legumin and pea vicilin proteins in 20 mM potassium phosphate, 100 mM NaCl, pH 8.0 buffer, were mixed to a 1:1 ratio. Cocoa butter was melted by heating to 70° C. and held warm until needed. The cocoa butter was added to 2% and 10% w/v to the protein mixtures, and was added at 60° C. to maintain cocoa butter in the liquid state. While the solutions were still warm, the mixtures were sonicated 1-3 minutes, until cocoa butter particles were visibly emulsified. The pH of the samples was adjusted to 5.5 with HCl, and the mixtures turned into a milky white color, then centrifuged at 5,000×g for ten minutes. After centrifugation, a pellet was collected, comprising a coacervate of protein and cocoa butter. The 2% fat coacervates were sticky and stretchy, while the 10% fat coacervates were fatty and pliable. The coacervates were sealed in plastic and subjected to high pressure processing (HPP). The sample was sealed in a heat-sealable food-saver plastic bag and then subject to high pressure processing (85 k psi for 5 minutes in an Avure 2 L Isostatic Food Press). After HPP, the 2% coacervate samples formed a semi-firm, cohesive material. The 10% coacervate samples were crumbly, soft, and oily.

Properties of the processed coacervate samples were measured by breaking off small portions of the material and cooking on a non-stick pan with temperature slowly ramping up to 250° C. The coacervate samples did not release any fat upon cooking to this temperature.

Other Embodiments

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A meat replica matrix comprising:
   one or more plant proteins;
   a sugar selected from glucose, ribose, sucrose, fructose, xylose, maltodextrin, and combinations thereof;
   at least one sulfur compound selected from methionine, cysteine, and thiamine; and
   0.01%-5% (by weight of the meat replica matrix) of a non-animal heme-containing protein,
   wherein, upon cooking of the meat replica matrix, at least two volatile compounds are generated that are associated with a beef-like aroma.

2. The meat replica matrix of claim 1, wherein the non-animal heme-containing protein has an amino acid sequence with at least 70% homology to the amino acid sequence set forth in SEQ ID NO: 1.

3. The meat replica matrix of claim 1, wherein the non-animal heme-containing protein has a UV-VIS spectrum that is substantially similar to that of myoglobin from an animal.

4. The meat replica matrix of claim 1, wherein non-animal the heme-containing protein is selected from the group consisting of a leghemoglobin, a flavohemoglobin, Hell's gate globin I, an erythrocruorin, a protoglobin, a cyanoglobin, a chlorocruorin, a truncated hemoglobin, a truncated 2/2 globin, and a hemoglobin 3.

5. The meat replica matrix of claim 1, wherein the meat replica matrix comprises 0.4%-1% (by weight of the meat replica matrix) of the non-animal heme-containing protein.

6. The meat replica matrix of claim 1, wherein the meat replica matrix comprises about 0.3% (by weight of the meat replica matrix) of the non-animal heme-containing protein.

7. The meat replica matrix of claim 1, wherein the meat replica matrix comprises about 0.2% (by weight of the meat replica matrix) of the non-animal heme-containing protein.

8. The meat replica matrix of claim 1, wherein the one or more plant proteins are selected from the group consisting of rubisco, pea proteins, lentil proteins, and other legume proteins.

9. The meat replica matrix of claim 8, wherein the pea proteins comprise pea albumin proteins.

10. The meat replica matrix of claim 1, wherein the one or more plant proteins are present in the meat replica matrix in an amount of between 1% and 30% (by weight of the meat replica matrix).

11. The meat replica matrix of claim 1, wherein the meat replica matrix is comprised within a consumable product, wherein the consumable product is selected from taco filling, a casserole, a sauce, a topping, soup, stew, and a loaf, wherein, upon cooking of the consumable product, the at least two volatile compounds are produced in higher amounts compared to the amounts of the at least two volatile compounds produced upon cooking of the meat replica matrix lacking the non-animal heme-containing protein.

12. The meat replica matrix of claim 1, wherein the at least two volatile compounds are selected from the group consisting of (E)-2-decenal; (E)-2-heptenal; (E)-2-hexenal; (E)-2-nonenal; (E)-2-octenal; (E)-4-octene; (E,E)-2,4-decadienal; (E,E)-2,4-heptadienal; (E,E)-2,4-nonadienal; (E,E)-3,5-octadien-2-one; (E,Z)-2,6-nonadienal; (Z)-2-decenal; (Z)-2-heptenal; (Z)-2-nonenal; (Z)-2-octen-1-ol; (Z)-4-heptenal; 1-(1H-pyrrol-2-yl)-ethanone; 1-(2-furanyl)-ethanone; 1-(6-methyl-2-pyrazinyl)-1-ethanone; 1-(acetyloxy)-2-propanone; 1,3-dimethyl-benzene; 1,3-hexadiene; 1-butanol; 1-ethyl-5-methylcyclopentene; 1-heptanol; 1-heptene; 1-hexanol; 1H-pyrrole-2-carboxaldehyde; 1-hydroxy-2-propanone; 1-methyl-1 (H)-pyrrole-2-2carboxaldehyde; 1-octanal; 1-octanol; 1-octen-3-ol; 1-octen-3-one; 1-octene; 1-pentanol; 1-penten-3-ol; 1-penten-3-one; 1-propanol; 2(5H)-furanone; 2,2,4,6,6-pentamethyl-heptane; 2,2-dimethyl-undecane; 2,3-butanedione; 2,3-dihydro-3,5-dihydroxy-6-methyl-4(H)-pyran-4-one; 2,3-dimethyl-5-ethylpyrazine; 2,3-dimethyl-pyrazine; 2,4-dodecadienal; 2,5-dimethyl-3-(3-methyl butyl) pyrazine; 2,5-dimethyl-pyrazine; 2,6-dimethylnonane; 2,6-dimethylpyrazine; 2-acetylthiazole; 2-butanone; 2-butenal; 2-decanone; 2-ethenyl-6-methylpyrazine; 2-ethyl furan; 2-ethyl-1-hexanol; 2-ethyl-5-methyl-pyrazine; 2-ethyl-furan; 2-furanmethanol; 2-heptanone; 2-heptenal; 2-hexyl-furan; 2-hexyl-thiophene; 2-hydroxy-3-methyl-2-cyclopentene-1-one; 2-methyl thiazole; 2-methyl-1H-pyrrole; 2-methyl-2-heptene; 2-methyl-butanal; 2-methyl-furan; 2-methyl-heptane; 2-methyl-propanal; 2-n-butylacrolein; 2-n-heptylfuran; 2-nonanone; 2-octanone; 2-pentanone; 2-pentyl-furan; 2-pentyl-thiophene; 2-propenal; 2-propyl-furan; 2-pyridinecarboxaldehyde; 2-pyrrolidinone; 2-thiophenecarboxaldehyde; 2-tridecen-1-ol; 2-undecenal; 3,5-octadien-2-one; 3,6,6-trimethyl-bicyclo[3.1.1]hept-2-ene; 3-acetyl-1h-pyrolline; 3-ethyl-2,2-dimethyl-pentane; 3-ethyl-2,5-dimethyl-pyrazine; 3-ethyl-2-1,4-dioxin; 3-ethyl-2-methyl-1,3-hexadiene; 3-ethylcyclopentanone; 3-methyl-2-butenal; 3-methyl-2-thiophenecarboxaldehyde; 3-methyl-3-hexene; 3-methyl-butanal; 3-methyl-furan; 3-octen-2-one; 3-pentyl-furan; 3-thiophenecarboxaldehyde; 3-thiophenmethanol; 4,7-dimethyl-undecane; 4-cyanocyclohexene; 4-cyclopentene-1,3-dione; 4-decyne; 4-methyl-5-thiazoleethanol; 4-methylthiazole; 4-octene; 4-penten-2-one; 5-acetyldihydro-2(3H)-furanone; 5-ethyldihydro-2(3H)-furanone; 5-methyl-2-furancarboxaldehyde; 5-methyl-2-thiophenecarboxaldehyde; 6-methyl-2-heptanone; 6-methyl-5-hepten-2-one; 8-methyl-1-undecene; acetaldehyde; acetamide; acetic acid; acetic acid ethenyl ester; acetoin; acetone; acetonitrile; acetophenone; benzaldehyde; benzene; benzyl alcohol; butanal; butanoic acid; butyrolactone; caprolactam; carbon disulfide; decanal; decanol; dihydro-2-methyl-3(2H)-furanone; dihydro-5-pentyl-2(3H)-furanone; dihydro-5-propyl-2(3H)-furanone; dimethyl sulfide; dimethyl trisulfide; d-limonene; ethenyl pyrazine; ethyl acetate; ethyl pyrazine; formamide; formic acid heptyl ester; furan; furaneol; furfural; heptanal; heptane; heptanoic acid; heptyl ester; hexanoic acid; isopropyl alcohol; isovaleric acid; methacrolein; methional; methyl ethanoate; methylpyrazine; methyl-thiirane; n-caproic acid vinyl ester; nonanal; octanal; octane; octanoic acid; oxalic acid, butyl propyl ester; pantolactone; p-cresol; pentanal; pentanoic acid; phenol; phenylacetaldehyde; propanal; pyrazine; pyridine; pyrrole; styrene; tetramethyl-pyrazine; thiazole; thiophene; toluene; trans-2-(2-pentenyl)furan; trans-3-nonen-2-one; trichloromethane; trimethyl-ethanethiol; and trimethyl-pyrazine.

13. A meat replica matrix comprising:
one or more plant proteins;
a sugar selected from glucose, ribose, sucrose, fructose, xylose, maltodextrin, and combinations thereof;
at least one sulfur compound selected from methionine, cysteine, and thiamine; and
0.01%-5% (by weight of the meat replica matrix) of a non-animal heme-containing protein,
wherein, upon cooking of the meat replica matrix, at least two volatile compounds are generated, and
wherein the at least two volatile compounds are selected from the group consisting of (E)-2-decenal; (E)-2-heptenal; (E)-2-hexenal; (E)-2-nonenal; (E)-2-octenal; (E)-4-octene; (E,E)-2,4-decadienal; (E,E)-2,4-heptadienal; (E,E)-2,4-nonadienal; (E,E)-3,5-octadien-2-one; (E,Z)-2,6-nonadienal; (Z)-2-decenal; (Z)-2-heptenal; (Z)-2-nonenal; (Z)-2-octen-1-ol; (Z)-4-heptenal; 1-(1H-pyrrol-2-yl)-ethanone; 1-(2-furanyl)-ethanone; 1-(6-methyl-2-pyrazinyl)-1-ethanone; 1-(acetyloxy)-2-propanone; 1,3-dimethyl-benzene; 1,3-hexadiene; 1-butanol; 1-ethyl-5-methylcyclopentene; 1-heptanol; 1-heptene; 1-hexanol; 1H-pyrrole-2-carboxaldehyde; 1-hydroxy-2-propanone; 1-methyl-1(H)-pyrrole-2-2carboxaldehyde; 1-octanal; 1-octanol; 1-octen-3-ol; 1-octen-3-one; 1-octene; 1-pentanol; 1-penten-3-ol; 1-penten-3-one; 1-propanol; 2(5H)-furanone; 2,2,4,6,6-pentamethyl-heptane; 2,2-dimethyl-undecane; 2,3-butanedione; 2,3-dihydro-3,5-dihydroxy-6-methyl-4

(H)-pyran-4-one; 2,3-dimethyl-5-ethylpyrazine; 2,3-dimethyl-pyrazine; 2,4-dodecadienal; 2,5-dimethyl-3-(3-methyl butyl) pyrazine; 2,5-dimethyl-pyrazine; 2,6-dimethylnonane; 2,6-dimethylpyrazine; 2-acetylthiazole; 2-butanone; 2-butenal; 2-decanone; 2-ethenyl-6-methyl-pyrazine; 2-ethyl furan; 2-ethyl-1-hexanol; 2-ethyl-5-methyl-pyrazine; 2-ethyl-furan; 2-furanmethanol; 2-heptanone; 2-heptenal; 2-hexyl-furan; 2-hexyl-thiophene; 2-hydroxy-3-methyl-2-cyclopentene-1-one; 2-methyl thiazole; 2-methyl-1H-pyrrole; 2-methyl-2-heptene; 2-methyl-butanal; 2-methyl-furan; 2-methyl-heptane; 2-methyl-propanal; 2-n-butylacrolein; 2-n-heptylfuran; 2-nonanone; 2-octanone; 2-pentanone; 2-pentyl-furan; 2-pentyl-thiophene; 2-propenal; 2-propyl-furan; 2-pyridinecarboxaldehyde; 2-pyrrolidinone; 2-thiophenecarboxaldehyde; 2-tridecen-1-ol; 2-undecenal; 3,5-octadien-2-one; 3,6,6-trimethyl-bicyclo[3.1.1]hept-2-ene; 3-acetyl-1h-pyrolline; 3-ethyl-2,2-dimethyl-pentane; 3-ethyl-2,5-dimethyl-pyrazine; 3-ethyl-2-1,4-dioxin; 3-ethyl-2-methyl-1,3-hexadiene; 3-ethylcyclopentanone; 3-methyl-2-butenal; 3-methyl-2-thiophenecarboxaldehyde; 3-methyl-3-hexene; 3-methyl-butanal; 3-methyl-furan; 3-octen-2-one; 3-pentyl-furan; 3-thiophenecarboxaldehyde; 3-thiophenmethanol; 4,7-dimethyl-undecane; 4-cyanocyclohexene; 4-cyclopentene-1,3-dione; 4-decyne; 4-methyl-5-thiazoleethanol; 4-methylthiazole; 4-octene; 4-penten-2-one; 5-acetyldihydro-2(3H)-furanone; 5-ethyldihydro-2(3H)-furanone; 5-methyl-2-furancarboxaldehyde; 5-methyl-2-thiophenecarboxaldehyde; 6-methyl-2-heptanone; 6-methyl-5-hepten-2-one; 8-methyl-1-undecene; acetaldehyde; acetamide; acetic acid; acetic acid ethenyl ester; acetoin; acetone; acetonitrile; acetophenone; benzaldehyde; benzene; benzyl alcohol; butanal; butanoic acid; butyrolactone; caprolactam; carbon disulfide; decanal; decanol; dihydro-2-methyl-3(2H)-furanone; dihydro-5-pentyl-2(3H)-furanone; dihydro-5-propyl-2(3H)-furanone; dimethyl sulfide; dimethyl trisulfide; d-limonene; ethenyl pyrazine; ethyl acetate; ethyl pyrazine; formamide; formic acid heptyl ester; furan; furaneol; furfural; heptanal; heptane; heptanoic acid; heptyl ester; hexanoic acid; isopropyl alcohol; isovaleric acid; methacrolein; methional; methyl ethanoate; methyl-pyrazine; methylthiirane; n-caproic acid vinyl ester; nonanal; octanal; octane; octanoic acid; oxalic acid, butyl propyl ester; pantolactone; p-cresol; pentanal; pentanoic acid; phenol; phenylacetaldehyde; propanal; pyrazine; pyridine; pyrrole; styrene; tetramethyl-pyrazine; thiazole; thiophene; toluene; trans-2-(2-pentenyl)furan; trans-3-nonen-2-one; trichloromethane; trimethyl-ethanethiol; and trimethyl-pyrazine.

14. The meat replica matrix of claim 13, wherein the non-animal heme-containing protein has an amino acid sequence with at least 70% homology to the amino acid sequence set forth in SEQ ID NO: 1.

15. The meat replica matrix of claim 13, wherein the non-animal heme-containing protein has a UV-VIS spectrum that is substantially similar to that of myoglobin from an animal.

16. The meat replica matrix of claim 13, wherein the non-animal heme-containing protein is selected from the group consisting of a leghemoglobin, a flavohemoglobin, Hell's gate globin I, an erythrocruorin, a protoglobin, a cyanoglobin, a chlorocruorin, a truncated hemoglobin, a truncated 2/2 globin, and a hemoglobin 3.

17. The meat replica matrix of claim 13, wherein the meat replica matrix comprises 0.4%-1% (by weight of the meat replica matrix) of the non-animal heme-containing protein.

18. The meat replica matrix of claim 13, wherein the meat replica matrix comprises about 0.3% (by weight of the meat replica matrix) of the non-animal heme-containing protein.

19. The meat replica matrix of claim 13, wherein the meat replica matrix comprises about 0.2% (by weight of the meat replica matrix) of the non-animal heme-containing protein.

20. The meat replica matrix of claim 13, wherein the one or more plant proteins are selected from the group consisting of rubisco, pea proteins, lentil proteins, and other legume proteins.

21. The meat replica matrix of claim 20, wherein the pea proteins comprise pea albumin proteins.

22. The meat replica matrix of claim 13, wherein the one or more plant proteins are present in the meat replica matrix in an amount of between 1% and 30% (by weight of the meat replica matrix).

23. The meat replica matrix of claim 13, wherein the meat replica matrix is comprised within a consumable product, wherein the consumable product is selected from taco filling, a casserole, a sauce, a topping, soup, stew, and a loaf, wherein, upon cooking of the consumable product, the at least two volatile compounds are produced in higher amounts compared to the amounts of the at least two volatile compounds produced upon cooking of the meat replica matrix lacking the non-animal heme-containing protein.

* * * * *

UNITED STATES PATENT AND TRADEMARK OFFICE
CERTIFICATE OF CORRECTION

PATENT NO. : 11,013,250 B2
APPLICATION NO. : 16/238802
DATED : May 25, 2021
INVENTOR(S) : Marija Vrljic et al.

It is certified that error appears in the above-identified patent and that said Letters Patent is hereby corrected as shown below:

On the Title Page

Item (63), and Page 2 delete:
"Continuation of application No. 15/786,766, filed on Oct. 18, 2017, now Pat. No. 10,172,381, which is a continuation of application No. 14/796,970, filed on Jul. 10, 2015, now Pat. No. 10,039,306, which is a continuation of application No. PCT/US2014/011361, filed on Jan. 13, 2014, which is a continuation of application No. 13/941,211, filed on Jul. 12, 2013, now abandoned."

And insert:
-- Continuation of application No. 15/786,766, filed on Oct. 18, 2017, now Pat. No. 10,172,381, which is a continuation of application No. 14/796,970, filed on Jul. 10, 2015, now Pat. No. 10,039,306, which is a continuation of application No. PCT/US2014/011361, filed on Jan. 13, 2014, which is a continuation-in-part of application No. 13/941,211, filed on Jul. 12, 2013, now abandoned, which claims the benefit of application No. 61/671,069, filed on July 12, 2012, and is a continuation-in-part of application No. PCT/US2012/046560, filed on July 12, 2012, which claims the benefit of application No. 61/572,205, filed on July 12, 2011. --

In the Specification

In Column 1, CROSS-REFERENCE TO RELATED APPLICATIONS, delete:
"This application is a continuation of U.S. application Ser. No. 15/786,776 filed on Oct. 18, 2017, which is a continuation of U.S. application Ser. No. 14/796,970 filed Jul. 10, 2015, which is a continuation of, and claims the benefit of priority under 35 U.S.C. § 120 to, PCT/US2014/011361, which is a continuation of, and claims the benefit of priority under 35 U.S.C. § 120 to U.S. application Ser. No. 13/941,211, filed Jul. 12, 2013, which claims the benefit of priority under 35 U.S.C. § 119(e) to U.S. Application Ser. No. 61/908,634, filed Nov. 25, 2013, and to U.S. Application Ser. No. 61/751,816, filed Jan. 11, 2013; and this application is related to the following co-pending patent applications: Application Serial No. PCT/ US2012/46560; Application Ser. No. PCT/US2012/46552; Application Ser. No. 61/876,676, filed Sep. 11, 2013; Application Ser. No. 61/751,818, filed Jan.

Signed and Sealed this
Twenty-fifth Day of March, 2025

Coke Morgan Stewart
*Acting Director of the United States Patent and Trademark Office*

CERTIFICATE OF CORRECTION (continued)
U.S. Pat. No. 11,013,250 B2

11, 2013, and Application Ser. No. 61/611,999, filed Mar. 16, 2012, all of which are incorporated herein by reference."

And insert:
-- This application (1) is a continuation of U.S. Application No. 15/786,776 filed on Oct. 18, 2017, now Pat. No. 10,172,381, which is incorporated by reference and is a continuation of U.S. Application No. 14/796,970, filed on Jul. 10, 2015, now Pat. No. 10,039,306, which is incorporated by reference and is a continuation of and claims priority to PCT/US2014/011361, which is incorporated by reference and is a continuation-in-part of and claims priority to U.S. Application. No. 13/941,211, filed on Jul. 12, 2013, now abandoned, which is incorporated by reference and claims the benefit of U.S. Application No. 61/671,069, filed on Jul. 12, 2012, and is a continuation-in-part of PCT/US2012/46560, filed on Jul. 12, 2012, which is incorporated by reference and claims the benefit of U.S. Application No. 61/572,205, filed on Jul. 12, 2011; (2) claims priority to U.S. Application No. 61/908,634, filed on Nov. 25, 2013, which is incorporated by reference; (3) claims priority to U.S. Application No. 61/751,816, filed on Jan. 11, 2013, which is incorporated by reference; and (4) is related to the following patent applications, which are incorporated by reference: PCT/US2012/046552, filed on Jul. 12, 2012; U.S. Application No. 61/876,676, filed on Sep. 11, 2013; U.S. Application No. 61/751,818, filed on Jan. 11, 2013; and U.S. Application No. 61/611,999, filed on Mar. 16, 2012. --